United States Patent [19]
Van Hook et al.

[11] Patent Number: 6,166,748
[45] Date of Patent: *Dec. 26, 2000

[54] INTERFACE FOR A HIGH PERFORMANCE LOW COST VIDEO GAME SYSTEM WITH COPROCESSOR PROVIDING HIGH SPEED EFFICIENT 3D GRAPHICS AND DIGITAL AUDIO SIGNAL PROCESSING

[75] Inventors: Timothy J. Van Hook, Menlo Park; Howard H. Cheng, San Francisco; Anthony P. DeLaurier, Sunnyvale; Carroll P. Gossett, Mountain View; Robert J. Moore, Sunnyvale; Stephen J. Shepard, Cupertino; Harold S. Anderson, Morgan Hill; John Princen, Sunnyvale; Jeffrey C. Doughty, Palo Alto; Nathan F. Pooley, Mountain View; Byron Sheppard, Santa Cruz, all of Calif.; Genyo Takeda, Hirakata; Shuhei Kato, Otsu, both of Japan

[73] Assignees: Nintendo Co., Ltd., Kyoto, Japan; Silicon Graphics Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/990,133

[22] Filed: Dec. 12, 1997

Related U.S. Application Data

[62] Division of application No. 08/561,718, Nov. 22, 1995.

[51] Int. Cl.[7] ...................................................... G06T 1/00
[52] U.S. Cl. .............................................................. 345/522
[58] Field of Search ..................................... 345/422, 431, 345/153, 155, 136, 506, 522, 432

[56] References Cited

U.S. PATENT DOCUMENTS

Re. 31,200  4/1983  Sukonick et al. .
4,016,544  4/1977  Morita et al. .
4,404,629  9/1983  Albaugh .

(List continued on next page.)

FOREIGN PATENT DOCUMENTS 0 627 699 A2  12/1994  European Pat. Off. .
0 632 407 A1  1/1995  European Pat. Off. .

(List continued on next page.)

OTHER PUBLICATIONS

"Battle Zone/Cabaret", Atari Inc. (1980), pp. 12–13 & VHS videotape.
Perry et al., associate editors, "Special Report, Consumer (List continued on next page.)

*Primary Examiner*—Mark Zimmerman
*Assistant Examiner*—Lance W. Sealey
*Attorney, Agent, or Firm*—Nixon & Vanderhye P.C.

[57] ABSTRACT

A low cost high performance three dimensional (3D) graphics system is disclosed that can model a world in three dimensions and project the model onto a two dimensional viewing plane selected based on a changeable viewpoint. The viewpoint can be changed on an interactive, real time basis by operating user input controls such as game controllers. The system rapidly produces a corresponding changing image (which can include animated cartoon characters or other animation) on the screen of a color television set.

The richly featured high performance low cost system is intended to give consumers the chance to interact in real time right inside magnificent virtual 3D worlds to provide a high degree of image realism, excitement and flexibility. An optimum feature set/architecture (including a custom designed graphics/audio coprocessor) provides high quality fast moving 3D images and digital stereo sound for video game play and other graphics applications. Numerous features provide flexibility and capabilities in a system that is intended to be within the cost range of most consumers.

45 Claims, 96 Drawing Sheets

U.S. PATENT DOCUMENTS

| | | |
|---|---|---|
| 4,454,593 | 6/1984 | Fleming et al. . |
| 4,789,927 | 12/1988 | Hannah . |
| 4,799,635 | 1/1989 | Nakagawa . |
| 4,821,208 | 4/1989 | Ryan et al. . |
| 4,823,120 | 4/1989 | Thompson et al. ............. 345/153 |
| 4,824,106 | 4/1989 | Ueda . |
| 4,945,499 | 7/1999 | Asari et al. . |
| 4,951,232 | 8/1990 | Hannah . |
| 4,970,636 | 11/1990 | Snodgrass et al. ............. 345/434 |
| 5,038,297 | 8/1991 | Hannah . |
| 5,051,737 | 9/1991 | Akeley et al. . |
| 5,068,644 | 11/1991 | Batson et al . |
| 5,070,479 | 12/1991 | Nakagawa . |
| 5,113,490 | 5/1992 | Winget . |
| 5,181,014 | 1/1993 | Dalrymple et al. . |
| 5,193,145 | 3/1993 | Akeley . |
| 5,204,664 | 4/1993 | Hamkawa . |
| 5,227,863 | 7/1993 | Bilbrey et al. ................ 345/302 |
| 5,228,126 | 7/1993 | Marianetti II . |
| 5,230,039 | 7/1993 | Grossman et al. ............. 345/430 |
| 5,250,928 | 10/1993 | Kuriki . |
| 5,265,199 | 11/1993 | Catlin . |
| 5,266,941 | 11/1993 | Akeley et al. . |
| 5,291,189 | 3/1994 | Otake et al. . |
| 5,307,450 | 4/1994 | Grossman . |
| 5,343,558 | 8/1994 | Akeley . |
| 5,347,618 | 9/1994 | Akeley . |
| 5,357,604 | 10/1994 | San et al. . |
| 5,369,739 | 11/1994 | Akeley . |
| 5,388,841 | 2/1995 | San et al. . |
| 5,394,170 | 2/1995 | Akeley et al. . |
| 5,479,189 | 12/1995 | Chesavage et al. . |
| 5,500,925 | 3/1996 | Tolson . |
| 5,515,081 | 5/1996 | Vasilik . |
| 5,537,579 | 7/1996 | Hiroyuki . |
| 5,541,923 | 7/1996 | Kato . |
| 5,570,115 | 10/1996 | Kawai et al. . |
| 5,631,668 | 5/1997 | Katsura et al. . |
| 5,684,897 | 11/1997 | Kumagai et al. . |
| 5,696,892 | 12/1997 | Redmann et al. . |
| 5,701,444 | 12/1997 | Baldwin ......................... 345/506 |
| 5,740,076 | 4/1998 | Lindbloom . |
| 5,790,128 | 8/1998 | Filliatre et al. . |
| 5,831,604 | 11/1998 | Gerber . |
| 5,872,902 | 2/1999 | Kuchkuda et al. . |
| 5,894,300 | 4/1999 | Tkaizawa . |
| 5,896,136 | 4/1999 | Augustine et al. . |
| 5,903,315 | 5/1999 | Mitchell et al. . |
| 5,907,315 | 5/1999 | Vlahos et al. . |
| 5,933,153 | 8/1999 | Deering et al. . |
| 5,949,409 | 9/1999 | Tananka et al . |
| 5,949,427 | 9/1999 | Nishikawa et al. . |
| 5,986,663 | 11/1999 | Wilde . |
| 5,990,903 | 11/1999 | Donovan . |
| 6,002,406 | 12/1999 | Zhao . |
| 6,016,151 | 1/2000 | Lin . |

FOREIGN PATENT DOCUMENTS

| | | |
|---|---|---|
| 0 633 533 A2 | 1/1995 | European Pat. Off. . |
| 0 649 118 A2 | 4/1995 | European Pat. Off. . |
| 0 676 719 A2 | 10/1995 | European Pat. Off. . |
| 0 676 726 A2 | 10/1995 | European Pat. Off. . |
| 0 681 267 A2 | 11/1995 | European Pat. Off. . |
| 4-106594 | 8/1992 | Japan . |
| WO94/27205 | 11/1994 | WIPO . |

OTHER PUBLICATIONS

Electronics, Video games: the electronic big bang," IEEE Spectrum, pp. 20–32, Dec. 1982.

Johnstone, "Keeping Nintendo Competitive," Wired, Jan. 1994, pp. 76–77.

"The Creation of Battlezone" from Microsoft Arcade (Updated).

"Battlezone by Atari Coin Op—True Facts" & "Army Battlezone" (memoranda).

*Open GL Programming Guide*, "The Offical Guide to Learning OpenGL, Release 1, " OpenGL Architecture Review Board, Jackie Neider, Tom Davis, Mason Woo, Copyright 1993 by Silicon Graphics, Inc.

*Open GL Reference Manual*, "The Offical Reference Document for OpenGL, Releasse 1," OpenGL Architecture REview Board, Copyright 1992 by Silicon Graphics, Inc.

*MIPS Microprocessor R4000 User's Manual*, First Edition, by Joe Heinrich, Copyright 1993 by MIPS Technologies, Inc.

*MIPS Microprocessor R4000 User's Manual*, Second edition, by Joe Heinrich, Copyright 1994 by MIPS Technologies, Inc.

*MIPS RISC Architecture*, "Introducing the R4000 Technology," by Gerry Kane and Joe Heinrich, Copyright 1992 by MIPS Technologies, Inc.

*MIPS Open RISC Technology*, "R4400 Microprocessor Product Information," by Satya Simha, MIPS Technologies, Inc. Sep. 27, 1993.

*Indy Product Guide*, Indy–TMG–(Sep. 1993), Copyright 1993 by Silicon Graphics, Inc.

*Open GL. It's Everywhere*, Information Sheet, OPGL–BRO (Jul. 1993), Copyright 1993 by Silicon Graphics, Inc.

*Reality Engine/Reality Engine$^2$, Graphics Subsystems*, Data Sheet, Copyright 1993 by Silicon Graphics, Inc.

*Indy Technical Report*, Indy–TR (Jun. 1993) Copyright 1993 by Silicon Graphics, Inc.

*Reality Engine In Visual Simulation Technical Overview*, RE–VisSim–TR(Aug. 1992). Copyright 1992 by Silicon Graphics, Inc.

*Rambus Architectural Overview*, DL0001–02, Copyright 1992, 1993 by Rambus Inc.

*SH7600 Series Super H RISC Engine, Overview*, Hitachi manual, Oct. 17, 1994.

*This Is What It's Like To Give Your Next Product A 32–Bit Risc Controller*, Hitachi America, Ltd. brochure, 1994.

*Sega Genesis Instruction Manual*, Sega, Hayward, California, #3701–926–0–01 (1994).

*Sega Genesis 32X Instruction Manual*, Sega, Redwood City California, #672–2116 (1994).

*Knuckles Chaotix Instruction Manual*, Sega, Redwood City, California, #84503 (1995).

*3D Ballz Instruction Booklet*. Accolade, San Jose, California, #0350–00231 Rev. A.

*Sonic 2 The Hedgehog Instruction Manual*, Sega, Hayward, California, #672–0944 3701–925–0–01 (1992).

PR Newswire, Sony Enters the CD–ROM–Based Video Game, New York, Ny, May 31, 1991.

Sony PlatStation Instruction Manual, and Information materials, Sony Computer Entertainment Inc. 1995.

6 Photographs of Sony PlayStation: 1) top case and compact disc; 2) hand controller; 3) internal circuit boards (top view); 4) internal circuit boards (top view); 5) compact disk reader (bottom view); and internal main circuit board (bottom view).

Johnson, M., "A Fixed –Point DSP For Graphics Engines, "IEEE MICRO, vol. 9, no. 4, Aug. 1989 (1989–08), pp. 63–77.

Wayner, P. "Silicon For 3–D, "BYTE, vol. 19, 1 Sept. 1994 (1994–09–01). pp. 191–192.

OVERALL VIDEO GAME SYSTEM

Fig. 3 OVERALL SYSTEM PROCESSES

OVERALL SYSTEM OPERATION

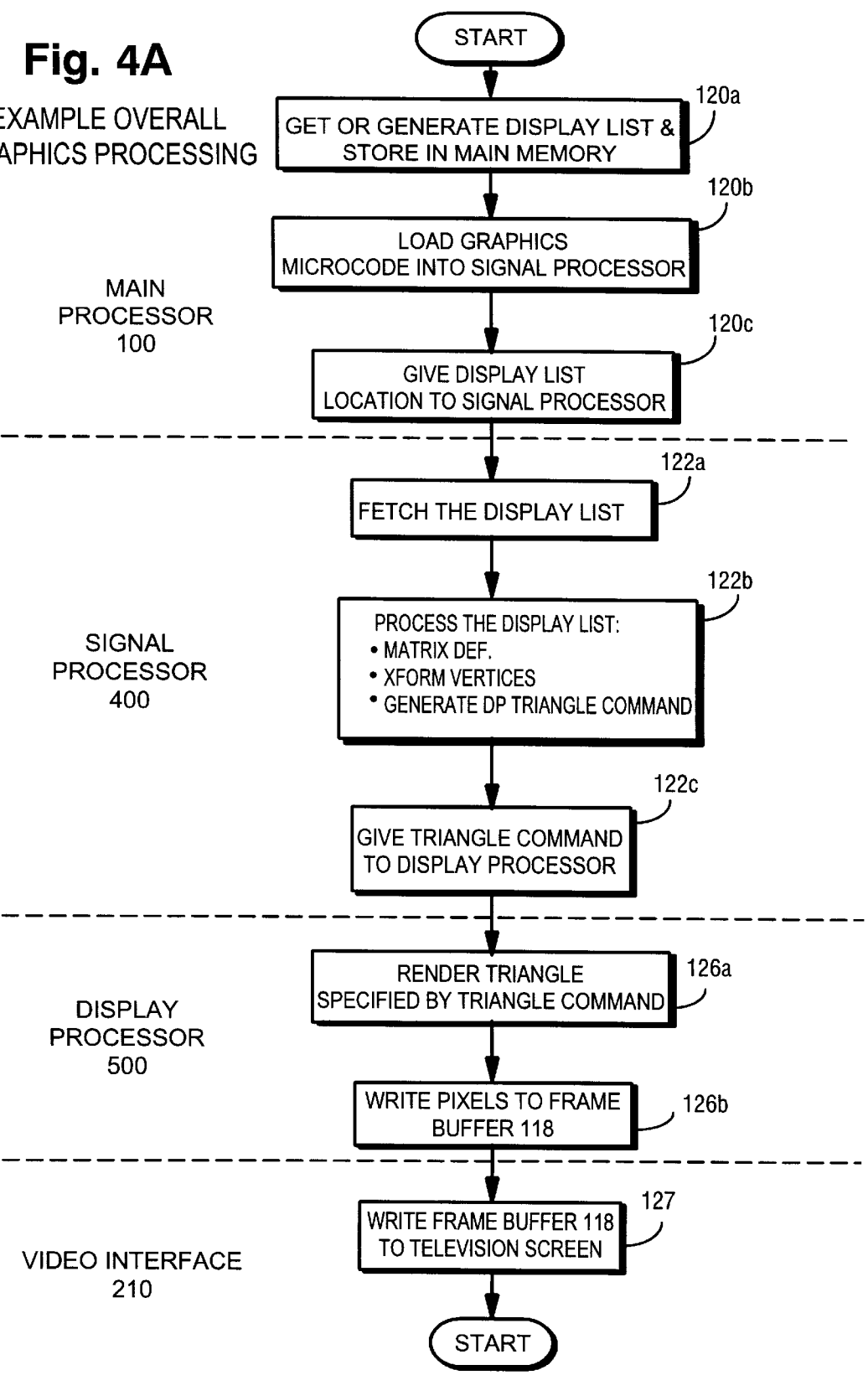

DETAILED SYSTEM ARCHITECTURE

EXAMPLE CPU
INITIALIZATION ROUTINE

EXAMPLE CPU MEMORY MAP

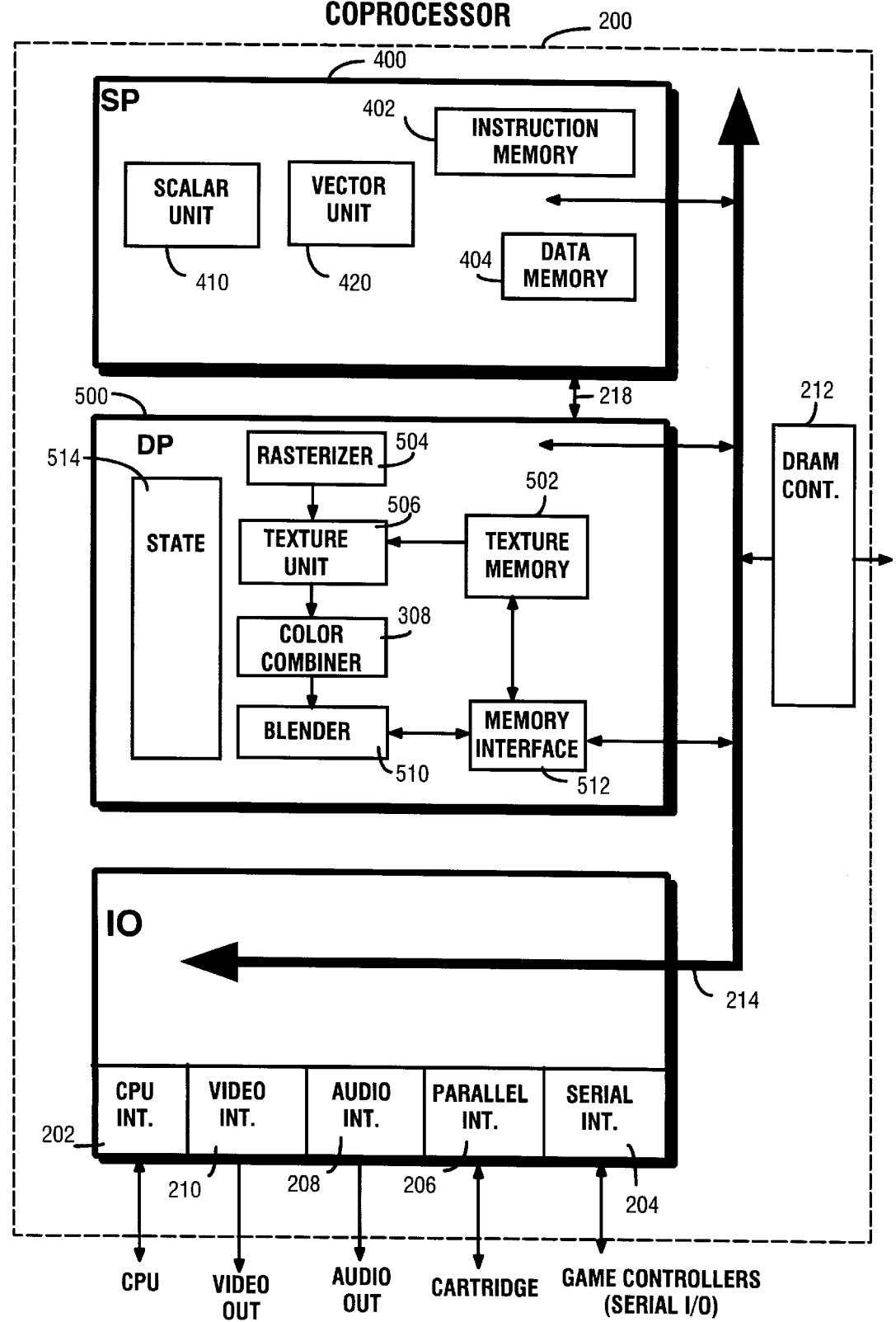

SYSTEM EXAMPLE
BUS STRUCTURE

SIGNAL PROCESSOR 400

Fig. 7D SP MEMORY DMA ADDRESS (R/W)
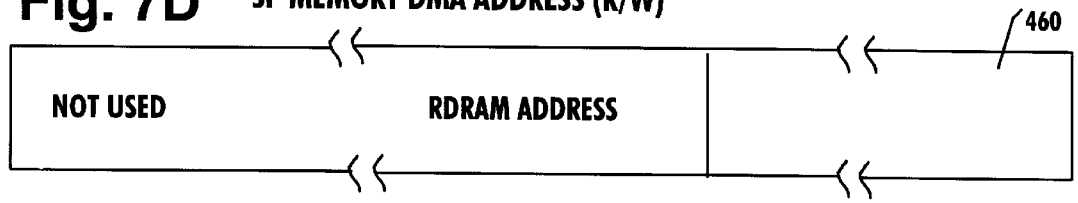
Fig. 7E SP READ DMA LENGTH (R/W)
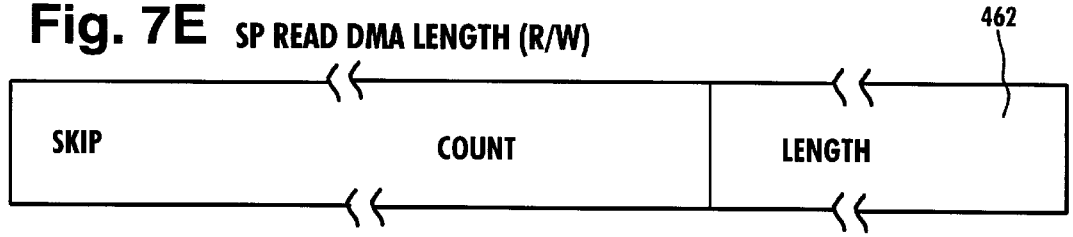
Fig. 7F SP WRITE DMA LENGTH (R/W)
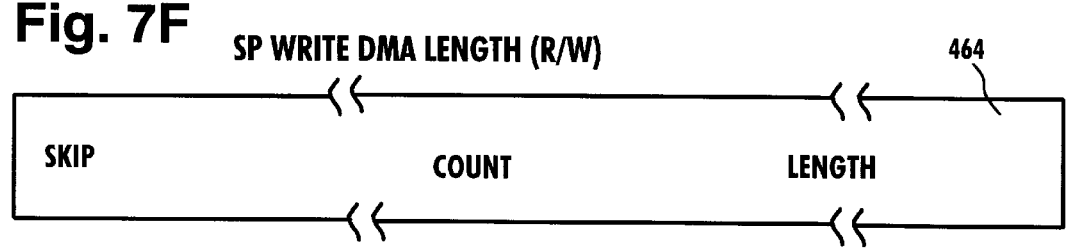
Fig. 7G SP DMA FULL REGISTER (R)
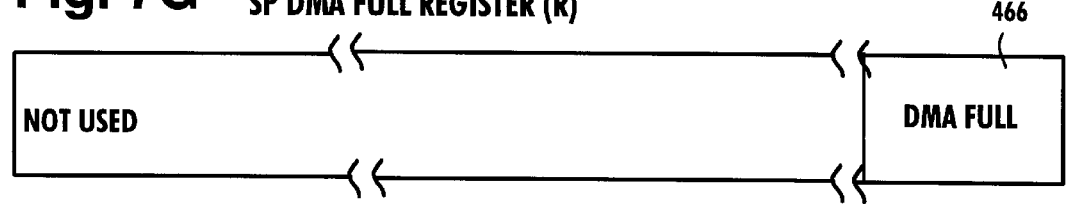
Fig. 7H SP DMA BUS, REGISTER (R)
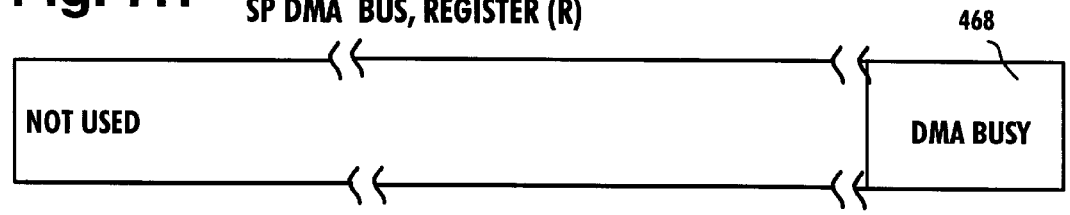
Fig. 7I SP DMA BUS, REGISTER (R)
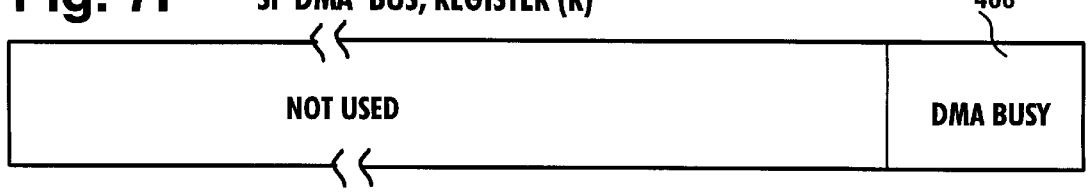

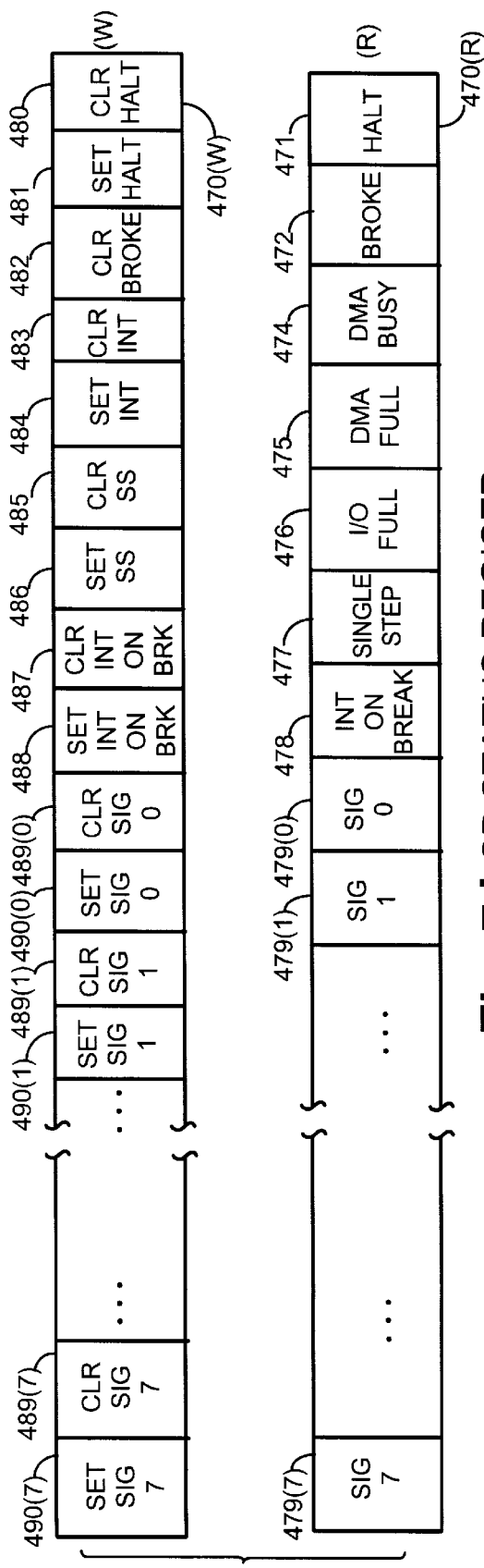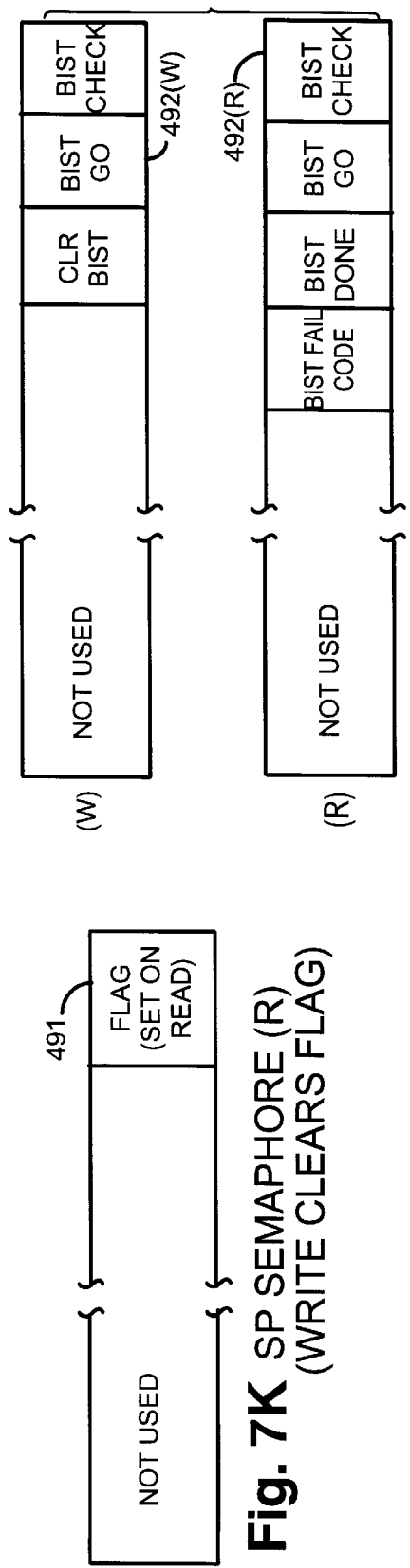
Fig. 7J SP STATUS REGISER
Fig. 7K SP SEMAPHORE (R) (WRITE CLEARS FLAG)
Fig. 7L SP IMEM BIST STATUS REGISTER

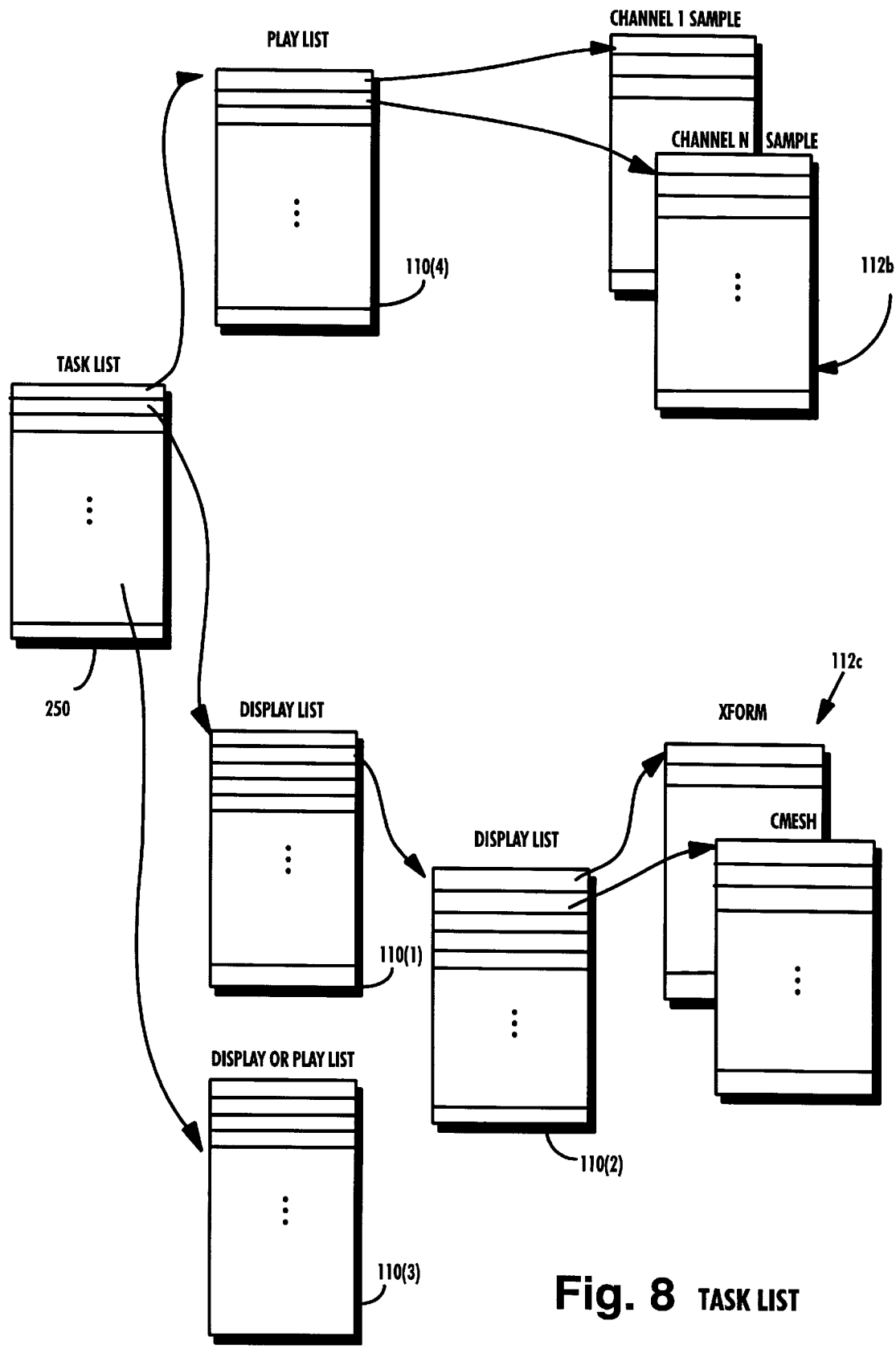
Fig. 8 TASK LIST

EXAMPLE MICROCODE LOAD ROUTINE

SIMPLE SP DISPLAY LIST PROCESS EXAMPLE

SIGNAL PROCESSOR
MICROCODE-GRAPHICS

EXAMPLE "DOUBLE PRECISION" VALUE

EXAMPLE MATRIX FORMAT

VERTEX BUFFER

EXAMPLE VERTEX DATA STRUCTURE

EXAMPLE SIGNAL PROCESSOR SEGMENT ADDRESSING

Fig. 14 EXAMPLE AUDIO SOFTWARE ARCHITECTURE
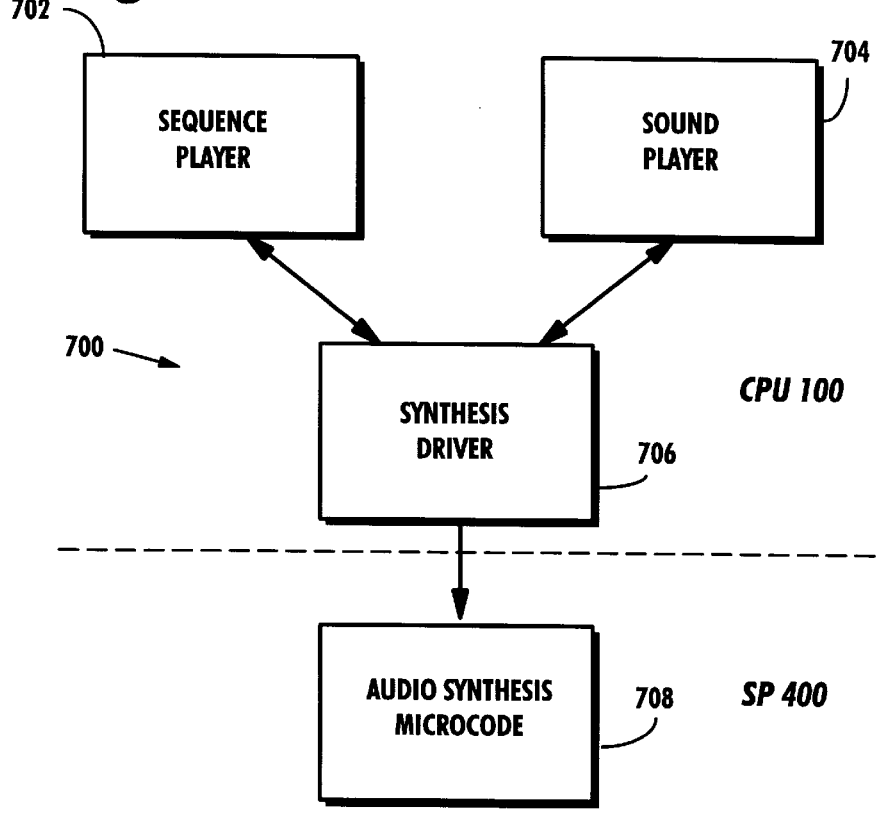
Fig. 17 EXAMPLE SP AUDIO PROCESSING
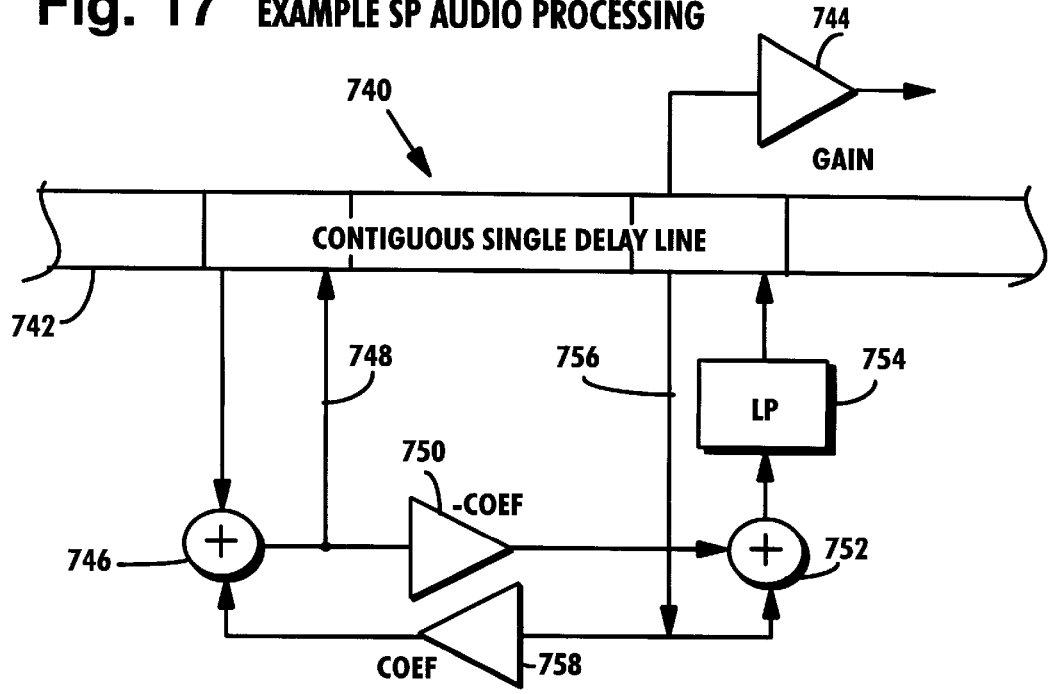

Fig. 15 SIMPLE SP PLAY LIST PROCESS EXAMPLE
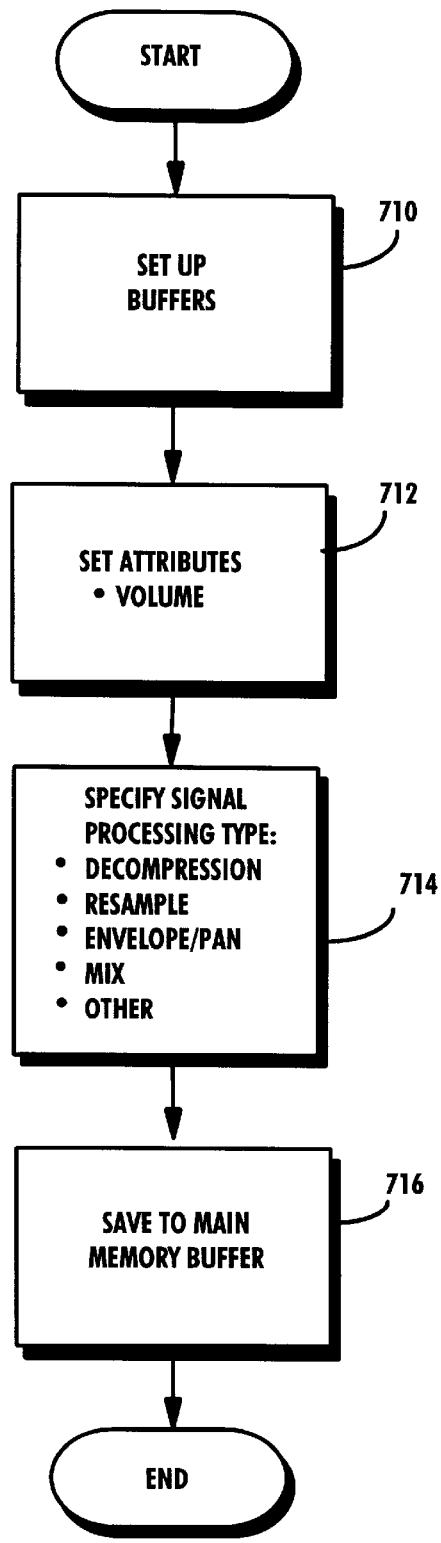

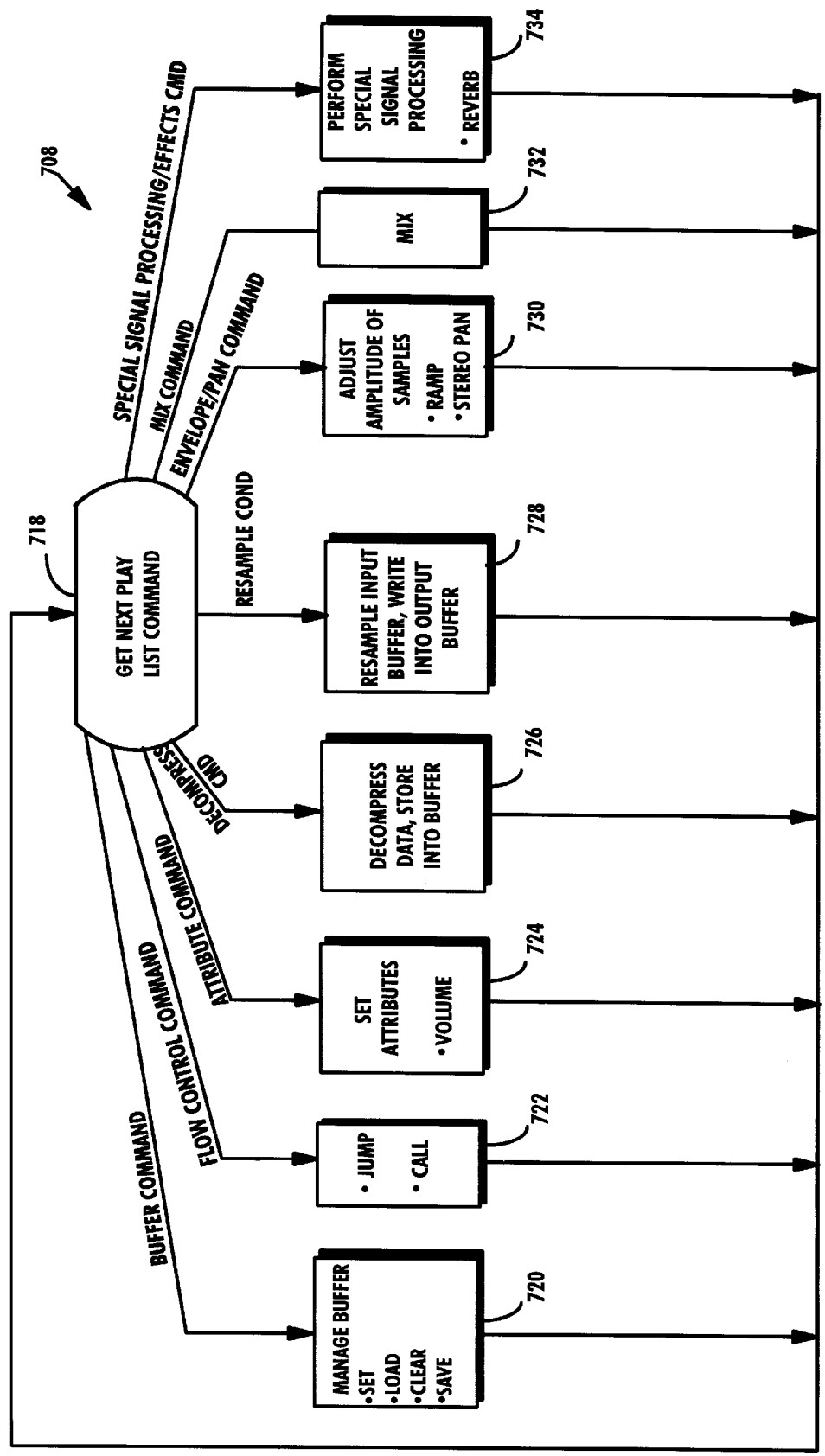
Fig. 16 SIGNAL PROCESSOR MICROCODE - AUDIO

DISPLAY PROCESSOR PROCESSING

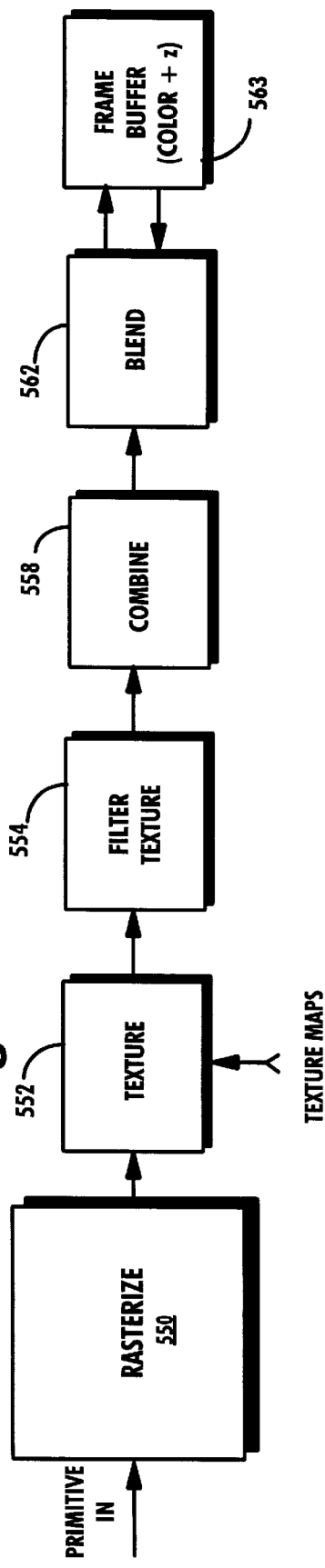
Fig. 19A DISPLAY PROCESSOR PIPELINE - 1 CYCLE MODE
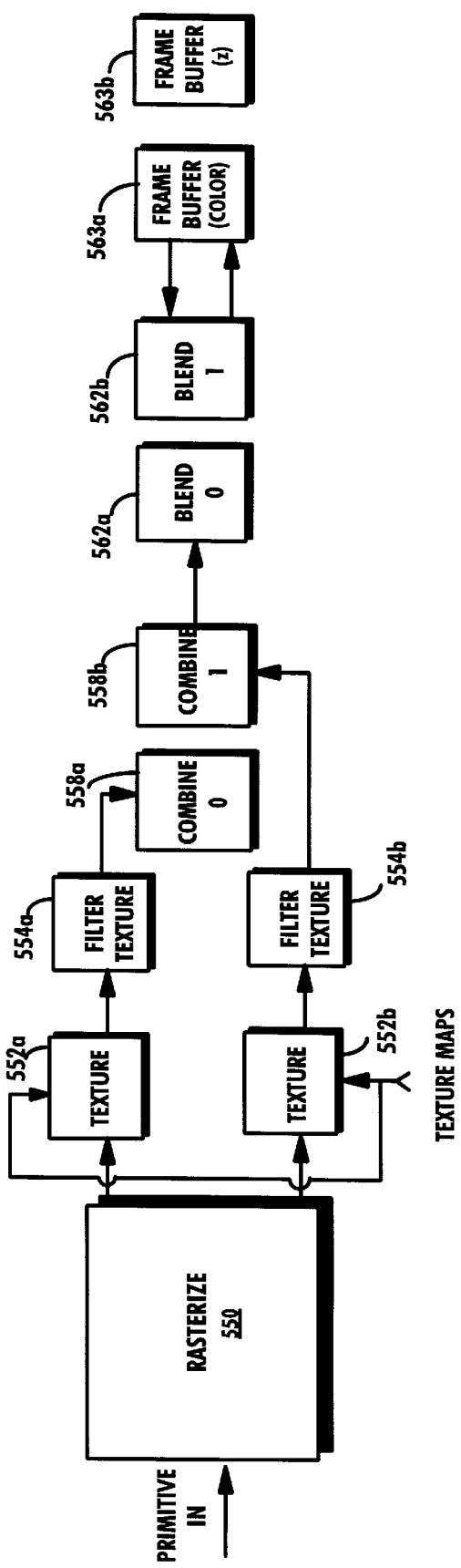
Fig. 19B DISPLAY PROCESSOR PIPELINE - 2 CYCLE MODE

DISPLAY PROCESSOR

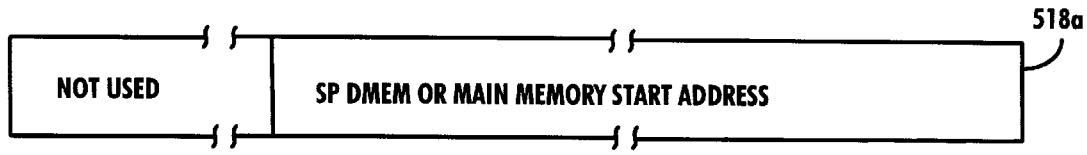
Fig. 21A DP CMD DMA START ADDRESS REGISTER (R/W)
Fig. 21B DP CMD DMA END ADDRESS REGISTER (R/W)
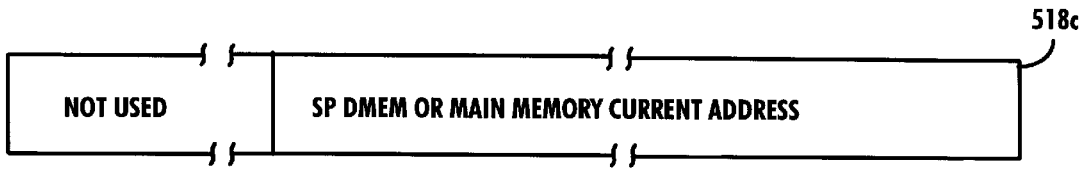
Fig. 21C DP CMD DMA CURRENT ADDRESS REGISTER (R/W)
Fig. 21E CLOCK COUNTER (R)   Fig. 21F DP PIPELINE BUSY CTR (R)
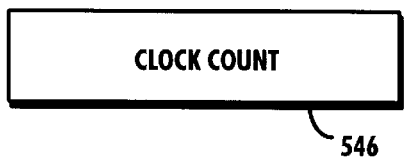
Fig. 21G CMD BUFFER BUSY CTR (R)   Fig. 21H TMEM LOCAL CTR (R)
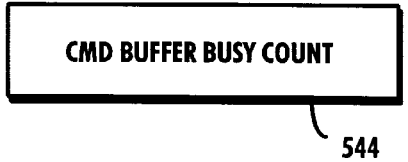
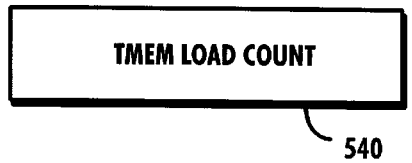

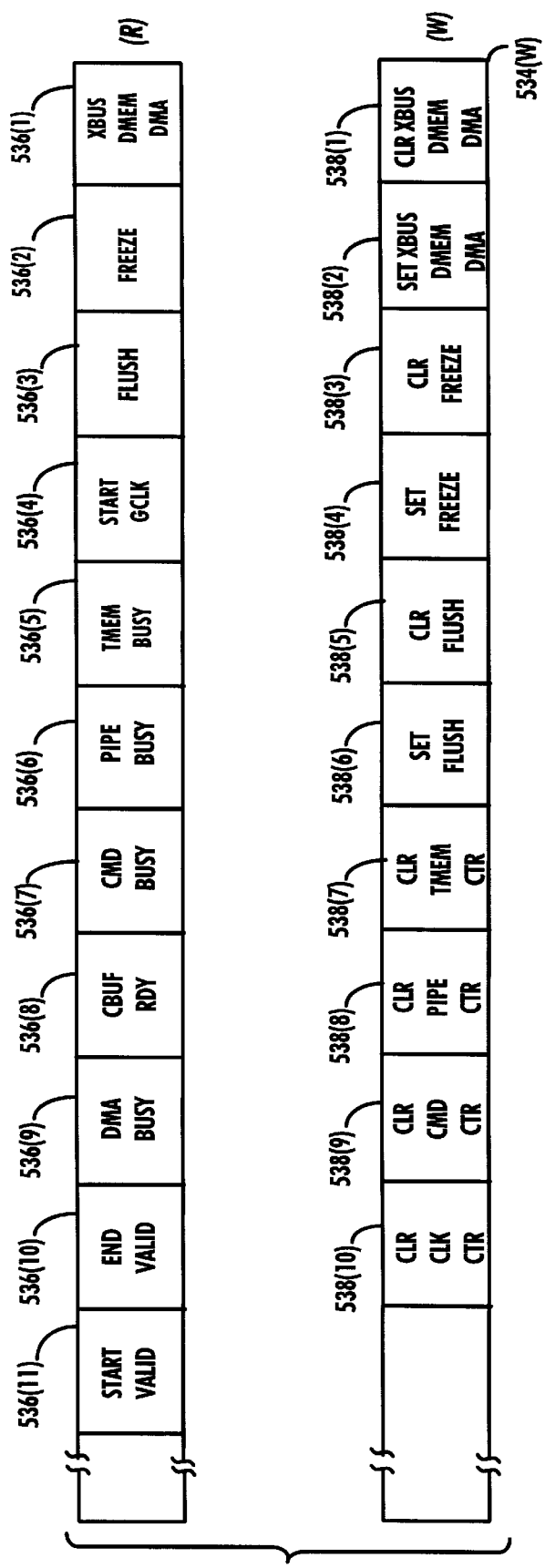
Fig. 21D  DP CMD STATUS/COMMAND REGISTER

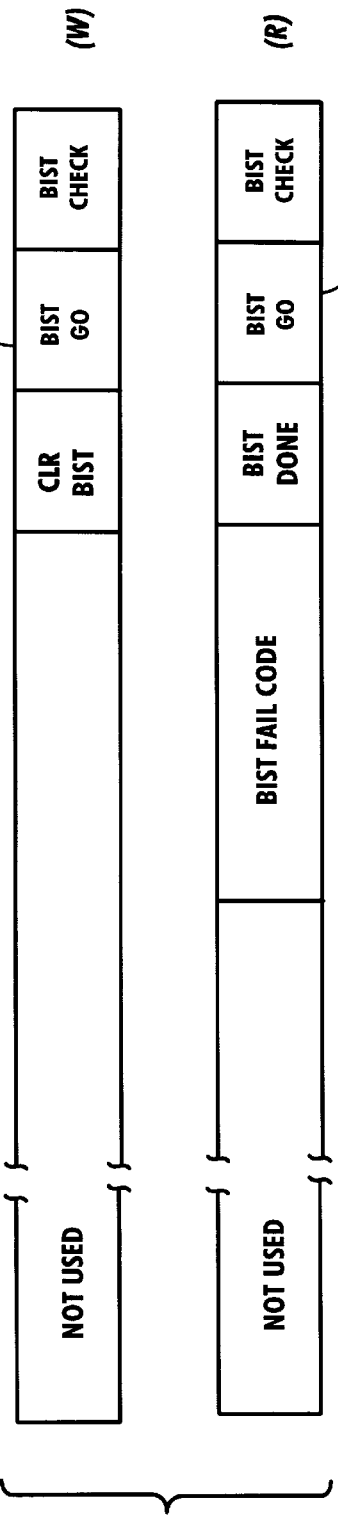
Fig. 21 I DP TMEM BIST STATUS/CONTROL REGISTER
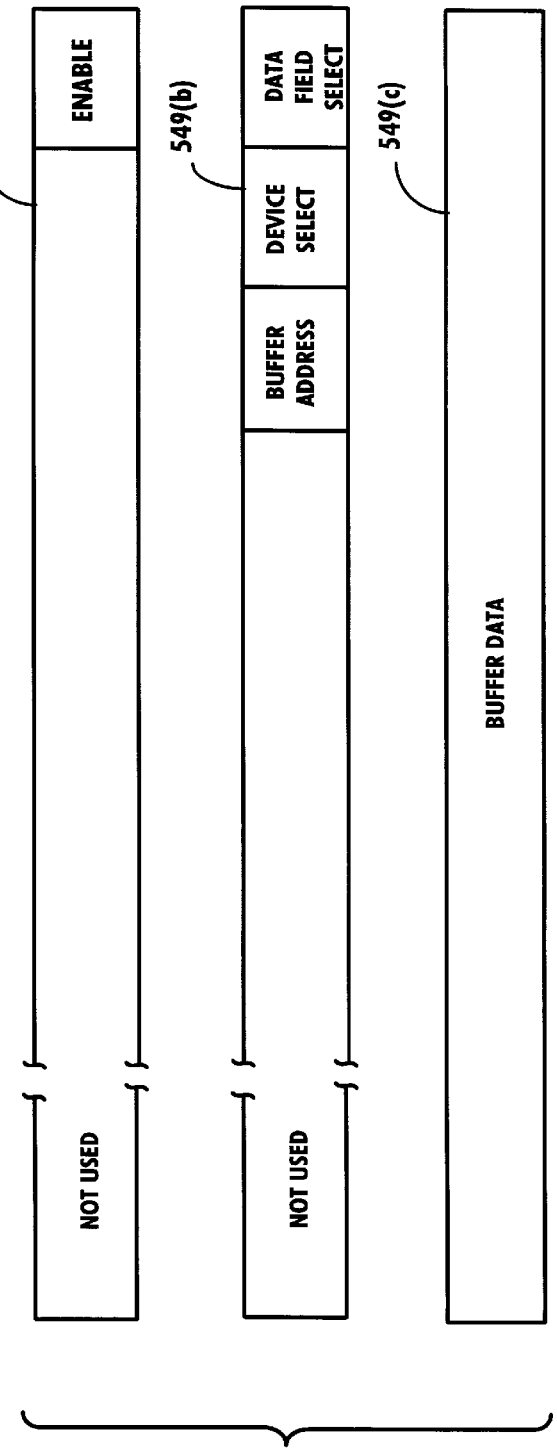
Fig. 21 J DP MEMSPAN TEST REGISTERS

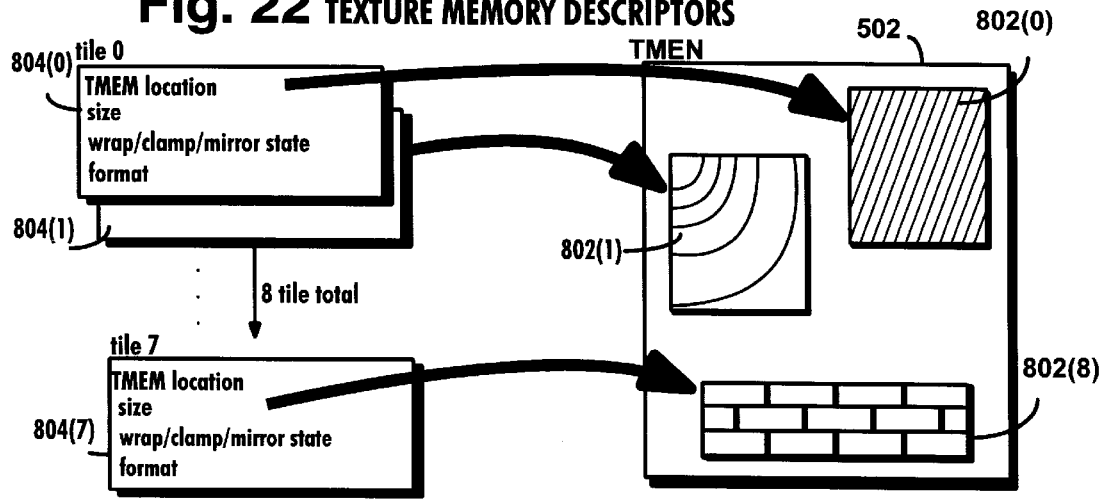
Fig. 22 TEXTURE MEMORY DESCRIPTORS
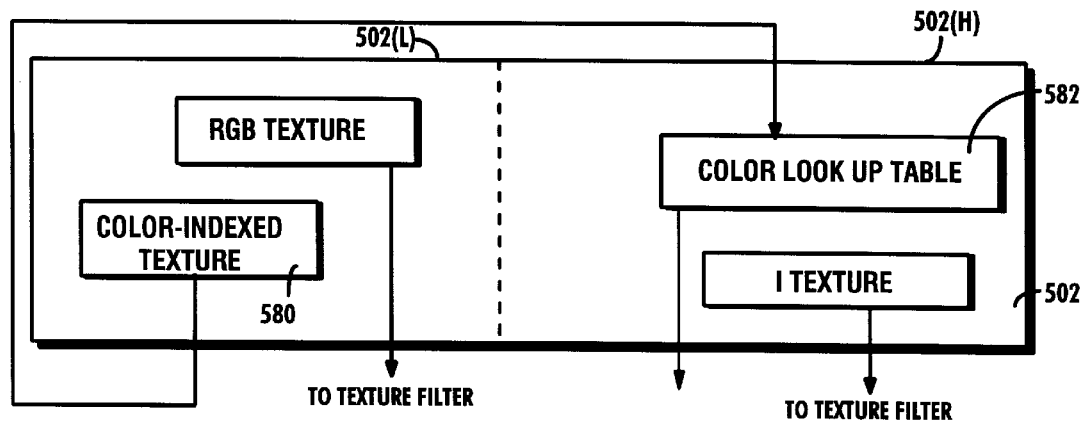
Fig. 25 TEXTURE MEMORY STORING COLOR INDEXED TEXTURES
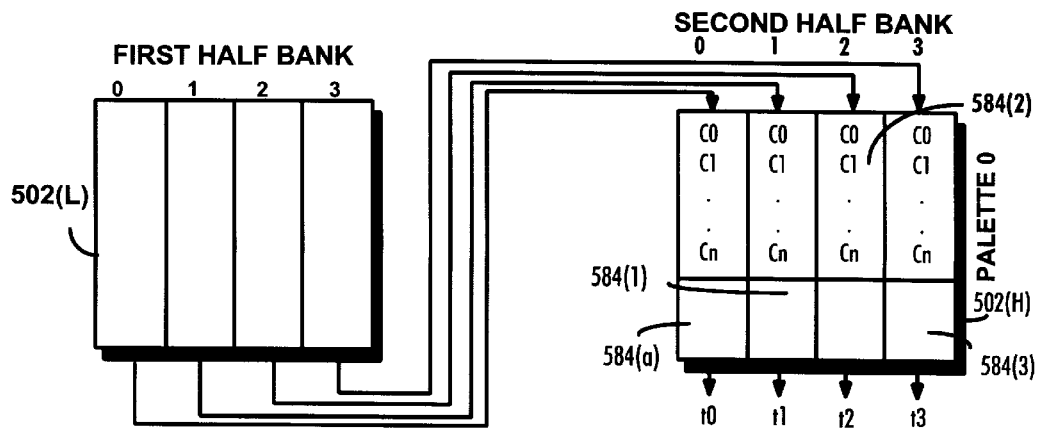
Fig. 26 DETAILED USE OF TEXTURE MEMORY TO STORE COLOR INDEXED TEXTURES

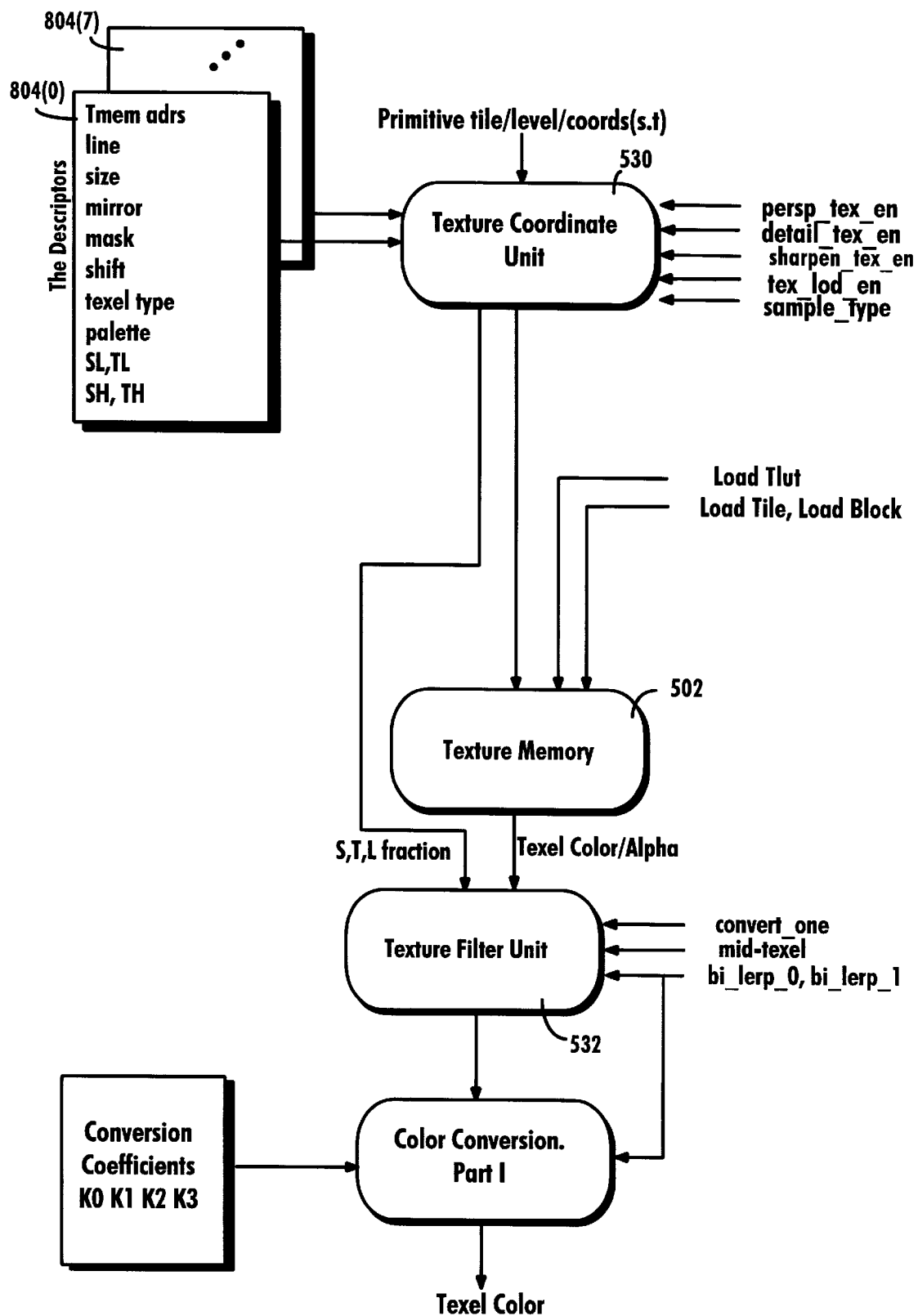
Fig. 23 TEXTURE UNIT EXAMPLE PROCESSES

TEXTURE COORDINATE UNIT
AND TEXTURE MEMORY UNIT

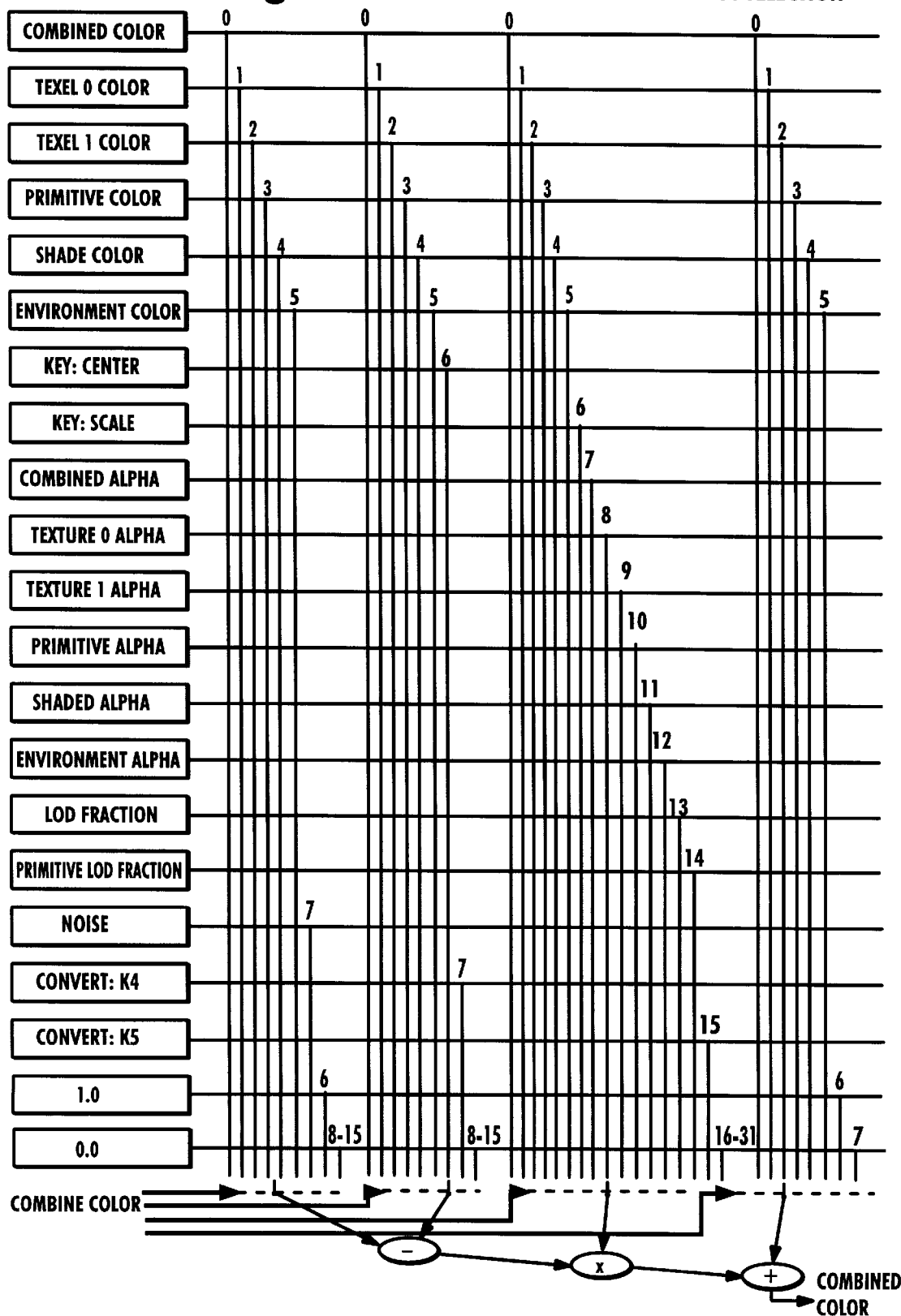
Fig. 27 RGB COLOR COMBINER EXAMPLE INPUT SELECTION

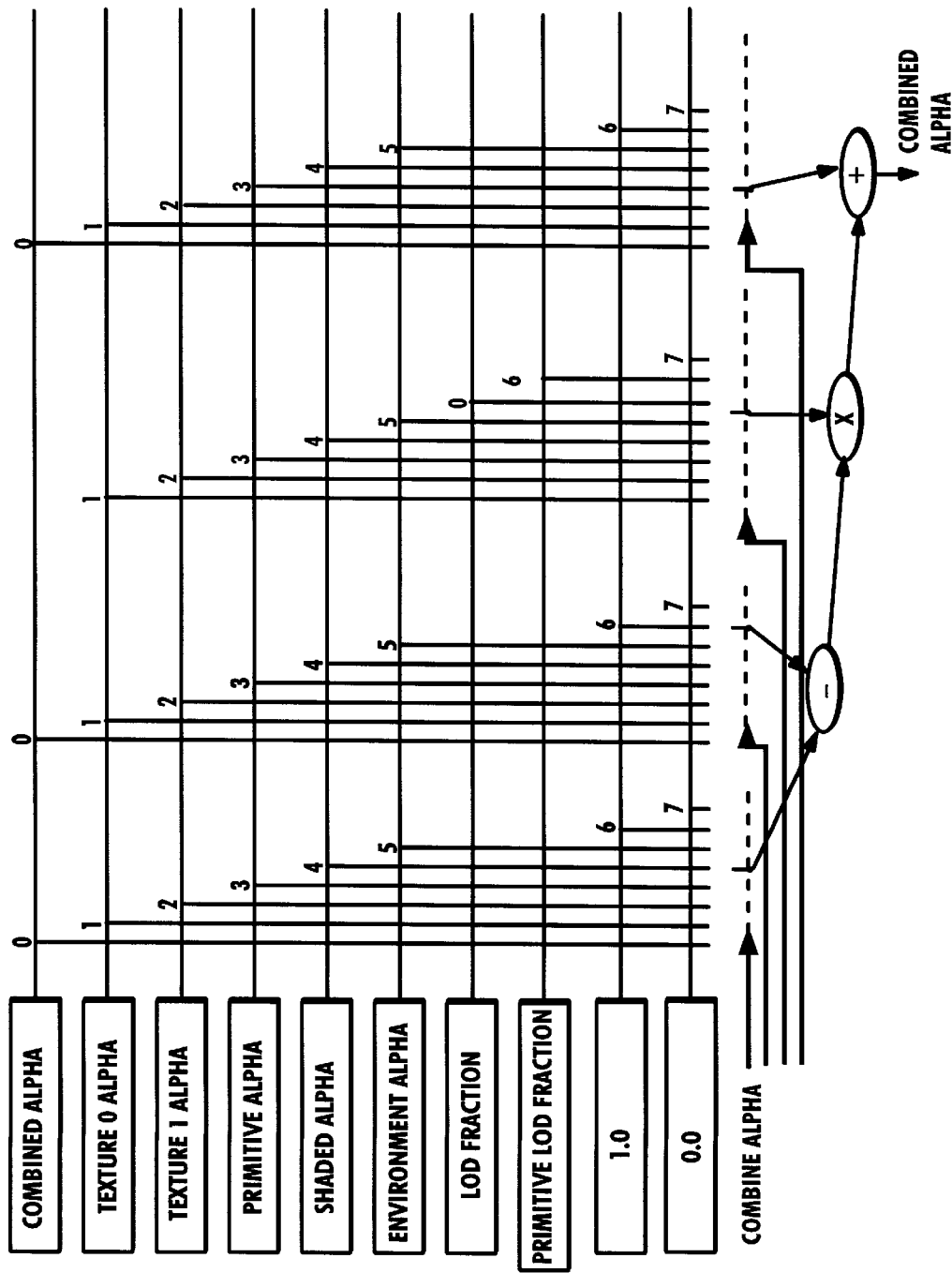

ALPHA FIXUP

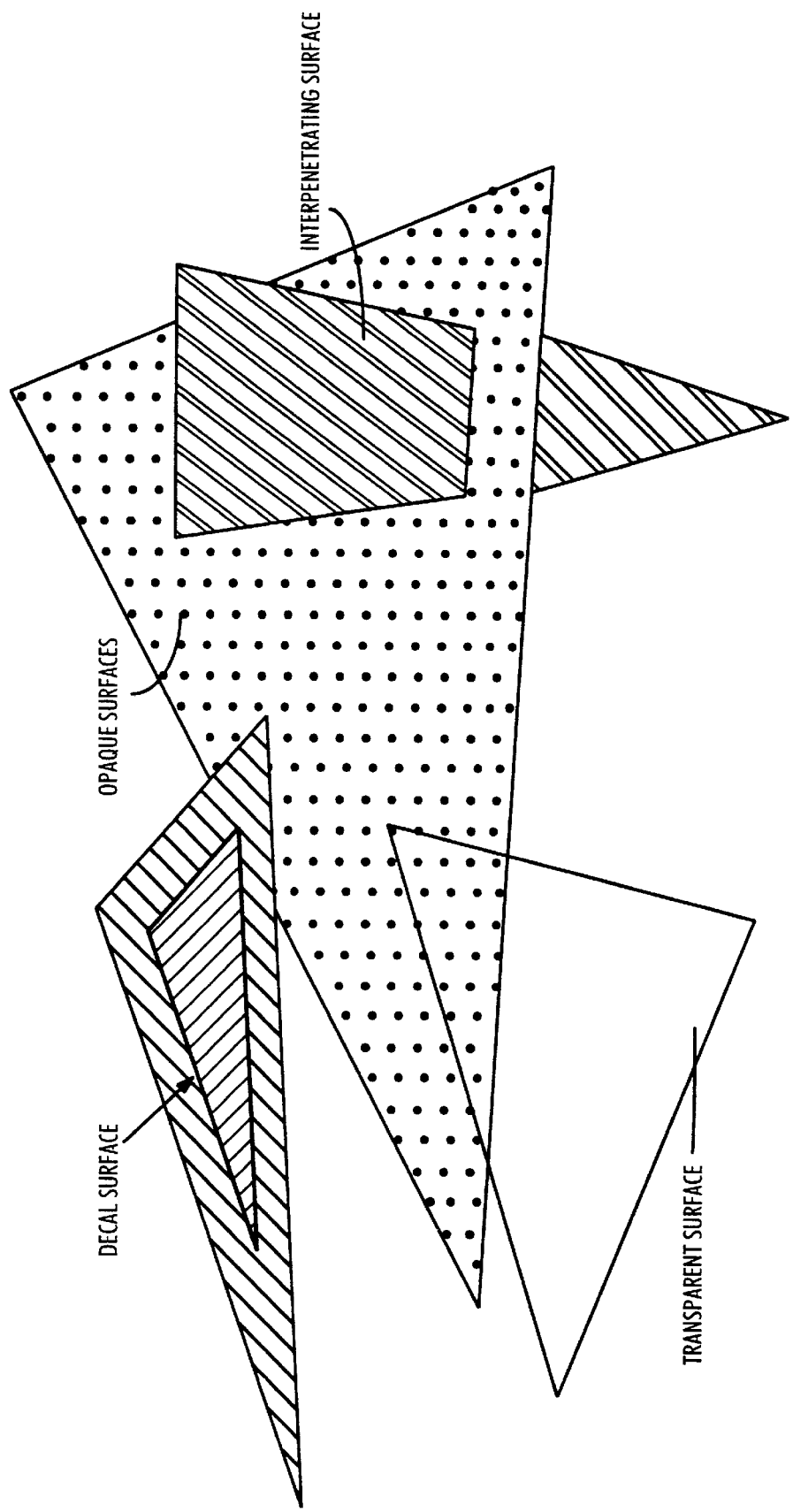
Fig. 30 BLENDER OPERATION

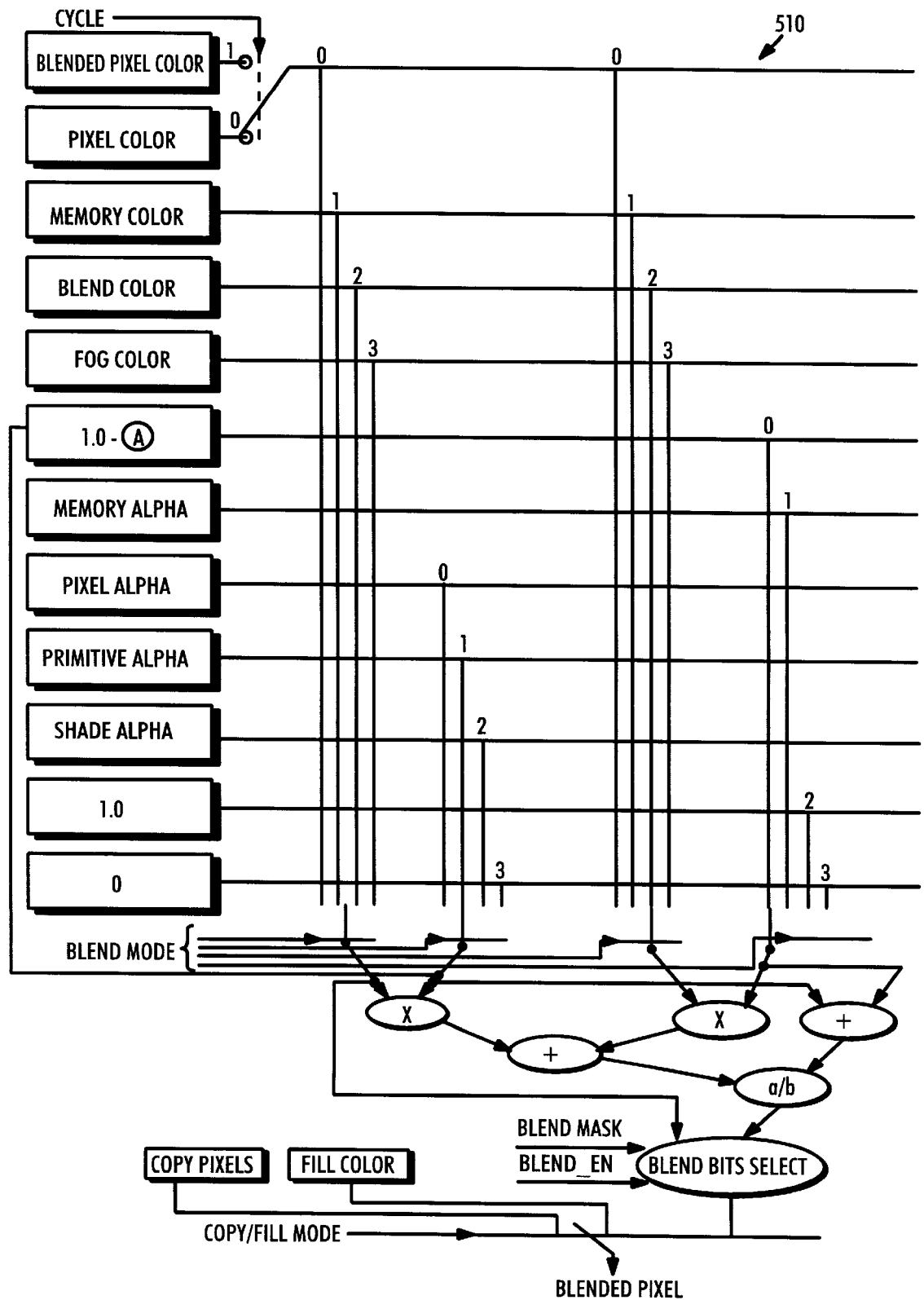
Fig. 31 BLENDER

Fig. 32 COLOR PIXEL FORMAT
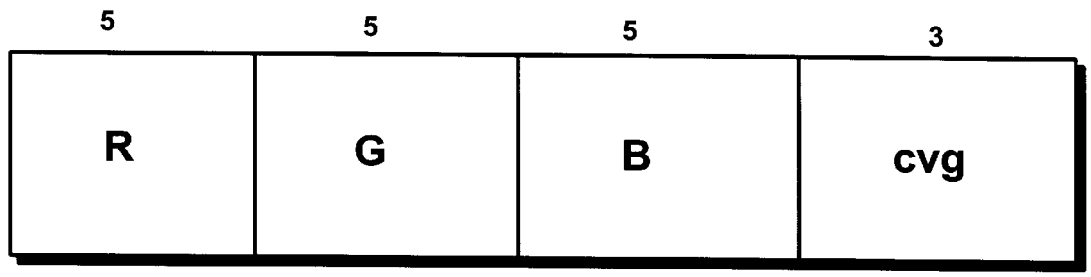
Fig. 33 DEPTH PIXEL FORMAT
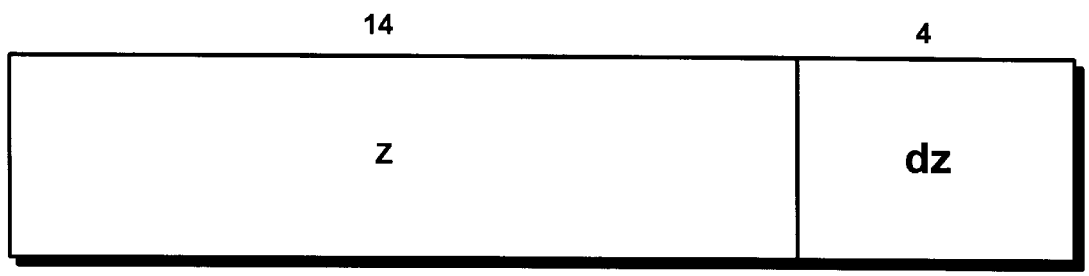

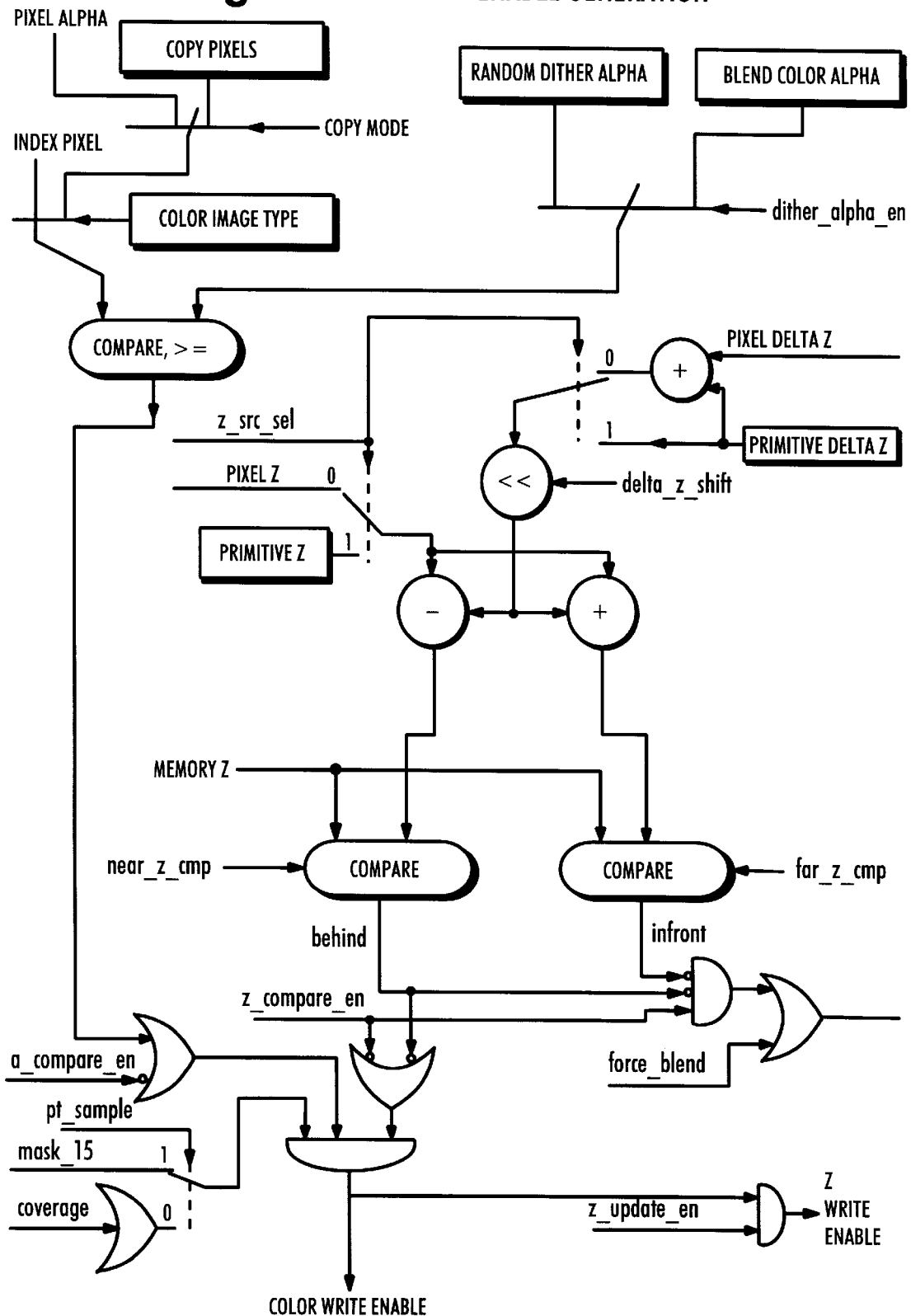
Fig. 33A WRITE ENABLE GENERATION

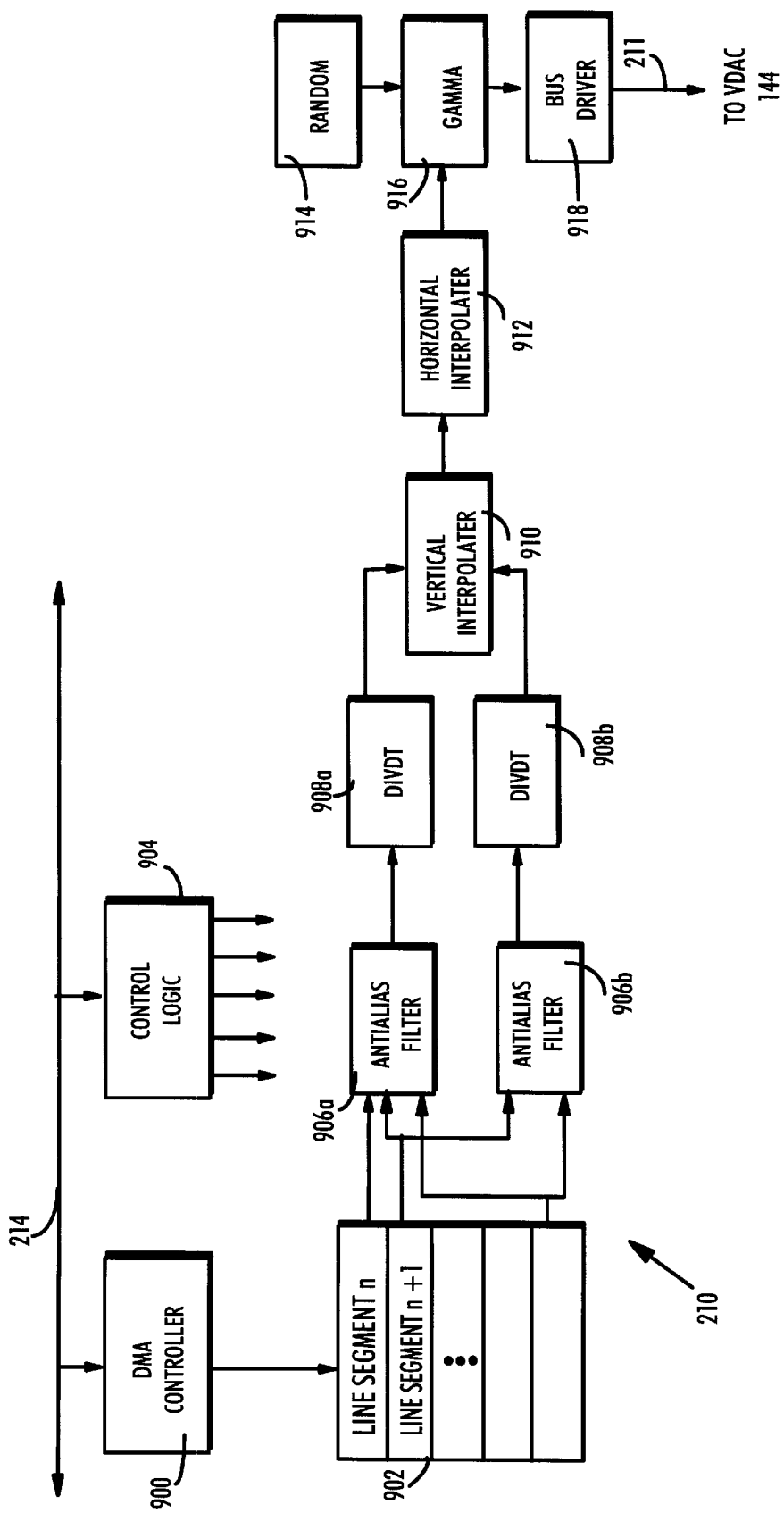
Fig. 34   EXAMPLE VIDEO INTERFACE ARCHITECTURE

EXAMPLE VIDEO INTERFACE OPERATION

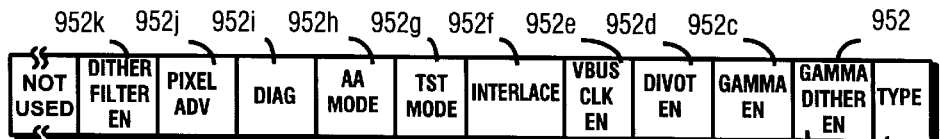
Fig. 35A  VIDEO INTERFACE CONTROL REGISTER (R/W)
Fig. 35B  VIDEO INTERFACE ORIGIN REGISTER (R/W)
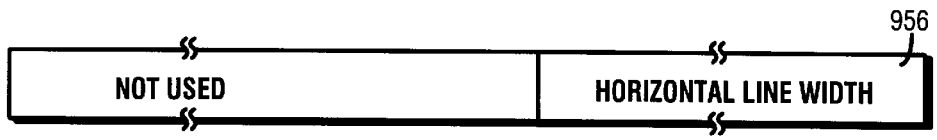
Fig. 35C  VIDEO INTERFACE LINE WIDTH REGISTER (R/W)
Fig. 35D  VIDEO INTERFACE VERTICAL INTERRUPT REGISTER (R/W)
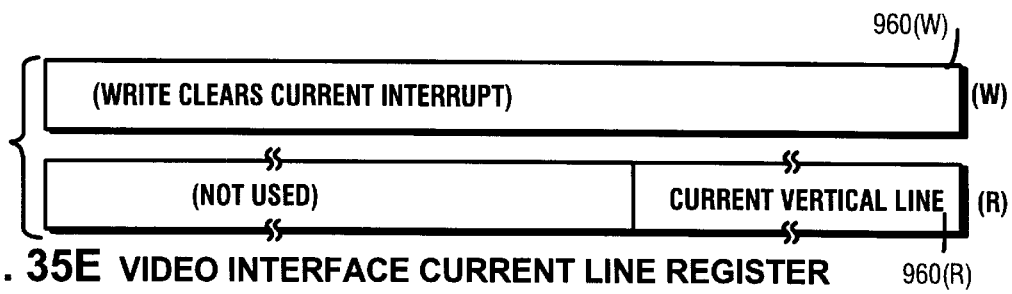
Fig. 35E  VIDEO INTERFACE CURRENT LINE REGISTER
Fig. 35F  VIDEO INTERFACE VIDEO TIMING REGISTER (R/W)

Fig. 35G VIDEO INTERFACE VSYNC REGISTER (R/W)
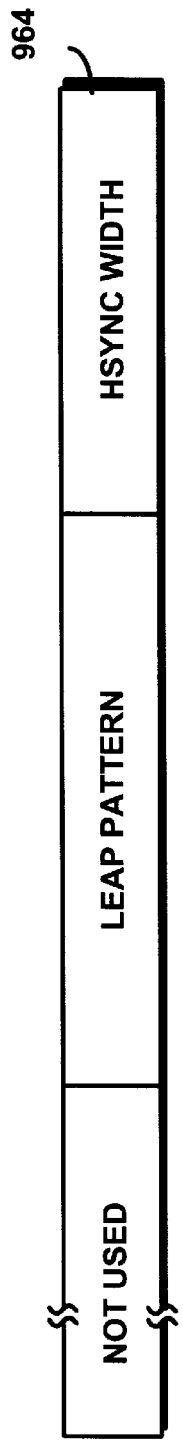
Fig. 35H VIDEO INTERFACE HSYNC REGISTER (R/W)
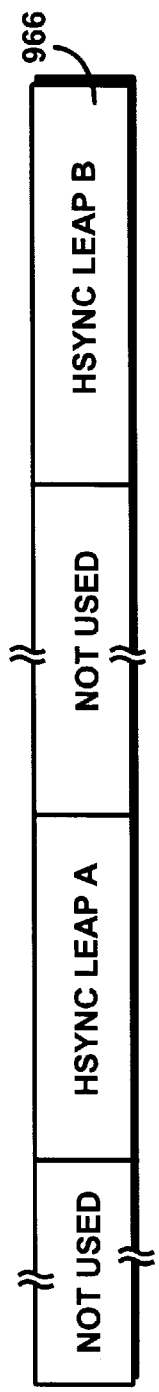
Fig. 35I VIDEO INTERFACE HSYNC LEAP REGISTER (R/W)
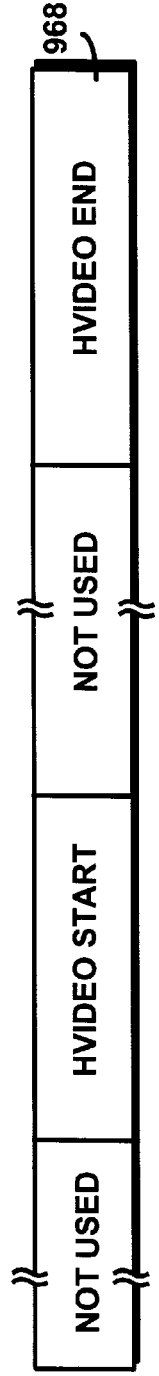
Fig. 35J VIDEO INTERFACE H VIDEO REGISTER (R/W)

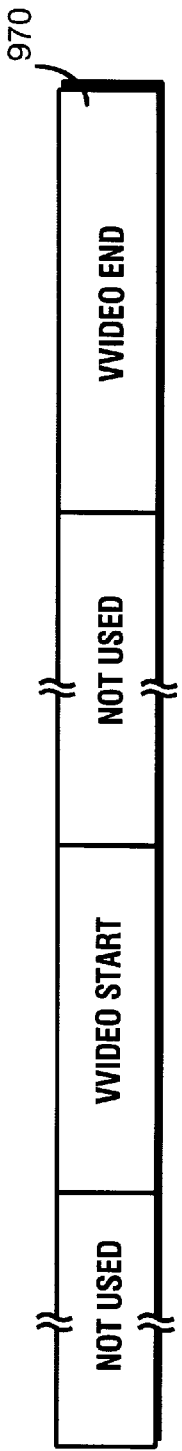
Fig. 35K VIDEO INTERFACE V VIDEO REGISTER (R/W)
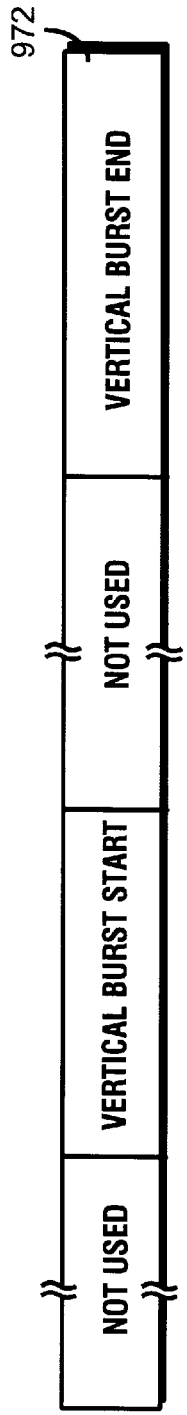
Fig. 35L VIDEO INTERFACE V BURST REGISTER (R/W)
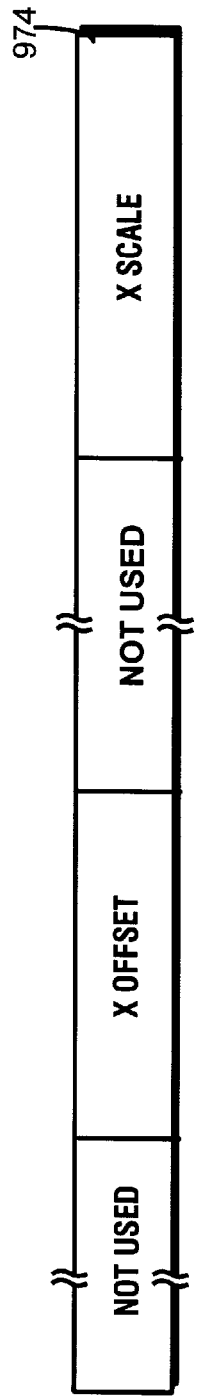
Fig. 35M VIDEO INTERFACE X SCALE REGISTER (R/W)
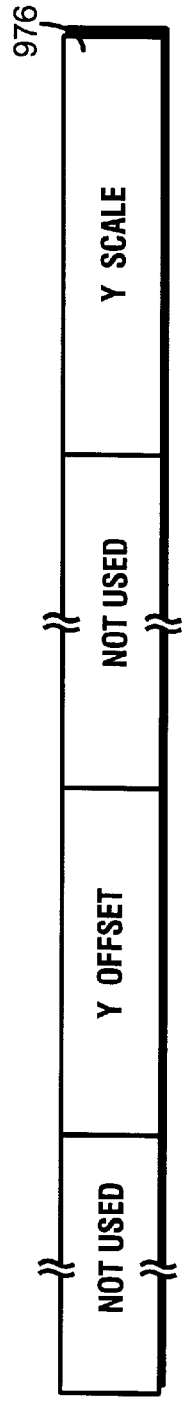
Fig. 35N VIDEO INTERFACE Y SCALE REGISTER (R/W)

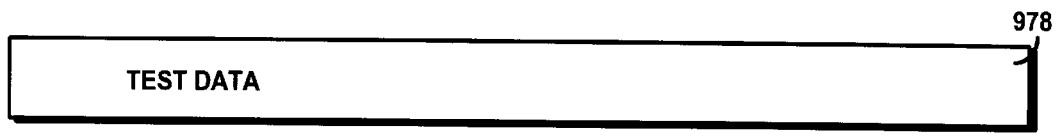
Fig. 35O VIDEO INTERFACE TEST DATA REGISTER (R/W)
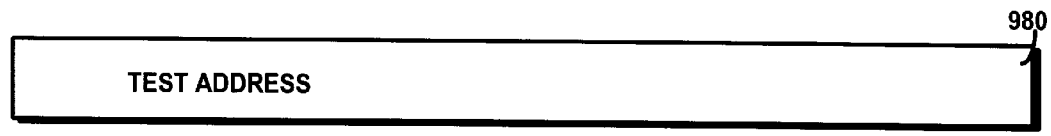
Fig. 35P VIDEO INTERFACE TEST ADDRESS REGISTER (R/W)

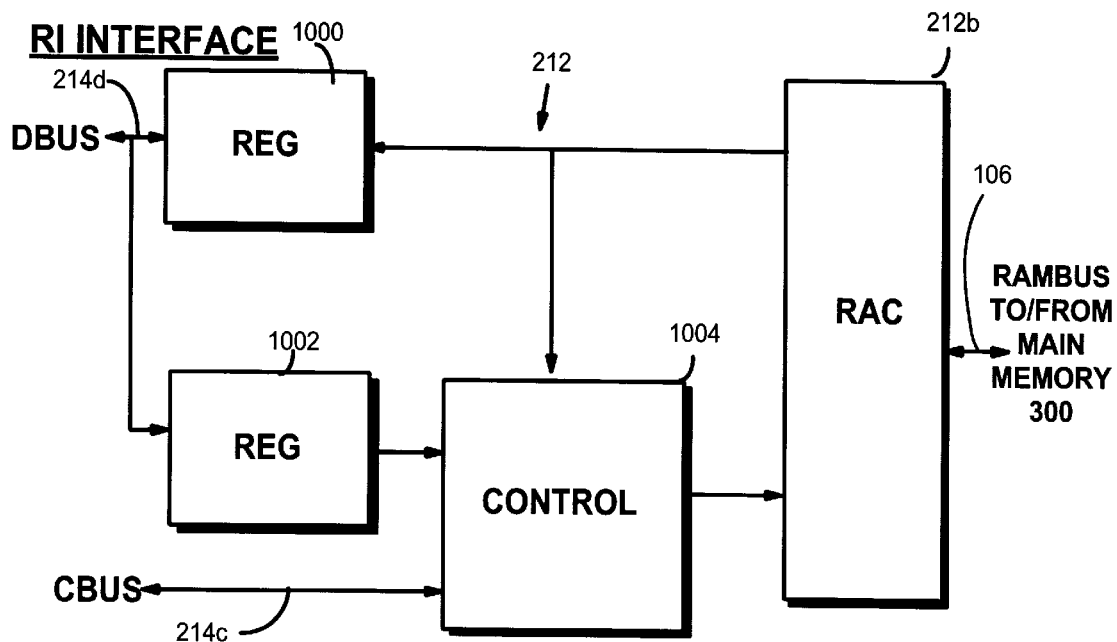
Fig. 36 EXAMPLE MEMORY INTERFACE
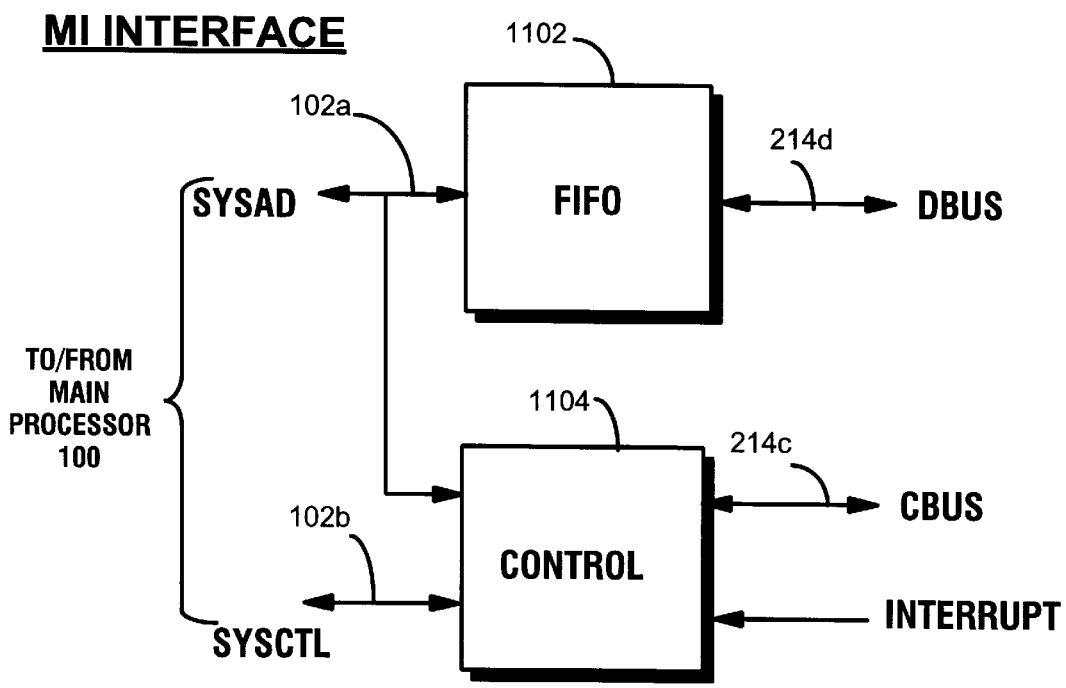
Fig. 38 EXAMPLE CPU INTERFACE

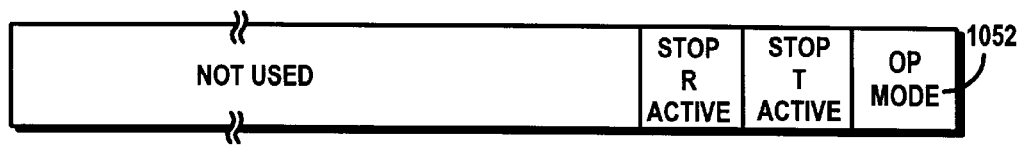
Fig. 37A MI MODE REGISTER(R/W)
Fig. 37B MI CONFIG REGISTER (R/W)
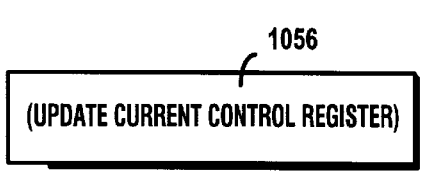
Fig. 37C CURRENT LOAD REG(W)
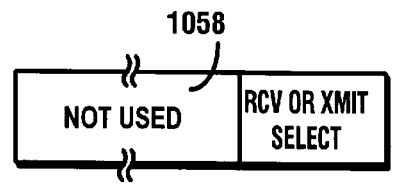
Fig. 37D SELECT REG
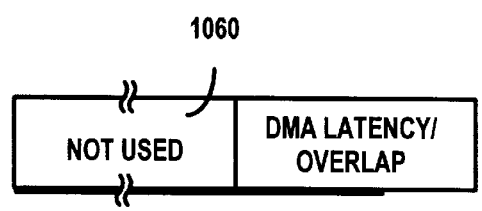
Fig. 37E LATENCY (R/W)
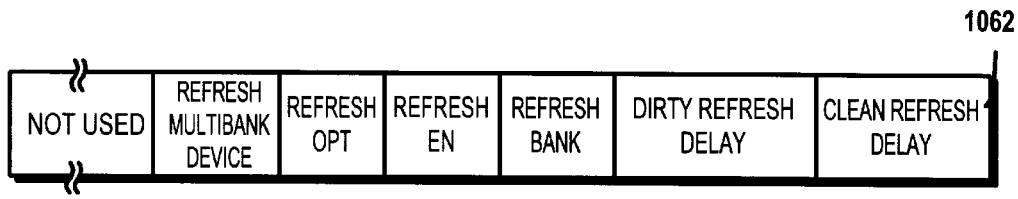
Fig. 37F REFRESH REGISTER (R/W)

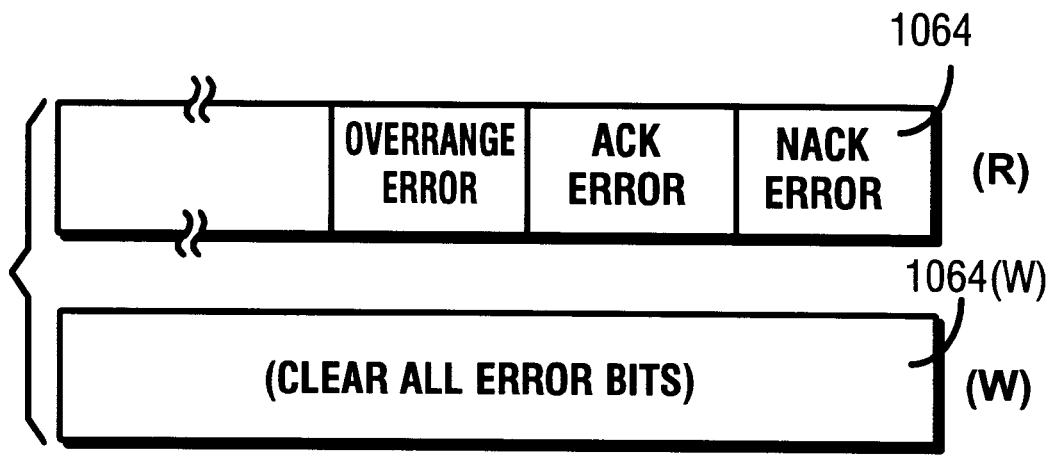
Fig. 37G ERROR REGISTER
Fig. 37H BANK STATUS REG

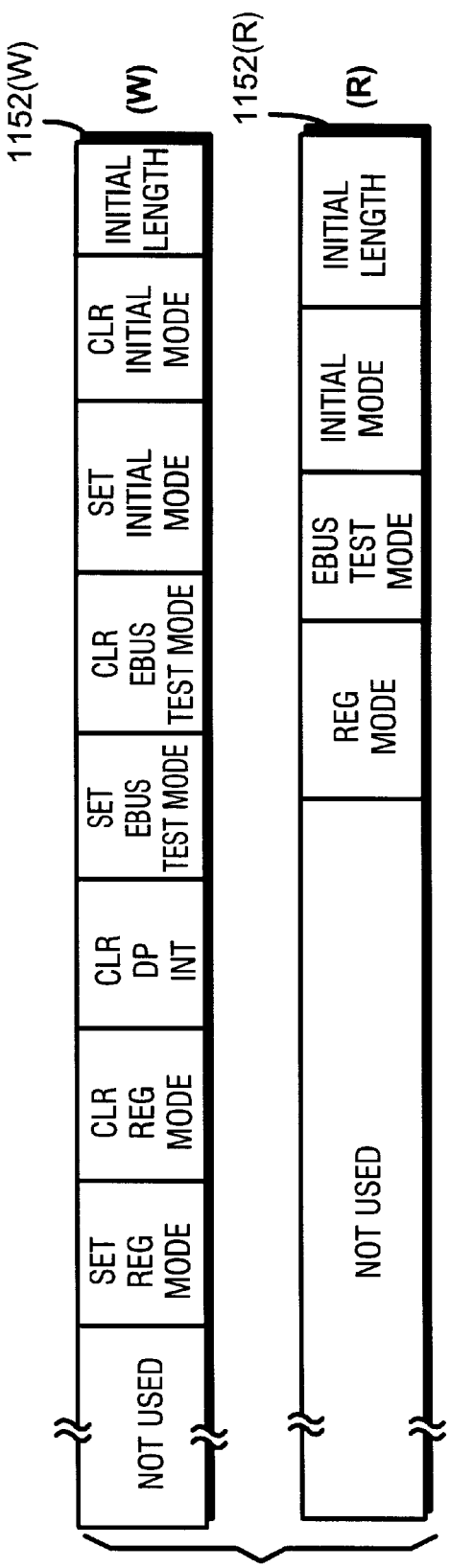
Fig. 39A CPUI STATUS/CONTROL REGISTER (R/W)
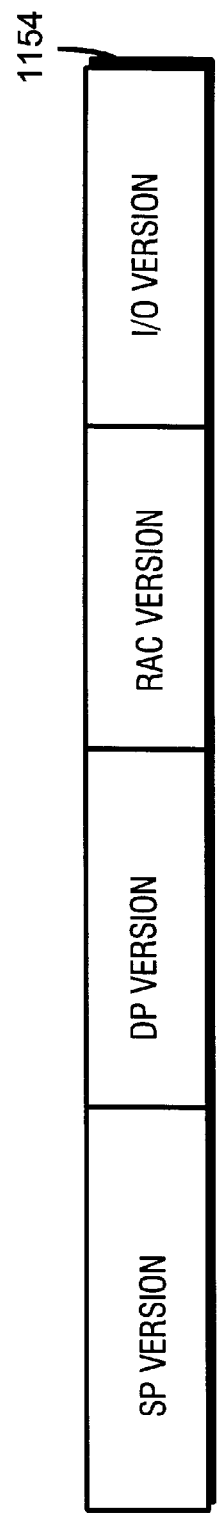
Fig. 39B CPUI VERSION REGISTER (R)

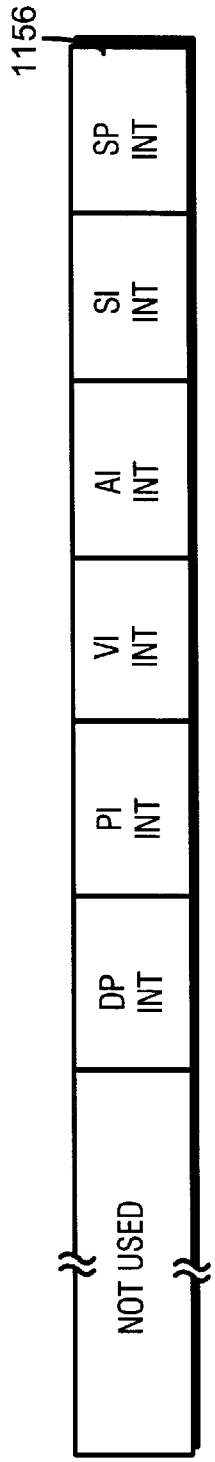
Fig. 39C INTERRUPT REGISTER (R)
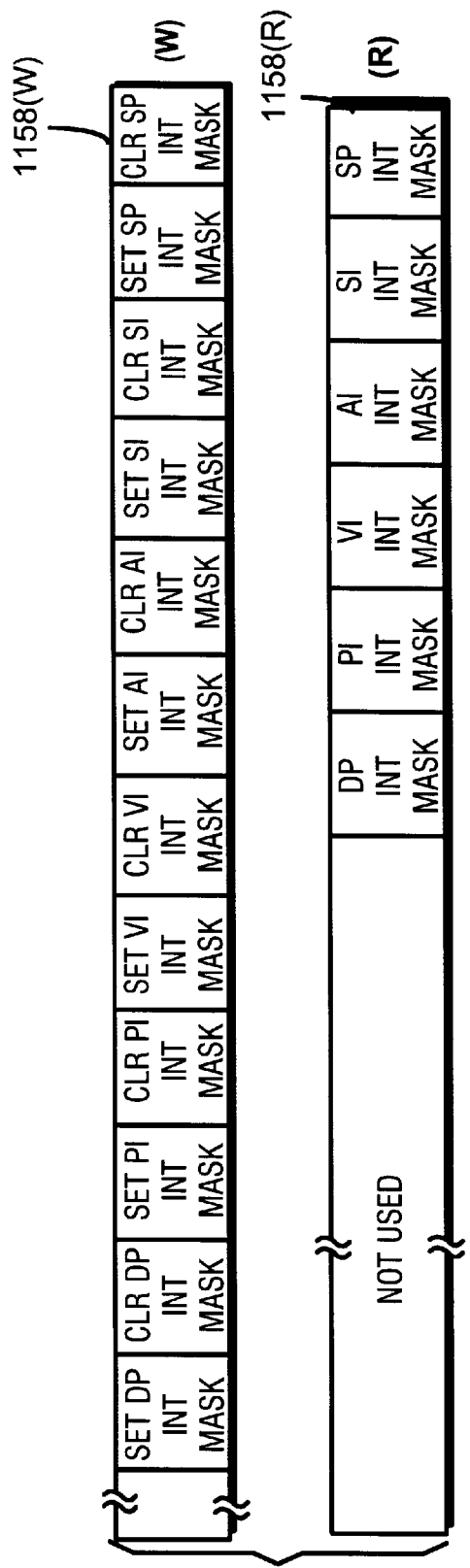
Fig. 39D INT MASK REGISTER

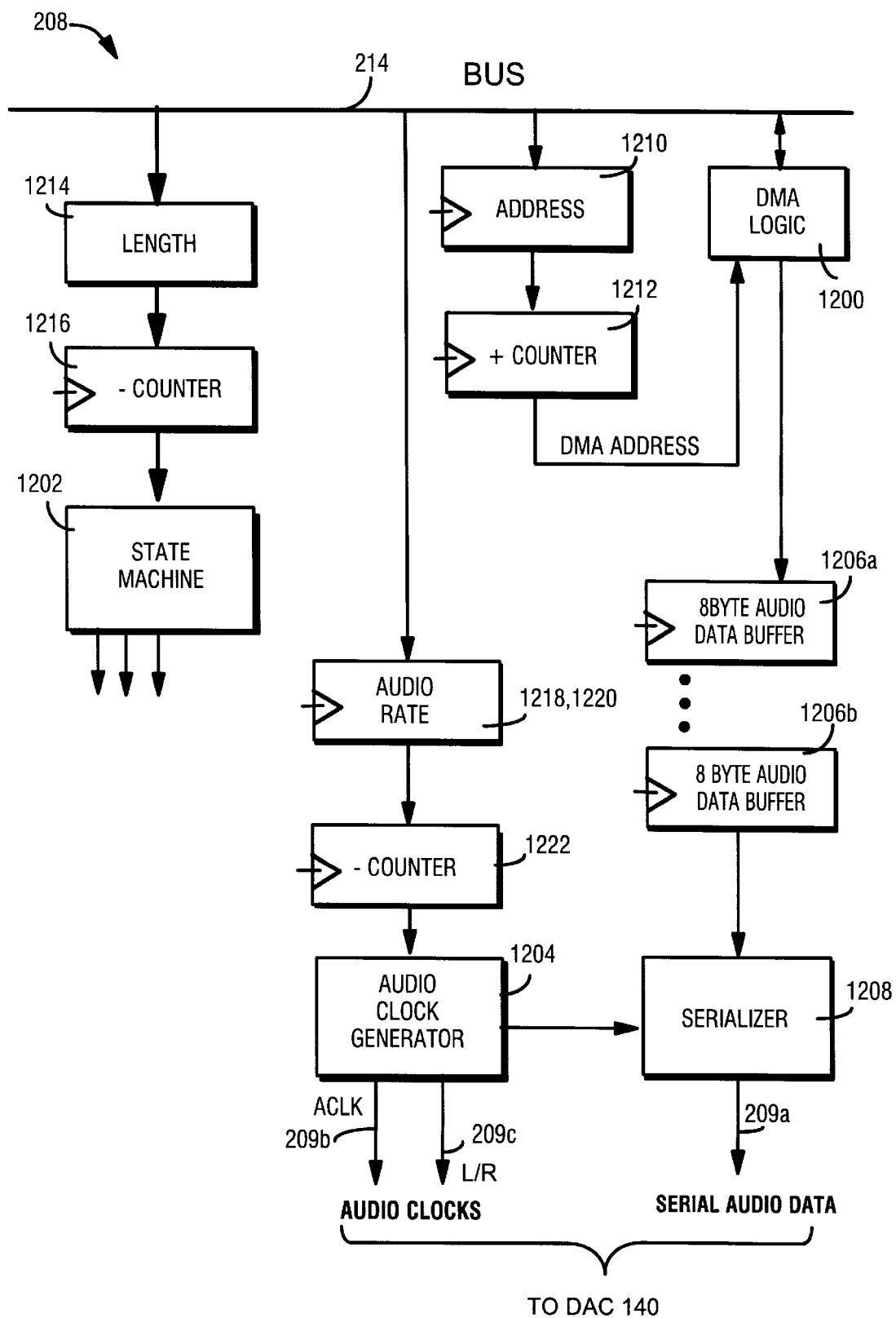
Fig. 40  EXAMPLE AUDIO INTERFACE ARCHITECTURE

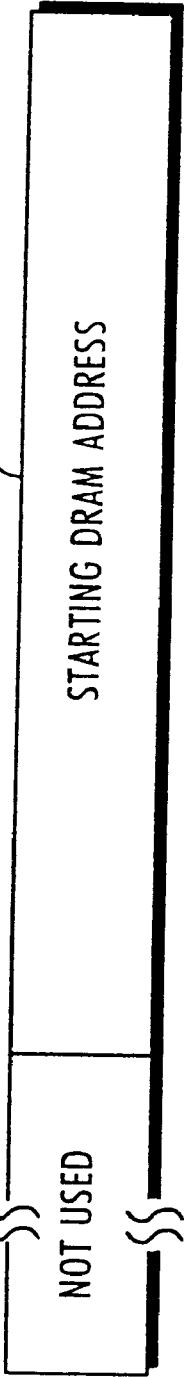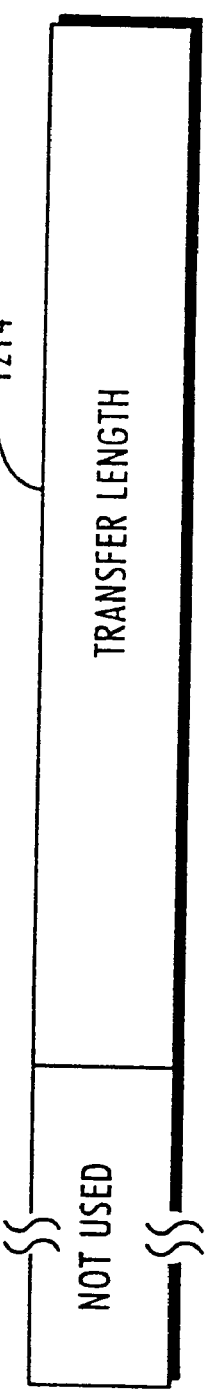

AI STATUS REGISTER (R)

AI DMA ENABLE REGISTER (W)

AI AUDIO DAC PERIOD REGISTER (W)

AI AUDIO DAC HALF PERIOD REGISTER (W)

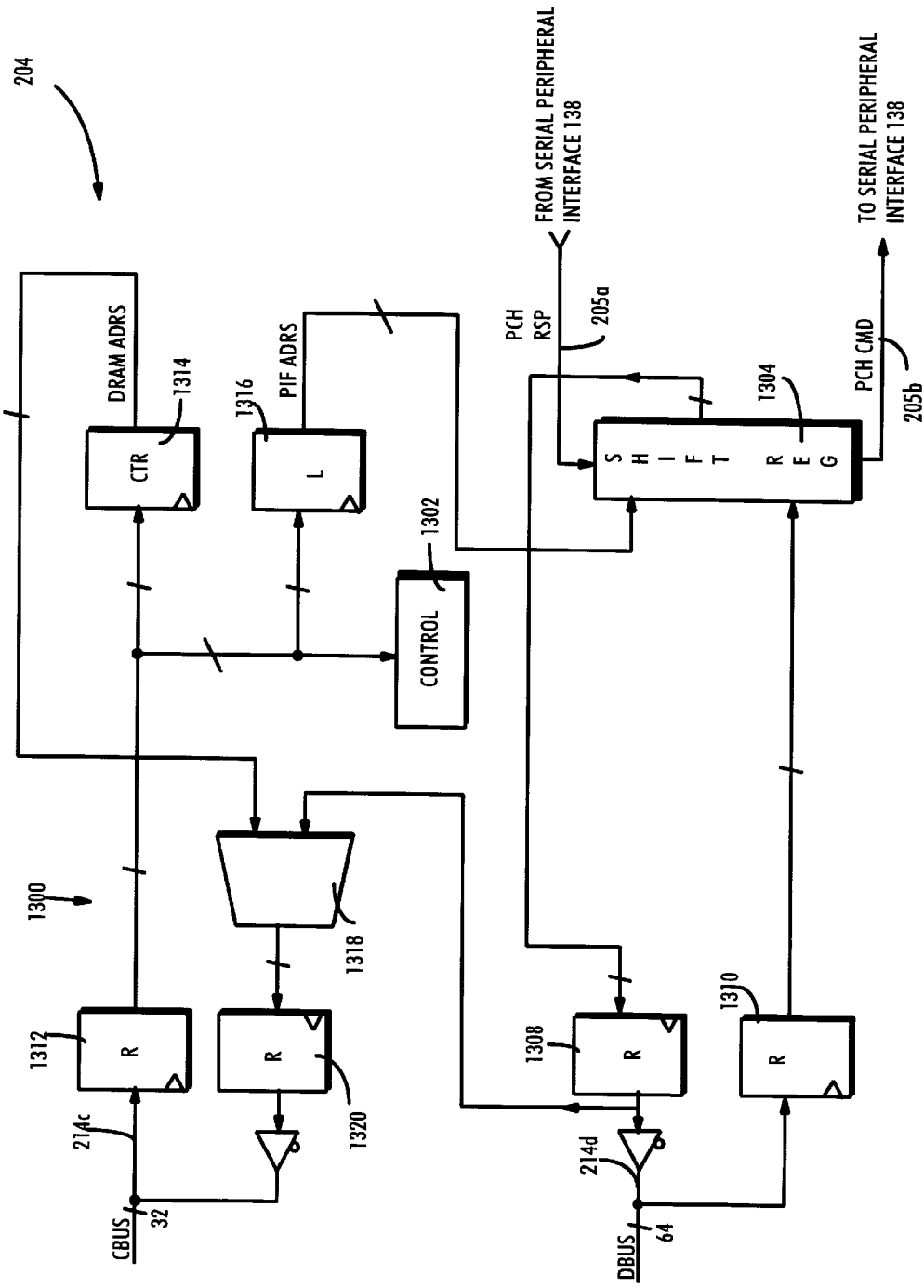
Fig. 42 EXAMPLE SERIAL INTERFACE (SI) BLOCK DIAGRAM

SI DRAM ADDRESS REGISTER (R/W)

SI/PIF DMA WRITE REQUEST REGISTER (W)

SI/PIF DMA READ REQUEST REGISTER (W)

SI STATUS CONTROL REGISTER (R/W)

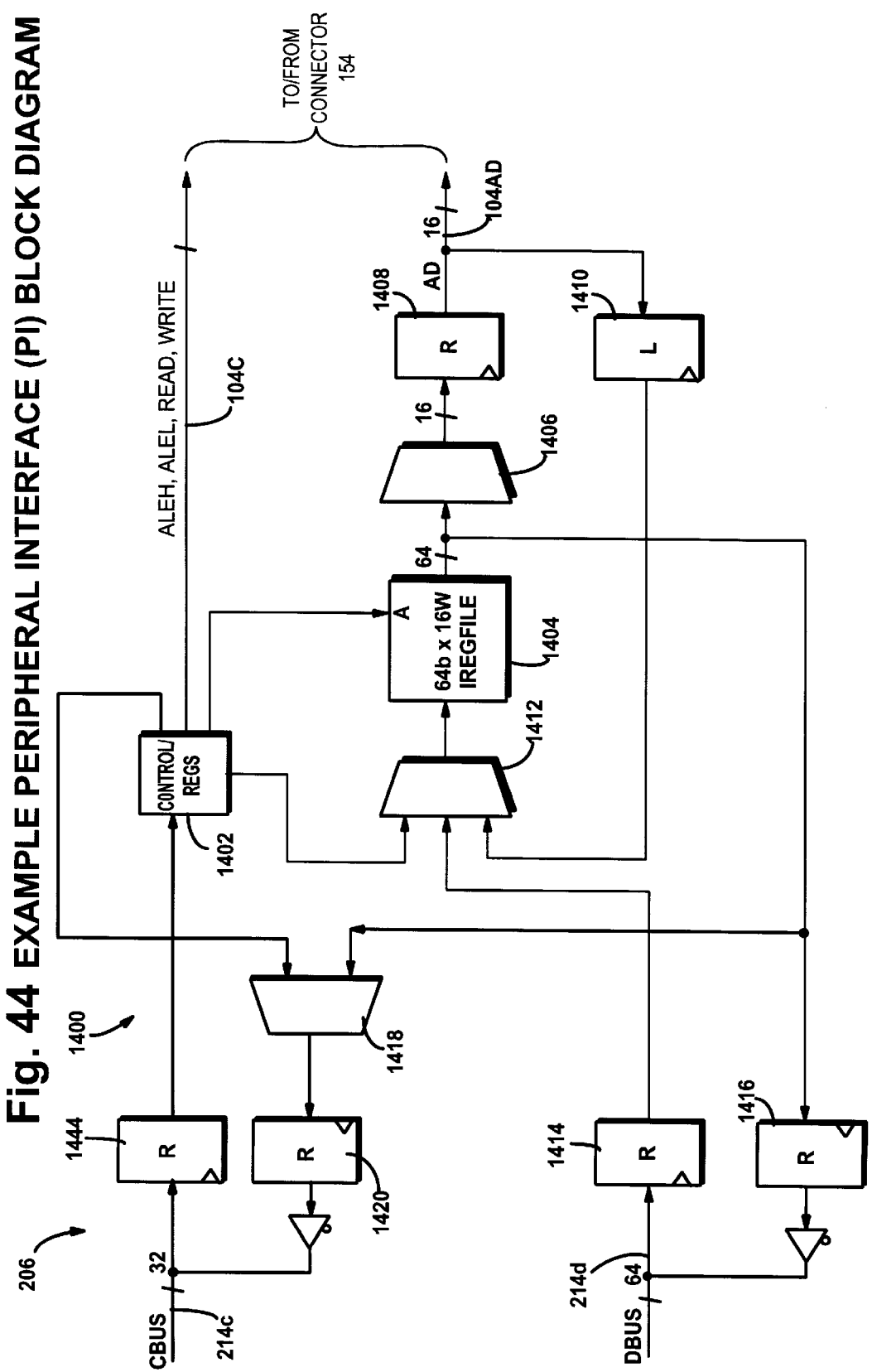
Fig. 44 EXAMPLE PERIPHERAL INTERFACE (PI) BLOCK DIAGRAM

Fig. 45A PI DRAM ADDRESS (R/W)
Fig. 45B PI PERIPHERAL BUS ADDRESS (R/W)
Fig. 45C PI DMA READ LENGTH (R/W)

Fig. 45D PI WRITE LENGTH (R/W)
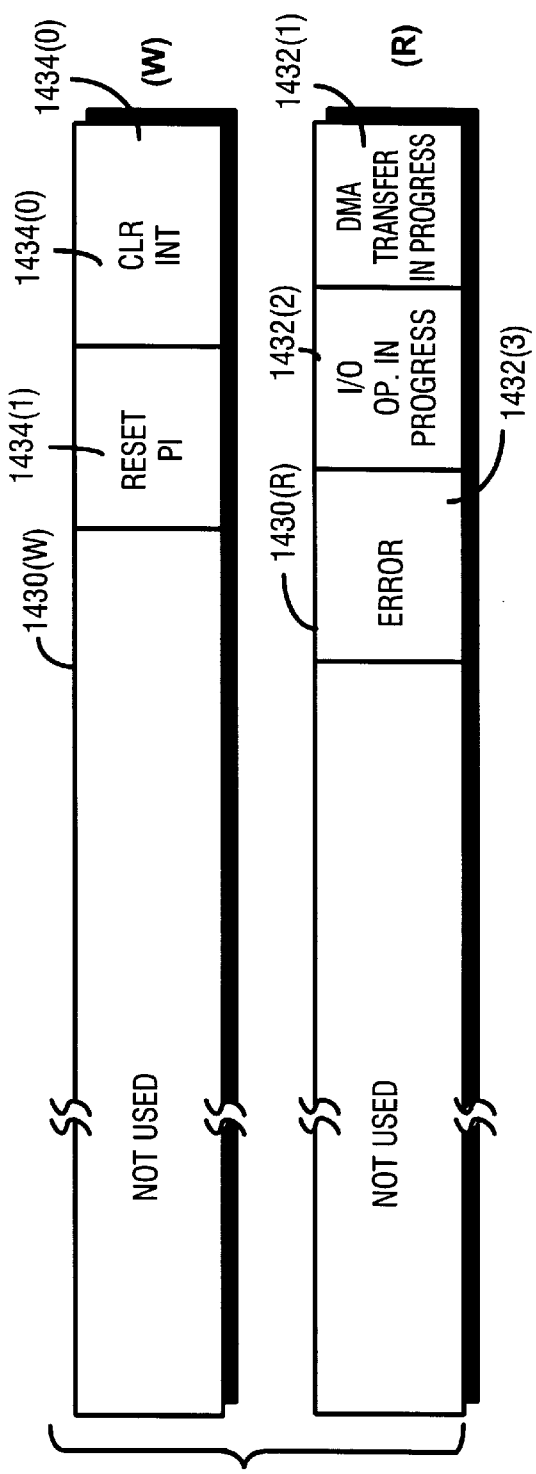
Fig. 45E PI CONTROL/STATUS REGISTER (R/W)

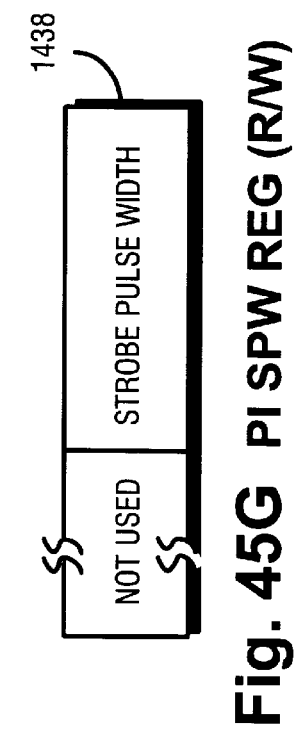
Fig. 45G PI SPW REG (R/W)
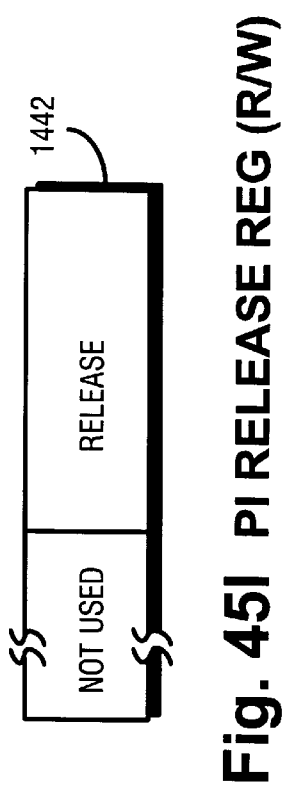
Fig. 45I PI RELEASE REG (R/W)
Fig. 45F PI LATENCY REG (R/W)
Fig. 45H PI PAGE SIZE REG (R/W)

Fig. 46 Set Color Image

| 63 | 56 55 | 48 47 | 40 39 | 32 31 | 24 23 | 16 15 | 8 7 | 0 |
|---|---|---|---|---|---|---|---|---|
| COMMAND =0x3f | FORMAT | SIZE | | WIDTH | | DRAM ADDRESS | | |

Fig. 47 Set_Color_Image Command Format

| FIELD | WORD | BITS | DESCRIPTION |
|---|---|---|---|
| COMMAND | 0 | 61-56 | COMMAND IDENTIFIER |
| FORMAT | 0 | 55-53 | IMAGE DATA FORMAT, 0=rgba, 1=yuv, 2=COLOR INDX, 3=1A, 4=1 |
| SIZE | 0 | 52-51 | SIZE OF PIXEL/TEXEL COLOR ELEMENT, 0=4b, 1=8b, 2=16b, 3=32b |
| WIDTH | 0 | 41-32 | WIDTH OF IMAGE IN PIXELS, IMAGE WIDTH=WIDTH+1 |
| DRAM ADRS | 0 | 25-0 | BASE ADDRESS (TOP LEFT CORNER) OF IMAGE IN DRAM, IN BYTES |

Fig. 48 Legal Color Image Types/Sizes

| TYPE | 4b | 8b | 16b | 32b |
|---|---|---|---|---|
| RGBA | | | ✓ | ✓ |
| YUV | | | ✓ | |
| CLR INDX | | ✓ | | |

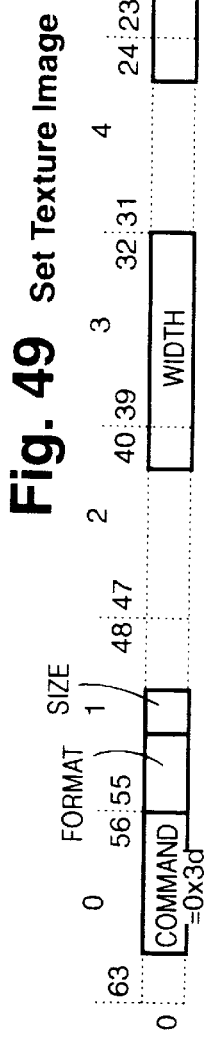

Fig. 49 Set Texture Image

Fig. 50 Set_Texture_Image Command Format

| FIELD | WORD | BITS | DESCRIPTION |
|---|---|---|---|
| COMMAND | 0 | 61-56 | COMMAND IDENTIFIER |
| FORMAT | 0 | 55-53 | IMAGE DATA FORMAT, 0=rgba, 1=yuv, 2=COLOR INDX, 3=1A, 4=1 |
| SIZE | 0 | 52-51 | SIZE OF PIXEL/TEXEL COLOR ELEMENT, 0=4b, 1=8b, 2=16b, 3=32b |
| WIDTH | 0 | 41-32 | WIDTH OF IMAGE IN PIXELS, IMAGE WIDTH=WIDTH+1 |
| DRAM ADRS | 0 | 25-0 | BASE ADDRESS (TOP LEFT CORNER) OF IMAGE IN DRAM, IN BYTES |

Fig. 51 Legal Texture Image Types/Sizes

| TYPE | 4b | 8b | 16b | 32b |
|---|---|---|---|---|
| RGBA | | | ✓ | ✓ |
| YUV | | | ✓ | |
| CLR INDX | ✓ | ✓ | | |
| 1A | ✓ | ✓ | ✓ | |
| 1 | ✓ | | | |

Fig. 52  Set Z Image

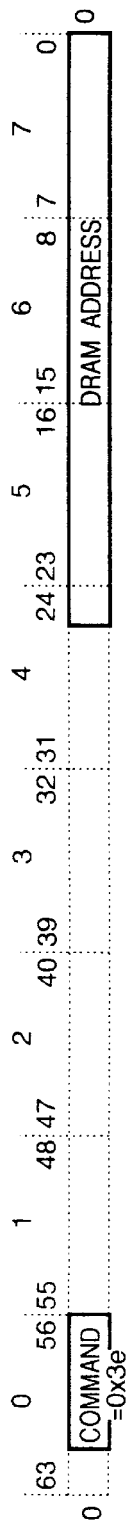

Fig. 53  Set_Mask_Image Command Format

| FIELD | WORD | BITS | DESCRIPTION |
|---|---|---|---|
| COMMAND | 0 | 61-56 | COMMAND IDENTIFIER |
| DRAM ADRS | 0 | 25-0 | BASE ADDRESS (TOP LEFT CORNER) OF IMAGE IN DRAM, IN BYTES |

Fig. 56  Load Tile

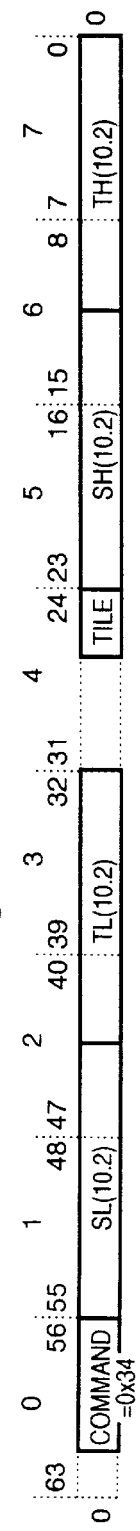

Fig. 57  Load_Tile

| FIELD | WORD | BITS | DESCRIPTION |
|---|---|---|---|
| COMMAND | 0 | 61-56 | COMMAND IDENTIFIER |
| SL | 0 | 55-44 | LOW S COORDINATE OF TILE IN IMAGE |
| TL | 0 | 43-32 | LOW T COORDINATE OF TILE IN IMAGE |
| TILE | 0 | 26-24 | TILE DESCRIPTOR INDEX |
| SH | 0 | 23-12 | HIGH S COORDINATE OF TILE IN IMAGE |
| TH | 0 | 11-0 | HIGH T COORDINATE OF TILE IN IMAGE |

Fig. 54 Set Tile

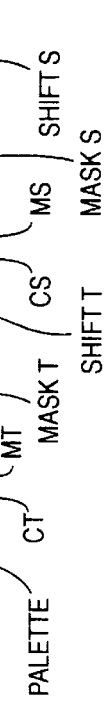

Fig. 55 Set_Tile Command Format

| FIELD | WORD | BITS | DESCRIPTION |
|---|---|---|---|
| COMMAND | 0 | 61-56 | COMMAND IDENTIFIER |
| FORMAT | 0 | 55-53 | IMAGE DATA FORMAT, 0=RGBA, 1=YUV, 2=COLOR INDX, 3=IA, 4=I |
| SIZE | 0 | 52-51 | SIZE OF PIXEL/TEXEL COLOR ELEMENT, 0=4b, 1=8b, 2=16b, 3=32b, 4=OTHER |
| LINE | 0 | 49-41 | SIZE OF TILE LINE IN 64b WORDS, MAX OF 4KB |
| TMEM ADRS | 0 | 40-32 | STARTING TMEM ADDRESS FOR THIS TILE IN WORDS (64b), 4KB RANGE |
| TILE | 0 | 26-24 | TILE DESCRIPTOR INDEX |
| PALETTE | 0 | 23-20 | PALETTE NUMBER FOR 4b COLOR INDEXED TEXELS. THIS NUMBER IS USED AS THE MS 4b OF AN 8b INDEX |
| CT | 0 | 19 | CLAMP ENABLE FOR T DIRECTION |
| MT | 0 | 18 | MIRROR ENABLE FOR T DIRECTION |
| MASK T | 0 | 17-14 | MASK FOR WRAPPING/MIRRORING IN T DIRECTION. IF THIS FIELD IS ZERO THEN CLAMP, OTHERWISE PASS (MASK) LSBs OF T ADDRESS. |
| SHIFT T | 0 | 13-10 | LEVEL OF DETAIL SHIFT FOR T ADDRESSES |
| CS | 0 | 9 | CLAMP ENABLE BIT FOR S DIRECTION |
| MS | 0 | 8 | MIRROR ENABLE BIT FOR S DIRECTION |
| MASK S | 0 | 7-4 | MASK FOR WRAPPING/MIRRORING IN S DIRECTION. IF THIS FIELD IS ZERO THEN CLAMP, OTHERWISE PASS (MASK) LSBs OF S ADDRESSES |
| SHIFT S | 0 | 3-0 | LEVEL OF DETAIL SHIFT FOR S ADDRESSES |

Fig. 58 Load_Block

| 0 | 56:55 | 48:47 | 40:39 | 32:31 | 24:23 | 16:15 | 8:7 | 0 |
|---|---|---|---|---|---|---|---|---|
| 63 | COMMAND =0x33 | SL(12..0) | TL(12..0) | | TILE | SH(12..0) | DxT(1..11) | 0 |

Fig. 59 Load_Block

| FIELD | WORD | BITS | DESCRIPTION |
|---|---|---|---|
| COMMAND | 0 | 61-56 | COMMAND IDENTIFIER. LOAD BLOCK LOADS A TMEM TILE WITH A SINGLE MEMORY "SPAN" FROM SL,TL TO SH,TL. DURING THE TILE LOAD, THE T COORDINATE IS INCREMENTED BY DxT EVERY 8 TMEM BYTES, IN ORDER TO PERFORM ODD-LINE SWAPPING AND LINE STRIDES. |
| SL | 0 | 55-44 | LOW S COORDINATE OF TILE IN IMAGE |
| TL | 0 | 43-32 | LOW T COORDINATE OF TILE IN IMAGE, THE TWO MSBs OF THIS NUMBER SHOULD BE ZERO (i.e., A 10-BIT NUMBER) |
| TILE | 0 | 26-24 | TILE DESCRIPTOR INDEX |
| SH | 0 | 23-12 | HIGH S COORDINATE OF TILE IN IMAGE |
| DxT | 0 | 11-0 | UNSIGNED T INCREMENT VALUE |

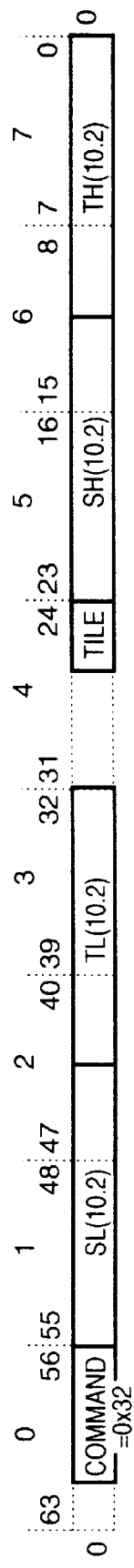
Fig. 60 Set Tile Size
Fig. 61 Set_Tile_Size
| FIELD | WORD | BITS | DESCRIPTION |
|---|---|---|---|
| COMMAND | 0 | 61-56 | COMMAND IDENTIFIER |
| SL | 0 | 55-44 | LOW S COORDINATE OF TILE IN IMAGE |
| TL | 0 | 43-32 | LOW T COORDINATE OF TILE IN IMAGE |
| TILE | 0 | 26-24 | TILE DESCRIPTOR INDEX |
| SH | 0 | 23-12 | HIGH S COORDINATE OF TILE IN IMAGE |
| TH | 0 | 11-0 | HIGH T COORDINATE OF TILE IN IMAGE |

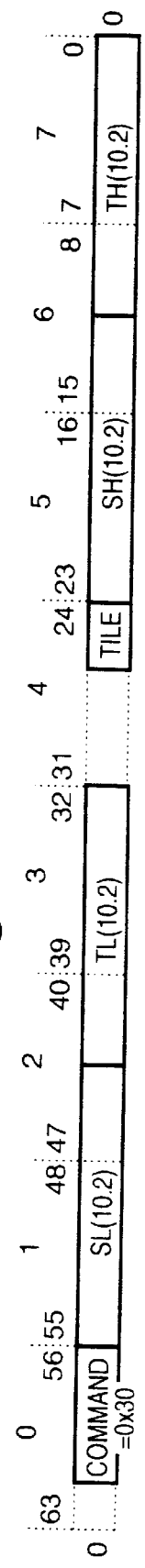

Fig. 62 Load Tlut

Fig. 63 Load_Tlut

| FIELD | WORD | BITS | DESCRIPTION |
|---|---|---|---|
| COMMAND | 0 | 61-56 | COMMAND IDENTIFIER, THIS COMMAND IS USED TO INITIATE A LOAD FROM DRAM OF AN INDEXED TEXTURE LOOKUP TABLE (TLUT). THIS TABLE DEREFERENCES COLOR INDEXED TEXELS BEFORE TEXTURE FILTERING. |
| SL | 0 | 55-44 | LOW INDEX INTO TABLE (0-255), FRACTIONAL BITS SHOULD BE ZERO |
| TL | 0 | 43-32 | NORMALLY ZERO |
| TILE | 0 | 26-24 | TILE DESCRIPTOR INDEX |
| SH | 0 | 23-12 | HIGH INDEX INTO TABLE (0-255), FRACTIONAL BITS SHOULD BE ZERO |
| TH | 0 | 11-0 | NORMALLY ZERO |

Fig. 64
Triangle Commands

| COMMAND | EDGE | SHADE | TEXTURE | ZBUFFER |
|---|---|---|---|---|
| NON-SHADED TRIANGLE, 0x08 | ✓ | | | |
| SHADE TRIANGLE, 0x0c | ✓ | ✓ | | |
| TEXTURE TRIANGLE, 0x0a | ✓ | | ✓ | |
| SHADE, TEXTURE TRIANGLE, 0x0c | ✓ | ✓ | ✓ | |
| NON-SHADED, ZBUFF TRIANGLE, 0x09 | ✓ | | | ✓ |
| SHADE, ZBUFF TRIANGLE, 0x0d | ✓ | ✓ | | ✓ |
| TEXTURE, ZBUFF TRIANGLE, 0x0b | ✓ | | ✓ | ✓ |
| SHADE, TEXTURE, ZBUFF TRIANGLE, 0x0f | ✓ | ✓ | ✓ | ✓ |

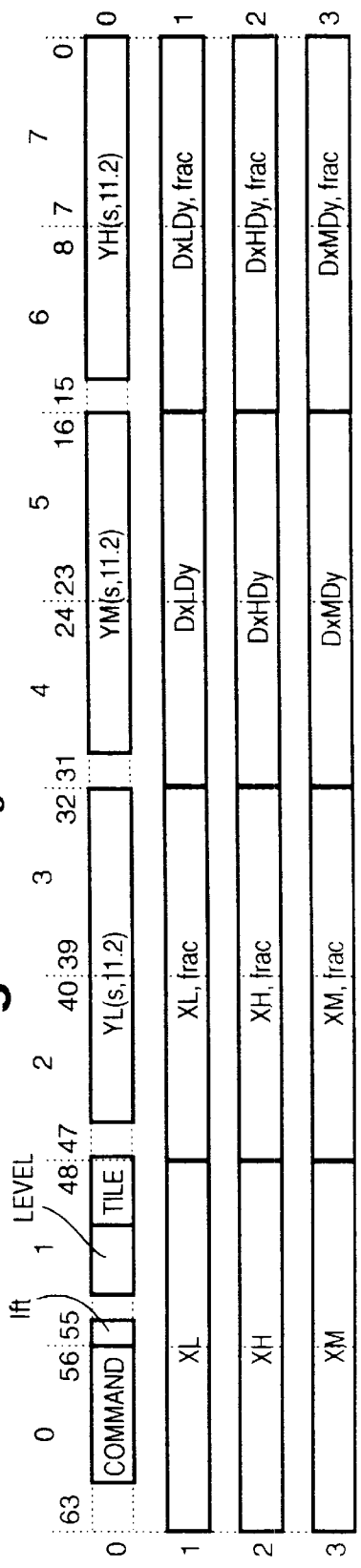

Fig. 65 Edge Coefficients

Fig. 66 Edge Coefficients

| FIELD | WORD | BITS | DESCRIPTION |
|---|---|---|---|
| COMMAND | 0 | 61-56 | COMMAND IDENTIFIER |
| lft | 0 | 55 | LEFT MAJOR FLAG, 1=LEFT MAJOR, 0=RIGHT MAJOR |
| LEVEL | 0 | 53-51 | NUMBER OF MIP-MAPS MINUS ONE |
| TILE | 0 | 50-48 | TILE DESCRIPTOR INDEX. USED TO REFERENCE TEXTURE FOR THIS PRIMITIVE. |
| YL | 0 | 45-32 | Y COORIDINATE OF LOW MINOR EDGE |
| YM | 0 | 29-16 | Y COORIDINATE OF MID MINOR EDGE |
| YH | 0 | 13-0 | Y COORIDINATE OF MAJOR EDGE |
| XL | 1 | 63-48 | X COORIDINATE OF LOW EDGE, INTEGER |
| XL, frac | 1 | 47-32 | X COORIDINATE OF LOW EDGE, FRACTION |
| DxLDy | 1 | 31-16 | INVERSE SLOPE OF LOW EDGE, INTEGER |
| DxLDy, frac | 1 | 15-0 | INVERSE SLOPE OF LOW EDGE, FRACTION |

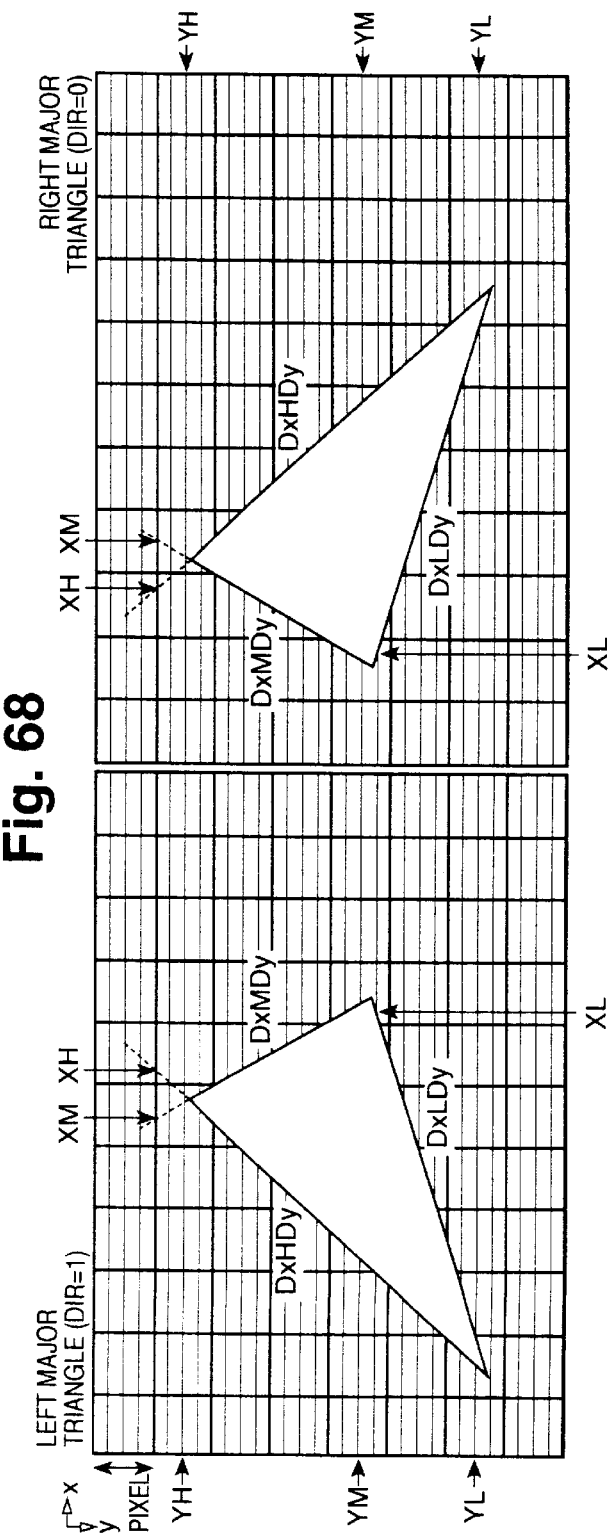

Fig. 67 Edge Coefficients

| FIELD | WORD | BITS | DESCRIPTION |
|---|---|---|---|
| XH | 2 | 63-48 | X COORIDINATE OF MAJOR EDGE, INTEGER |
| XH, frac | 2 | 47-32 | X COORIDINATE OF MAJOR EDGE, FRACTION |
| DxHDy | 2 | 31-16 | INVERSE SLOPE OF MAJOR EDGE, INTEGER |
| DxHDy, frac | 2 | 15-0 | INVERSE SLOPE OF MAJOR EDGE, FRACTION |
| XM | 3 | 63-48 | X COORIDINATE OF MIDDLE EDGE, INTEGER |
| XM, frac | 3 | 47-32 | X COORIDINATE OF MIDDLE EDGE, FRACTION |
| DxMDy | 3 | 31-16 | INVERSE SLOPE OF MIDDLE EDGE, INTEGER |
| DxMDy, frac | 3 | 15-0 | INVERSE SLOPE OF MIDDLE EDGE, FRACTION |

Fig. 68

Fig. 69 Shade Coefficients

| | 63:56:55 | 48:47 | 40:39 | 32:31 | 24:23 | 16:15 | 8:7 | 0 |
|---|---|---|---|---|---|---|---|---|
| 4 | RED | | GREEN | | BLUE | | ALPHA | |
| 5 | DrDx | | DgDx | | DbDx | | DaDx | |
| 6 | RED FRACTION | | GREEN FRACTION | | BLUE FRACTION | | ALPHA FRACTION | |
| 7 | DrDx, FRACTION | | DgDx, FRACTION | | DbDx, FRACTION | | DaDx, FRACTION | |
| 8 | DrDe | | DgDe | | DbDe | | DaDe | |
| 9 | DrDy | | DgDy | | DbDy | | DaDy | |
| 10 | DrDe, FRACTION | | DgDe, FRACTION | | DbDe, FRACTION | | DaDe, FRACTION | |
| 11 | DrDy, FRACTION | | DgDy, FRACTION | | DbDy, FRACTION | | DaDy, FRACTION | |

Fig. 70 Shade Coefficients

| FIELD | WORD | BITS | DESCRIPTION |
|---|---|---|---|
| RED | 4 | 63-48 | RED COLOR COMPONENT, INTEGER |
| GREEN | 4 | 47-32 | GREEN COLOR COMPONENT, INTEGER |
| BLUE | 4 | 31-16 | BLUE COLOR COMPONENT, INTEGER |
| ALPHA | 4 | 15-0 | ALPHA COLOR COMPONENT, INTEGER |
| DrDx | 5 | 63-48 | CHANGE IN RED PER CHANGE IN X COORDINATE, INTEGER |
| DgDx | 5 | 47-32 | CHANGE IN GREEN PER CHANGE IN X COORDINATE, INTEGER |

Fig. 71 Shade Coefficients

| FIELD | WORD | BITS | DESCRIPTION |
|---|---|---|---|
| DbDx | 5 | 31-16 | CHANGE IN BLUE PER CHANGE IN X COORDINATE, INTEGER |
| DaDx | 5 | 15-0 | CHANGE IN ALPHA PER CHANGE IN X COORDINATE, INTEGER |
| RED, FRAC | 6 | 63-48 | RED COLOR COMPONENT, FRACTION |
| GREEN, FRAC | 6 | 47-32 | GREEN COLOR COMPONENT, FRACTION |
| BLUE, FRAC | 6 | 31-16 | BLUE COLOR COMPONENT, FRACTION |
| ALPHA, FRAC | 6 | 15-0 | ALPHA COLOR COMPONENT, FRACTION |
| DrDx, FRAC | 7 | 63-48 | CHANGE IN RED PER CHANGE IN X COORDINATE, FRACTION |
| DgDx, FRAC | 7 | 47-32 | CHANGE IN GREEN PER CHANGE IN X COORDINATE, FRACTION |
| DbDx, FRAC | 7 | 31-16 | CHANGE IN BLUE PER CHANGE IN X COORDINATE, FRACTION |
| DaDx, FRAC | 7 | 15-0 | CHANGE IN ALPHA PER CHANGE IN X COORDINATE, FRACTION |
| DrDe | 8 | 63-48 | CHANGE IN RED ALONG THE EDGE, INTEGER |
| DgDe | 8 | 47-32 | CHANGE IN GREEN ALONG THE EDGE, INTEGER |
| DbDe | 8 | 31-16 | CHANGE IN BLUE ALONG THE EDGE, INTEGER |
| DaDe | 8 | 15-0 | CHANGE IN ALPHA ALONG THE EDGE, INTEGER |
| DrDy | 9 | 63-48 | CHANGE IN RED PER CHANGE IN Y COORDINATE, INTEGER |
| DgDy | 9 | 47-32 | CHANGE IN GREEN PER CHANGE IN Y COORDINATE, INTEGER |
| DbDy | 9 | 31-16 | CHANGE IN BLUE PER CHANGE IN Y COORDINATE, INTEGER |
| DaDy | 9 | 15-0 | CHANGE IN ALPHA PER CHANGE IN Y COORDINATE, INTEGER |
| DrDe | 10 | 63-48 | CHANGE IN RED ALONG THE EDGE, FRACTION |
| DgDe | 10 | 47-32 | CHANGE IN GREEN ALONG THE EDGE, FRACTION |
| DbDe | 10 | 31-16 | CHANGE IN BLUE ALONG THE EDGE, FRACTION |
| DaDe | 10 | 15-0 | CHANGE IN ALPHA ALONG THE EDGE, FRACTION |
| DrDy | 11 | 63-48 | CHANGE IN RED PER CHANGE IN Y COORDINATE, FRACTION |
| DgDy | 11 | 47-32 | CHANGE IN GREEN PER CHANGE IN Y COORDINATE, FRACTION |
| DbDy | 11 | 31-16 | CHANGE IN BLUE PER CHANGE IN Y COORDINATE, FRACTION |
| DaDy | 11 | 15-0 | CHANGE IN ALPHA PER CHANGE IN Y COORDINATE, FRACTION |

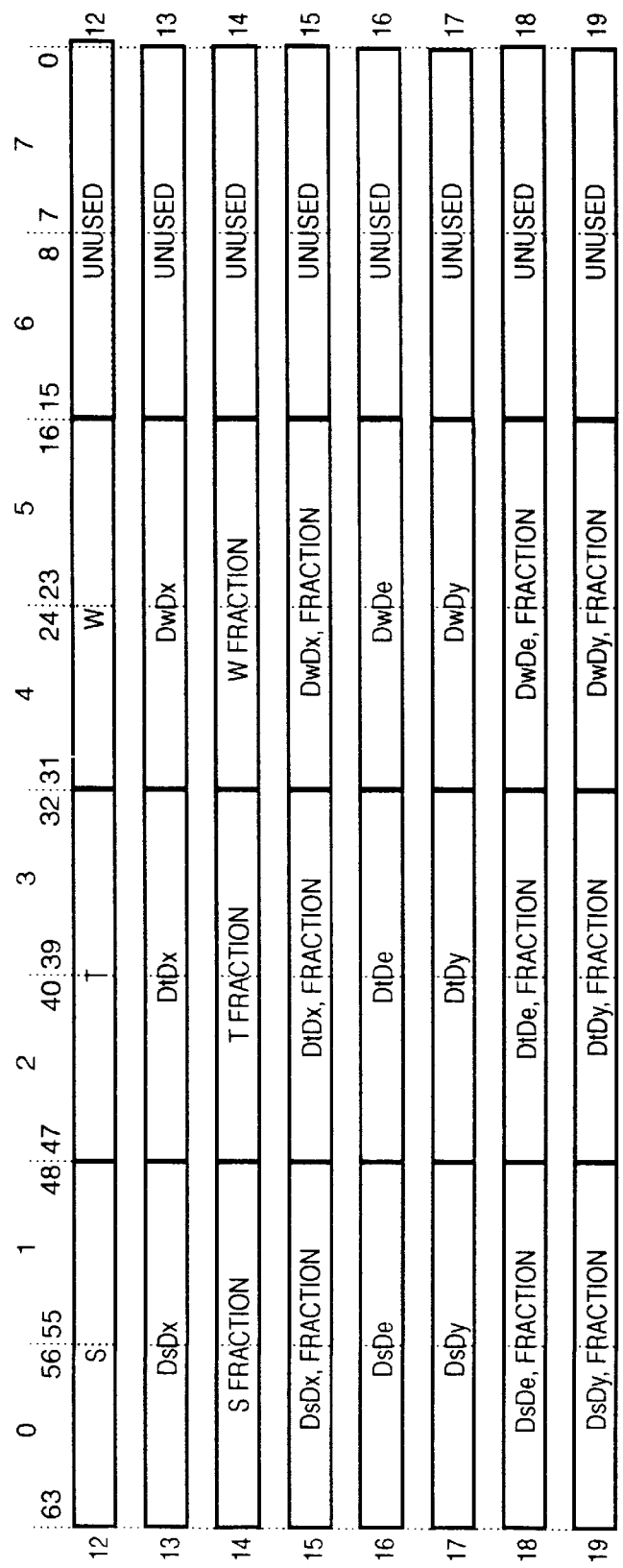
Fig. 72 Texture Coefficients
Fig. 73 Texture Coefficients
| FIELD | WORD | BITS | DESCRIPTION |
|---|---|---|---|
| S | 12 | 63-48 | S TEXTURE COORDINATE, INTEGER |
| T | 12 | 47-32 | T TEXTURE COORDINATE, INTEGER |
| W | 12 | 32-16 | NORMALIZED INVERSE DEPTH, INTEGER |
| DsDx | 13 | 63-48 | CHANGE IN S PER CHANGE IN X COORDINATE, INTEGER |
| DtDx | 13 | 47-32 | CHANGE IN T PER CHANGE IN X COORDINATE, INTEGER |
| DwDx | 13 | 31-16 | CHANGE IN W PER CHANGE IN X COORDINATE, INTEGER |

Fig. 74  Texture Coefficients

| FIELD | WORD | BITS | DESCRIPTION |
|---|---|---|---|
| S, FRAC | 14 | 63-48 | S TEXTURE COORDINATE, FRACTION |
| T, FRAC | 14 | 47-32 | T TEXTURE COORDINATE, FRACTION |
| W, FRAC | 14 | 32-16 | NORMALIZED INVERSE DEPTH, FRACTION |
| DsDx, FRAC | 15 | 63-48 | CHANGE IN S PER CHANGE IN X COORDINATE, FRACTION |
| DtDx, FRAC | 15 | 47-32 | CHANGE IN T PER CHANGE IN X COORDINATE, FRACTION |
| DwDx, FRAC | 15 | 31-16 | CHANGE IN W PER CHANGE IN X COORDINATE, FRACTION |
| DsDe | 16 | 63-48 | CHANGE IN S ALONG THE EDGE, INTEGER |
| DtDe | 16 | 47-32 | CHANGE IN T ALONG THE EDGE, INTEGER |
| DwDe | 16 | 31-16 | CHANGE IN W ALONG THE EDGE, INTEGER |
| DsDy | 17 | 63-48 | CHANGE IN S PER CHANGE IN Y COORDINATE, INTEGER |
| DtDy | 17 | 47-32 | CHANGE IN T PER CHANGE IN Y COORDINATE, INTEGER |
| DwDy | 17 | 31-16 | CHANGE IN W PER CHANGE IN Y COORDINATE, INTEGER |
| DsDe, FRAC | 18 | 63-48 | CHANGE IN S ALONG THE EDGE, FRACTION |
| DtDe, FRAC | 18 | 47-32 | CHANGE IN T ALONG THE EDGE, FRACTION |
| DwDe, FRAC | 18 | 31-16 | CHANGE IN W ALONG THE EDGE, FRACTION |
| DsDy, FRAC | 19 | 63-48 | CHANGE IN S PER CHANGE IN Y COORDINATE, FRACTION |
| DtDy, FRAC | 19 | 47-32 | CHANGE IN T PER CHANGE IN Y COORDINATE, FRACTION |
| DwDy, FRAC | 19 | 31-16 | CHANGE IN W PER CHANGE IN Y COORDINATE, FRACTION |

Fig. 75 ZBuffer Coefficients

| | 0 | | 1 | | 2 | | 3 | | 4 TILE | | 5 | | 6 | | 7 | |
|---|---|---|---|---|---|---|---|---|---|---|---|---|---|---|---|---|
| | 63 | 56 55 | 48 47 | | 40 39 | | 32 31 | | 24 23 | | 16 15 | | 8 7 | | 0 | |
| 20 | Z | | | | Z, FRAC | | | | DzDx | | | | DzDx, FRAC | | | |
| 21 | DzDe | | | | DzDe, FRAC | | | | DzDy | | | | DzDy, FRAC | | | |

Fig. 76 ZBuffer Coefficients

| FIELD | WORD | BITS | DESCRIPTION |
|---|---|---|---|
| Z | 20 | 63-48 | INVERSE DEPTH, INTEGER |
| Z, FRAC | 20 | 47-32 | INVERSE DEPTH, FRACTION |
| DzDx | 20 | 31-16 | CHANGE IN Z PER CHANGE IN X COORDINATE, INTEGER |
| DzDx, FRAC | 20 | 15-0 | CHANGE IN Z PER CHANGE IN X COORDINATE, FRACTION |
| DzDe | 21 | 63-48 | CHANGE IN Z ALONG MAJOR EDGE, INTEGER |
| DzDe, FRAC | 21 | 47-32 | CHANGE IN Z ALONG MAJOR EDGE, FRACTION |
| DzDy | 21 | 31-16 | CHANGE IN Z PER CHANGE IN Y COORDINATE, INTEGER |
| DzDy, FRAC | 23 | 15-0 | CHANGE IN Z PER CHANGE IN Y COORDINATE, FRACTION |

Fig. 77 Fill Rectangle

| 63 | 56 55 | | 48 47 | | 40 39 | | 32 31 | | 24 23 | | 16 15 | | 8 7 | | 0 |
|---|---|---|---|---|---|---|---|---|---|---|---|---|---|---|---|
| 0 | COMMAND =0x36 | | XL(10.2) | | YL(10.2) | | | | XH(10.2) | | | | YH(10.2) | | 0 |
| | 0 | 1 | | 2 | | 3 | | 4 | | 5 | | 6 | | 7 | |

Fig. 78 Fill_Rectangle

| FIELD | WORD | BITS | DESCRIPTION |
|---|---|---|---|
| COMMAND | 0 | 61-56 | COMMAND IDENTIFIER |
| XL | 0 | 55-44 | X COORDINATE OF BOTTOM RIGHT CORNER OF RECTANGLE |
| YL | 0 | 43-32 | Y COORDINATE OF BOTTOM RIGHT CORNER OF RECTANGLE |
| XH | 0 | 23-12 | X COORDINATE OF TOP LEFT CORNER OF RECTANGLE |
| YH | 0 | 11-0 | Y COORDINATE OF TOP LEFT CORNER OF RECTANGLE |

Fig. 79 Texture Rectangle

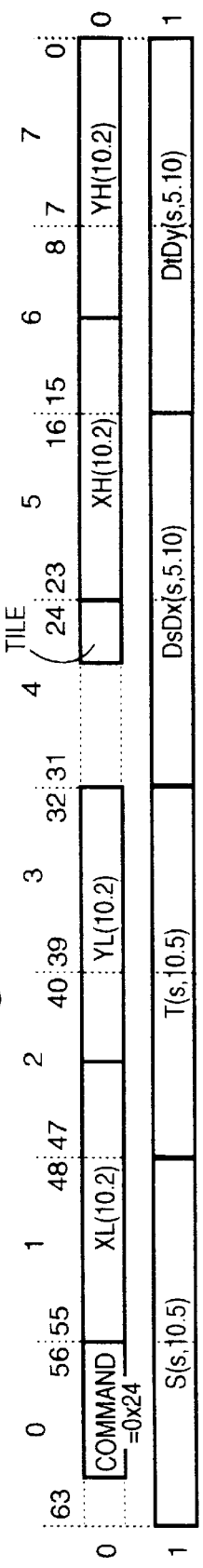

Fig. 80 Texture_Rectangle

| FIELD | WORD | BITS | DESCRIPTION |
|---|---|---|---|
| COMMAND | 0 | 61-56 | COMMAND IDENTIFIER |
| XH | 0 | 55-44 | X COORDINATE OF TOP LEFT CORNER OF RECTANGLE |
| YH | 0 | 43-32 | Y COORDINATE OF TOP LEFT CORNER OF RECTANGLE |
| TILE | 0 | 26-24 | TILE DESCRIPTOR INDEX |
| XL | 0 | 23-12 | X COORDINATE OF BOTTOM RIGHT CORNER OF RECTANGLE |
| YL | 0 | 11-0 | Y COORDINATE OF BOTTOM RIGHT CORNER OF RECTANGLE |
| S | 1 | 63-48 | S TEXTURE COORDINATE AT TOP LEFT CORNER OF RECTANGLE |
| T | 1 | 47-32 | T TEXTURE COORDINATE AT TOP LEFT CORNER OF RECTANGLE |
| DsDx | 1 | 31-16 | CHANGE IN S PER CHANGE IN X COORDINATE |
| DtDy | 1 | 15-0 | CHANGE IN T PER CHANGE IN Y COORDINATE |

Fig. 81 Set_Combine_Mode

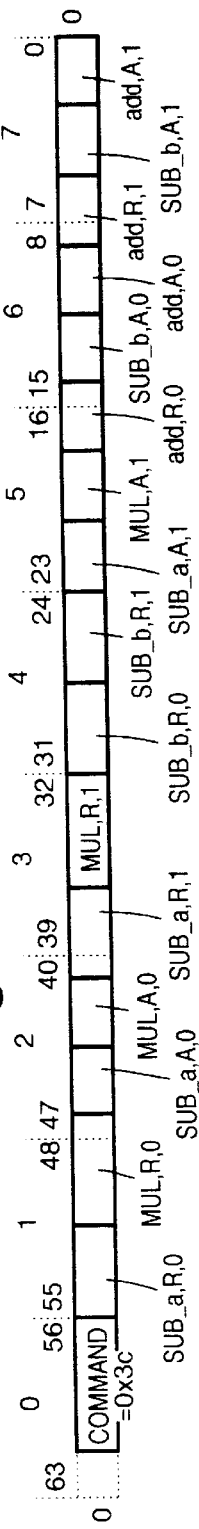

Fig. 82 Set_Combine_Mode

| FIELD | WORD | BITS | DESCRIPTION |
|---|---|---|---|
| COMMAND | 0 | 61-56 | COMMAND IDENTIFIER |
| SUB_a, R, 0 | 0 | 55-52 | SUB_A INPUT, RGB COMPONENTS, CYCLE 0 |
| MUL, R, 0 | 0 | 51-47 | MULTIPLY INPUT, RGB COMPONENTS, CYCLE 0 |
| SUB_a, A, 0 | 0 | 46-44 | SUB_A INPUT, ALPHA COMPONENT, CYCLE 0 |
| MUL, A, 0 | 0 | 43-41 | MULTIPLY INPUT, ALPHA COMPONENT, CYCLE 0 |
| SUB_a, R, 1 | 0 | 40-37 | SUB_A INPUT, RGB COMPONENTS, CYCLE 1 |
| MUL, R, 1 | 0 | 36-32 | MULTIPLY INPUT, RGB COMPONENTS, CYCLE 1 |
| SUB_b, R, 0 | 0 | 31-28 | SUB_B INPUT, RGB COMPONENTS, CYCLE 0 |
| SUB_b, R, 1 | 0 | 27-24 | SUB_B INPUT, RGB COMPONENTS, CYCLE 1 |
| SUB_a, A, 1 | 0 | 23-21 | SUB_A INPUT, ALPHA COMPONENT, CYCLE 1 |
| MUL, A, 1 | 0 | 20-18 | MULTIPLY INPUT, ALPHA COMPONENT, CYCLE 1 |
| ADD, R, 0 | 0 | 17-15 | ADDER INPUT, RGB COMPONENTS, CYCLE 0 |
| SUB_b, A, 0 | 0 | 14-12 | SUB_B INPUT, ALPHA COMPONENTS, CYCLE 0 |
| ADD, A, 0 | 0 | 11-9 | ADDER INPUT, ALPHA COMPONENTS, CYCLE 0 |
| ADD, R, 1 | 0 | 8-6 | ADDER INPUT, RGB COMPONENTS, CYCLE 1 |
| SUB_b, A, 1 | 0 | 5-3 | SUB_B INPUT, ALPHA COMPONENTS, CYCLE 1 |
| ADD, A, 1 | 0 | 2-0 | ADDER INPUT, ALPHA COMPONENTS, CYCLE 1 |

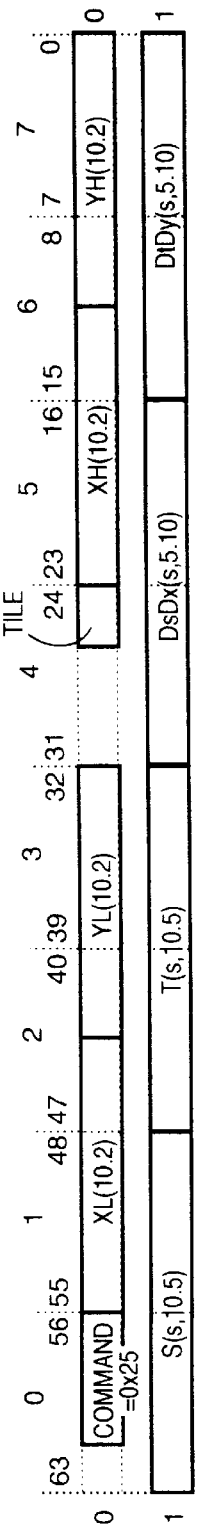

Fig. 83 Texture Rectangle Flip

Fig. 84 Texture_Rectangle Flip

| FIELD | WORD | BITS | DESCRIPTION |
|---|---|---|---|
| COMMAND | 0 | 61-56 | COMMAND IDENTIFIER, SAME AS TEXTURE RECTANGLE EXCEPT HARDWARE SWAPS S/T AND DsDx/DtDy |
| XH | 0 | 55-44 | X COORDINATE OF TOP LEFT CORNER OF RECTANGLE |
| YH | 0 | 43-32 | Y COORDINATE OF TOP LEFT CORNER OF RECTANGLE |
| TILE | 0 | 26-24 | TILE DESCRIPTOR INDEX |
| XL | 0 | 23-12 | X COORDINATE OF BOTTOM RIGHT CORNER OF RECTANGLE |
| YL | 0 | 11-0 | Y COORDINATE OF BOTTOM RIGHT CORNER OF RECTANGLE |
| S | 1 | 63-48 | S TEXTURE COORDINATE AT TOP LEFT CORNER OF RECTANGLE |
| T | 1 | 47-32 | T TEXTURE COORDINATE AT TOP LEFT CORNER OF RECTANGLE |
| DsDx | 1 | 31-16 | CHANGE IN S PER CHANGE IN X COORDINATE |
| DtDy | 1 | 15-0 | CHANGE IN T PER CHANGE IN Y COORDINATE |

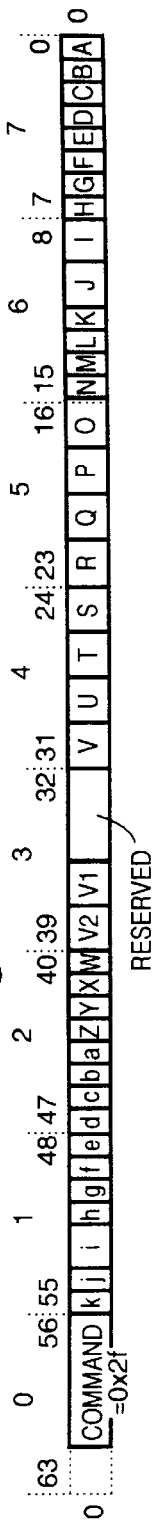

Fig. 85 Set_Other_Modes

Fig. 86 Set_Other_Modes

| FIELD | WORD | BITS | DESCRIPTION |
|---|---|---|---|
| COMMAND | 0 | 61:56 | COMMAND IDENTIFIER |
| k: ATOMIC_PRIM | 0 | 55 | FORCE PRIMITIVE TO BE WRITTEN TO FRAME BUFFER BEFORE READ OF FOLLOWING PRIMITIVE. |
| j: RESERVED | 0 | 54 | THIS MODE BIT IS NOT CURRENTLY USED BUT MAY BE IN THE FUTURE |
| i: CYCLE_TYPE | 0 | 53:52 | DISPLAY PIPELINE CYCLE CONTROL MODE: 0=1 CYCLE, 1=2 CYCLE, 2=COPY, 3=FILL |
| h: PERSP_TEX_EN | 0 | 51 | ENABLE PERSPECTIVE CORRECTION ON TEXTURE |
| g: DETAIL_TEX_EN | 0 | 50 | ENABLE DETAIL TEXTURE |
| f: SHARPEN_TEX_EN | 0 | 49 | ENABLE SHARPENED TEXTURE |
| e: TEX_LOD_EN | 0 | 48 | ENABLE TEXTURE LEVEL OF DETAIL (LOD) |
| d: EN_TLUT | 0 | 47 | ENABLE LOOKUP OF TEXEL VALUES FROM TLUT. MEANINGFUL IF TEXTURE TYPE IS INDEX, TILE IS IN LOW TMEM, TLUT IS IN HIGH TMEM, AND COLOR IMAGE IS RGB. |
| c: TLUT TYPE | 0 | 46 | TYPE OF TEXELS IN TABLE, 0=16b RGBA(5/5/5/1), 1=IA(8/8) |
| b: SAMPLE_TYPE | 0 | 45 | DETERMINES HOW TEXTURES ARE SAMPLED: 0=1x1 (POINT SAMPLE), 1=2x2. NOTE THAT COPY (POINT SAMPLE 4 HORIZONTALLY ADJACENT TEXELS) MODE IS INDICATED BY CYCLE_TYPE. |
| a: MID_TEXEL | 0 | 44 | INDICATES TEXTURE FILTER SHOULD DO A 2x2 HALF TEXEL INTERPOLATION, PRIMARILY USED FOR MPEG MOTION COMPENSATION PROCESSING. |
| Z: BI_LERP_0 | 0 | 43 | 1=BI_LERP, 0=COLOR CONVERT OPERATION IN TEXTURE FILTER. USED IN CYCLE 0. |
| Y: BI_LERP_1 | 0 | 42 | 1=BI_LERP, 0=COLOR CONVERT OPERATION IN TEXTURE FILTER. USED IN CYCLE 1. |
| X: CONVERT_ONE | 0 | 41 | COLOR CONVERT TEXEL THAT WAS THE OUTPUT OF THE TEXTURE FILTER ON CYCLE 0, USED TO QUALIFY BI_LERP_1 |
| W: KEY_EN | 0 | 40 | ENABLES CHROMA KEYING |

Fig. 87 Set_Other_Modes

| FIELD | WORD | BITS | DESCRIPTION |
|---|---|---|---|
| V2: RGB_DITHER_SEL | 0 | 39:38 | 0=MAGIC SQUARE MATRIX (PREFERRED IF FILTERED)<br>1="STANDARD" BAYER MATRIX (PREFERRED IF NOT FILTERED)<br>2=NOISE (AS BEFORE)<br>3=NO DITHER |
| V1: ALPHA_DITHER_SEL | 0 | 37:36 | 0=PATTERN<br>1=~PATTERN<br>2=NOISE<br>3=NO DITHER |
| RESERVED | 0 | 35:32 | RESERVED FOR FUTURE USE, DEFAULT VALUE IS 0xf |
| V: b, m1a, 0 | 0 | 31:30 | BLEND MODEWORD, MULTIPLY 1a INPUT SELECT, CYCLE 0 |
| U: b, m1a, 1 | 0 | 29:28 | BLEND MODEWORD, MULTIPLY 1a INPUT SELECT, CYCLE 1 |
| T: b, m1b, 0 | 0 | 27:26 | BLEND MODEWORD, MULTIPLY 1b INPUT SELECT, CYCLE 0 |
| S: b, m1b, 1 | 0 | 25:24 | BLEND MODEWORD, MULTIPLY 1b INPUT SELECT, CYCLE 1 |
| R: b, m2a, 0 | 0 | 23:22 | BLEND MODEWORD, MULTIPLY 2a INPUT SELECT, CYCLE 0 |
| Q: b, m2a, 1 | 0 | 21:20 | BLEND MODEWORD, MULTIPLY 2a INPUT SELECT, CYCLE 1 |
| P: b, m2b, 0 | 0 | 19:18 | BLEND MODEWORD, MULTIPLY 2b INPUT SELECT, CYCLE 0 |
| O: b, m2b, 1 | 0 | 17:16 | BLEND MODEWORD, MULTIPLY 2b INPUT SELECT, CYCLE 1 |
| N: RESERVED | 0 | 15 | THIS MODE BIT IS NOT CURRENTLY USED, BUT MAY BE IN THE FUTURE |
| M: FORCE_BLEND | 0 | 14 | FORCE BLEND ENABLE |
| L: ALPHA_CVG_SELECT | 0 | 13 | USE CVG (OR CVG*ALPHA) FOR PIXEL ALPHA |
| K: CVG_TIMES_ALPHA | 0 | 12 | USE CVG TIMES ALPHA FOR PIXEL ALPHA AND COVERAGE |
| J: Z_MODE[1:0] | 0 | 11:10 | 0 :OPAQUE, 1: INTERPENETRATING, 2: TRANSPARENT, 3: DECAL |
| I: CVG_DEST[1:0] | 0 | 8:9 | 0: CLAMP (NORMAL), 1: WRAP (WAS ASSUME FULL CVG), 2: ZAP (FORCE TO FULL CVG), 3: SAVE (DON'T OVERWRITE MEMORY CVG). |
| H: COLOR_ON_CVG | 0 | 7 | ONLY UPDATE COLOR ON COVERAGE OVERFLOW (TRANSPARENT SURFACES) |
| G: IMAGE_READ_EN | 0 | 6 | ENABLE COLOR/CVG READ/MODIFY/WRITE MEMORY ACCESS |

Fig. 88 Set_Other_Modes

| FIELD | WORD | BITS | DESCRIPTION |
|---|---|---|---|
| F: Z_UPDATE_EN | 0 | 5 | ENABLE WRITING OF Z IF COLOR WRITE ENABLED |
| E: Z_COMPARE_EN | 0 | 4 | CONDITIONAL COLOR WRITE ENABLE ON DEPTH COMPARISON |
| D: ANTIALIAS_EN | 0 | 3 | IF NOT FORCE BLEND, ALLOW BLEND ENABLE - USE CVG BITS |
| C: Z_SOURCE_SEL | 0 | 2 | CHOOSE BETWEEN PRIMITIVE Z AND PIXEL Z |
| B: DITHER_ALPHA_EN | 0 | 1 | USE RANDOM NOISE IN ALPHA COMPARE, OTHERWISE USE BLEND ALPHA IN ALPHA COMPARE |
| A: ALPHA_COMPARE_EN | 0 | 0 | CONDITIONAL COLOR WRITE ON ALPHA COMPARE |

Fig. 89 Set Env Color

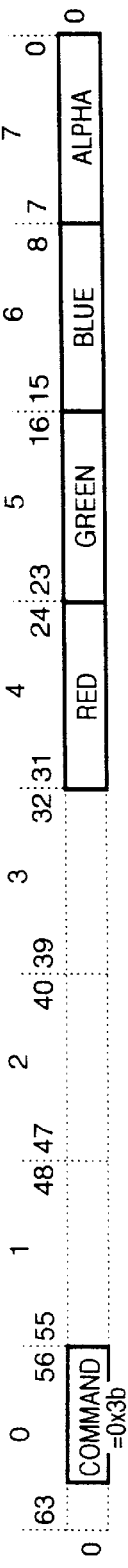

Fig. 90 Set Env Color

| FIELD | WORD | BITS | DESCRIPTION |
|---|---|---|---|
| COMMAND | 0 | 61-56 | COMMAND IDENTIFIER |
| RED | 0 | 31-24 | RED COMPONENT |
| GREEN | 0 | 23-16 | GREEN COMPONENT |
| BLUE | 0 | 15-8 | BLUE COMPONENT |
| ALPHA | 0 | 7-0 | ALPHA COMPONENT |

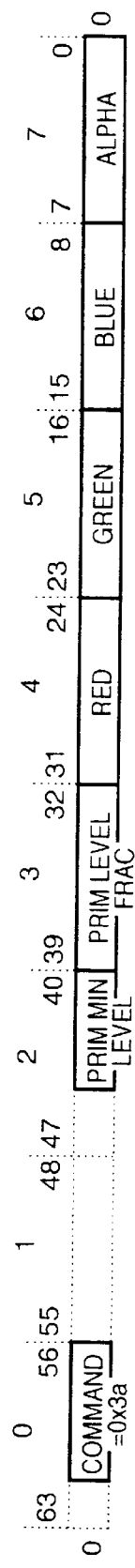

Fig. 91 Set Prim Color

Fig. 92 Set Env Color

| FIELD | WORD | BITS | DESCRIPTION |
|---|---|---|---|
| COMMAND | 0 | 61-56 | COMMAND IDENTIFIER |
| PRIM MIN LEVEL | 0 | 44-40 | MINIMUM CLAMP FOR LOD FRACTION WHEN IN DETAIL OR SHARPEN TEXTURE MODES, FIXED POINT 0.5. |
| PRIM LEVEL FRAC | 0 | 39-32 | LEVEL OF DETAIL FRACTION FOR PRIMITIVE, USED PRIMARILY IN MULTI-TILE OPERATIONS FOR RECTANGLE PRIMITIVES, 0.8. |
| GREEN | 0 | 23-16 | GREEN COMPONENT |
| BLUE | 0 | 15-8 | BLUE COMPONENT |
| ALPHA | 0 | 7-0 | ALPHA COMPONENT |

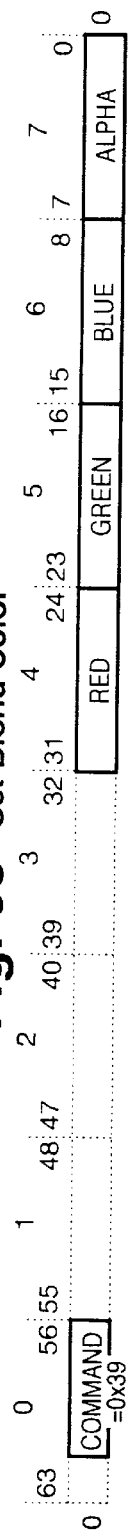
Fig. 93 Set Blend Color
Fig. 94 Set Blend Color
| FIELD | WORD | BITS | DESCRIPTION |
|---|---|---|---|
| COMMAND | 0 | 61-56 | COMMAND IDENTIFIER |
| RED | 0 | 31-24 | RED COMPONENT |
| GREEN | 0 | 23-16 | GREEN COMPONENT |
| BLUE | 0 | 15-8 | BLUE COMPONENT |
| ALPHA | 0 | 7-0 | ALPHA COMPONENT |
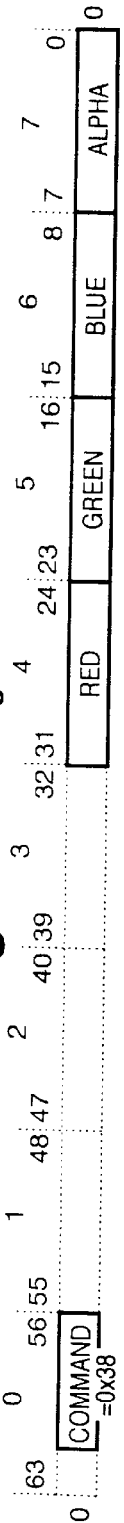
Fig. 95 Set Fog Color
Fig. 96 Set Fog Color
| FIELD | WORD | BITS | DESCRIPTION |
|---|---|---|---|
| COMMAND | 0 | 61-56 | COMMAND IDENTIFIER |
| RED | 0 | 31-24 | RED COMPONENT |
| GREEN | 0 | 23-16 | GREEN COMPONENT |
| BLUE | 0 | 15-8 | BLUE COMPONENT |
| ALPHA | 0 | 7-0 | ALPHA COMPONENT |

Fig. 97 Set Fill Color

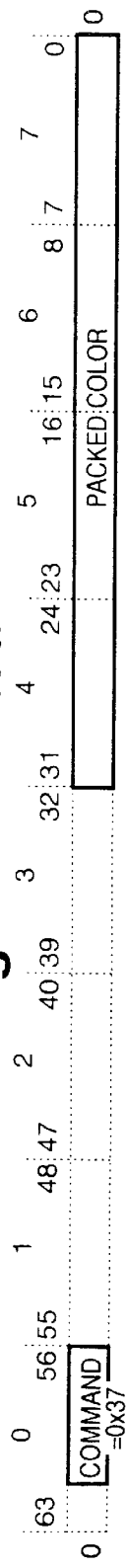

Fig. 98 Set Fill Color

| FIELD | WORD | BITS | DESCRIPTION |
|---|---|---|---|
| COMMAND | 0 | 61-56 | COMMAND IDENTIFIER |
| PACKED COLOR | 0 | 31-0 | PACKED COLOR, FOR EXAMPLE, IF THE COLOR IMAGE WAS SET BE 16b RGBA, THEN THE FILL COLOR WOULD BE TWO HORIZONTALLY ADJACENT 16b RGBA PIXELS. |

Fig. 99 Set Prim Depth

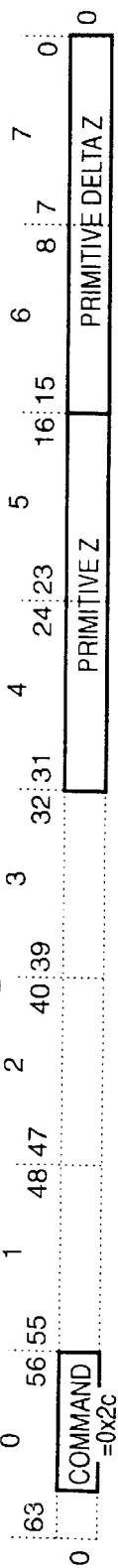

Fig. 100 Set Prim Depth

| FIELD | WORD | BITS | DESCRIPTION |
|---|---|---|---|
| COMMAND | 0 | 61-56 | COMMAND IDENTIFIER |
| PRIMITIVE Z | 0 | 31-16 | PRIMITIVE Z |
| PRIMITIVE DELTA Z | 0 | 15-0 | PRIMITIVE DELTA Z |

Fig. 101 Set Scissor

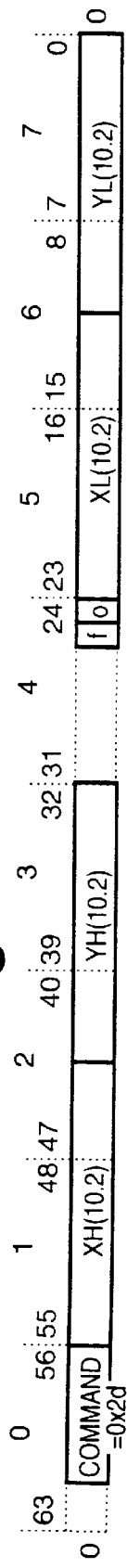

Fig. 102 Set Scissor

| FIELD | WORD | BITS | DESCRIPTION |
|---|---|---|---|
| COMMAND | 0 | 61-56 | COMMAND IDENTIFIER |
| XH | 0 | 55-44 | X COORDINATE OF TOP LEFT CORNER OF SCISSOR BOX IN SCREEN SPACE. |
| YH | 0 | 43-32 | Y COORDINATE OF TOP LEFT CORNER OF SCISSOR BOX IN SCREEN SPACE. |
| f | 0 | 25 | SCISSOR FIELD, ENABLES SCISSORING OF ODD OR EVEN LINES FOR INTERLACED DISPLAYS |
| o | 0 | 24 | ODD LINE: 0=KEEP EVEN LINE, 1=KEEP ODD LINE, INDICATES WHETHER ALL ODD LINES OR ALL EVEN LINES SHOULD BE SKIPPED (FOR INTERLACED DISPLAYS). |
| XL | 0 | 23-12 | X COORDINATE OF BOTTOM RIGHT CORNER OF SCISSOR BOX IN SCREEN SPACE. |
| YL | 0 | 11-0 | Y COORDINATE OF BOTTOM RIGHT CORNER OF SCISSOR BOX IN SCREEN SPACE. |

Fig. 103 Set Convert

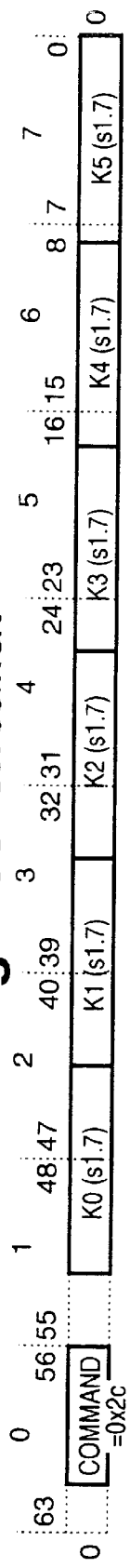

Fig. 104 Set Convert

| FIELD | WORD | BITS | DESCRIPTION |
|---|---|---|---|
| COMMAND | 0 | 61-56 | COMMAND IDENTIFIER, THIS COMMAND UPDATES THE COEFFICIENTS FOR CONVERTING YUV PIXELS TO RGB. CONCEPTUALLY THE EQUATIONS ARE: R = C0*(Y-16) + C1*V G = C0*(Y-16) - C2*U - C3*V B = C0*(Y-16) + C4*U |
| K0 | 0 | 45-53 | K0 TERM OF YUV-RGB CONVERSION MATRIX |
| K1 | 0 | 36-44 | K1 TERM OF YUV-RGB CONVERSION MATRIX |
| K2 | 0 | 27-35 | K2 TERM OF YUV-RGB CONVERSION MATRIX |
| K3 | 0 | 18-26 | K3 TERM OF YUV-RGB CONVERSION MATRIX |
| K4 | 0 | 9-17 | K4 TERM OF YUV-RGB CONVERSION MATRIX |
| K5 | 0 | 0-8 | K5 TERM OF YUV-RGB CONVERSION MATRIX |

Fig. 105 Set Key R

| 0 | | 1 | | 2 | | 3 | | 4 | | 5 | | 6 | | 7 |
|---|---|---|---|---|---|---|---|---|---|---|---|---|---|---|
| 63 56:55 | | 48:47 | | 40:39 | | 32:31 | | 24:23 | | 16:15 | | 8:7 | | 0 |
| COMMAND =0x2b | | | | | | | | WIDTH R (s7.4) | | CENTER R | | SCALE R | | |

Fig. 106 Set_Key_R

| FIELD | WORD | BITS | DESCRIPTION |
|---|---|---|---|
| COMMAND | 0 | 61-56 | COMMAND IDENTIFIER, THIS COMMAND SET THE COEFFICIENTS USED FOR RED KEYING. THE EQUATION USED FOR KEYING IS: KEY R = CLAMP(0.0, -ABS((R - CENTER) * SCALE) + WIDTH, 1.0). THE KEY ALPHA IS THE MINIMUM OF THE KEY R, KEY G, KEY B. |
| WIDTH R | 0 | 27-16 | (SIZE OF HALF THE KEY WINDOW INCLUDING THE SOFT EDGE)*SCALE. IF WIDTH > 1.0, THEN KEYING IS DISABLED FOR THAT CHANNEL. |
| CENTER R | 0 | 15-8 | DEFINES COLOR OR INTENSITY AT WHICH KEY IS ACTIVE, 0-255 |
| SCALE R | 0 | 7-0 | (1.0 / (SIZE OF SOFT EDGE). FOR HARD EDGE KEYING, SET SCALE TO 255. |

Fig. 107 Set_Key_GB

| 63 | 56 55 | 48 47 | 40 39 | 32 31 | 24 23 | 16 15 | 8 7 | 0 |
|---|---|---|---|---|---|---|---|---|
| COMMAND =0x2a | WIDTH G | WIDTH B | CENTER G | SCALE G | CENTER B | SCALE B | | |
| 0 | 1 | 2 | 3 | 4 | 5 | 6 | 7 | 0 |

Fig. 108 Set_Key_GB

| FIELD | WORD | BITS | DESCRIPTION |
|---|---|---|---|
| COMMAND | 0 | 61-56 | COMMAND IDENTIFIER. THIS COMMAND SET THE COEFFICIENTS USED FOR GREEN/BLUE KEYING. CONCEPTUALLY, THE EQUATION USED FOR KEYING IS: KEY G/B = CLAMP(0.0, -ABS((G/B - CENTER)*SCALE) + WIDTH, 1.0). THE KEY ALPHA IS THE MINIMUM OF THE KEY R, KEY G, KEY B. |
| WIDTH G | 0 | 55-44 | (SIZE OF HALF THE KEY WINDOW INCLUDING THE SOFT EDGE)*SCALE. IF WIDTH > 1.0, THEN KEYING IS DISABLED FOR THAT CHANNEL. |
| WIDTH B | 0 | 43-32 | (SIZE OF HALF THE KEY WINDOW INCLUDING THE SOFT EDGE)*SCALE. IF WIDTH > 1.0, THEN KEYING IS DISABLED FOR THAT CHANNEL. |
| CENTER G | 0 | 31-24 | DEFINES COLOR OR INTENSITY AT WHICH KEY IS ACTIVE, 0-255 |
| SCALE G | 0 | 23-16 | (1.0 / (SIZE OF SOFT EDGE). FOR HARD EDGE KEYING, SET SCALE TO 255. |
| CENTER B | 0 | 15-8 | DEFINES COLOR OR INTENSITY AT WHICH KEY IS ACTIVE, 0-255 |
| SCALE B | 0 | 7-0 | (1.0 / (SIZE OF SOFT EDGE). FOR HARD EDGE KEYING, SET SCALE TO 255. |

Fig. 109 Sync Full

```
 0       56 55        48 47        40 39        32 31        24 23        16 15        8  7         0
 63        COMMAND
           =0x29
```

Fig. 110 Sync Full

| FIELD | WORD | BITS | DESCRIPTION |
|---|---|---|---|
| COMMAND | 0 | 61-56 | COMMAND IDENTIFIER, THIS COMMAND STALLS THE RDP UNTIL THE LAST DRAM BUFFER IS READ OR WRITTEN FROM ANY PRECEEDING PRIMITIVE. IT IS TYPICALLY ONLY NEEDED IF THE MEMORY DATA IS TO BE REUSED, LIKE SWITCHING DISPLAY BUFFERS, OR WRITING A COLOR_IMAGE TO BE USED AS A TEXTURE_IMAGE, OR FOR CONSISTENT R/W ACCESS TO AN RDP W/R IMAGE FROM THE CPU. |

Fig. 111 Sync Load

```
 0       56 55        48 47        40 39        32 31        24 23        16 15        8  7         0
 63        COMMAND
           =0x31
```

Fig. 112 Sync Full

| FIELD | WORD | BITS | DESCRIPTION |
|---|---|---|---|
| COMMAND | 0 | 61-56 | COMMAND IDENTIFIER, THIS COMMAND STALLS THE EXECUTION OF LOAD COMMANDS (LOAD TLUT, LOAD TILE, LOAD BLOCK) UNTIL PRECEEDING PRIMITIVES HAS COMPLETELY FINISHED. USUALLY PRECED ALL LOAD COMMANDS BY SYNC LOAD. |

Fig. 113 Sync Pipe

| 63 | 56 55 | 48 47 | 40 39 | 32 31 | 24 23 | 16 15 | 8 7 | 0 |
|---|---|---|---|---|---|---|---|---|
| 0 | COMMAND =0x27 | | | | | | | 0 |
| | 7 | 6 | 5 | 4 | 3 | 2 | 1 | 0 |

Fig. 114 Sync Pipe

| FIELD | WORD | BITS | DESCRIPTION |
|---|---|---|---|
| COMMAND | 0 | 61-56 | COMMAND IDENTIFIER, GENERAL ATTRIBUTES (OTHER THAN PRIM_COLOR/DEPTH) WHICH ARE BEING READ BY UP TO TWO PRECEEDING PRIMITIVES SHOULD BE PRECEEDED BY SYNC_PIPE, WHICH STALLS UNTIL THE MOST RECENT PRIMITIVE IS PAST THE LAST USAGE OF ANY ATTRIBUTE. ONLY ONE SYNC_PIPE IS NEEDED BEFORE ANY NUMBER OF ATTRIBUTE COMMANDS. SOFTWARE CAN OPTIMIZE SYNC_PIPE USAGE IF IT KNOWS WHAT IS BEING READ, FOR EXAMPLE, A SET_TEXTURE_IMAGE CAN FOLLOW TRI's OR RECTS IN PREPARATION FOR A LOAD_TILE WITHOUT A SYNC_PIPE, BECAUSE TRIS OR RECTS DON'T USE THE TEXTURE_IMAGE ATTRIBUTE. [IN GENERAL, THE RDP IS OPTIMIZED FOR A NUMBER OF PRIMITIVES RENDERED WITH THE SAME ATTRIBUTE SETTING. IF ATTRIBUTES CHANGE PER PRIMITIVE, PERFORMANCE WILL DEGRADE SLIGHTLY. |

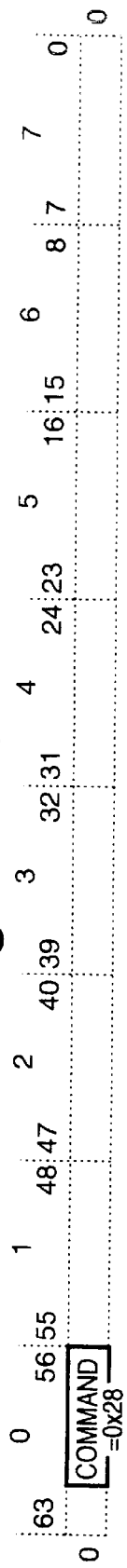

Fig. 115 SyncTile

Fig. 116 Sync Tile

| FIELD | WORD | BITS | DESCRIPTION |
|---|---|---|---|
| COMMAND | 0 | 61-56 | COMMAND IDENTIFIER, ALLOWS SYNCHRONIZATION BETWEEN COMMANDS THAT WRITE TO THE SAME TILE DESCRIPTOR THAT AN IMMEDIATELY PREVIOUS COMMAND IS READING. |

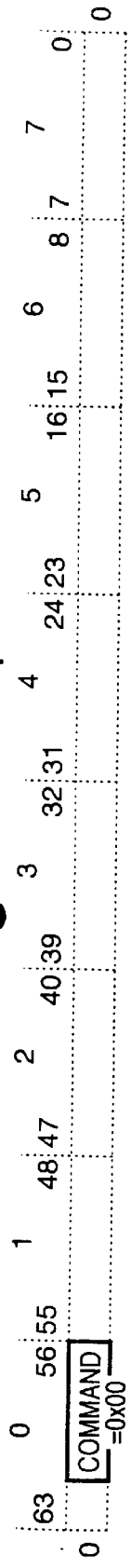

| FIELD | WORD | BITS | DESCRIPTION |
|---|---|---|---|
| COMMAND | 0 | 61-56 | COMMAND IDENTIFIER, THIS COMMAND HAS NO EFFECT ON RDP COMMAND EXECUTION BUT IS USEFUL FOR PADDING COMMAND BUFFERS. |

INTERFACE FOR A HIGH PERFORMANCE LOW COST VIDEO GAME SYSTEM WITH COPROCESSOR PROVIDING HIGH SPEED EFFICIENT 3D GRAPHICS AND DIGITAL AUDIO SIGNAL PROCESSING

This is a division of application Ser. No. 08/561,718, filed Nov. 22, 1995.

FIELD OF THE INVENTION

The present invention relates to low cost video game systems. More particularly, the invention relates to a video game system that can model a world in three dimensions and project the model onto a two dimensional viewing plane selected based on a changeable viewpoint.

BACKGROUND AND SUMMARY OF THE INVENTION

People's imaginations are fueled by visual images. What we actually see at sunset, what we dream at night, the pictures we paint in our mind when we read a novel—all of these memorable scenes are composed of visual images. Throughout history, people have tried to record these images with pencils or paints or video tape. But only with the advent of the computer can we begin to create images with the same vividness, detail and realism that they display in the real world or in the imagination.

Computer-based home video game machines such as the Nintendo Entertainment System and the Super Nintendo Entertainment System have been highly successful because they can interactively produce exciting video graphics. However, without additional add-on hardware, these prior video graphics systems generally operated in two dimensions, creating graphics displays from flat (planar) image representations in a manner somewhat analogous to tacking flat paper cutouts onto a bulletin board. Although very exciting game play can be created using two dimensional graphics techniques, a 2D system cannot provide the realism offered by a three-dimensional graphics system.

3D graphics are fundamentally different from 2D graphics. In 3D graphics techniques, a "world" is represented in three dimensional space. The system can allow the user to select a viewpoint within the world. The system creates an image by "projecting" the world based on the selected viewpoint. The result is a true three-dimensional image having depth and realism.

For many years, specialists have used super computers and high end workstations to create incredible realistic 3D images—for example, ultra-detailed models of cars, planes and molecules; virtual reality as seen from the cockpit of a jet fighter or the front seat of an Olympic bobsled; and dinosaurs of "Jurassic Park." However, in the past, computer systems required to produce such images interactively cost tens of thousands of dollars—well beyond the reach of the average consumer.

The low cost high performance 3D graphics system disclosed herein is intended to for the first time give millions of game players, not just the specialists, the chance to interact right inside these magnificent virtual 3D worlds with a richly featured high performance low cost system. What players get is truly amazing—many times the power of any home computer system, far more realistic 3-dimensional animation, stunning graphics—all delivered at a sufficiently low cost to be within the reach of the average consumer.

The following are a few examples of the many advantageous features provided by a system in accordance with the present invention:

Realistic interactive 3D graphics in a low price system

Optimum feature set/architecture for a low cost system for use with a color television set to provide video game play and other graphics applications in a low cost system and/or to produce particular screen effects Coprocessor that provides high performance 3D graphics and digital sound processing Signal processor sharing between graphics digital processing and audio signal processing to achieve high quality stereo sound and 3-D graphics in a low cost color television based system Unified RAM approach increases flexibility All major system components can communicate through the shared RAM Techniques/structures for compensating for narrow main memory bus width Executable code from a storage device (e.g., a portable memory cartridge) can be loaded into the common RAM and accessed by the main processor through coprocessor memory access/arbitration circuitry Graphics coprocessor loadable microcode store receives microcode from a portable storage medium to provide additional flexibility and simplify compatibility issues Microcode is loaded via execution of "boot ROM" instructions Optimal commands and associated formats are used to invoke graphics and audio functions within the coprocessor and provide an interface between the graphics coprocessor and the rest of the system Coprocessor register set including particular hardware register definitions, formats and associated functions Microcode graphics and audio structure/processes provide efficient high performance operation Vector unit provides optimal performance for graphics and audio digital processing in a low cost package Pipelined rasterizing engine provides a one-pixel-per-cycle and two-pixel-per-cycle modes to minimize hardware cost while providing a rich feature set Low coprocessor pin out

BRIEF DESCRIPTION OF THE DRAWINGS

These and other features and advantages of the present invention will be better and more completely understood by referring to the following detailed description of a presently preferred exemplary embodiment in connection with the drawings, of which:

FIG. 4A shows example overall steps performed by a video game system to generate graphics images;

FIG. 6 shows an example coprocessor internal architecture;

FIG. 7D–7L show example signal processor registers;

FIG. 8 shows an example hierarchical task list including graphics display lists and audio play lists;

FIG. 14 shows an example audio software architecture;

FIG. 15 shows an example simple signal processor play list processing example;

FIG. 16 shows an example signal processor audio microcode control step sequence;

FIG. 17 shows an example signal processor audio processing construct;

FIGS. 19A and 19B show example display processor pipeline configurations;

FIGS. 21A–21J show example display processor registers;

FIG. 22 shows an example texture memory tile descriptor arrangement;

FIG. 23 shows an example texture unit process;

FIG. 25 shows an example texture memory color index mode lookup;

FIG. 26 shows an example more detailed use of the texture memory to store color indexed textures;

FIG. 27 shows an example color combiner operation;

FIG. 28 shows an example alpha combiner operation;

FIG. 30 shows an example of blending different types of primitives;

FIG. 31 shows an example blender operation;

FIG. 32 shows an example color pixel format;

FIG. 33 shows an example depth (z) pixel format;

FIG. 33A shows an example write enable generation process;

FIG. 34 shows an example video interface architecture;

FIGS. 35A–35P show example video interface control registers;

FIG. 36 shows an example main memory interface architecture;

FIGS. 37A–37H show example memory interface controller registers;

FIG. 38 shows an example main processor interface architecture;

FIGS. 39A–39D show example main processor interface registers;

FIG. 40 shows an example audio interface architecture;

FIGS. 41A–41F show example audio interface registers;

FIG. 42 shows an example serial interface architecture;

FIG. 44 shows an example peripheral interface architecture;

FIGS. 45A–45I show example peripheral interface control/status registers;

FIGS. 46–118 show display processor 500 graphic display command example formats and associated functions.

DETAILED DESCRIPTION OF A PRESENTLY PREFERRED EXAMPLE EMBODIMENT

Figure 1:
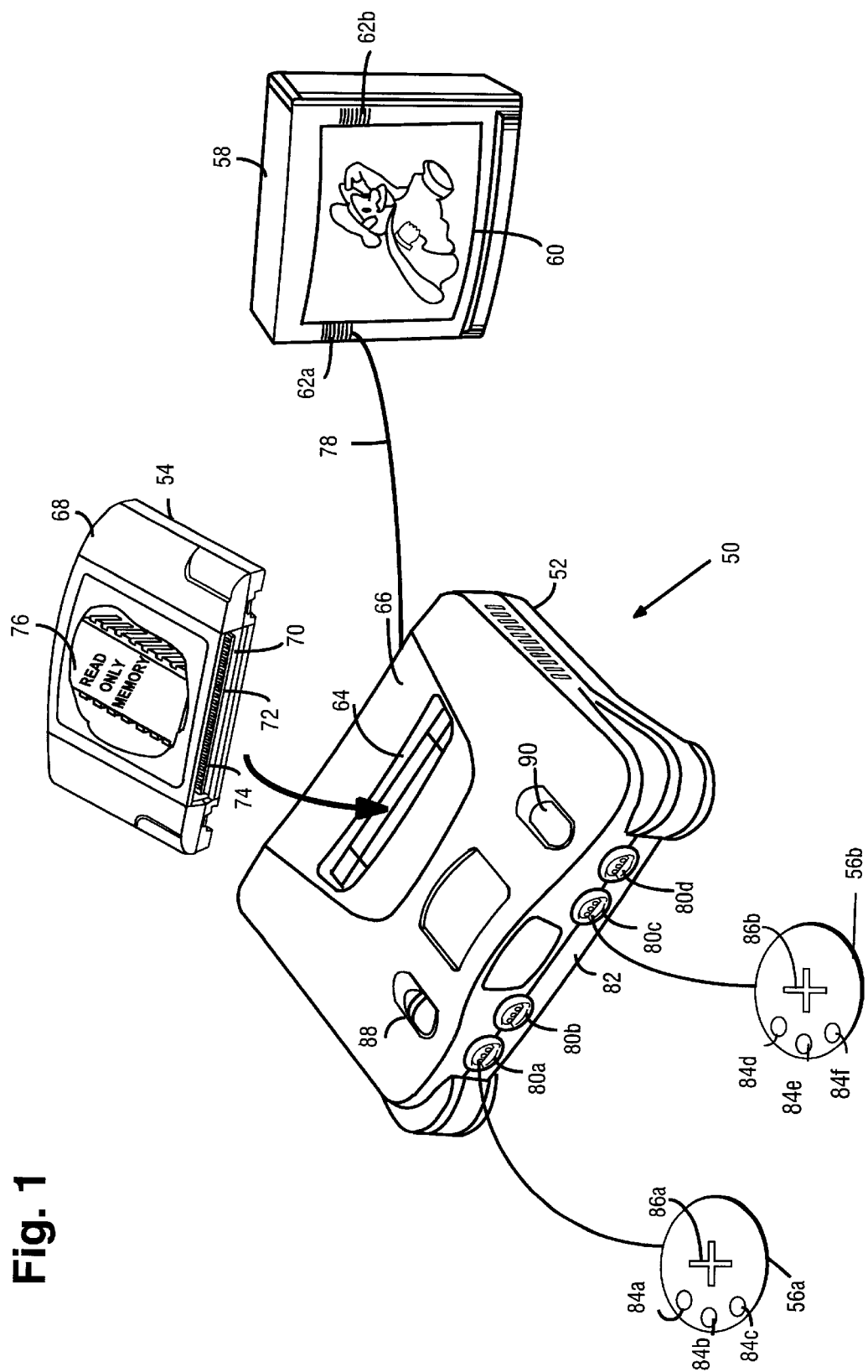
FIG. 1 shows an overall video game system capable of generating 3-D images and digitally processed stereo sound.
Figure 1A:
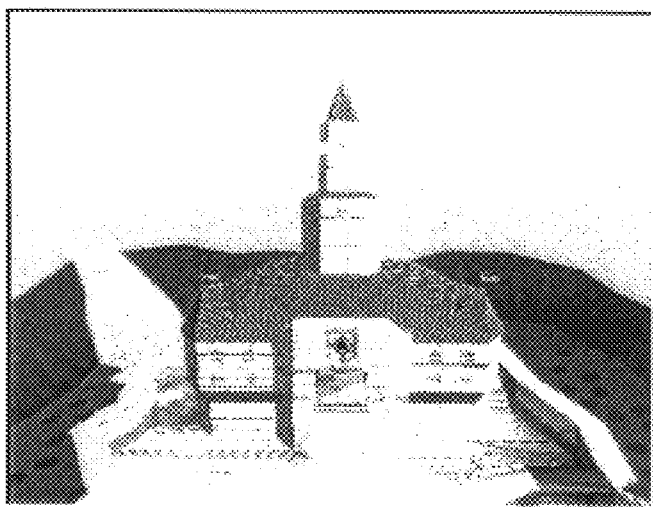
FIGS. 1A–1F show example 3-D screen effects achievable using the FIG. 1 system.
Figure 1B:
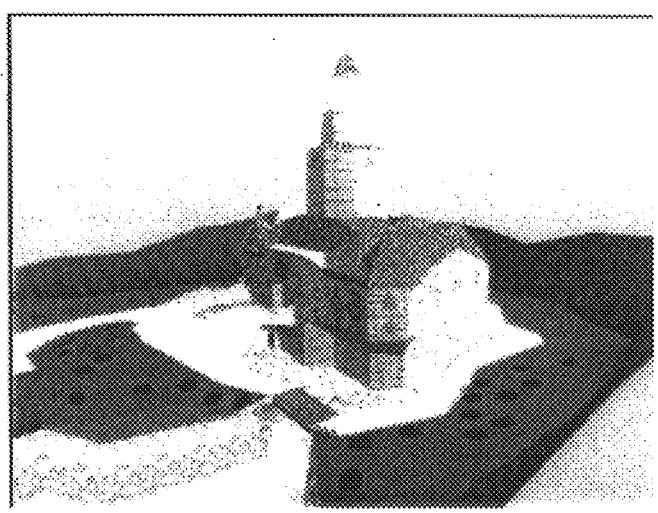
Figure 1C:
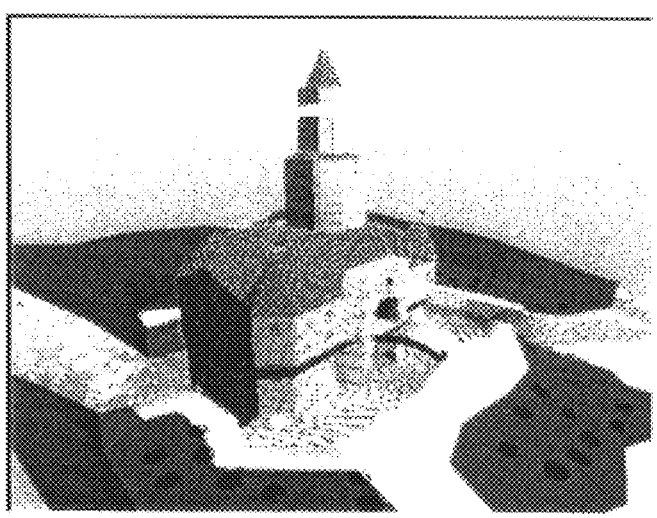

FIG. 1 shows an example embodiment video game system 50 in accordance with the present invention(s). Video game system 50 in this example includes a main unit 52, a video game storage device 54, and handheld controllers 56 (or other user input devices). In this example, main unit 52 connects to a conventional home color television set 58. Television set 58 displays 3D video game images on its television screen 60 and reproduces stereo sound through its loud speakers 62.

In this example, the video game storage device 54 is in the form of a replaceable memory cartridge insertable into a slot 64 on a top surface 66 of main unit 52. Video game storage device 54 can comprise, for example, a plastic housing 68 encasing a read only memory (ROM) chip 76. The read only memory 76 contains video game software in this example. When the video game storage device 54 is inserted into main unit slot 64, cartridge electrical contacts 74 mate with corresponding "edge connector" electrical contacts within the main unit. This action electrically connects the storage device's read only memory 76 to the electronics within main unit 52.

"Read only memory" chip 76 stores software instructions and other information pertaining to a particular video game. The read only memory chip 76 in one storage device 54 may, for example, contain instructions and other information for an adventure game. The read only memory chip 76 in another storage device 54 may contain instructions and information to play a driving or car race game. The read only memory chip 76 of still another storage device 54 may contain instructions and information for playing an educational game. To play one game as opposed to another, the user of video game system 50 simply plugs the appropriate storage device 54 into main unit slot 64—thereby connecting the storage device's read only memory chip 76 (and any other circuitry the storage device may contain) to the main unit 52. This enables the main unit 52 to access the information contained within read only memory 76, which information controls the main unit to play the appropriate video game by displaying images and reproducing sound on color television set 58 as specified under control of the video game software in the read only memory.

To play a video game using video game system 50, the user first connects main unit 52 to his or her color television set 58 by hooking a cable 78 between the two. Main unit 52 produces both "video" signals and "audio" signals for controlling color television set 58. The "video" signals are what controls the images displayed on the television screen 60, and the "audio" signals are played back as sound through television loudspeakers 62. Depending on the type of color television set 58, it may be necessary to use an additional unit called an "RF modulator" in line between main unit 52 and color television set 58. An "RF modulator" (not shown) converts the video and audio outputs of main unit 52 into a broadcast type television signal (e.g., on television channel 2 or 3) that can be received and processed using the television set's internal "tuner."

The user also needs to connect main unit 52 to a power source. This power source may comprise a conventional AC adapter (not shown) that plugs into a standard home electrical wall socket and converts the house current into a lower DC voltage signal suitable for powering main unit 52.

The user may then connect hand controllers 56a, 56b to corresponding connectors 80 on main unit front panel 82. Controllers 56 may take a variety of forms. In this example, the controllers 56 shown each include various push buttons 84 and a directional switch or other control 86. The directional switch 88 can be used, for example, to specify the direction (up, down, left or right) that a character displayed on television screen 60 should move and/or to specify a point of view in a 3D world. Other possibilities include, for example, joysticks, mice pointer controls and other conventional user input devices. In this example, up to four controllers 56 can be connected to main unit 52 to allow 4-player games.

The user then selects a storage device 54 containing the video game he or she wants to play, and inserts that storage device into main unit slot 64 (thereby electrically connecting read only memory 76 to the main unit electronics via a printed circuit board 70 and associated edge contacts 74). The user may then operate a power switch 88 to turn on the video game system 50. This causes main unit 52 to begin playing the video game based on the software stored in read only memory 54. He or she may operate controllers 86 to provide inputs to main unit 52 and thus affect the video game play. For example, depressing one of push buttons 84 may cause the game to start. As mentioned before, moving directional switches 86 can cause animated characters to move on the television screen 60 in different directions or can change the user's point of view in a 3D world. Depending upon the particular video game stored within the storage device 54, these various controls 84, 86 on the controller 56 can perform different functions at different times. If the user wants to restart game play, he or she can press a reset button 90.

EXAMPLE 3D SCREEN EFFECTS

System 50 is capable of processing, interactively in real time, a digital representation or model of a three-dimensional world to display the world (or portions of it) from any arbitrary viewpoint within the world. For example, system 50 can interactively change the viewpoint in response to real time inputs from game controllers 86. This can permit, for example, the game player to see the world through the eyes of a "virtual person" who moves through the world, and looks and goes wherever the game player commands him or her to go. This capability of displaying quality 3D images interactively in real time can create very realistic and exciting game play.

FIGS. 1A–1F show just one example of some three-dimensional screen effects that system 50 can generate on the screen of color television set 58. FIGS. 1A–1F are in black and white because patents cannot print in color, but system 50 can display these different screens in brilliant color on the color television set. Moreover, system 50 can create these images very rapidly (e.g., seconds or tenths of seconds) in real time response to operation of game controllers 86.

Each of FIGS. 1A–1F was generated using a three-dimensional model of a "world" that represents a castle on a hilltop. This model is made up of geometric shapes (i.e., polygons) and "textures" (digitally stored pictures) that are "mapped" onto the surfaces defined by the geometric shapes. System 50 sizes, rotates and moves these geometric shapes appropriately, "projects" them, and puts them all together to provide a realistic image of the three-dimensional world from any arbitrary viewpoint. System 50 can do this interactively in real time response to a person's operation of game controllers 86.

FIGS. 1A–1C and 1F show aerial views of the castle from four different viewpoints. Notice that each of the views is in perspective. System 50 can generate these views (and views in between) interactively in a matter of seconds with little or no discernible delay so it appears as if the video game player is actually flying over the castle.

Figure 1D:
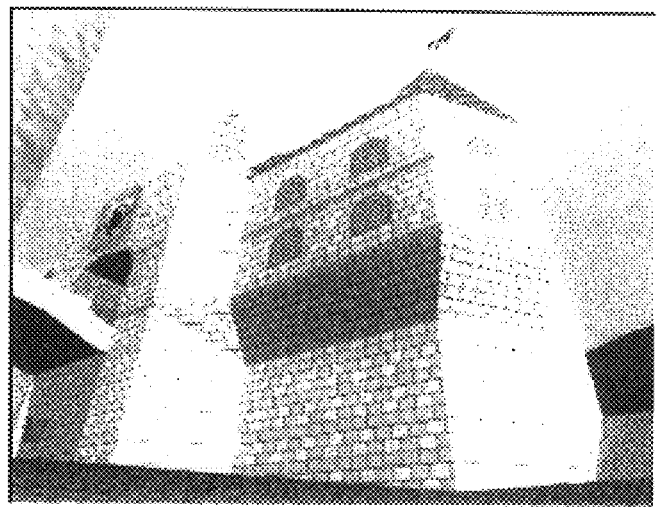
Figure 1E:
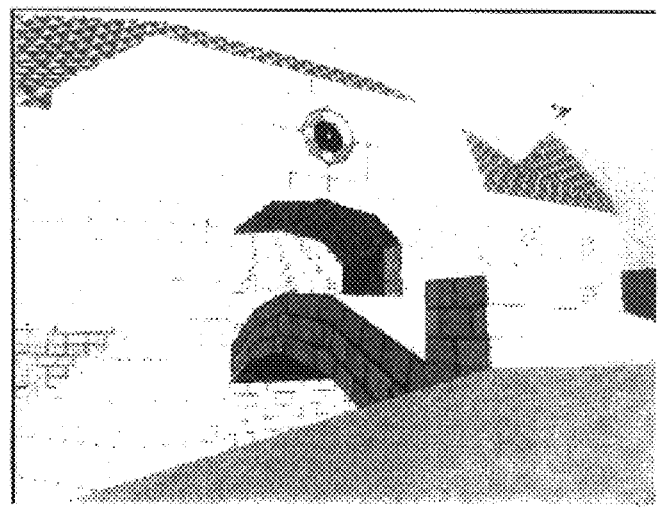
Figure 1F:
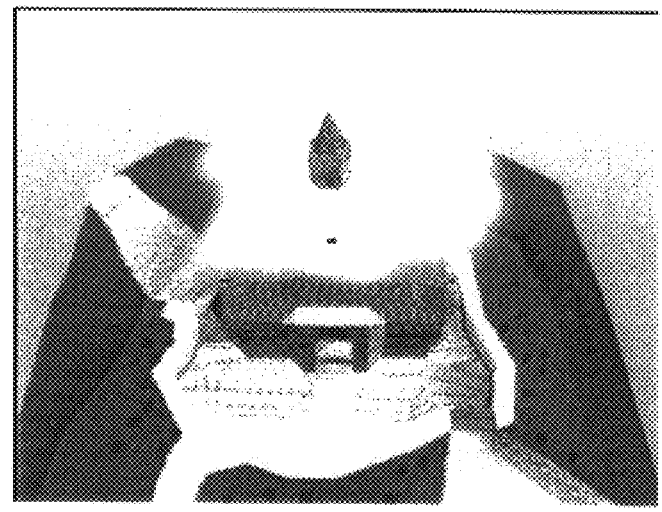

FIGS. 1D and 1E show views from the ground looking up at or near the castle main gate. System 50 can generate these views interactively in real time response to game controller inputs commanding the viewpoint to "land" in front of the castle, and commanding the "virtual viewer" (i.e., the imaginary person moving through the 3-D world through whose eyes the scenes are displayed) to face in different directions. FIG. 1D shows an example of "texture mapping" in which a texture (picture) of a brick wall is mapped onto the castle walls to create a very realistic image.

Overall Video Game System Electronics

Figure 2:
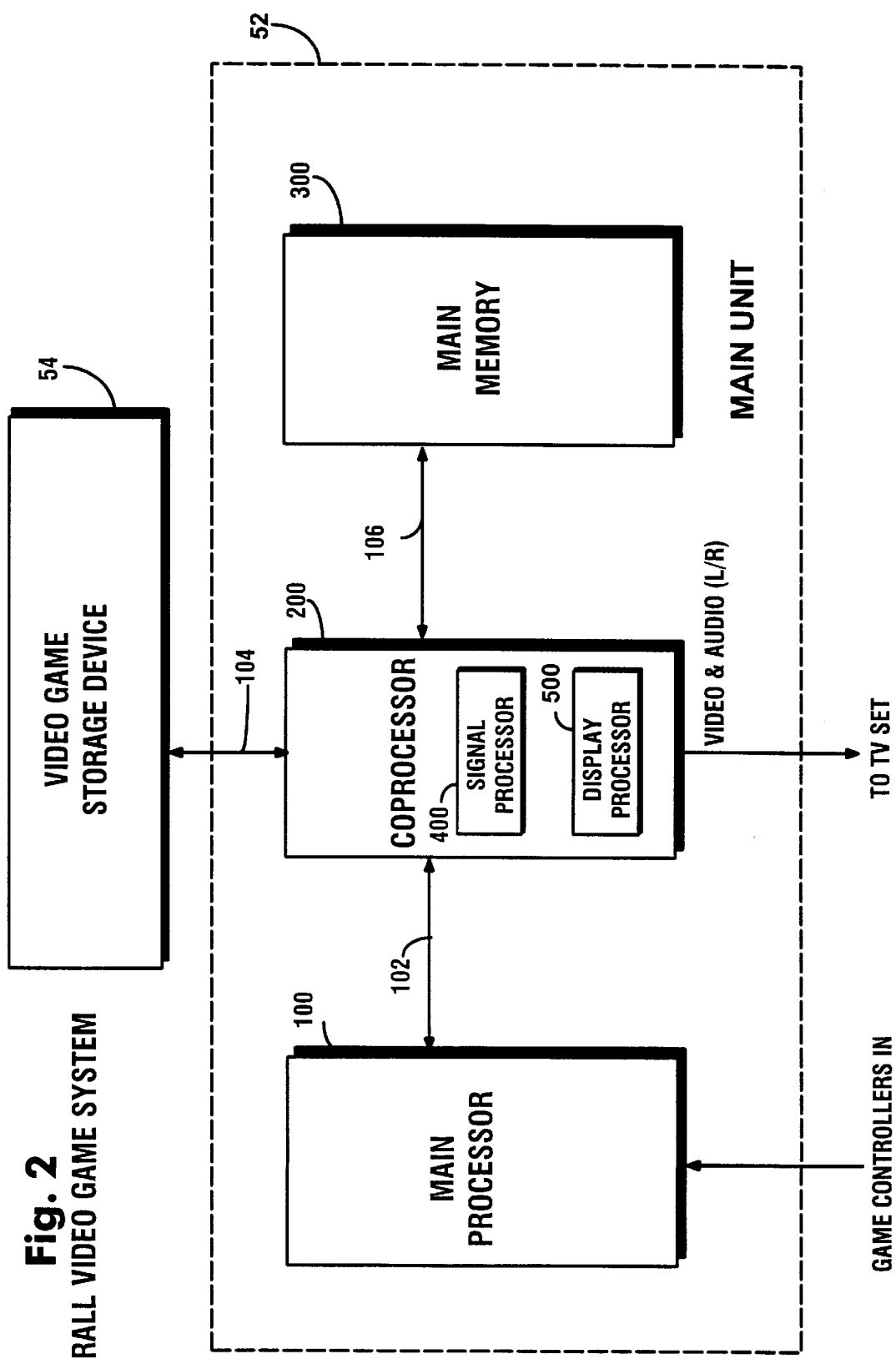
FIG. 2 shows an example of principal components of an overall video game system.

FIG. 2 shows that the principal electronics within main unit 52 includes a main processor 100, a coprocessor 200, and main memory 300. Main processor 100 is a computer that runs the video game program provided by storage device 54 based on inputs provided by controllers 56. Coprocessor 200 generates images and sound based on instructions and commands it gets from main processor 100. Main memory 300 is a fast memory that stores the information main processor 100 and coprocessor 200 need to work, and is shared between the main processor and the coprocessor. In this example, all accesses to main memory 300 are through coprocessor 200.

In this example, the main processor 100 accesses the video game program through coprocessor 200 over a communication path 102 between the main processor and the coprocessor 200. Main processor 100 can read from storage device 54 via another communication path 104 between the coprocessor and the video game storage device. The main processor 100 can copy the video game program from the video game storage device 54 into main memory 300 over path 106, and can then access the video game program in main memory 300 via coprocessor 200 and paths 102, 106.

Main processor 100 generates, from time to time, lists of commands that tell the coprocessor 200 what to do. Coprocessor 200 in this example comprises a special purpose high performance application-specific integrated circuit (ASIC) having an internal design that is optimized for rapidly processing 3-D graphics and digital audio. In response to commands provided by main processor 100 over path 102, coprocessor 200 generates video and audio for application to color television set 58. The coprocessor 200 uses graphics, audio and other data stored within main memory 300 and/or video game storage device 54 to generate images and sound.

Figure 3:
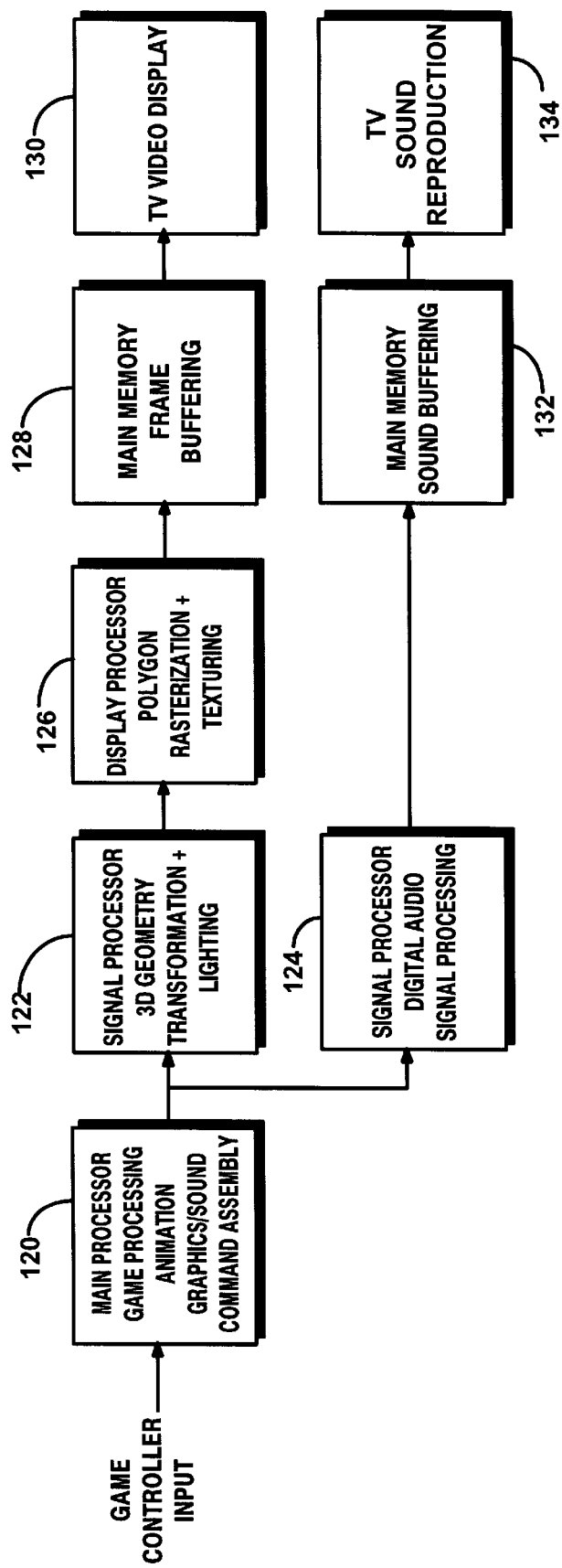
FIG. 3 shows example major processing operations of an overall video game system.

FIG. 2 shows that coprocessor 200 in this example includes a signal processor 400 and a display processor 500. Signal processor 400 is an embedded programmable microcontroller that performs graphics geometry processing and audio digital signal processing under control of a "microcode" computer program supplied by video game storage device 54. Display processor 500 is a high speed state machine that renders graphics primitives, thereby creating images for display on television 58. The signal processor 400 and display processor 500 work independently, but the signal processor can supervise the display processor by sending graphics commands to it. Both signal processor 400 and display processor 500 can be controlled directly by main processor 100. The following are examples of functions and operations the signal processor 400 and display processor 500 can perform:

SIGNAL PROCESSOR
Matrix control
3D transformations
Lighting
Clipping, perspective and viewport application
Display processor command generation DISPLAY PROCESSOR
Rasterization
Texture coordinate generation
Texture application and filtering
Color combining
Blending
Fogging
Antialiasing
Frame buffer and frame buffer control FIG. 3 shows the main processes performed by the main processor 100, coprocessor 200 and main memory 300 in this example system 50. The main processor 100 receives inputs from the game controllers 56 and executes the video game program provided by storage device 54 to provide game processing (block 120). It provides animation, and assembles graphics and sound commands for use by coprocessor 200. The graphics and sound commands generated by main processor 100 are processed by blocks 122, 124 and 126—each of which is performed by coprocessor 200. In this example, the coprocessor signal processor 400 performs 3D geometry transformation and lighting processing (block 122) to generate graphics display commands for display processor 500. Display processor 500 "draws" graphics primitives (e.g., lines, triangles and rectangles) to create an image for display on color TV 58. Display processor 500 performs this "drawing" or rendering function by "rasterizing" each primitive and applying a texture to it if desired (block 126). It does this very rapidly—e.g., on the order of many millions of "pixels" (color television picture elements) a second. Display processor 500 writes its image output into a frame buffer in main memory 300 (block 128). This frame buffer stores a digital representation of the image to be displayed on the television screen 60. Additional circuitry within coprocessor 200 reads the information from the frame buffer and outputs it to television 58 for display (block 130).

Signal processor 400 also processes sound commands received from main processor 100 using digital audio signal processing techniques (block 124). Signal processor 400 writes its digital audio output into a sound buffer in main memory 300. The main memory temporarily "buffers" (i.e., stores) the sound output (block 132). Other circuitry in coprocessor 200 reads this buffered sound data from main memory 300 and converts it into electrical audio signals (stereo left and right channels) for application to and reproduction by television speakers 62a, 62b (block 134).

Television 58 displays 30 or 60 new images a second. This "frame rate" fools the human eye into seeing continuous motion, allowing main unit 52 to create animation effects on television screen 60 by changing the image slightly from one frame to the next. To keep up with this television frame rate, coprocessor 200 must create a new image every 1/30 or 1/60 of a second. Coprocessor 200 must also be able to produce a stream of continuous sound to go along with the animation effects on screen 60.

Overall System Operation

Figure 4:
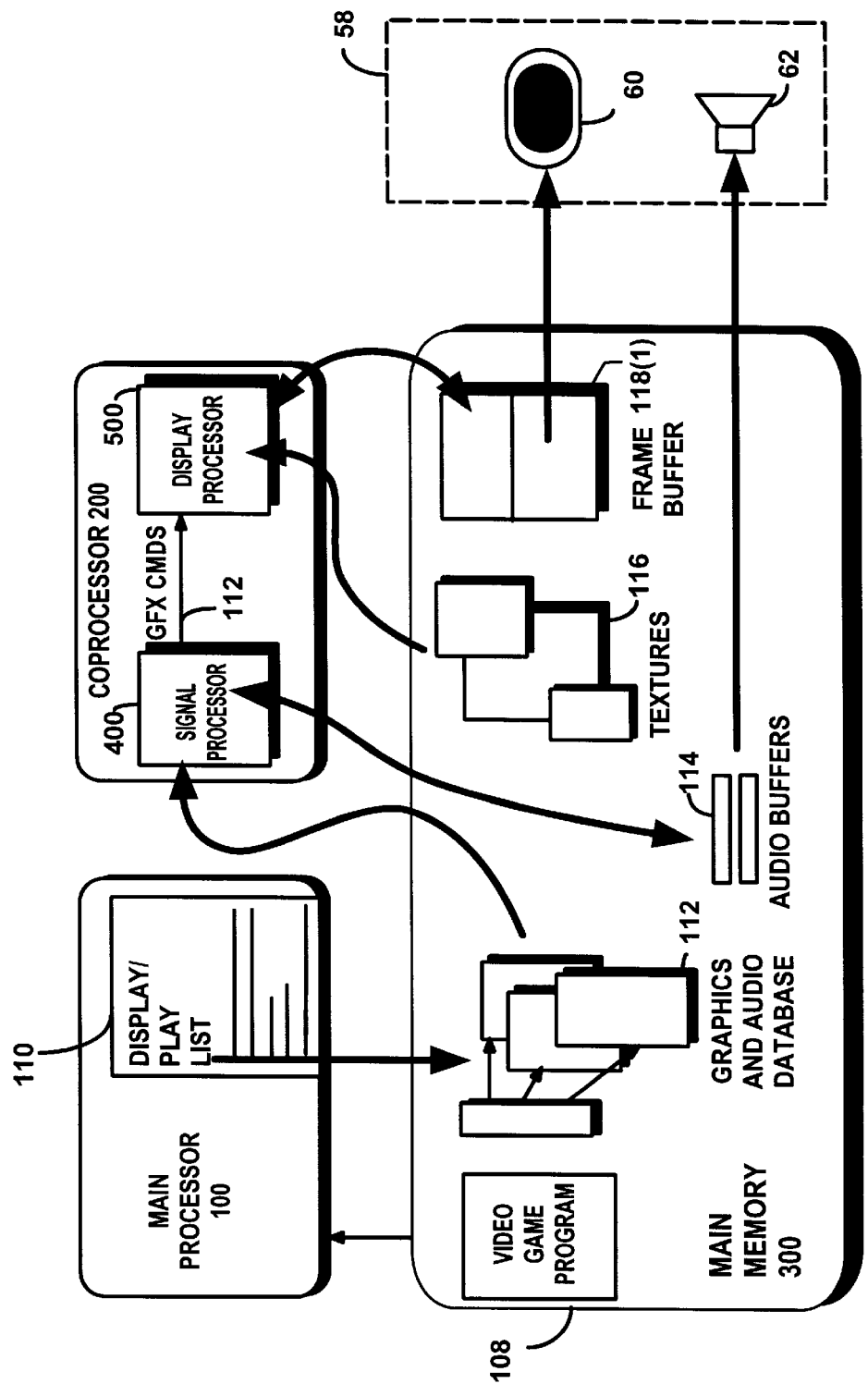
FIG. 4 shows example overall operation of a video game system.

FIG. 4 shows the overall operation of system 50 in more detail, and FIG. 4A shows overall steps performed by the system to generate graphics. In this example, main processor 100 reads a video game program 108 stored in main memory 300 (generally, this video game program will have originated in video game storage device 54 and have been copied from the video game storage device into the main memory). In response to executing this video game program 108 (and in response to inputs from game controllers 56), main processor 100 creates (or reads from storage device 58) a list 110 of commands for coprocessor 200 (FIG. 4A, block 120a). This list 110, in general, includes two kinds of commands:

(1) graphics commands
(2) audio commands. Graphics commands tell coprocessor 200 what images to generate on TV screen 60. Audio commands tell coprocessor 200 what sounds it should generate for reproduction on TV loudspeakers 62.

The list of graphics commands is called a "display list" because it controls the images coprocessor 200 displays on the TV screen 60. The list of audio commands is called a "play list" because it controls the sounds that are played over loudspeaker 62. Generally, main processor 100 specifies both a new display list and a new play list for each video "frame" time of color television set 58.

In this example, main processor 100 provides its display/play list 110 to coprocessor 200 by storing it into main memory 300 and then telling the coprocessor where to find it (FIG. 4A, block 120c). Main processor 100 also makes sure the main memory 300 contains a graphics and audio database 112 that includes all of the data coprocessor 200 will need to generate the graphics and sound requested in the display/play list 110. Some or all of this graphics and audio database 112 can come from storage device 54. The display/play list 110 specifies which portions of graphics and audio database 112 the coprocessor 200 should use. Main processor 100 also is responsible for making sure that signal processor 400 has loaded "microcode"—i.e., a computer program that tells the signal processor what to do.

Signal processor 400 reads the display/play list 110 from main memory 100 (FIG. 4A, block 122a) and processes this list—accessing additional data within the graphics and audio database 112 as needed (FIG. 4A, block 122b). Signal processor 400 generates two main outputs: graphics display commands 112 for further processing by display processor 500 (FIG. 4A, block 122c); and audio output data 114 for temporary storage within main memory 300. Signal processor 400 processes the audio data in much less than the time it takes to play the audio through loudspeakers 62. Another part of the coprocessor 200 called an "audio interface" (not shown) subsequently reads the buffered audio data and outputs it in real time for reproduction by television loudspeakers 62.

The signal processor 400 can provide the graphics display commands 112 directly to display processor 500 over a path internal to coprocessor 200, or it may write those graphics display commands into main memory 300 for retrieval by the display processor (not shown). These graphics display commands 112 command display processor 500 to draw ("render") specified geometric shapes with specified characteristics (FIG. 4a, block 126a). For example, display processor 500 can draw lines, triangles or rectangles (polygons) based on these graphics display commands 112, and may fill triangles and rectangles with particular colors and/or textures 116 (e.g., images of leaves of a tree or bricks of a brick wall)—all as specified by the graphics display commands 112. Main processor 100 stores the texture images 116 into main memory 300 for access by display processor 500. It is also possible for main processor 100 to write graphics display commands. 112 directly into main memory 300 for retrieval by display processor 500 to directly command the display processor.

Display processor 500 generates, as its output, a digitized representation of the image that is to appear on television screen 60 (FIG. 4A, block 126b). This digitized image, sometimes called a "bit map," is stored within a frame buffer 118 residing in main memory 300. Display processor 500 can also store and use a depth (Z) buffer 118b in main memory 300 to store depth information for the image. Another part of coprocessor 200 called the "video interface" (not shown) reads the frame buffer 118 and converts its contents into video signals for application to color television set 58 (FIG. 4a, block 127). Typically, frame buffer 118 is "double buffered," meaning that coprocessor 200 can be writing the "next" image into half of the frame buffer while the video interface is reading out the other half.

The various steps shown in FIG. 4A and described above are "pipelined" in this example. "Pipelining" means that different operations are performed concurrently for different stages in the graphics generation process. A simple analogy is the way most people do laundry. A non-pipelined mode of doing laundry would involve completing all relevant tasks (washing, drying, ironing/folding, and putting away) for one load of laundry before beginning the next load. To save time, people with multiple loads of laundry "pipeline" the laundry process by performing washing, drying, ironing/folding and putting away operations concurrently for different loads of laundry.

Similarly, the operations performed by main processor 100, signal processor 400, display processor 500 and video interface 210 are "pipelined" in this example. For example, main processor 100 in this example can be assembling a display list two video frames ahead while signal processor 400 and display processor 500 are processing data for one video frame ahead and video interface 210 is processing data for the current video frame in progress. As is explained below, the detailed graphics rendering steps performed by display processor 500 in block 126a are also pipelined to maximize speed performance.

More Detailed System Architecture

Figure 5:
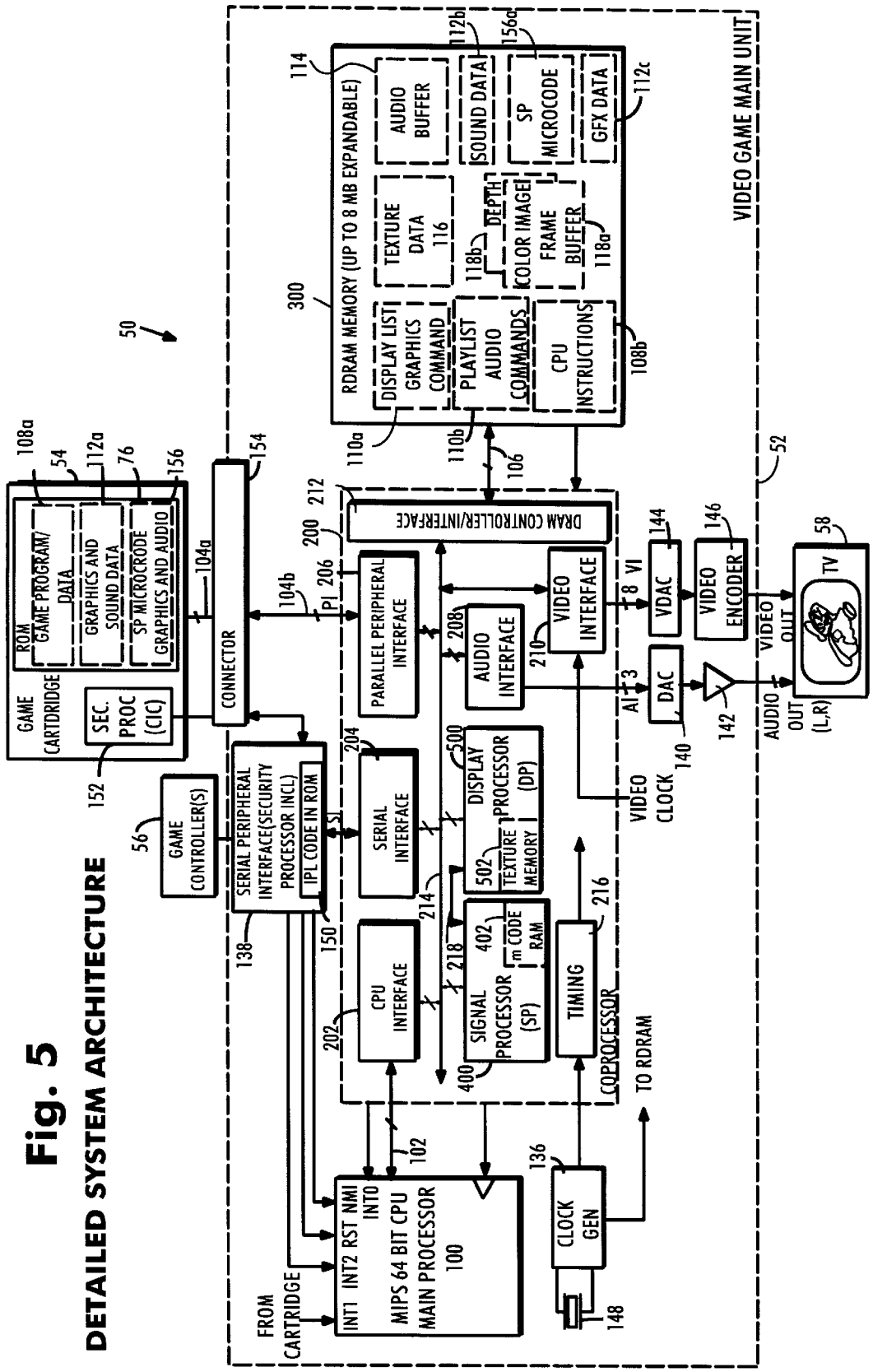
FIG. 5 shows a detailed overall system architecture example.

FIG. 5 shows a more detailed architecture of video game system 50. This diagram shows video game main unit 52 including, in addition to main processor 100, coprocessor 200 and main memory 300, additional components such as a clock generator 136, a serial peripheral interface 138, an audio digital-to-analog converter (DAC) 140, an audio amplifier/mixer 142, a video digital-to-analog converter 144, and a video encoder 146.

In this example, the clock generator 136 (which may be controlled by a crystal 148) produces timing signals to time and synchronize the other components of main unit 52. Different main unit components require different clocking frequencies, and clock generator 136 provides suitable such clock frequency outputs (or frequencies from which suitable clock frequencies can be derived such as by dividing). A timing block 216 within coprocessor 200 receives clocking signals from clock generator 136 and distributes them (after appropriate dividing as necessary) to the various other circuits within the coprocessor.

In this example, the game controllers 58 are not connected directly to main processor 100, but instead are connected to main unit 52 through serial peripheral interface 138. Serial peripheral interface 138 demultiplexes serial data signals incoming from up to four (or five) game controllers 56 (or other serial peripheral devices) and provides this data in a predetermined format to main processor 100 via coprocessor 200. Serial peripheral interface 138 is bidirectional in this example, i.e., it is capable of transmitting serial information specified by main-processor 100 in addition to receiving serial information.

Figure 5A:
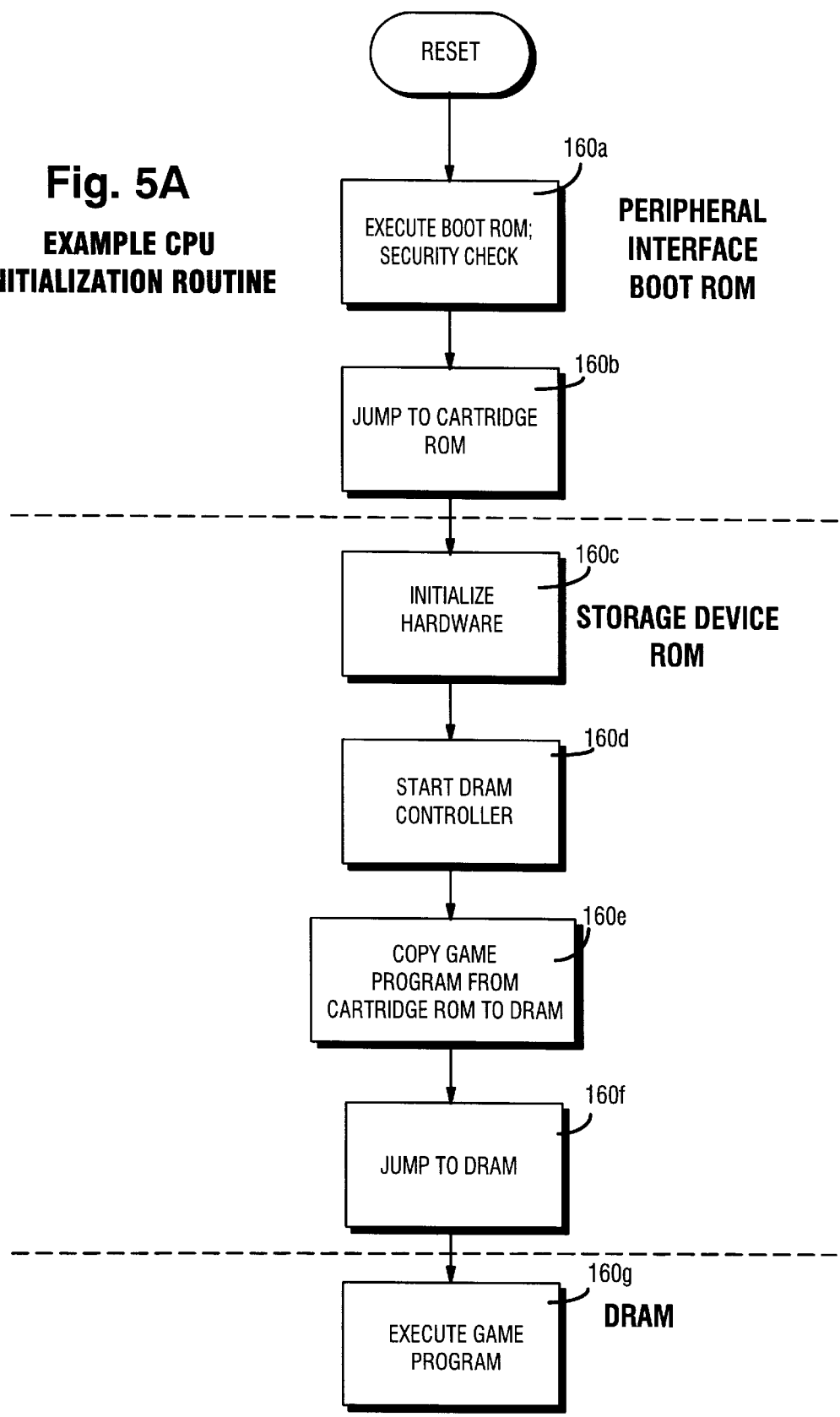
FIG. 5A shows an example main processor initialization routine.

Serial peripheral interface 138 in this example also includes a "boot ROM" read only memory 150 that stores a small amount of initial program load (IPL) code. This IPL code stored within boot ROM 150 is executed by main processor 100 at time of startup and/or reset to allow the main processor to begin executing game program instructions 108a within storage device 54 (see FIG. 5A, blocks 160a, 160b). The initial game program instructions 108a may, in turn, control main processor 100 to initialize the drivers and controllers it needs to access main memory 300 (see FIG. 5A, blocks 160c, 160d) and to copy the video game program and data into the faster main memory 300 for execution and use by main processor 100 and coprocessor 200 (see FIG. 5A, blocks 160e, 160f, 160g).

Also in this example, serial peripheral interface 138 includes a security processor (e.g., a small microprocessor) that communicates with an associated security processor 152 (e.g., another small microprocessor) within storage device 54 (see FIG. 5). This pair of security processors (one in the storage device 54, the other in the main unit 52) perform an authentication function to ensure that only authorized storage devices may be used with video game main unit 52. See U.S. Pat. No. 4,799,635. In this example, the security processor within serial peripheral interface 138 may process data received from game controllers 56 under software control in addition to performing a security function under software control.

FIG. 5 shows a connector 154 within video game main unit 52. This connector 154 connects to the electrical contacts 74 at the edge of storage device printed circuit board 70 in this example (see FIG. 1). Thus, connector 154 electrically connects coprocessor 200 to storage device ROM 76. Additionally, connector 154 connects the storage device security processor 152 to the main unit's serial peripheral interface 138. Although connector 154 in the particular example is used primarily to read data and instructions from a non-writable read only memory 76, system 52 is designed so that the connector is bidirectional, i.e., the main unit can send information to the storage device 54 in addition to reading information from it.

FIG. 5 also shows that the audio and video outputs of coprocessor 200 are processed by some electronics outside of the coprocessor before being sent to television set 58. In particular, in this example coprocessor 200 outputs its audio and video information in digital form, but conventional home color television sets 58 generally require analog audio and video signals. Therefore, the digital outputs of coprocessor 200 are converted into analog form—a function performed for the audio information by DAC 140 and for the video information by VDAC 144. The analog audio output of DAC 140 is amplified by an audio amplifier 142 that may also mix audio signals generated externally of main unit 52 and supplied through connector 154. The analog video output of VDAC 144 is provided to video encoder 146, which may, for example, convert "RGB" input signals to composite video outputs. The amplified stereo audio output of amplifier 142 and the composite video output of video encoder 146 are provided to home color television set 58 through a connector not shown.

As shown in FIG. 5, main memory 300 stores the video game program in the form of CPU instructions 108b. These CPU instructions 108b are typically copied from storage device 54. Although CPU 100 in this example is capable of executing instructions directly out of storage device ROM 76, the amount of time required to access each instruction from the ROM is much greater than the time required to access instructions from main memory 300. Therefore, main processor 100 typically copies the game program/data 108a from ROM 76 into main memory 300 on an as-needed basis in blocks, and accesses the main memory in order to actually execute the instructions (see FIG. 5A, blocks 160e, 160f). The main processor 100 preferably includes an internal cache memory to further decrease instruction access time.

FIG. 5 shows that storage device 54 also stores a database of graphics and sound data 112a needed to provide the graphics and sound of the particular video game. Main processor 100 reads the graphics and sound data 112a from storage device 54 on an as-needed basis and stores it into main memory 300 in the form of texture data 116, sound data 112b and graphics data 112c. In this example, display processor 500 includes an internal texture memory 502 into which the texture data 116 is copied on an as-needed basis for use by the display processor.

Storage device 54 also stores coprocessor microcode 156. As described above, in this example signal processor 400 executes a computer program to perform its various graphics and audio functions. This computer program or "microcode," is provided by storage device 54. Because the microcode 156 is provided by storage device 54, different storage devices can provide different microcodes—thereby tailoring the particular functions provided by coprocessor 200 under software control. Typically, main processor 100 copies a part of the microcode 156 into main memory 300 whenever it starts the signal processor, and the signal processor 400 then accesses other parts of the microcode on an as-needed basis. The signal processor 400 executes the microcode out of an instruction memory 402 within the signal processor 400. Because the SP microcode 156 may be too large to fit into the signal processor's internal instruction memory 402 all at once, different microcode portions may need to be loaded from main memory 300 into the instruction memory 402 to allow signal processor 400 to perform different tasks. For example, one part of the SP microcode 156 may be loaded into signal processor 400 for graphics processing, and another part of microcode may be loaded into the signal processor for audio processing. In this example, the signal processor microcode RAM 402 (and an additional signal processor data memory RAM not shown in FIG. 5) is mapped into the address space of main processor 100 so the main processor can directly access the RAM contents under software control through load and store instructions.

Main Processor 100

Main processor 100 in this example is a MIPS R4300 RISC microprocessor designed by MIPS Technologies, Inc., Mountain View, Calif. This R4300 processor includes an execution unit with a 64-bit register file for integer and floating-point operations, a 16 KB Instruction Cache, a 8 KB Write Back Data Cache, and a 32-entry TLB for virtual-to-physical address calculation. The main processor 100 executes CPU instructions (e.g., a videogame program) 108 in kernel mode with 32-bit addresses. 64-bit integer operations are available in this mode, but 32-bit calling conventions are preferable to maximize performance. For more information on main processor 100, see, for example, Heinrich, *MIPS Microprocessor R4000 User's Manual* (MIPS Technologies, Inc., 1994, Second Ed.).

Main processor 100 communicates with coprocessor 200 over bus 102, which in this example comprises a bi-directional 32-bit SysAD multiplexed address/data bus, a bi-directional 5-bit wide SysCMD bus, and additional control and timing lines. See chapter 12 et seq. of the above-mentioned Heinrich manual.

The conventional R4300 main processor supports six hardware interrupts, one internal (timer) interrupt, two software interrupts, and one non-maskable interrupt (NMI). In this example, three of the six hardware interrupt inputs (INT0, INT1 and INT2) and the non-maskable interrupt (NMI) input allow other portions of system 50 to interrupt the main processor. Specifically, main processor INT0 is connected to allow coprocessor 200 to interrupt the main processor, main processor interrupt INT1 is connected to allow storage device 54 to interrupt the main processor, and main processor interrupts INT2 and NMI are connected to allow the serial peripheral interface 138 to interrupt the main processor. Any time the processor is interrupted, it looks at an internal interrupt register to determine the cause of the interrupt and then may respond in an appropriate manner (e.g., to read a status register or perform other appropriate action). All but the NMI interrupt input from serial peripheral interface 138 are maskable (i.e., the main processor 100 can selectively enable and disable them under software control).

Main processor 100 reads data from and writes data to the rest of system 50 via the CPU-to-coprocessor bus 102. The coprocessor 200 performs a memory mapping function, allowing the main processor 100 to address main memory 300, the storage device cartridge ROM 76, the "boot ROM" 150 within serial peripheral interface 138 (and other parts of the serial peripheral interface), various parts of coprocessor 200 (including signal processor RAM 402), and other parts of system 50.

In the example, the operations performed by main processor 100 are completely dependent on videogame program 108. In this example, all "system" software is supplied by the storage device 58 to provide maximum flexibility. Different video games (or other applications) may run more efficiently with different kinds of high level software. Therefore, main unit 52 in this example does not provide any standard software libraries—or any software at all for that matter—since such libraries could limit flexibility. Instead, all software in this example is supplied by storage device 54.

Developers of video game software 108 may wish to employ advanced software architecture such as, for example, device drivers, schedulers and thread libraries to manage the various resources within system 50. Since main processor 100 is a state-of-the-art RISC processor/computer, it is appropriate to use such software architecture/constructs and to implement video game program 108 in a high level software environment.

Figure 5B:
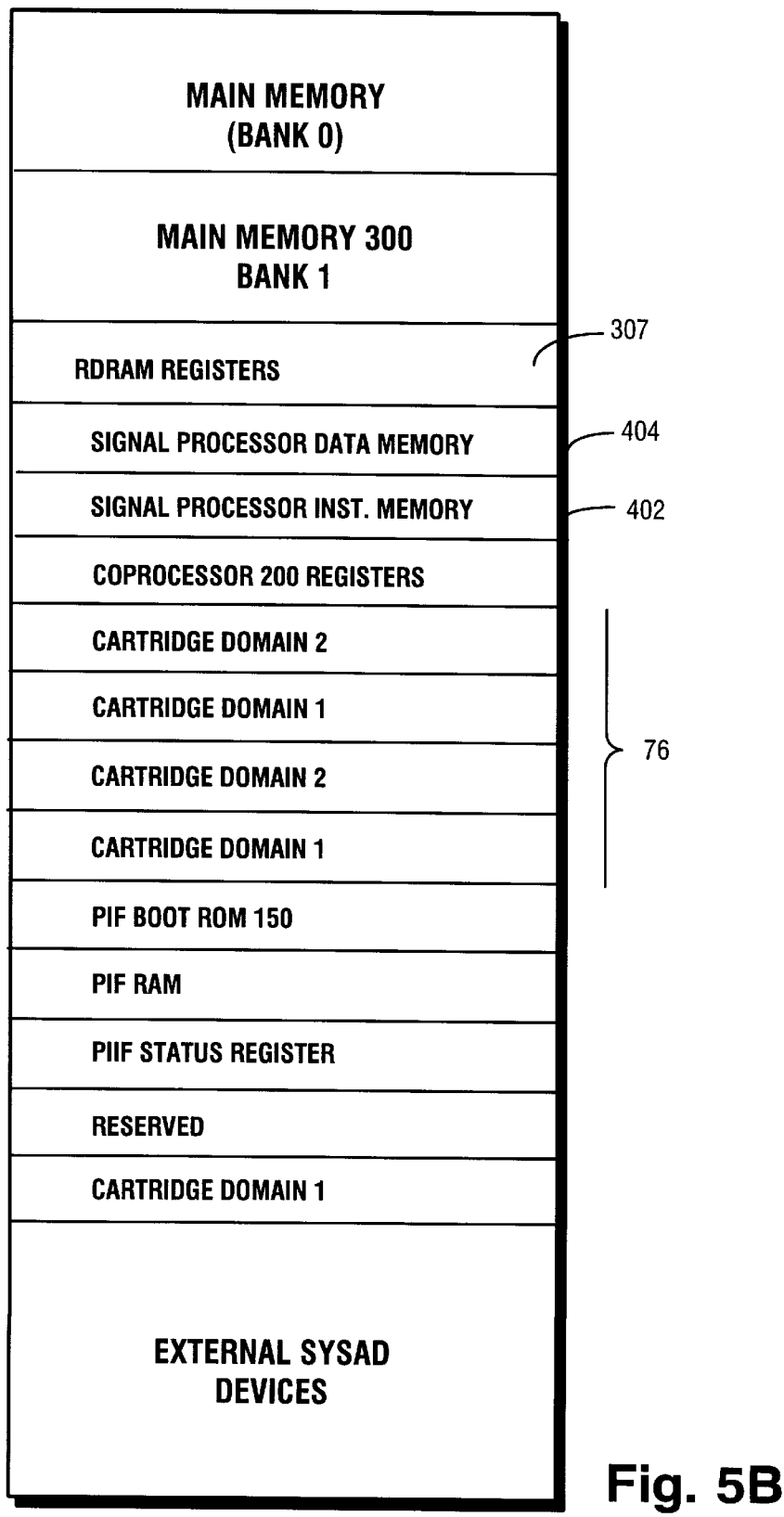
FIG. 5B shows an example main processor memory map.

An example system "memory map" of the main processor 100 address space is shown in FIG. 5B. As shown in this FIG. 5B, main memory 300 is divided into two banks (bank 0 and bank 1) in this example. In addition, certain configuration registers 307 within the main memory 300 are mapped into the main processor address space, as are registers within coprocessor 200. Main processor 100 in this example can control each of the various coprocessor sub-blocks by writing, under control of video game program 108, into control registers associated with each coprocessor 200 sub-block.

As shown in FIG. 5B, storage device 54 address space is divided into two "domains" (for two different devices, for example). These "domains" are mapped into several parts of the main processor 100 address space. Various parts of the serial peripheral interface 138 (i.e., PIF boot ROM 150, a PIF buffer RAM, and a PIF status register) are also mapped into the main processor 100 address space.

Unified Main Memory 300

Main memory 300 in this example comprises a RDRAM dynamic random access memory available from Rambus Inc. of Mountain View, Calif. In this example, main memory 300 is expandable to provide up to 8 megabytes of storage, although main unit 52 may be shipped with less RAM (e.g., 2 or 3 MB) to decrease cost.

Main memory 300 provides storage for the entire system 50 in this example. It provides a single address space (see FIG. 5B above) for storing all significant data structures, including for example (as shown in FIG. 5):

Main processor instructions 108

Signal processor microcode 156

Display list graphic commands 110a

Play list audio commands 110b

Texture maps 116 and other graphics data 112c

Color image frame buffer 118a

Depth (z) buffer 118b sound data 112b

Audio output buffer 114

Main processor working values

Coprocessor working values

Data communicated between various parts of the system.

Advantages and disadvantages in using single address space memory architectures for raster scan display systems are known (see, for example, Foley et al, *Computer Graphics: Principles and Practice* at 177–178 (2d Ed. Addison-Wesley 1990). Many video game (and other graphics) system architects in the past rejected a single address space architecture in favor of using dedicated video RAM devices for graphics data and using other types of memory devices for other types of data. However, a unified main memory 300 provides a number of advantages in this particular example of a video game system 50. For example:

Data communications between system elements is simplified. Once data is stored in main memory 300, there is little or no additional overhead in communicating the data to another part of the system. The overhead of transferring data between different parts of the system is thus minimized. For example, since the main processor 100 and each sub-block within the coprocessor 200 can each access system main memory 300, the main memory used by all system elements for data structure storage can also be used as a general purpose communication channel/data buffer between elements.

For example, display lists 110 main processor 100 stores within main memory 300 can be directly accessed by signal processor 400. Similarly, display commands the main processor (and/or the signal processor) stores within the main memory can be directly accessed by display processor 500. The main processor 100 working data (which can automatically be written into the main memory 300 via a "cache flush") is immediately available to all other parts of the system.

The unified memory provides memory allocation flexibility. Main memory 300 locations look alike, and therefore each location can be used for storing any type of data structure. All main memory 300 allocation decisions are left to the application programmer. This provides great flexibility in terms of data structure sizes and memory usage. Data structures can be stored anywhere in main memory 300, and each location in memory 300 can be allocated however the application programmer specifies.

For example, one video game programmer might provide a large frame buffer for high resolution images and/or image scrolling and panning, while another programmer may decide to use a smaller frame buffer so as to free up memory space for other data structures (e.g., textures or audio data). One application may devote more of main memory 300 storage for audio data structures and less to graphics data, while another application may allocate most of the storage for graphics related data. The same video game program 108 can dynamically shift memory allocation from one part of game play to another (e.g., at the time the game changes levels) to accomplish different effects. Application flexibility is not limited by any fixed or hardwired memory allocation.

The Unified RAM architecture supports flexible data structure sharing and usage. Since all significant data structures are stored within common main memory 300, they can all be accessed by main processor 100 and other system elements. There is no hardware distinction between display images and source images. For example, main processor 100 can, if desired, directly access individual pixels within frame buffer 118. The scan conversion output of display processor 500 can be used as a texture for a texture mapping process. Image source data and scan converted image data can be interchanged and/or combined to accomplish special effects such as, for example, warping scan-converted images into the viewpoint.

The shortcomings of a unified memory architecture (e.g., contention for access to the main memory 300 by different parts of the system) have been minimized through careful system design. Even though main memory 300 is accessed over a single narrow (9-bit-wide) bus 106 in this example, acceptable bandwidth has been provided by making the bus very fast (e.g., on the order of 240 MHz). Data caches are provided throughout the system 50 to make each sub-component more tolerant to waiting for main memory 300 to become available.

Coprocessor 200

FIG. 5 shows that coprocessor 200 includes several components in addition to signal processor 400 and display processor 500, namely:

CPU interface 202,
a serial interface 204,
a parallel peripheral interface 206,
an audio interface 208,
a video interface 210,
a main memory DRAM controller/interface 212,
a main internal bus 214 and
a timing block 216.

In this example, main bus 214 allows each of the various main components within coprocessor 200 to communicate with one another.

FIG. 6, a more detailed diagram of coprocessor 200, shows that the coprocessor is a collection of processors, memory interfaces and control logic all active at the same time and operating in parallel. The following briefly describes the overall functions provided by each of these other sub-blocks of coprocessor 200:

Signal processor 400 is a microcoded engine that executes audio and graphics tasks.

Display processor 500 is a graphics display pipeline that renders into frame buffer 118.

Coprocessor serial interface 204 provides an interface between the serial peripheral interface 128 and coprocessor 200 in this example.

Coprocessor parallel peripheral interface 206 interfaces with the storage device 54 or other parallel devices connected to connector 154.

Audio interface 208 reads information from audio buffer 114 within main memory 300 and outputs it to audio DAC 140.

Coprocessor video interface 210 reads information from frame buffer 118a within main memory 300 and outputs it to video DAC 144.

The CPU interface 202 is the gateway between main processor 100, coprocessor 200 and the rest of system 50.

DRAM controller/interface 212 is the gateway through which coprocessor 200 (and main processor 100) accesses main memory 300. Memory interface 212 provides access to main memory 300 for main processor 100, signal processor 400, display processor 500, video interface 210, audio interface 208, and serial and parallel interfaces 204, 206.

Each of these various processors and interfaces may be active at the same time.

Signal processor 400 in this example includes the instruction memory 402 discussed above, a data memory 404, a scalar processing unit 410 and a vector processing unit 420. Instruction memory 402 stores microcode for execution by scalar unit 410 and/or vector unit 420. Data memory 404 stores input data, work data and output data for the scalar unit 410 and for the vector unit 420. Signal processor 400 can execute instructions only out of instruction memory 402 in this example, but has access to main memory 300 via direct memory accessing (DMA) techniques.

In this example, scalar unit 410 is a general purpose integer processor that executes a subset of the MIPS R4000 instruction set. It is used to perform general purpose operations specified by microcode within instruction memory 402. Vector unit 420 comprises eight 16-bit calculating elements capable of performing numerical calculations in parallel. Vector unit 420 is especially suited for graphics matrix calculations and certain kinds of digital audio signal processing operations.

Display processor 500 in this example is a graphics display pipelined engine that renders a digital representation of a display image. It operates based on graphics display commands generated by the signal processor 400 and/or main processor 100. Display processor 500 includes, in addition to texture memory 502, a rasterizer 504, a texture unit 506, a color combiner 508, a blender 510 and a memory interface 512. Briefly, rasterizer 504 rasterizes polygon (e.g., triangle, and rectangle) geometric primitives to determine which pixels on the display screen 60 are within these primitives. The texture unit can apply texture maps stored within texture memory 502 onto textured areas defined by primitive edge equations solved by rasterizer 504. The color combiner 508 combines and interpolates between the texture color and a color associated with the graphic primitive. Blender 510 blends the resulting pixels with pixels in frame buffer 118 (the pixels in the frame buffer are accessed via memory interface 512) and is also involved in performing Z buffering (i.e., for hidden surface removal and anti-aliasing operations). Memory interface 512 performs read, modify and write operations for the individual pixels, and also has special modes for loading/copying texture memory 502, filling rectangles (fast clears), and copying multiple pixels from the texture memory 502 into the frame buffer 118. Memory interface 512 has one or more pixel caches to reduce the number of accesses to main memory 300.

Display processor 500 includes circuitry 514 that stores the state of the display processor. This state information is used by the rest of display processor 500 to, for example, select rendering modes and to ensure that all previous rendering effected by a mode change occurs before the mode change is implemented.

The command list for display processor 500 usually comes directly from signal processor 400 over a private "X bus" 218 that connects the signal processor to the display processor. More specifically, X-bus 218 in this example is used to transfer graphics display commands from the signal processor data memory 404 into a command buffer (not shown in FIG. 6) within display processor 500 for processing by the display processor. However, in this example it is also possible for signal processor 400 and/or main processor 100 to feed graphics display commands to display processor 500 via main memory 300.

Display processor 500 accesses main memory 300 using physical addresses to load its internal texture memory 502, read frame buffer 118 for blending, read the Z buffer 118B for depth comparison, to write to the Z-buffer and the frame buffer, and to read any graphics display commands stored in the main memory.

Coprocessor Internal Bus Architecture

Figure 6A:
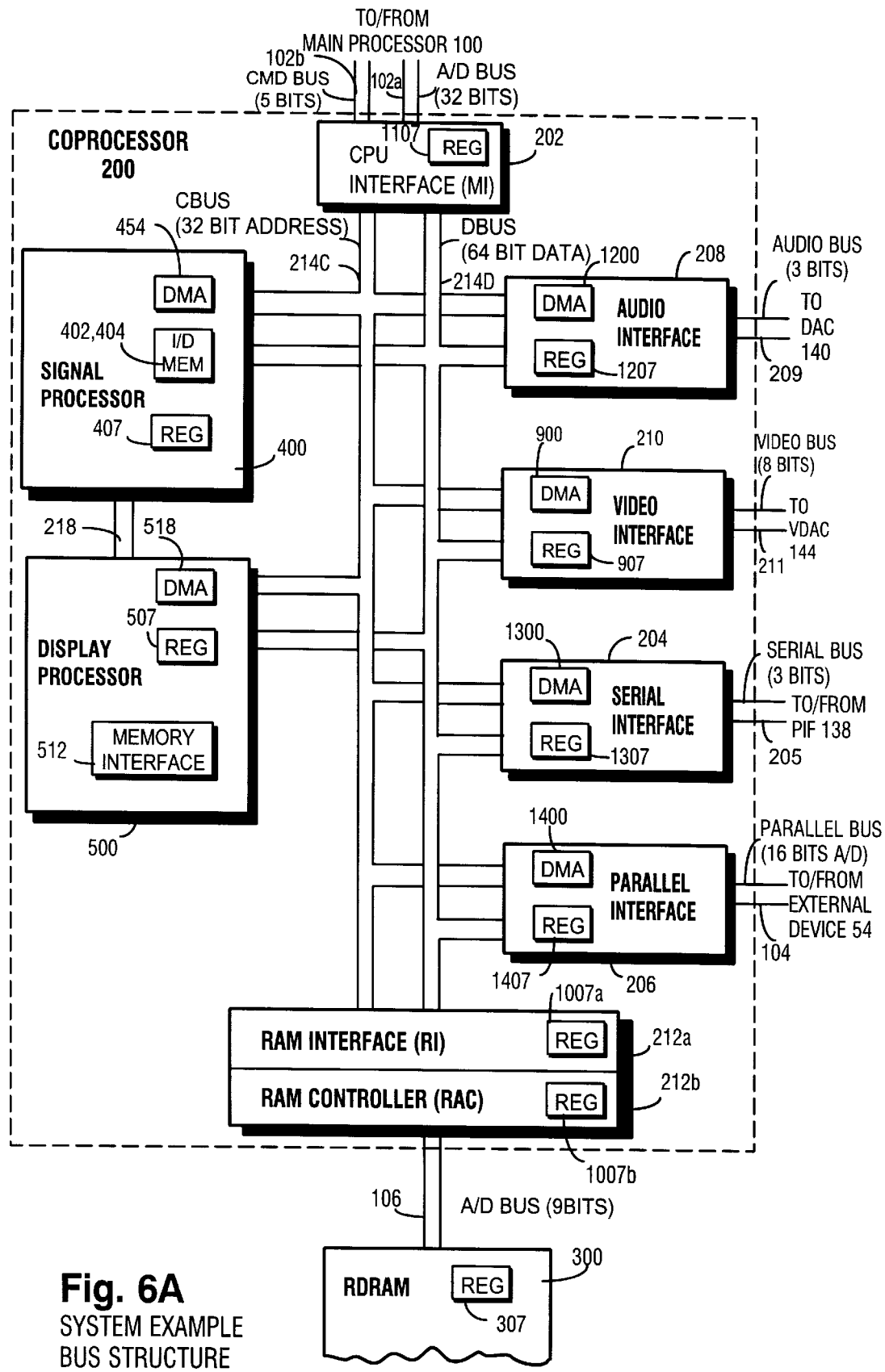
FIG. 6A shows an example coprocessor internal bus architecture.

FIG. 6A is a more detailed diagram showing an example coprocessor bus 214 arrangement, which in this example comprises a 32-bit address ("C") bus 214C and a 64-bit data ("D") bus 214D. These busses 214C, 214D are connected to each of signal processor 400, display processor 500, CPU interface 202, audio interface 208, video interface 210, serial interface 204, parallel peripheral interface 206, and main memory (RAM) interface 212. As shown in FIG. 6A, main processor 100 and each of the sub-blocks of coprocessor 200 communicates with main memory 300 via internal coprocessor busses 214C, 214D, and main memory interface/controller 212a/212b.

In this example, main memory interface/controller 212a, 212b converts main memory addresses asserted on coprocessor address bus 214C into 9-bit-wide format for communication over the 9-bit-wide main memory multiplexed address/data bus 106, and also converts between the main memory bus 106 9-bit-wide data format and the coprocessor data bus 214D 64-bit wide data format. In this example, the DRAM controller/interface 212 includes, as a part thereof, a conventional RAM controller 212b (see FIG. 5C) provided by Rambus Inc. The use of a 9-bit-wide main memory bus 106 reduces the chip pin count of coprocessor 200.

In this example, each of the coprocessor 200 sub-blocks shown has an associated direct memory access (DMA) circuit that allows it to independently address and access main memory 300. For example, signal processor DMA circuit 454, display processor DMA circuit 518, audio interface DMA circuit 1200, video interface DMA circuit 900, serial interface DMA circuit 1300, and parallel peripheral interface DMA circuit 1400 each allow their associated coprocessor sub-block to generate addresses on coprocessor address bus 214C and to communicate data via coprocessor data bus 214D (additionally, display processor 500 has a further memory interface block 512 for access to the main memory frame buffer 118 and texture data 116).

Although each of the coprocessor 200 sub-blocks can independently access main memory 300, they all share common busses 214C, 214D in this example—and only one of the subblocks can use these shared busses at a time. Accordingly, coprocessor 200 has been designed to make most efficient use of the shared busses 214. For example, the coprocessor 200 sub-blocks may buffer or "cache" information to minimize the frequency of different bus accesses by the same sub-block and to make the subblocks more tolerant of temporary bus unavailability. A private bus 218 allows signal processor 400 to communicate with display processor 500 without having to wait for main bus 214 to become available.

Also as shown in FIG. 6A, each of the sub-blocks of coprocessor 200 includes control/status registers that can be accessed by main processor 100 via CPU interface 202. For example, signal processor registers 407, display processor registers 507, audio interface registers 1207, video interface registers 907, serial interface registers 1307, parallel peripheral interface registers 206, RAM interface registers 1007a, and RAM controller registers 1007b are each mapped into the main processor 100 address space. The main processor 100 can read from and/or write to these various registers under control of game program 108 to directly control the operation of sub-blocks within coprocessor 200.

Signal Processor 400

Figure 7:
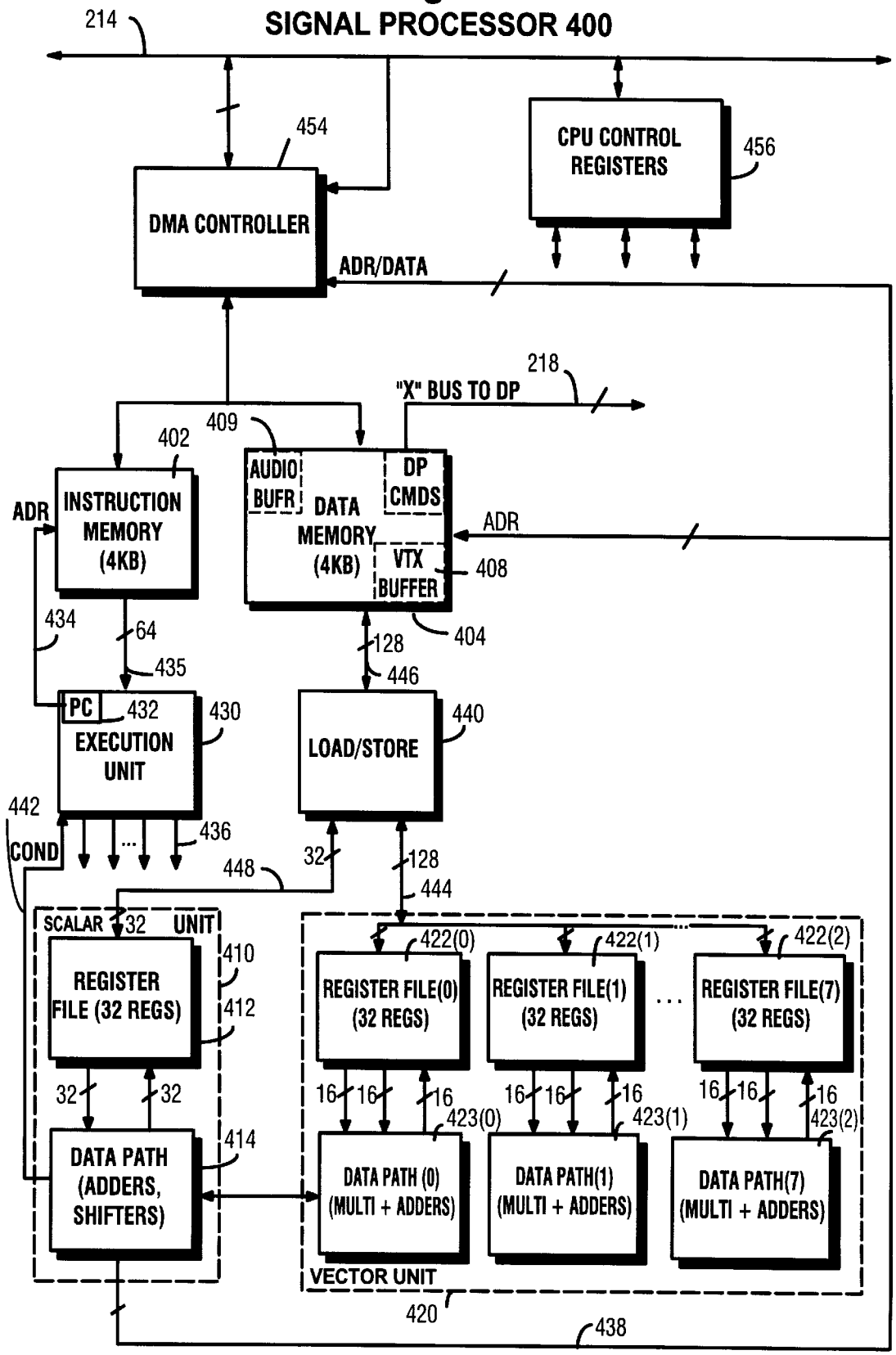
FIG. 7 shows an example signal processor internal architecture.

FIG. 7 shows the architecture of signal processor 400 of this example in more detail. As explained above, signal processor 400 includes a scalar unit 410, a vector unit 420, an instruction memory 402 and a data memory 404. In this example, scalar unit 410 is a 32-bit integer processor that executes a sub-set of the MIPS 4000 instruction set. Vector unit 420 (which is defined as a "CP1" coprocessor of scalar unit 410 under the MIPS 4000 architecture) performs integer calculations (e.g., multiplications, additions, subtractions and multiply/accumulates) on eight 16-bit sets of values in parallel.

Vector unit 420 can perform the same operation on eight pairs of 16-bit operands in parallel simultaneously. This makes signal processor 400 especially suited for "sum of products" calculations such as those found in matrix multiplications, texture resampling, and audio digital signal processing such as, for example, digital audio synthesis and spatial and frequency filtering.

Signal processor 400 uses a RISC (reduced instruction set computer) architecture to provide high performance machine control based on instructions residing in the instruction memory 402. In this example, execution unit includes a program counter 432 that is used to address instruction memory 402 over path 434. This program counter 432 can access only the 4 kilobyte instruction space within instruction memory 402 in this example—requiring that all instructions to be executed by the signal processor first be placed into the instruction memory. Execution unit 430 generates output control signals 436 based on the particular instructions currently being executed. These output control signals 436 control all other parts of signal processor 400, and are sequenced to manage pipelined instruction processing. Scalar unit 410 and vector unit 420 are controlled by these control signals 436. For example, scalar unit 410 may address data memory 404 via path 438 to read data from and/or write data into the data memory using load/store block 440. Data path 414 may perform tests based on results of calculations and provide resulting condition outputs to execution unit 430 via path 442. This execution unit 430 may use these condition outputs to perform a conditional branch or jump, loading program counter 432 with the appropriate (next) address into instruction memory 402. Because scalar processor 410 has these more general capabilities, it is used in this example for general purpose functions such as, for example, control flow, address calculation and the like—in addition to providing 32-bit integer calculations.

Figure 7A:
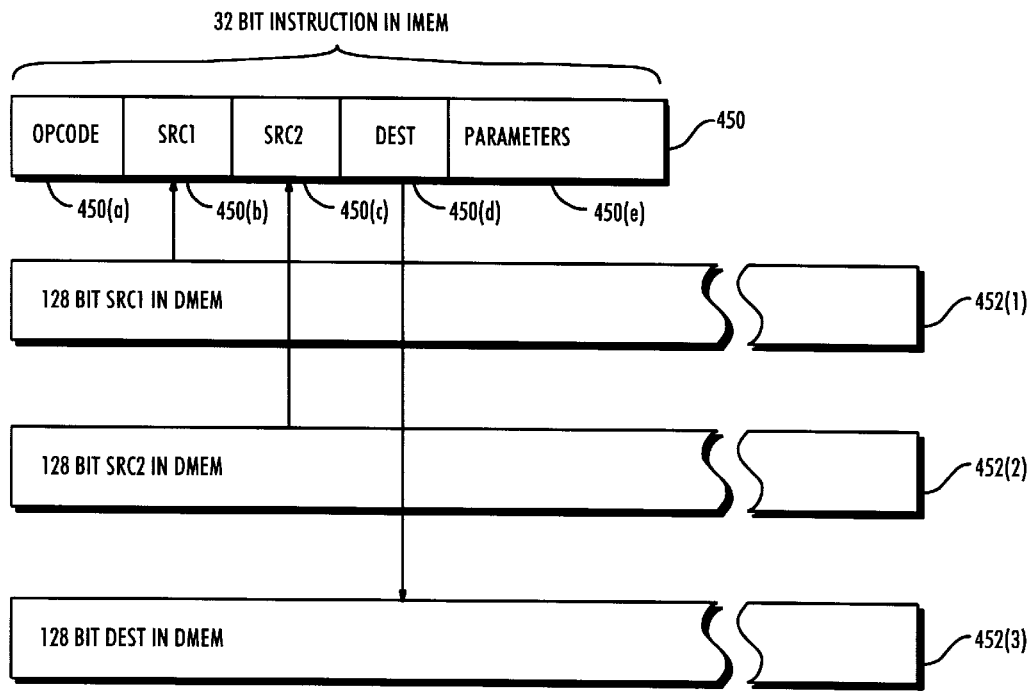
FIG. 7A shows an example signal processor instruction format.

Execution unit 430 executes intermediate, jump and register instruction formats in accordance with the standard MIPS R4000 instruction set. FIG. 7A shows an example of a register instruction format 450 and how signal processor 400 uses that register instruction format to access three 128-bit wide words 452 within data memory 404. Register instruction format 450 may include a 6-bit operation code field 450(a), a 5-bit source register specifier 450(b), a 5-bit target (source/destination) register specifier 450(c), a 5-bit destination register specifier 450(d), and a parameter field 450(e). The parameter field 450(e) may specify shift amounts and/or functions, and together with operation code 450(a) defines the operation to be performed. Each of fields 450(b), 450(c) and 450(d) specifies a location within data memory 404—and thus each designates 128-bit word.

Figure 7B:
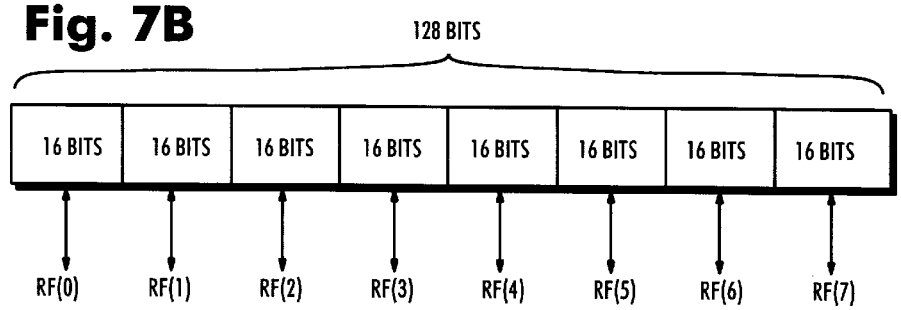
FIG. 7B shows an example slicing of the FIG. 7A source or destination field for processing by the vector unit shown in FIG. 7.

As shown in FIG. 7B, vector unit 420 treats each of these 128-bit words as a concatenated sequence of eight 16-bit values, and operates on each of the 16-bit values in parallel. The operations of vector unit 420 are invoked by instructions within the CP1 type instructions typically reserved for floating point operations in the MIPS R4000 instruction set (signal processor 400 has no floating point unit in this example).

Scalar unit 410 includes a register file 412 comprising 32 registers, each register being 32 bits wide. Scalar unit also includes a data path 414 comprising adders, shifters, and other logic required to execute integer calculations and other operations. Register file 412 is similar to the general purpose register file defined by the MIPS R4000 architecture, and accepts instructions in R4000 format. Data path 414 includes an integer multiplier/divider, and operates in conjunction with an execution unit 430 that receives 64-bit wide instructions from instruction memory 402.

Vector unit 420 includes eight sets of register files 422 (0)–422(7) and eight sets of corresponding data paths 423

Figure 7C:
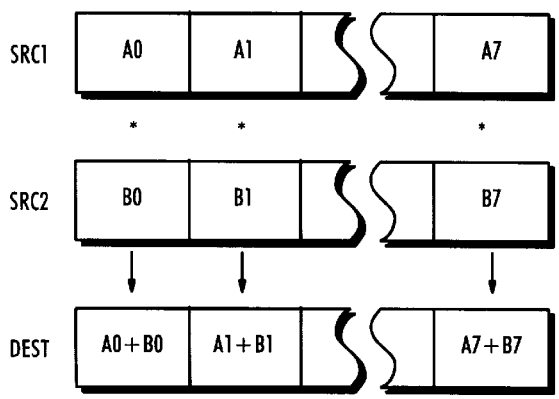
FIG. 7C shows an example add operation performed by the example signal processor vector unit.

(0)–423(7). Data paths 423 each include a 16-bit multiplier, a 16-bit adder and a 48-bit accumulator (48 bit accumulation accommodates audio filters with a large number of taps, and also accommodates partial products wherein a series of 16-bit multiplies and sums is used to obtain a 32-bit result for certain graphics calculations requiring more than 16-bit precision). Each of register files 422 comprises 32 registers each of which are 32-bits wide. A 128 bit wide data path 444 connects vector unit 420 to load/store block 440, and another 128 bit wide data path 446 connects the load/store block 440 to data memory 404. Data memory 404 stores 4096 (4 KB) words, each word being 128 bits wide. When a word in data memory 404 is retrieved for use by vector unit 420, it is sliced into eight 16-bit segments, with each segment being sent to a different register file 422 within vector unit 420 (see FIG. 7B). FIG. 7C shows an example add operation performed by vector unit 420. When vector unit 420 writes to a destination addressed within data memory 404, each of register files 422 contributes 16-bits which are combined into a 128 bit word before being written into the data memory (see FIG. 7A). Alternatively, load/store block 440 includes a steering multiplexer arrangement (not shown) that can steer 16-bit sub-words within the data memory 128-bit word to/from different vector unit register files 422—with the particular sub-word and the particular vector unit register file being selectable based on instructions from instruction memory 402. Similarly, load/store block 440 includes a further steering multiplexer arrangement (not shown) that can steer different sized data units (e.g., bytes, 16-bit half-words, or 32-bit words) between data memory 408 and scalar unit 410—with the particular data unit and size being specified by instructions within instruction memory 402. See, for example, description of Load and Store "Byte", "Halfword", "Word", "Word Left" and "Word Right" in Heinrich, *MIPS R4000 Microprocessor User's Manual* (2d Ed. 1994).

Signal processor 400 also includes a DMA controller 454 and CPU control registers 456. DMA controller 454 is connected to the coprocessor internal bus 214, and is used to transfer data into and out of instruction memory 402 and/or data memory 404. For example, DMA controller 454 can copy microcode modules 156 from main memory 300 into signal processor instruction memory 402. DMA controller 454 may also be used to transfer information between data memory 404 and main memory 300. DMA controller 454 can be commanded by execution unit 430, and receives DMA address and data information from scalar unit data path 414 over path 438. DMA controller 454 may also be commanded by main processor 100 via CPU control registers 456. CPU control registers 456 are mapped into the main processor 100 address space, and can be accessed by signal processor 400 and execution unit 430 using MIPS "CPO" instruction formats.

FIGS. 7D–7L show example CPU control registers 756. The registers shown in FIGS. 7D–7H are used to control and/or monitor the DMA controller 454.

For example, the SP-DRAM DMA address register 458 shown in FIG. 7D can be written to or read from by main processor 100 (as well as SP execution unit 430), and is used to specify a starting DMA address within instruction memory 402 or data memory 404. SP memory DMA address 460 shown in FIG. 7E is used to specify a starting DMA address in main memory 300. Read and write DMA length registers 462, 464 shown in FIGS. 7F and 7G, respectively, specify the length of a block of data to be transferred between signal processor 400 and main memory 300—with the direction of transfer depending upon which one of these two registers is used to specify the block length. DMA status registers 466, 468 shown in FIGS. 7H and 7I respectively, can be read by main processor 100 to determine whether DMA controller 454 is full or busy, respectively.

FIG. 7J shows the main SP status register 470 within CPU control registers 456. SP status register 470 acts as an SP control register when it is written to by main processor 100 (top diagram of FIG. 7J), and indicates SP status when read by the main processor (bottom diagram in FIG. 7J). When used as a status register, SP status register 470 tells main processor 100 whether the SP is halted (field 471), whether the SP is operating in a breakpoint mode (field 472), whether the DMA controller 454 is busy (field 474) or full (field 475), whether SP I/O is full (field 476), whether the SP is operating in single step mode (field 477), whether the SP is operating in a mode in which it won't generate an interrupt upon reaching a breakpoint (block 478), and whether the SP has generated various general purpose "signals" 479 that can be defined under software control to provide status concerning various software-dependent parameters. Main processor 100 can write to register 470 to stop or start signal processor 400 (fields 480, 481), to clear breakpoint mode (field 482), to clear or set an interrupt mode (fields 483, 484), to clear or set single step mode (fields 485, 486), to clear or set an interrupt on breakpoint mode (fields 487, 488), and to clear or set the various software-dependent "signals" (fields 489, 490).

FIG. 7K shows an additional SP register 491 used as a "semaphore" for general purpose communications between the main processor 100 and the signal processor 400. This register 491 contains a flag that main processor 100 sets upon reading the register and clears upon writing to the register. Signal processor 400 can also set or clear this flag.

FIG. 7L shows an SP instruction memory BIST status register 492 that is used as a BIST control register when written to by main processor 100 (top diagram in FIG. 7L) and indicates BIST status when read by the main processor (bottom diagram of FIG. 7L). Program counter 432 is preferably also mapped into the CPU control registers 456 so that it can be written to and read from by main processor 100.

Signal Processor Microcode

The particular functions signal processor 400 performs depend on the SP microcode 156 provided by storage device 54. In this example, SP microcode 156 provides both graphics and audio processing functions. As explained above, the main tasks performed by signal processor 400 for graphics processing include reading a display list, performing 3-dimensional geometry transformation and lighting calculations, and generating corresponding graphics display commands for use by display processor 500. In more detail, signal processor 400 performs the following overall graphics functions under control of microcode 156:

Display list processing
Matrix definition
Vertex generation and lighting
Texture definition/loading
Clipping and culling
Display processor command setup
Flow control Signal processor 400 performs the following overall functions under control of microcode 156 to process audio:

Play list processing
Digital audio synthesis/processing

Writing digital audio samples to main memory audio buffer 114

Task Lists

Main processor 100 tells signal processor 400 what to do by providing the signal processor with a task list. The microcode 156 program that runs on signal processor 400 is called a task. Main processor 100 (and thus the video game program 108 supplied by storage device 54) is responsible for scheduling and invoking tasks on signal processor 400. The task list contains all of the information signal processor 400 needs to begin task execution, including pointers to the microcode 156 routines it needs to run in order to perform tasks. Main processor 100 provides this task list under control by game program 108.

FIG. 8 shows an example of a task list 250. The task list 250 may reference one or more display lists and/or play lists 110. These display lists or play lists 110, in turn, may reference additional data structures including other display lists or play lists. A display list 110 can point to other display lists and/or graphics data. Similarly, a play list can reference other play list and/or sound data. In this example, display lists and play lists can be thought of as hierarchical data structures up to ten levels deep. Signal processor 400 processes the display lists and play lists of the stack, pushing and popping the current display list pointer. All display lists must terminate with an "end" command. For example, display list 110(1) shown in FIG. 8 references another display list 110(2). Display list 110(2) references graphics data 112 needed to execute the list. Similarly, play list 110(4) shown in FIG. 8 references sound data 112B.

For graphics animation, it is desirable to "double buffer" only parts of the display list 110 that change from one frame to another. In this way, only the data that changes from one frame to the next needs to be "double buffered"—thus conserving space in main memory 300. Swapping between double buffers is efficiently done by changing segment base addresses within task lists 250 and by organizing the hierarchical display lists in an appropriately efficient manner. Display lists or fragments of display lists can be chained together for more efficient memory utilization.

Figure 9:
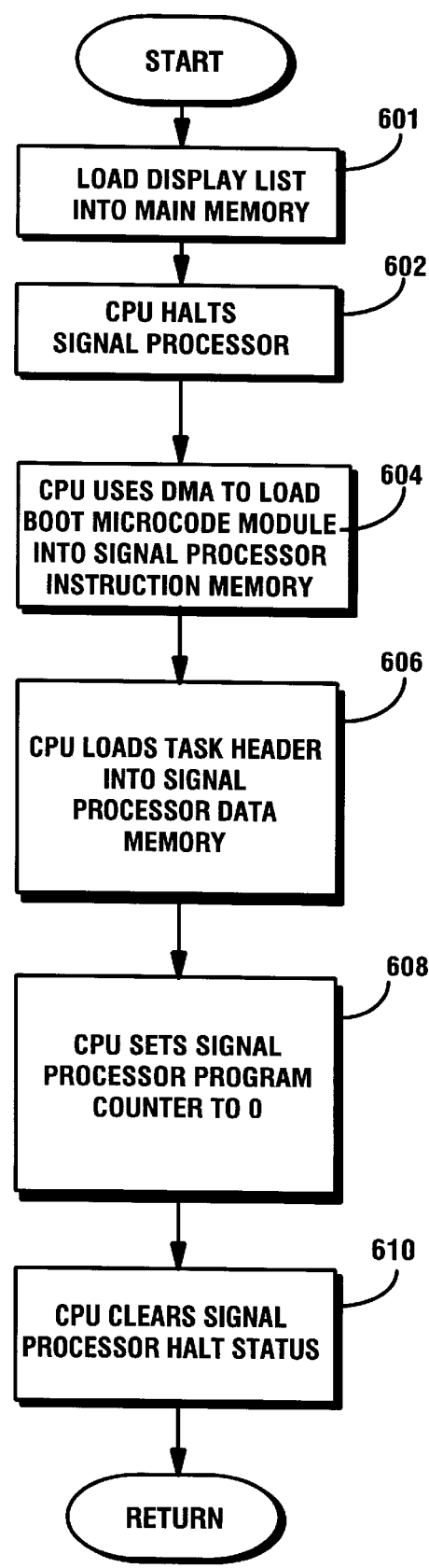
FIG. 9 shows an example microcode load routine.

FIG. 9 shows an example process performed by main processor 100 to invoke processing of a new task list by signal processor 400. Main processor 100 first loads the task (display) list into main memory 300 (block 601). It then halts signal processor 400 (or checks to insure that the signal processor is halted) by writing to and/or reading from SP status register 470 (block 602). Main processor 100 then writes to SP DMA registers 458, 460, 462 to load an initial microcode module into signal processor instruction memory 402 (604, FIG. 9). Main processor 100 next stores the address in main memory 300 of the task (display) list loaded by block 601 into signal processor data memory 404 (block 606, FIG. 9). Main processor 100 then resets the signal processor program counter 432 (block 608, FIG. 9), and writes to SP status register 470 to start the signal processor 400 (block 610, FIG. 9). The signal processor 400 typically then uses its DMA controller 454 to fetch the task (display) list from main memory 300 into its data memory 404.

Now that signal processor 400 has a task list and is started, it proceeds to perform each of the operations requested in the task list. It continues to execute the task list until it reaches the end of the task list, at which time it stops and waits for main processor 100 to provide a new task list. Generally, main processor 100 provides a new task list once each video frame—although, as discussed above, in many cases only a portion of the task list and/or the display and/or play lists the task list references may actually change from one frame to the next. Portions of the task list in main memory 300 may be "double buffered" so the main processor 100 can be writing to one buffer while signal processor 400 reads from another buffer. Before the next video frame, the main processor 100 can change a pointer to give the signal processor 400 access to the new buffer.

As signal processor 400 executes the task list, it retrieves additional SP microcode 156 modules from main memory 300 as needed to perform the specified tasks. For example, signal processor 400 may use its DMA facility 454 to load particular graphics microcode into instruction memory 402 to execute graphics commands specified by a task list, and may similarly retrieve and load audio processing microcode routines to perform audio processing specified by the task list. Different microcode routines or "overlays" may be loaded on an as-needed basis to more optimally handle particular types of graphics and/or audio processing operations. As one example, the signal processor 400 may load special lighting graphics routines as overlays to perform particular lighting operations, and may load clipping routines or overlays to perform particular culling operations. Microcode loading and reloading into signal processor 400 during execution of the single task list 250 is necessary in this example because signal processor instruction memory 402 is not large enough to store all of SP microcode 156, and the signal processor is designed so that it can execute instructions only out of its internal instruction memory.

Figure 10:
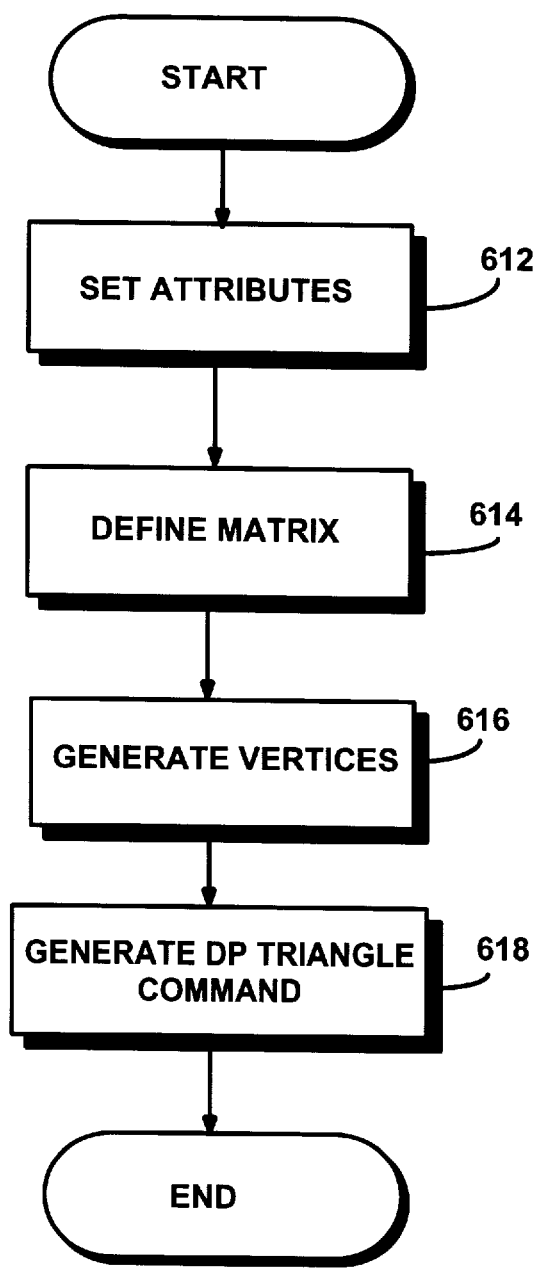
FIG. 10 shows an example simple signal processor display list processing example.

FIG. 10 shows an example of a simplified graphics process performed by signal processor 400 based on a display list 110. In this simplified process, the display list 110 first commands signal processor 400 to set various attributes defining the overall graphical images that are to be rendered by the co-processor. Such attributes include, for example, shading, lighting, Z buffering, texture generation, fogging and culling (FIG. 10 block 612). The display list next commands signal processor 400 to define a modeling/viewing matrix and a projection matrix (FIG. 10, block 614). Once the appropriate matrices have been defined, the display list commands signal processor 400 to transform a set of vertices based on the modeling/viewing matrix and the projection matrix defined by block 614 and also based on the attributes set by block 612 (FIG. 10, block 616). Finally, the display list commands signal processor 400 to generate a graphics display (e.g., triangle) command that directs display processor 500 to render a primitive based on the vertices generated by block 616 and the attributes set by block 612 (FIG. 10, block 618). Signal processor 400 may, in response to step 618, transfer the display processor command it has generated (or the address of the command, which the signal processor may store in its data memory 404 or in main memory 300) for access and execution by display processor 500.

Figure 11:
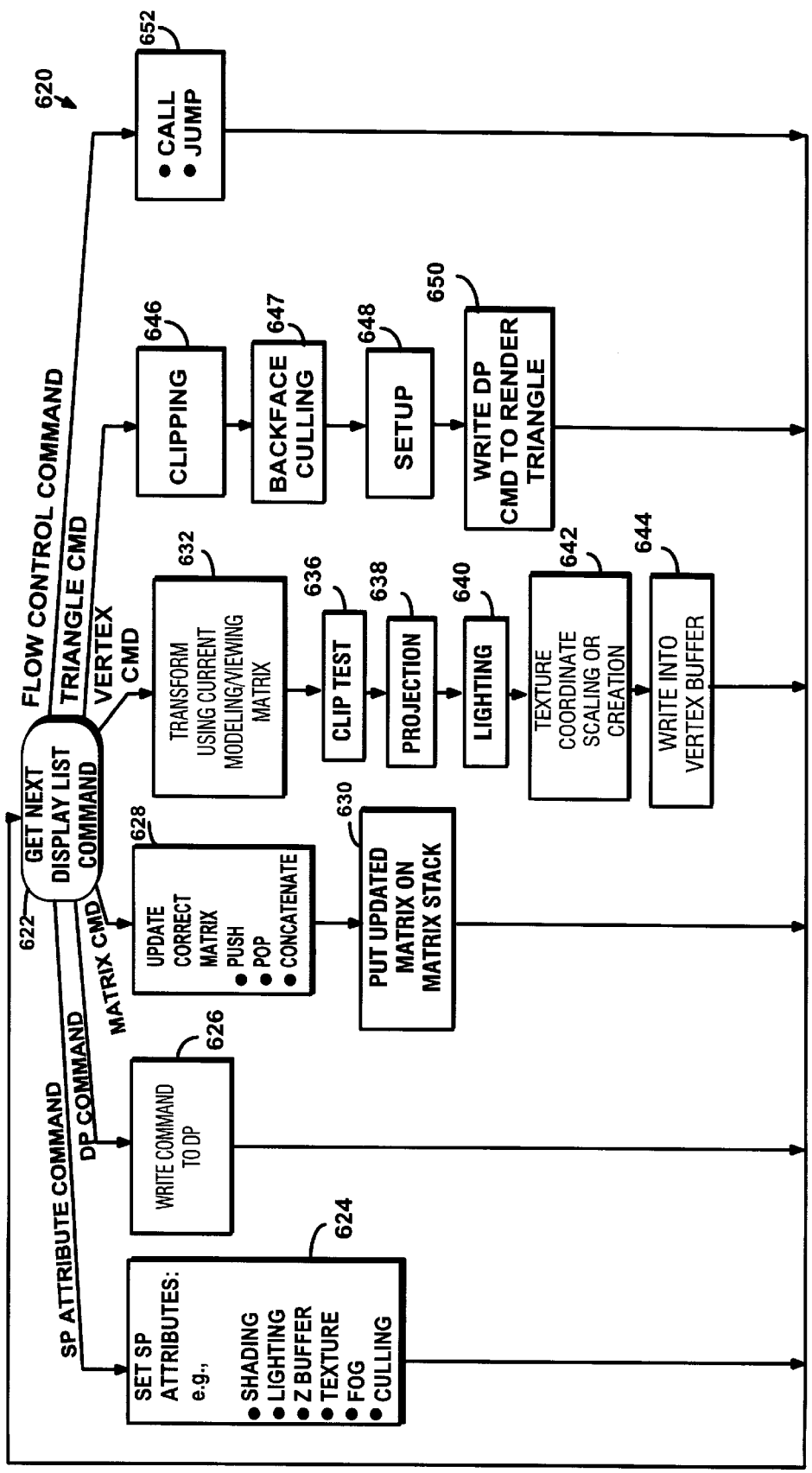
FIG. 11 shows an example signal processor graphics microcode control step sequence.

FIG. 11 shows an overall process 620 performed by signal processor graphics microcode 156 to process a display list 110 (e.g., to perform the type of process shown in FIG. 10). Signal processor 400 gets the next display list command and determines what kind of a command it is (FIG. 11, block 622). Display lists commands in this example generally have five different types:

Signal processor attribute command
Display processor command
Matrix command
Vertex command
Triangle command Flow control command If the display list command is a signal processor attribute command, signal processor 400 sets signal processor attributes as specified by the command (FIG. 11, block 624). In this example, the following types of SP attribute command are defined:

shading lighting

Z-buffering texturing fogging culling.

The following are example SP attribute command formats and associated definitions:

Signal Processor Attribute Commands:

G_SETGEOMETRYMODE:

| command |         |
|---------|---------|
|         | command |

This command "sets" some of the rendering pipeline state. This state is maintained in the signal processor 400, and a SET/CLEAR interface is presented to the user.

Bits which are "on" in the command field are turned ON in the internal state.

| | |
|---|---|
| G_SHADE | Enable vertex shading or use primitive color to paint the polygon (default is vertex shading). |
| G_LIGHTING | Enable lighting calculations. |
| G_SHADING_SMOOTH | Enable smooth or flat shading (the default, with this bit cleared is flat shading). |
| G_ZBUFFER | Enable z-buffer depth calculations. |
| G_TEXTURE_GEN | Enable automatic generation of the texture coordinates S & T. After transformations, a spherical mapping will be used to replace any S & T value originally given with the vertex. |
| G_FOG | Enable fog coefficient to be generated and replace the vertex alpha. Large alphas are more foggy (farther). |
| G_TEXTURE_GEN_LINEAR | Enable linearization of the texture coordinates generated when G_TEXTURE_GEN is set. For example, this allows the use of a panoramic texture map when performing environment mapping. |
| G_LOD | Enable generation level of detail (LOD) value for mipmapped textures and texture-edge mode. |
| G_CULL_FRONT | Cull the front-facing polygons. |
| G_CULL_BACK | Cull the back-facing polygons. |

G_CLEARGEOMETRY MODE:

Same as G_SETGEOMETRYMODE, but this command "clears" some of the rendering pipeline state (bits which are "on" in the command field are turned OFF in the internal state).

G_LIGHT:

| Command | param | length = 16 |
|---------|-------|-------------|
| seg | address | |

↓

| light.r | light.g | light.b | 0x00 |
|---------|---------|---------|------|
| light.r | light.g | light.b | 0x00 |
| light.x | light.y | light.z | 0x00 |

This command passes a light to the rendering pipeline. There can be up to 7 directional lights (numbered 1–7) plus an ambient light. The param specifies which light number (n) to replace with this light description. Use the G_NUM_LIGHTS command to specify how many of the 8 lights to use. If the number of lights specified is N, then the first N lights (1–N) will be the ones used, and the Nth+1 lights will be the ambient light. The "param" field should be set based on a value maintained in data memory 404+(n−1)×2.

The ambient light is defined by a color: light.r,light.g, light.b(unsigned 8 bit integers) which should be set to the color of the ambient light multiplied by the color of the object which is to be drawn. (If you are lighting a texture mapped object just use the color of the ambient light). (For ambient lights the light.x,light.y, and light.z fields are ignored). The ambient light cannot be turned off except by specifying a color of black in this example.

Directional lights are specified by a color: light.r, light.g, light.b (unsigned 8 bit integers) which, like the ambient light color, should be set to the color of the light source multiplied times the color of the object which is to be drawn. Directional lights also have a direction. The light.x, light.y, light.z fields (signed 8 bit fractions with 7 bits of fraction) indicates the direction from the object to light. There must be at least one directional light (if G_LIGHTING is enabled in G_SETGEOMETRYMODE command) turned on, but if its color is black it will have no effect on the scene.

The G_NUM_LIGHTS command should always be used sometime after G_LIGHT command(s) before the next G_VTX command even if the number of lights has not changed.

G_NUM_LIGHTS:

| Command | param | length = 8 |
|---------|-------|------------|
| seg | address | |

↓

| 0x8000 | 32x(1 + N) |
|--------|------------|
| 0x00000000 | |

N=number of diffuse light sources (1–7).

This command specifies how many lights should be used. It should always be used after the G_LIGHT command before the next G_VTX command. The parameter specifies the number of diffuse light sources (N) which must be at least 1 and not more than 7. The ambient light source will be light number N+1 and the directional light sources will be lights numbered 1 through N.

G_SETOTHERMODE_H:

| command | | shift | len |
|---|---|---|---|
| word | | | |

This command sets the high word of the "other" modes in the display processor, including blending, texturing, and frame buffer parameters. The signal processor 400 remembers the high and low words of the display processor 500 "other" state, in order to present a simple set-command interface. Although this is a display processor command, it must be parsed and interpreted by the signal processor 400 and therefore cannot be sent directly to the display processor without first going through the signal processor.

The shift and len parameters in this command are used to construct a mask:

(((0x01<<len)−1)<<shift)

This mask is used to clear those bits in the display processor 500 status word. New bits, from the word parameter are OR'd into the status word. (the parameter word must be pre-shifted).

G_SETOTHERMODE_L

Same as G_SETOTHERMODE_H, but affects the low word of the "other" modes on the display processor 500.

G_TEXTURE:

| command | | s scale | |
|---|---|---|---|
| t scale | mipmap level | tile num | on |

This command turns texture mapping ON/OFF, provides texture coordinate scaling, and selects the tile number (within a tiled texture). Scale parameters are in the format of (0.16) and scale the texture parameters in vertex commands. Texture on/off turns on and off the texture coordinate processing in the geometry pipeline. Tile number corresponds to tiles chosen in the raster portion of the pipeline. The tile num also holds the maximum levels for level of detail (LOD) (mid-mapping).

G_LOOKAT_X:

| Command | param | length = 16 |
|---|---|---|
| seg | address | |

| 0x00000000 | | | |
|---|---|---|---|
| 0x00000000 | | | |
| X | Y | Z | 0x00 |

This command is used for automatic texture coordinate generation. It is used to describe the orientation of the eye so that the signal processor 400 knows with respect to what to generate texture coordinates. The XYZ values (8 bit signed fractions with 7 bits of fraction) describe a vector in worldspace (the space between the MODELVIEW matrix and the PROJECTION matrix) which is perpendicular to the viewer's viewing direction and pointing towards the viewer's right.

G_LOOKAT_Y:

Same as G_LOOKAT_X, but the first zero words in the addressed segment are zero (0x00000000).

DP Command Generation

Referring back to FIG. 11, if the next display list command is one intended for display processor 500, signal processor 400 simply writes the command to the display processor (block 626 of FIG. 11). Block 626 can either DMA the display processor command into display processor 500 via the X-bus 218, or it can deposit the display processor command in a buffer within main memory 300 for access by the display processor.

MATRIX COMMANDS

If the next display list command is a matrix command, signal processor 400 updates the state of the current matrix it is using (FIG. 11, block 628) and places the updated matrix on the matrix stack (block 630). As mentioned above, in this example signal processor 400 maintains a 10-deep modeling/viewing matrix stack. New matrices can be loaded onto the stack, multiplied (concatenated) with the top of the stack, or popped off of the stack. In this example, signal processor 400 maintains a "one-deep" projection matrix. Therefore, new matrices can be loaded onto or multiplied with the current projection matrix, but cannot be pushed or popped.

Figure 12A:
FIG. 12A shows an example double precision representation.
Figure 12B:
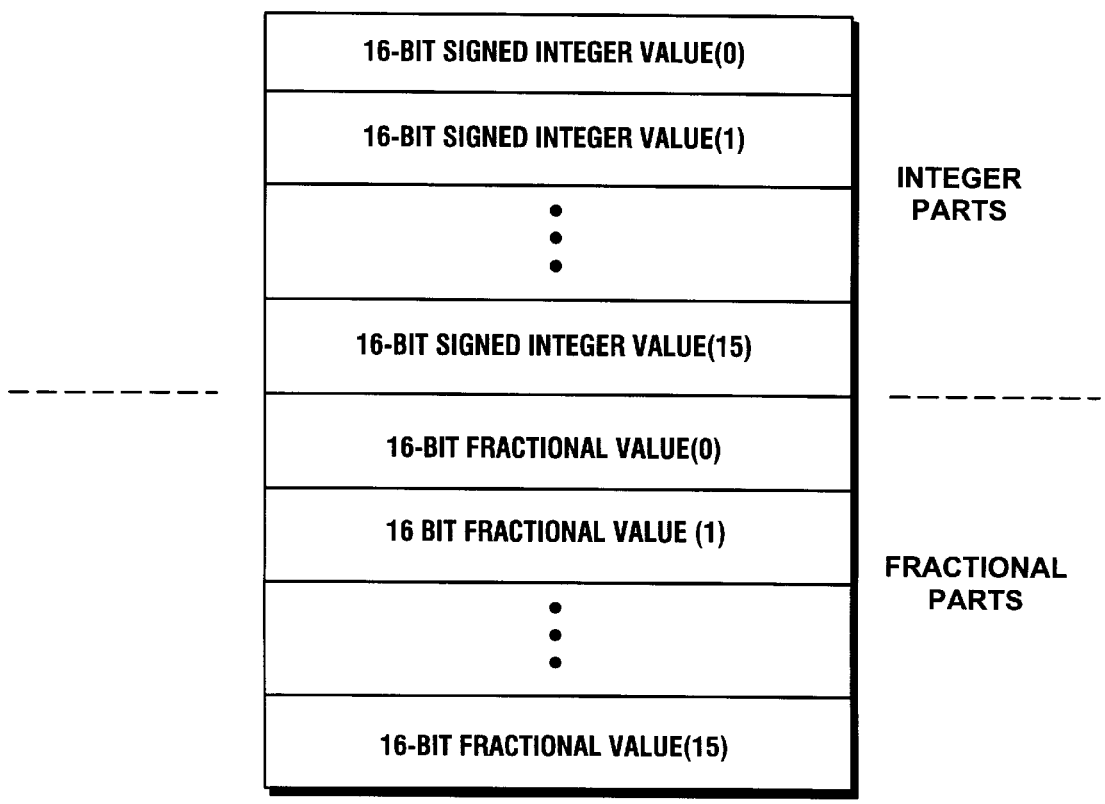
FIG. 12B shows an example matrix format.

In this example, the modeling/viewing matrix stack resides in main memory 300. The video game program 108 must allocate enough memory for this stack and provide a pointer to the stack area in task list 250. The format of the matrix is optimized for the signal processor's vector unit 420. To provide adequate resolution, signal processor 400 in this example represents each matrix value in 32-bit "double precision"—with an upper 16 bit signed integer portion (indicating the part of the value greater than 1) and a lower 16-bit fractional portion (indicating the part of the value between 0 and 1). However, vector unit 420 in this example operates on 16-bit wide values and cannot directly multiply 32-bit wide values. The matrix format (which is shown in FIG. 12B) groups all of the integer parts of the elements, followed by all of the fractional parts of the elements. It allows signal processor 400 to more efficiently manipulate the matrix by multiplying 16 bit integer parts and 16 bit fractional parts separately without have to repeatedly "unpack" or "pack" the matrix.

For example, vector unit 420 can multiply each of the 16-bit fixed point signed integer values in a matrix row in one operation, it can multiply each of the 16-bit fractional portions of the same row in another operation. These two partial results can be added together to obtain a 32-bit double precision value, or they can be used separately (e.g., for operations that require only the integer part of the result or only the fractional part of the result). Thus, matrix representations thus allows signal processor 400 to efficiently process 32-bit precision values even though vector unit 420 in this example, operates on 16-bit values and as no explicit "double precision" capability.

The following are example signal processor matrix commands and associated formats:

Example Matrix Commands:

G_MTX:

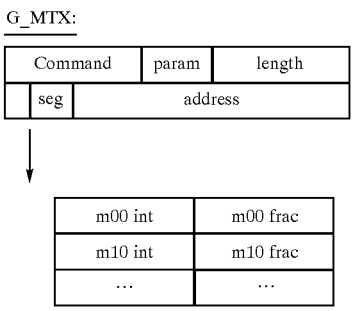

The matrix command points to a 4×4 transformation matrix (See FIG. 12B) that will be used to transform the subsequent geometry, in a manner controlled by the flags in the parameter field. The length is the size of the incoming matrix in bytes. A 4×4 matrix pointed to by this command has the following format: It is a contiguous block of memory, containing the 16 elements of the matrix in ROW MAJOR order. Each element of the matrix is in a fixed point format, S15.16. The length of a 4×4 matrix in bytes should be 64 bytes. The segment id and address field are used to construct the main memory 300 address of the actual matrix. (see G_SEGMENT SP command for more information).

The following flags in the parameter field are used:

| | |
|---|---|
| G_MTX_MODELVIEW | Identifies the incoming matrix as a modelview matrix, which is necessary to provide efficient transformation of polygon normals for shading, etc. (default) |
| G_MTX_PROJECTION | Identifies the incoming matrix as a projection matrix, which does not affect the transformation of the polygon normals for shading, etc. |
| G_MTX_MUL | The incoming matrix is concatenated with the current top of the matrix stack. (default) |
| G_MTX_LOAD | The incoming matrix replaces the current top of the (modelview or projection) matrix stack. |
| G_MTX_NOPUSH | The current top of the matrix stack is not pushed prior to performing the load or concat operation with the top of the stack. (default) |
| G_MTX_PUSH | The current top of the matrix stack is pushed prior to performing the load or concat operation with the top of the stack. Push is only supported with G_MTX_MODELVIEW, and not with G_MTX_PROJECTION.—Since there is no projection matrix stack (the projection must be explicitly reloaded) |

This single command with the combination of parameters allows for a variety of commonly used matrix operations. For example, (G_MTX_LOAD|G_MTX_NOPUSH) replaces the top of the stack. (G_MTX_MUL|G_MTX_PUSH) performs a concatenation while pushing the stack for typical modeling hierarchy construction.

For lighting and texturing, the polygon normal also must be transformed by the inverse transpose of the modelview matrix (reference the "OpenGL Programming Guide"). This is the reason separate modelview and projection stacks are kept, and incoming matrices must be identified.

G_POPMTX:

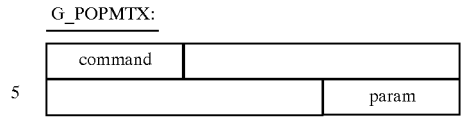

This command pops the modelview matrix stack. The parameter field should be 0. Popping an empty stack results in . . . (doesn't pop). Since there is no projection matrix stack, this command is supported only for the modelview matrix.

G_VIEWPORT:

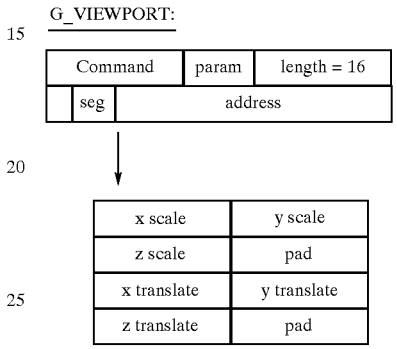

This command sends a viewport structure to the graphics pipeline.

The segment id and address field are used to construct the main memory 300 address of the actual VIEWPORT structure (see G_SEGMENT for more information).

The viewport transformation is a scale-translation of the normalized screen coordinates. In general, the viewport must be constructed in cooperation with the projection matrix in order to meet the hardware requirements for screen device coordinates.

The scale and translation terms for x and y have 2 bits of fraction, necessary to accommodate the sub-pixel positioning in the hardware. The z values have no fraction.

Accounting for the fractional bits, using one of the default projection matrices, the viewport structure can be initialized like this.

(SCREEN_WD/2*4, (SCREEN_HT/2) * 4, G_MAXZ, 0, /* scale */

(SCREEN_WD/2*4, (SCREEN_HT/2) * 4, 0, 0, /* translate */

Vertex Command Processing

Figure 13A:
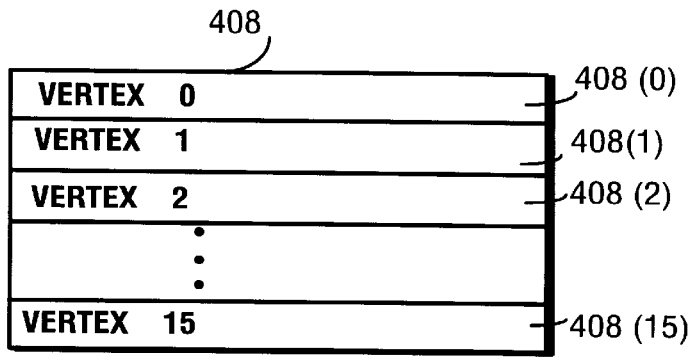
FIG. 13A shows an example signal processor vertex buffer format.

Referring once again to FIG. 11, if the next display list command is a "vertex command", signal processor 400 transforms the vertices specified by the vertex command by the current matrix state and possibly shaded by the current lighting state, performs a clip test on the vertices, and loads the resulting vertices into a vertex buffer 408 within data memory 404. Signal processor 400 in this example has a vertex buffer that holds up to sixteen vertices. FIG. 13A shows the signal processor 400 vertex buffer, which is fully exposed to main processor 100 and thus to video game program 108. This internal vertex buffer 404, which can hold up to 16 points, is stored in signal processor data memory 404 and can be read by main processor 100.

Although signal processor 400 in this example, can handle only lines, triangles or rectangles (i.e., surfaces defined by 2, 3, or 4 vertices), vertex buffer 408 in this example, stores up to 16 vertices so that the signal processor can re-use transformed vertex values instead of having to recalculate the vertices each time. 3D authoring/modeling software used to create video game program 108, in this example, should preferably organize display list 110 to maximize vertex re-use (and thus speed performance).

Figure 13B:
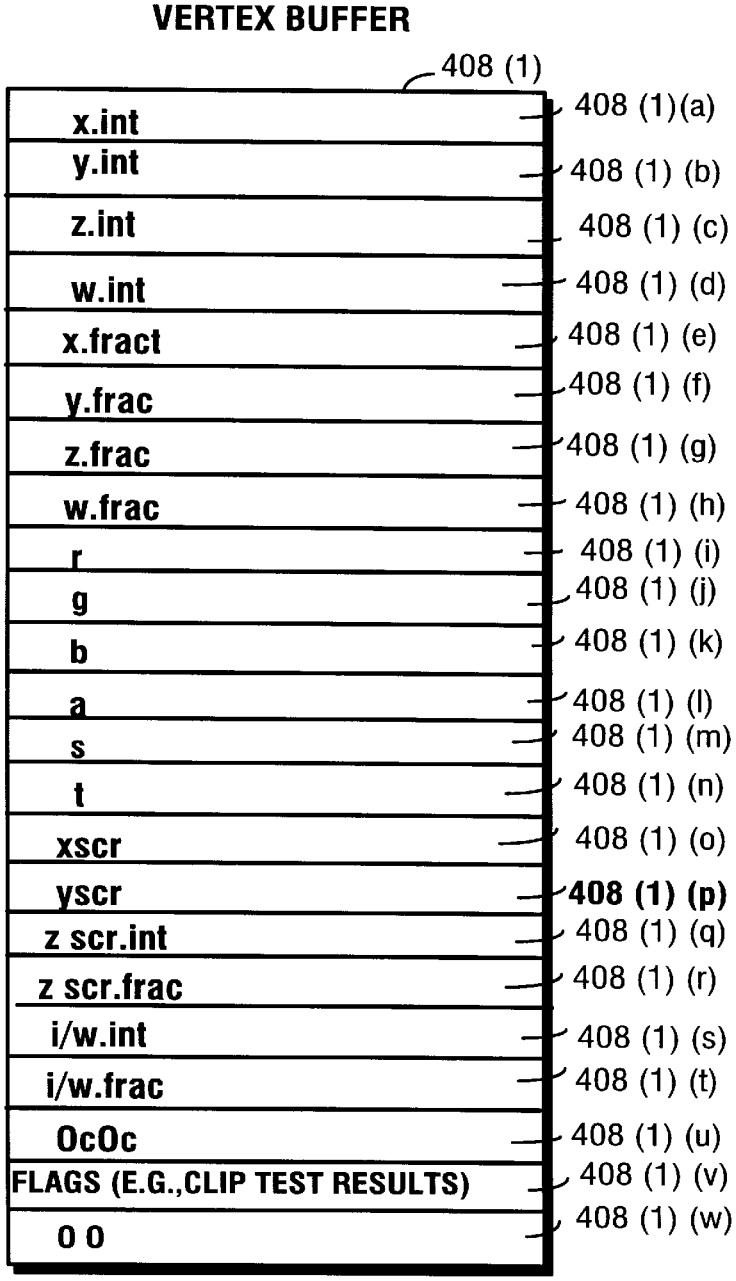
FIG. 13B shows an example vertex data definition.

FIG. 13B shows an example vertex data structure signal processor 400 uses to represent each of the vertices stored in vertex buffer 408. In this example, the transformed x, y, z, and w, values corresponding to the vertex are stored in double precision format, with the integer parts first followed by the fractional parts (fields 408(1)(a)–408 (1)(h)). With vertex color (r, g, b, α) are stored in fields 408(1)(I)–408 (1)(l), and vertex texture coordinates (s, t) are stored in fields 408(1)(m), 408(1)(n). Additionally, from this example, the vertex values in screen space coordinates (i.e., transformed and projected onto the viewing plane) are stored in fields 408(1)(o)–408(1)(t) (with the one/w value stored in double precision format). The screen coordinates are used by display processor 500 to draw polygons defined by the vertex. The transformed 3-dimensional coordinates are maintained in vertex buffer 408 for a clipping test. Since polygons (not vertices) are clipped, and since the vertices in vertex buffer 408 may be re-used for multiple polygons, these transformed 3D vertex values are stored for multiple possible clipping test to be performed. In addition, the vertex data structure 408(1) includes flags 408(1)(v) that signal processor 400 can use, for example, to specify clip test results (i.e., whether the vertex falls inside or outside of each of six different clip planes). The perspective projection factor stored in fields 408(1)(s), 408(1)(t) is retained for perspective correction operations performed by the display processor texture coordinate unit (explain below).

The following is an example of a vertex command format used to load the internal vertex buffer with some points:

G_VTX:

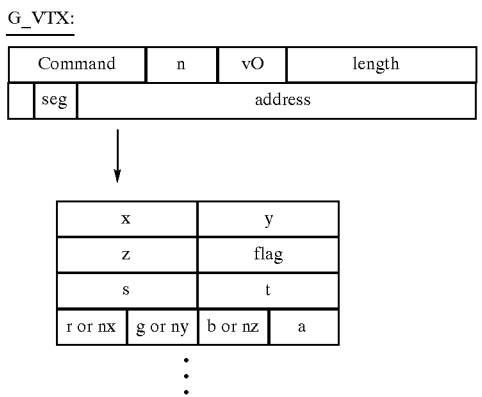

This command loads (n+1) points into the vector buffer beginning at location v0 in the vertex buffer. The segment id and address field are used to construct the main memory 300 address of the actual VTX structure. (see G_SEGMENT for more information). The number of vertices n, is encoded as "the number minus one", in order to allow a full 16 vertices to be represented in 4 bits. The length is the number of points times 16, the size of the VTX structure (in bytes). Vertex coordinates are 16-bit integers, the texture coordinates s and t are S10.5. The flag parameter is ignored in this example. A vertex either has a color or a normal (for shading). Colors are 8 bit unsigned numbers. Normals are 8 bit signed fractions (7 bits of fraction). (0x7f maps to +1.0, 0x81 maps to −1.0, and 0x0 maps to 0.0). Normal vectors must be normalized, i.e., $$\sqrt{x^2 + y^2 + z^2} \le 127$$

Upon receiving a vertex command, signal processor 400 transforms the vertices specified in the vertex command using the current modeling/viewing matrix (FIG. 11, block 632). See Neider et al, *Open GL Programming,Guide* (Silicon Graphics 1993) at chapter 3 ("viewing"). These transformations orient the object represented by the vertices in 3-dimensional space relative to the selected view point. For example, they may translate, rotate and/or scale the represented object relative to a selected point of view. Such transformation calculations make heavy use of the signal processor vector unit 420 and its ability to perform eight parallel calculations simultaneously. The transformed results are stored in vertex data structure fields 408(1)(a)–408(1)(h) in double precision format in this example.

Clip Test:

Signal processor 400 then performs a clip test (FIG. 11, block 636) to determine whether the transformed vertex is inside or outside of the scene. Six clipping planes define the sides and ends of the viewing volume. Each transformed vertex is compared to each of these six planes, and the results of the comparison (i.e., on which side of the clip plane the vertex is located) are stored in vertex buffer "flags" field 408(v) (see FIG. 13B). These results are used by clipping block 646 in response to a "triangle command" (see below). Note that because this example clips polygons and not vertices, FIG. 11 block 636 does not actually perform clipping, it simply tests vertex position relative to the clip planes.

Projection:

Signal processor 400 then transforms the vertex values using the projection matrix (FIG. 11, block 638). The purpose of the projection transformation is to define a viewing volume, which is used in two ways. The viewing volume determines how an object is projected onto the 2-dimensional viewing screen (that is, by using a perspective or an orthographic projection). (See *Open GL Programming Guide* at 90 et seq.) The resulting transformed vertices have now been projected from 3-dimensional space onto the 2-dimensional viewing plane with the proper for shortening (if the projection matrix defines a perspective projection) or orthographically (if the projection matrix defines an orthographic projection). These screen coordinates values are also written to the vertex buffer data structure at fields 408(1) (o)–408(1)t) (the"1/w" value is retained for later perspective correction).

Lighting:

Signal processor 400 next performs lighting calculations in order to "light" each of the vertices specified in the vertex command. System 50 supports a number of sophisticated real-time lighting effects, including ambient (uniform) lighting, diffuse (directional) lights, and specular highlights (using texture mapping). In order to perform lighting calculations in this example, signal processor 400 must first load an SP microcode 108 overlay to perform the lighting calculations. The G_SETGEOMETRYMODE command must have specified that lighting calculations are enabled, and the lights must have been defined by the G_NUM_LIGHTS command discussed above. The part of microcode 108 that performs the lighting calculations is not normally resident within signal processor 400, but is brought in through an overlay when lighting calls are made. This has performance implications for rendering scenes with some objects lighted and others colored statically. In this example, the lighting overlay overwrites the clipping microcode, so to achieve highest performance it is best to minimize or completely avoid clipped objects in lighted scenes.

To light an object, the vertices which make up the objects must have normals instead of colors specified. In this example, the normal consists of three signed 8-bit numbers representing the x, y and z components of the normal (see the G_VTX command format described above). Each component ranges in value from −128 to +127 in this example. The x component goes in the position of the red color of the vertex, the y into the green and the z into the blue. Alpha remains unchanged. The normal vector must be normalized, as discussed above.

Lighting can help achieve the effect of depth by altering the way objects appear as they change their orientation. Signal processor 400 in this example supports up to seven diffused lights in a scene. Each light has a direction and a color. Regardless of the orientation of the object and the viewer, each light will continue to shine in the same direction (relative to the open "world") until the light direction is changed. In addition, one ambient light provides uniform illumination. Shadows are not explicitly supported by signal processor 400 in this example.

As explained above, lighting information is passed to signal processor 400 in light data structures. The number of diffuse lights can vary from 0 to 7. Variables with red, green and blue values represent the color of the light and take on values ranging from 0 to 255. The variables with the x, y, z suffixes represent the direction of the light. The convention is that the direction points toward the light. This means the light direction indicates the direction to the light and not the direction that the light is shining (for example, if the light is coming from the upper left of the world the direction might be x=−141, y=−141, z=0). To avoid any ambient light, the programmer must specify the ambient light is black (0, 0, 0,).

The G_ light command is used to activate a set of lights on a display list. Once lights are activated, they remain on until the next set of lights is activated. This implies that setting up a new structure of lights overwrites the old structure of lights in signal processor 400. To turn on the lighting computation so that the lights can take effect, the lighting mode bit needs to be turned on using the G_SETGEOMETRYMODE command.

The lighting structures discussed above are used to provide color values for storing into vertex buffer fields 408(1)(i)–408(1)(l).

Texture Coordinate Scaling/Creation:

Signal processor 400 next performs texture coordinate scaling and/or creation (FIG. 11, block 642). In this example, the operations performed by block 642 may be used to accomplish specular highlighting, reflection mapping and environment mapping. To render these effects, coprocessor 200 in this example uses a texture map of an image of the light or environment, and computes the texture coordinates s,t based on the angle from the viewpoint to the surface normal. This texture mapping technique avoids the need to calculate surface normals at each pixel to accomplish specular lighting. It would be too computationally intensive for system 50 in this example to perform such surface normal calculations at each pixel.

The specular highlight from most lights can be represented by a texture map defining a round dot with an exponential or Gaussian function representing the intensity distribution. If the scene contains highlights from other, oddly shaped lights such as fluorescent tubes or glowing swords, the difficulty in rendering is no greater provided a texture map of the highlight can be obtained.

Although display processor 500 performs texture mapping operations in this example, signal processor 400 performs texture coordinate transformations for each vertex when these effects are required. Activation or de-activation of the signal processor texture coordinate transformations is specified by a value within the G_SETGEOMETRYMODE Command (see above). In addition, the G_SETGEOMETRYMODE Command can specify linearization of the generated textured coordinates, e.g., to allow use of a panoramic texture map when performing environment mapping.

In this example, signal processor 400 texture coordinate generation utilizes the projection of the vertex normals in the x and y directions in screen space to derive the s and t indices respectively for referencing the texture. The angle between the viewpoint and the surface normal at each vertex is used to generate s, t. The normal projections are scaled to obtain the actual s and t values in this example. Signal processor 400 may map the vertices "behind" the point of view into 0, and may map positive projections into a scaled value.

In this example, texturing is activated using the G_TEXTURE command described above in the signal processor attribute command section. This command provides, among other things, scaling values for performing the texture coordinate mapping described above.

As explained above, the texture coordinate mapping performed by signal processor 400, in this example, also requires information specifying the orientation of the eye so that the angle between the vertex surface normal and the eye can be computed. The G_LOOKAT_X and the G_LOOKAT_Y commands supply the eye orientation for automatic texture coordinate generation performed by signal processor 400. The transformed texture coordinate values, if they are calculated, are stored by signal processor 400 in the vertex data structure at fields 408(1)(m), 408(1)(n). These texture coordinate values are provided to display processor 500 to perform acquired texture mapping using a texture specified by the G_TEXTURE command.

Since these effects use texture mapping, they cannot be used with objects which are otherwise texture mapped.

Vertex Buffer_Write:

After performing all of these various steps, signal processor 400 writes the transformed, lighted, projected vertex values into vertex buffer 408 (FIG. 11, block 644), and returns to parse the next display list command (block 622).

Triangle Command Processing:

Once signal processor 400 has written vertices into its vertex buffer 408, the display list 110 can provide a "triangle command". The "triangle command," which specifies a polygon defined by vertices in vertex buffer 408, is essentially a request for signal processor 400 to generate a graphics display command representing a polygon and to send that command to display processor 500 for rendering. In this example, signal processor 400 can render three different kinds of primitives: lines, triangles and rectangles. Different modules of microcode 108 need to be loaded in this example to render lines or triangles. In this example, all rectangles are 2-dimensional primitives specified in screen-coordinates, and are neither clipped nor scissored.

The following is an example of a format and associated function of triangle commands:

Example of Triangle Commands

The following command specifies a triangle defined by 3 vertices in the vertex buffer:

G_TRI1:

| command | | | | |
|---|---|---|---|---|
| | N | v0 | v1 | v2 |

This command results in one triangle, using the vertices v0, v1, and v2 stored in the internal vertex buffer. The N field identifies which of the three vertices contains the normal of the face (for flat shading) or the color of the face (for flat shading).

The following command is used to control signal processor 400 to generate display processor 500 commands for rendering a line defined by two vertices in vertex buffer 408:

G_LINE3D:

| command | | | | |
|---|---|---|---|---|
| | N | v0 | v1 | |

This command generates one line, using the vertices v0 and v1 in the internal vertex buffer. The N field specifies which of the two vertices contain the color of the face (for flat shading).

Textured and filled rectangles require intervention by signal processor 400 and are thus a signal processor operation. The following is an example command format and associated function of a texture rectangle command:

G_TEXRECT

| command | x0 | y0 |
|---|---|---|
| | x1 | y1 |

| command | 0x000000 | |
|---|---|---|
| S (top left texture coord) | | T(top left texture coord) |

| command | 0x000000 | |
|---|---|---|
| DsDx | | DtDy |

These 3 commands draw a 2D rectangle with the current texture. The parameters x0, y0 specify the upper left corner of the rectangle; x1, y1 are the lower right corners. All coordinates are 12 bits. S and T are signed 10.5 bit numbers, and specify the upper left coordinate of s, t. DsDx and DtDy are signed 5.10 bit numbers, and specify change in s (t) per change in x (y) coordinate.

Signal processor 400 also in this example supports a G_TEXRECT_FLIP command that is identical to the G_TEXRECT command except that the texture is flipped so that the s coordinate changes in the y direction and the t coordinate changes in the x direction.

G_FILLRECT:

| command | x0 | y0 |
|---|---|---|
| | x1 | y1 |

This command draws a 2D rectangle in the current fill color. The parameters x0, y0 specify the upper left corner of the rectangle; x1, y1 are the lower right corners. All coordinates are 12 bits.

Clipping/Setup:

Referring back to FIG. 11, upon receipt of a triangle command, signal processor 400 performs any necessary clipping of the vertices (FIG. 11, block 646). This clipping operation eliminates portions of geometric primitives that lie outside of the six clipped planes defining the view plane.

As explained above, the results of the clip test 636 performed for each vertex are stored and available in vertex buffer 408. With the triangle command now defining a primitive defined by those vertices, signal processor 400 can proceed to clip the primitive. If all of the vertices of a primitive lay within the space defined by the six clip planes, the entire primitive exists within the display space and does not need to be clipped. If all of the vertices defining a primitive lay outside of the same clip plane (as indicated by the flags field of vertex data structure 408(1) shown in FIG. 13B), the entire primitive can be excluded from display and thus discarded. If some of the vertices defining a primitive lie within the display space and some lay outside of it (or if all vertices lay outside of the display space but define a primitive which passes through the displayed space), the primitive needs to be clipped and new vertices defined. These tests and operations are performed by clipping block 646 in this example.

Signal processor 400 next performs backface culling (FIG. 11, block 647). This operation maximizes drawing speed by discarding polygons that can be determined to be on the backface of an object and thus hidden from view. In this example, either front-facing, back-facing, neither or both types of primitives can be culled (i.e., discarded) by block 647. The types of primitives to cull are specified by parameters in the G_SETGEOMETRYMODE command described above—allowing geometry to be ordered in any direction or where used with different culling flags to achieve various effects (e.g., interior surfaces, two-sided polygons, etc.).

Signal processor 400 also performs some set up operations (FIG. 11, block 648), and may then pass a graphics display command to display processor 500 to control the display processor to render the primitive (FIG. 11, block 650). As part of the set up operation (block 648), signal processor 400 in this example translates "segmented" addresses in the display list 110 into physical addresses that the display processor 500 can use (the display processor is a physical address machine in this example).

In this example, signal processor 400 uses a segment table 416 (see FIG. 13C) to assist it in addressing main memory 300. More specifically, addresses within signal processor 400 may be represented by a table entry 417A and a 26-bit offset 417B. The table entry 417A references one of 16 base addresses within segment address table 416. The referenced base address may be added to the offset 417b to generate a physical address into main memory 300. Signal processor 400 constructs a main memory 300 address by adding the base address for the segment and a 26-bit offset (which could be provided, for example, by a display list 110). The segment table 416 is constructed based on the following example G_SEGMENT command:

G_SEGMENT

| command | |
|---|---|
| seg | address |

This command adds an entry in the segment table 416 discussed above.

The segmented addressing used by signal processor 400 in this example can be useful to facilitate double-buffered animation. For example, video game program 108 can keep two copies of certain display list fragments within main memory 300, with the same offsets in two different segments. Switching copies of them is as easy as swapping the segment pointers in signal processor 400. Another use is to group data and textures in one segment and to group static background geometry in another segment. Grouping data might help optimize memory caching in main processor 100. All data which contains embedded addresses must be preceded by the appropriate G_SEGMENT command that loads the signal processor 400 segment table with the proper base address.

Figure 13C:
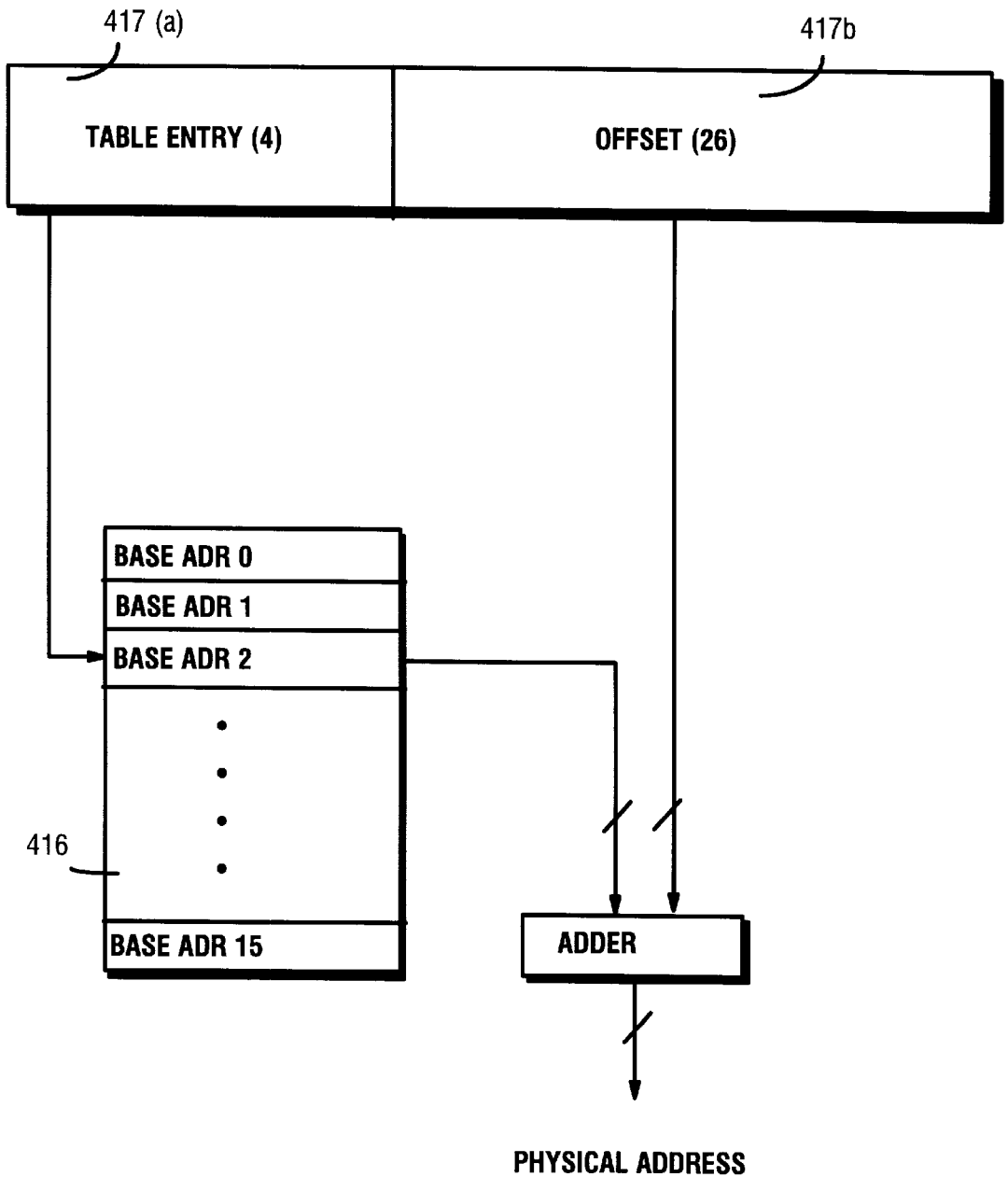
FIG. 13C shows an example signal processor segment addressing arrangement.

Although signal processor 400 can use the segment addressing scheme shown in FIG. 13C, this arrangement is not available to display processor 500 in this example. Hence, part of set up processing 648 is to translate any segment addresses that point to data structures required for rendering into physical addresses that can be used directly by display processor 500.

DP Command Write:

The primary output of signal processor 400 for graphics purposes is one or more commands to display processor 500 that are outputted by FIG. 11, block 650. Although main processor 100 (or storage device 54) can directly supply display processor 500 commands, for 3D images the signal processor 400 generally needs to perform the transformation processes described above to generate display processor commands representing transformed, projected lighted, clipped, culled primitives.

The repertoire of display processor commands is set forth in FIGS. 46–118. Signal processor 400 is responsible for formatting appropriately the display processor commands it generates, and for including the appropriate information and address information in the commands. In addition, signal processor 400 may generate and provide certain appropriate mode and attribute commands the display processor may require to render a particular primitive specified by the signal processor using the appropriate parameters (although many of the mode and attribute commands for the display processor 500 are typically supplied directly by main processor 100 under control of game program 108). As mentioned above, main processor 100 can provide any display processor 500 directly, but in general, needs to rely on the signal processor to generate at least some display processor commands whenever 3D objects need to be transformed.

Flow Control Command Processing:

Referring once again to FIG. 11, if the display list command received by signal processor 400 is a flow control command, then signal processor 400 will respond to this command in an appropriate manner to navigate through or traverse the display list 110. The following example commands and formats provide flow control.

Example Flow Control Commands:

G_DL:

| command | param | (not used) |
|---------|-------|------------|
| seg | address ||

↓

|  |
|--|
| · |
| · |
| · |

This command points to another display list and is used to create display list hierarchies, nested display lists, indirect references, etc. The segment field identifies a memory segment. The address field is the offset from the base of that segment. Together, these form an address in main memory 300 pointing to the new display list. A length field (not shown) may describe the length of the new display list in bytes—although in this example it is preferred that all display lists are terminated by a G_ENDDL command. The parameter field holds flags which control the behavior of the transfer. If the flag G_DL_NOPUSH is set, the current display list is not pushed onto the stack before transferring control. This behaves more like a branch or go to, rather than a hierarchial display list (this may be useful to break up a larger display list into non-contiguous memory pieces, then just connect them with display list branches).

G_ENDDL:

| command |  |
|---------|--|
|         |  |

The end display list command terminates this branch of the display list hierarchy, causing a "pop" in the processing of the display list hierarchy. This command is most useful for constructing display list pieces of variable or unknown size, terminated with an end command instead of providing a display list length a priori. All display lists must terminate with this command.

G_NOOP:

| command |  |  |  |
|---------|--|--|--|
|         |  |  |  |

This command does nothing. It is generated internally under some circumstances.

FIG. 11, block 652 performs the function of maintaining a display list stack in main memory 300 and, pushing and nooping (traversing) this display list stack. Block 652 halts signal processor 400 when the signal processor encounters an "open end" display list command.

SIGNAL PROCESSOR MICROCODE AUDIO PROCESSING

Signal processor 400 in this example performs digital audio processing in addition to the graphics processing discussed above. Signal processor vector unit 420 is especially suited for performing "sum of products" calculations that are especially useful in certain types of digital signal processing for audio signals such as, for example, audio decompression, wavetable resampling, synthesis and filtering. Digital spatial and/or frequency filtering with a relatively large number of taps can be accommodated without loss of precision because of the 48-bit-wide accumulators contained with vector unit data paths 423. As one example of a particular optimum usage of vector unit 420 for audio processing, the eight separate register files 422 and associated data paths 423 of signal processor vector unit 420 can be used to simultaneously process eight different MIDI voices in parallel. The following are examples of additional audio processing that can be efficiently performed using vector unit 420:

solving polynomial equations, processing 8 audio voices or 8 time samples in parallel, wavetable synthesis using cubic interpolation, wherein four of the vector unit data paths 423 are used to process one sample, and the other four vector unit data paths are used to process a second sample, audio enveloping processing wherein the 8 vector unit data paths can each multiply a different audio sample by a different weighting factor, and audio mixing processing wherein the 8 vector unit data paths can each multiply a different audio sample by a corresponding mixer weighting factor.

Because signal processor 400 can perform audio digital signal processing efficiently at high speed, it takes the signal processor only a small fraction of an audio playback real time interval to perform and complete the digital audio processing associated with that time interval. For example, signal processor 400 takes much less than 1/30th of a second to digitally process audio that coprocessor audio interface 208 will playback in real time over a 1/30th of a second time interval. Because of this capability, signal processor 400 in this example can be time-shared between graphics processing and digital audio processing.

Generally, main processor 100 gives signal processor 400 a task list 250 at the beginning of a video frame that specifies the image and sound to be produced during the next succeeding video frame. Coprocessor 200 must be finished with both the audio and graphics processing for this next succeeding frame by the time that next succeeding frame begins. Because video display and audio playback is a real time continuous process (i.e., a new video image must be provided each video frame time, and audio must be continuously provided), coprocessor 200 needs to finish all audio and video signal processing associated with each next succeeding video frame by the time that next frame begins.

In this example, signal processor 400 is shared between graphics processing and digital audio signal processing. Because of the high speed calculating capabilities of signal processor vector unit 420, signal processor 400 is able to complete processing of the audio to be played during the next succeeding video frame in much less than the current video frame time, and is also able to complete graphics processing for the image to be displayed during the next succeeding image in less than the current frame time. This allows task list 250 to specify both graphics display lists and audio play lists that all must be completed by signal processor 400/coprocessor 200 by the beginning of the next video frame time. However, in this example there is nothing to prevent main processor 100 from giving coprocessor 200 a task list 250 that the coprocessor cannot complete before the next video frame begins. If the combined audio and graphics processing required by signal processor 400 is sufficiently intensive and time-consuming, the signal processor 400 can work on processing the task list for the entire current video frame and still not be done by the beginning of the next video frame. It is up to video game program 108 to avoid overtaxing coprocessor 200, and to handle any overtaxing in an appropriate manner should it occur. A video game programmer can avoid overtaxing signal processor 400 by ensuring that all display lists 110 are organized efficiently, modeling the objects in 3-D in an efficient manner, and taking precautions to ensure that extensive time consuming processing (e.g., clipping) is avoided or minimized. Even with such precautions, however, it may take coprocessor 200 more than a single video frame time to complete especially complicated images. A video game programmer can handle this situation by slowing down the effective frame rate so that television 58 redisplays the same image stored in one part of frame buffer 118 for multiple video frames during which time coprocessor 200 can complete processing the next image. Because the user may perceive a variable frame rate as undesired delay, it is often best to slow down the overall effective frame rate to the rate required for coprocessor 200 to complete the most processing-intensive images—thus preventing more complex images from appearing more slowly than less complex images.

With respect to audio processing, it is generally unacceptable to fail to provide audio for a given video frame time since the user will hearing a disturbing "click" in a stream of otherwise continuous audio. Such audio disruptions are easily heard and can be annoying. Therefore, they should be avoided. One way to avoid an easily detectable audio disruption in a situation where signal processor 400 has failed to complete its assigned audio processing in time is for main processor 100 to command audio interface 208 to replay the last frame's worth of audio during the next succeeding frame. Acceptable audio can be produced in this way without the user noticing a disruption if done carefully. Other strategies include having signal processor 400 process multiple video frames worth of audio within a single video frame time-thereby providing an effective audio "frame" rate that is different (faster) than the effective video frame rate. By "effective frame rate" we mean the rate at which coprocessor 200 produces a frame's worth of information (in this example, the television actual video frame rate stays constant).

Example Audio Software Architecture

FIG. 14 shows an example of the overall software architecture provided by system 50 to synthesize and manipulate audio. This overall software architecture 700 includes four software objects, in this example a sequence player 702, a sound player 704, a synthesis driver 706 and audio synthesis microcode 708. In this example, sequence player 702, sound player 704, and synthesis driver 706 all execute on main processor 100, and audio synthesis microcode 708 runs on coprocessor signal processor 400. Thus, sequence player 702, sound player 704 and synthesis driver 706 are each supplied as part of game program 108 of storage device 54, and audio synthesis microcode 708 is supplied as part of SP microcode 156.

Sequence player 702, sound player 704 and synthesis driver 706 may differ depending on the particular video game being played. In general, sequence player 702 is responsible for the playback of Type 0 MIDI music sequence files. It handles sequence, instrument bank and synthesizer resource allocation, sequence interpretation, and MIDI message scheduling. Sound player 704 is responsible for the playback of all ADPCM compressed audio samples. It is useful for sound effects and other streamed audio. Synthesis driver 706 is responsible for creating audio play lists 110 which are packaged into tasks by main processor 100 under software control and passed to coprocessor 200 in the form of task lists 250. In this example, synthesis driver 706 allows sound player 704 or other "clients" to assign wave tables to synthesizer voices, and to control playback parameters. As discussed above, the audio synthesis microcode 708 processes tasks passed to it and synthesizes L/R stereo 16-bit samples, which signal processor 400 deposits into audio buffers 114 within main memory 300 for playback via audio interface 208, audio DAC140 and amplifier/mixer 142.

In this example, synthesis driver 706 passes audio tasks to signal processor 400 in the form of audio "frames." A "frame" is a number of audio samples-usually something close to the number of samples required to fill a complete video frame time at the regular video frame rate (for example, 30 or 60 Hz). Although television set 58 receives and processes audio signals in a continuous stream unconstrained by any video frame rate parameter (e.g., the television can generate audio during horizontal and vertical video blanking and retrace), system 50 in this example organizes audio processing in terms of video frame rate because signal processor 400—which is shared between audio and graphics processing—must operate in accordance with the video frame rate because the graphics related tasks it performs are tied to the video frame rate.

Example Play List Processing

FIG. 15 shows an example of a simple signal processor play list process. The FIG. 15 process is specified by a play list 110 generated by main processor 100 under control of video game program 108, and specified as part of a task list 250. Thus, the FIG. 15 SP play list process is an example of an output of synthesis driver 706 that is provided to signal processor 400 in the form of an audio play list 110.

Because of the limited size of instruction memory 402 in this example, audio synthesis microcode 708 is generally not continuously resident within signal processor 400. Instead, the initialization microcode main processor 100 arranges to be loaded into instruction memory 402 (see FIG. 9, block 604), ensures that the appropriate audio microcode routine is loaded into the instruction memory for audio processing (also ensures that the appropriate graphics microcode routine is loaded into the instruction memory for graphics processing). The steps shown in FIG. 15 assume that the audio synthesis microcode 708 is resident within the signal processor instruction memory 402, and that the signal processor 400 is reading an audio play list 110 specifying the steps shown.

Generally, the first task of an audio play list 110 is to set up buffers within signal processor data memory 408 required to perform the audio processing task (FIG. 15, block 710). Generally, this buffer set up process involves allocating areas within data memory 404 to be used as one or more audio input buffers, and allocating an audio output buffer within the data memory. Generally, main processor 100 also commands signal processor 400 to use its DMA facility 454 to retrieve audio input data 112b from main memory into the allocated input buffer(s) for processing. Main processor 100 may next set certain attributes (e.g., volume ranges and change rates) to be used for the audio processing (FIG. 15, block 712). Main processor 100 then specifies the types of signal processing to be performed by signal processor 400 along with appropriate parameters (FIG. 15, block 714). In this example, main processor 100 can specify decompression, resampling, envelope/pan, mixing, and other processing (e.g., reverb) to be performed individually or in combination. The audio play list 110 typically will terminate with a command to save the contents of the output audio buffer stored in signal processor data memory 404 into main memory 300 (block 716).

Example Audio Synthesis Microcode

FIG. 16 shows the overall tasks performed by audio synthesis microcode 708 in this example. Signal processor 400 under microcode control retrieves the next play list command from the current audio play list 110, and determines what kind of command it is (FIG. 16, block 718). In this example, the audio command within an audio play list 110 may fall into the following general types:

buffer command flow control command attribute command decompress command resample command envelope/pan command mix command special signal processing/effects command.

Buffer Command Processing:

Buffer commands manage audio buffers within signal processor data memory 404, and permit audio data to be transferred between the data memory and main memory 300. The following are examples of buffer command formats and associated functions:

Example Buffer Commands:

A_SETBUFF:

| command | | dmemin |
|---|---|---|
| dmemout | | count |

This command sets the internal signal processor data memory 404 buffer pointers and count value used by the processing commands. This command is typically issued before any processing command dmemin points to an input buffer, dmemout to an output buffer and count defines the number of 16 bit samples to process.

A_LOADBUFF:

| command | |
|---|---|
| seg | address |

This command loads a signal processor data memory 404 buffer from the main memory 300 address given by the seg+address fields. The SP data memory buffer location and the number of 16 bit samples to load are defined by issuing an A_SETBUFF command prior to the A_LOADBUFF command.

A_CLEARBUFF:

| command | | dmemin |
|---|---|---|
| | | count |

This command clears an area of size count 16 bit samples starting at the signal processor 400 data memory address given by dmem.

A_SAVEBUFF:

| command | |
|---|---|
| seg | address |

This command saves a buffer of 16 bit samples in the signal processor data memory 404 to the main memory 300 address given by the seg+address field. The input SP data memory buffer and number of samples are defined by issuing a A_SETBUFF command.

A_SEGMENT:

| command | |
|---|---|
| seg | address |

See graphics G-SEGMENT command. This command is used to map indirect "segment" addresses into main memory 300 physical addresses.

Referring again to FIG. 16, signal processor audio synthesis microcode 708 performs the specified buffer command by establishing, managing, writing data into, or reading data from the associated data memory buffer 409 (FIG. 16, block 720). Typically, signal processor 400 may use its DMA facility 454 to transfer data between main memory 300 and signal processor memory 404 in order to retrieve audio input data for processing or save audio data into main memory for playback by audio interface 208.

Flow Control Command Processing:

If the next play list command is a flow control command, signal processor 400 responds to the command by traversing the current audio play list in the manner specified by the command. Nesting of audio play lists 110 is preferably permitted, and signal processor 400 may maintain an audio play list stack in main memory 300 (just as it may do for graphics display lists).

Attribute Command Processing:

If the next audio play list command is an attribute command, signal processor 400 processes the command by establishing appropriate mode and/or attribute conditions to be used for subsequent audio processing (FIG. 16, block 724). In this example, audio synthesis microcode 708 supports the following example attribute command format and associated function:

Example Attribute Commands:

A_SETVOL:

| command | volume |
|---|---|
| volume target | volume rate |

This command is used to set the volume parameters for subsequent processing commands. Currently this should be issued prior to A_ENVELOPE, A_PAN and A_RESAMPLE.

Decompress Command Processing

If the next audio play list command retrieved by signal processor 400 is a decompression command, the signal processor performs a decompression operation to decompress a compressed audio binary stream stored in an input buffer within data memory 404 to produce 16-bit audio samples which it stores in a defined audio output buffer within its data memory (FIG. 16, block 726). In this example, audio synthesis microcode 708 supports the following audio decompression command format and associated function:

Example Decompression Command:

A_ADPCM:

| command | flags | gain |
|---|---|---|
| seg | address | |

This command decompresses a binary stream in signal processor data memory 404 to produce 16 bit samples. The addresses in the data memory 404 for the input and output buffers and the number of samples to process are defined by issuing a A_SETBUFF command prior to the A_ADPCM command. The seg+address field points to a main memory 300 location which is used to save and restore state. The gain parameter is used to scale the output and is represented as S.15.

The flags define the behavior of the command. Currently defined flags are:

| | |
|---|---|
| A_INIT, | The seg + address field is used to restore state at the beginning of the command. If not set the pointer to state is ignored upon initiation, however, state is saved to this address at the end of processing. |
| A_MIX, | The results are mixed into the output buffer. If not set results are put into the output buffer. |

Resample Command Processing:

If the next audio play list command signal processor 400 reads is a resample command, then the signal processor provides pitch shifting/resampling as well as integral envelope modulation based on the parameters specified in the command (FIG. 16, block 728). The following is an example of a resample command and associated function supported by audio synthesis microcode 708.

Example Resample Command:

A_RESAMPLE:

| command | flags | pitch |
|---|---|---|
| seg | address | |

This command provides pitch shifting/resampling as well as integral envelope modulation. The signal processor data memory 404 input and output buffers and the number of samples are defined by issuing an A_SETBUFF command, and the volume envelope parameters are defined by issuing an A_SETVOL command. Resampling factor is defined by pitch.

The flags define the behavior of the command. Currently defined flags are:

| | |
|---|---|
| A_INIT, | The seg + address field field is used to restore state at the beginning of the command. If not set the pointer to state is ignored upon initiation, however, state is saved to this address at the end of processing. |
| A_MIX, | The results are mixed into the output buffer. If not set results are put into the output buffer. |

Envelope/Pan Command Processing:

If the next audio play list command signal processor 400 reads is an envelope/pan command, the signal processor performs that command by modulating one or two audio signal streams using a linear envelope (FIG. 16, block 730). An envelope command multiplies an audio input sample stream by a linear function, and is thus able to ramp the volume of the audio up or down. A "pan" command generally applies inverse linear functions to audio in left and right stereo channels—accomplishing the effect of moving the perceived source of a sound or voice in space (i.e., from left to right or from right to left). The following examples of envelope/pan command formats and associated functions are supported by audio synthesis microcode 708 in this example of system 50.

Example Envelope/Pan Commands:

A_ENVELOPE:

| command | flags | |
|---|---|---|
| seg | | address |

This command modulates a sample stream using a linear envelope. The parameters for the volume envelope are defined by issuing A_SETVOL and the signal processor data memory 404 buffer locations and number of samples to process are defined by issuing an A_SETBUFF prior to issuing the A_ENVELOPE command.

The flags define the behavior of the command. Currently defined flags are:

| | |
|---|---|
| A_INIT, | The seg + address field field is used to restore state at the beginning of the command. If not set the pointer to state is ignored upon initiation, however, state is saved to this address at the end of processing. |
| A_MIX, | The results are mixed into the output buffer. If not set results are put into the output buffer. |

A_PAN:

| command | flags | dmemout2 |
|---|---|---|
| seg | | address |

This command provides 1 input, 2 output panning. Input, first output and number of samples are defined by issuing an A_SETBUFF command and the panning parameters are defined by issuing an A_SETVOL command. The second output is defined by dmemout2.

The flags defined the behavior of the command. Currently defined flags are:

| | |
|---|---|
| A_INIT, | The seg + address field field is used to restore state at the beginning of the command. If not set the pointer of state is ignored upon initiation, however, state is saved to this address at the end of processing. |
| A_MIX, | The results are mixed into the output buffer. If not set results are put into the output buffer. |

Mixing Command Processing:

If the next audio play list command is a mixing command, signal processor 400 performs a mixing function to mix two audio input sample streams into the output audio buffer (FIG. 16, block 732). The following example mixing command format and associated function is supported by signal processor 400 and audio synthesis microcode 708 in this example.

Example Mixer Command:

A_MIXER:

| command | | gain |
|---|---|---|
| | | dmemoutf |

This command provides a double precision mixing function. The single precision input is added to the double precision output after multiplication by gain dmemoutf points to a signal processor data memory 404 area which stores the fractional part of the mixed stream. The input buffer, number of samples and integer part of the mixed output are defined by issuing an A_SETBUFF prior to the A_MIX Special Audio Effects Processing:

If the next audio play list command is a special signal processing/effects command, signal processor 400 executes the command by providing the specified special effect or signal processing (FIG. 16, block 734). An example special signal processing/effect is the addition of reverberation to create presence. This special effect simulates sound reflection in caves, concert halls, etc., and can also be used for various other special effects. Signal processor 400 and audio synthesis microcode 708 supports the following example reverberation special effects command format and associated function:

Example Effects Command:

A_REVERB:

| command | flags | |
|---|---|---|
| seg | | address |

This command applies the reverb special effect to a sample stream. Signal processor data memory 404 input, output and number of samples are defined by issuing an A_SETBUFF command.

The flags define the behavior of the command. Currently defined flags are:

| | |
|---|---|
| A_INIT, | The seg + address field field is used to restore state at the beginning of the command. If not set the pointer to state is ignored upon initiation, however, state is saved to this address at the end of processing. |
| A_MIX, | The results are mixed into the output buffer. If not set results are put into the output buffer. |

Audio Processing Structure:

To accomplish each of audio processing functions 728, 730, 732, 734 in this example, audio synthesis microcode 708 uses a general purpose effects implementation that manipulates data in a single delay line. FIG. 17 shows an example general purpose audio processing implementation 740. In this example, the audio input samples can be conceived of as being applied to the input of contiguous single delay line 742. The output tap of the delay line is applied through a gain 744 to the audio output buffer within signal processor data memory 404. Samples from another tap on delay line 742 are passed through a summer 746 and returned to the delay line directly (over path 748) and also through a coefficient block 750, another summer 752 and a low pass filter 754. A further tap 756 from delay line 742 is connected to the other input of summer 752 and also to the other input of summer 746 (this time through a further coefficient block 758). This generalized implementation 740 allows a particular effect to be constructed by attaching an arbitrary number of effect primitives to single delay line 742. The parameters for each primitive in the effect are passed through via the commands discussed above. Each primitive consists of an all-pass with a variable length tap followed by a DC normalize (unity gain at DC) single poll low-pass filter 754 followed by an output gain 744 specifying how much of this primitive's output is to be contributed to the final effect output. The value of each of the parameters for a primitive specifies the function of that primitive as a whole within the effect. Note that in FIG. 17, the feedback coefficient 758 can be used to construct an "all-pass inside a comb" reverb (in response to the a_reverb command discussed above).

The general nature of implementation 740 does not mean that all functions are implemented. Only those functions which are driven by legitimate parameters actually generate audio command operations by signal processor 400. This gives video game programmers a great degree of flexibility in defining an effect that is appropriate in terms of both sonic quality and efficiency.

COPROCESSOR DISPLAY PROCESSOR 500

Figure 18:
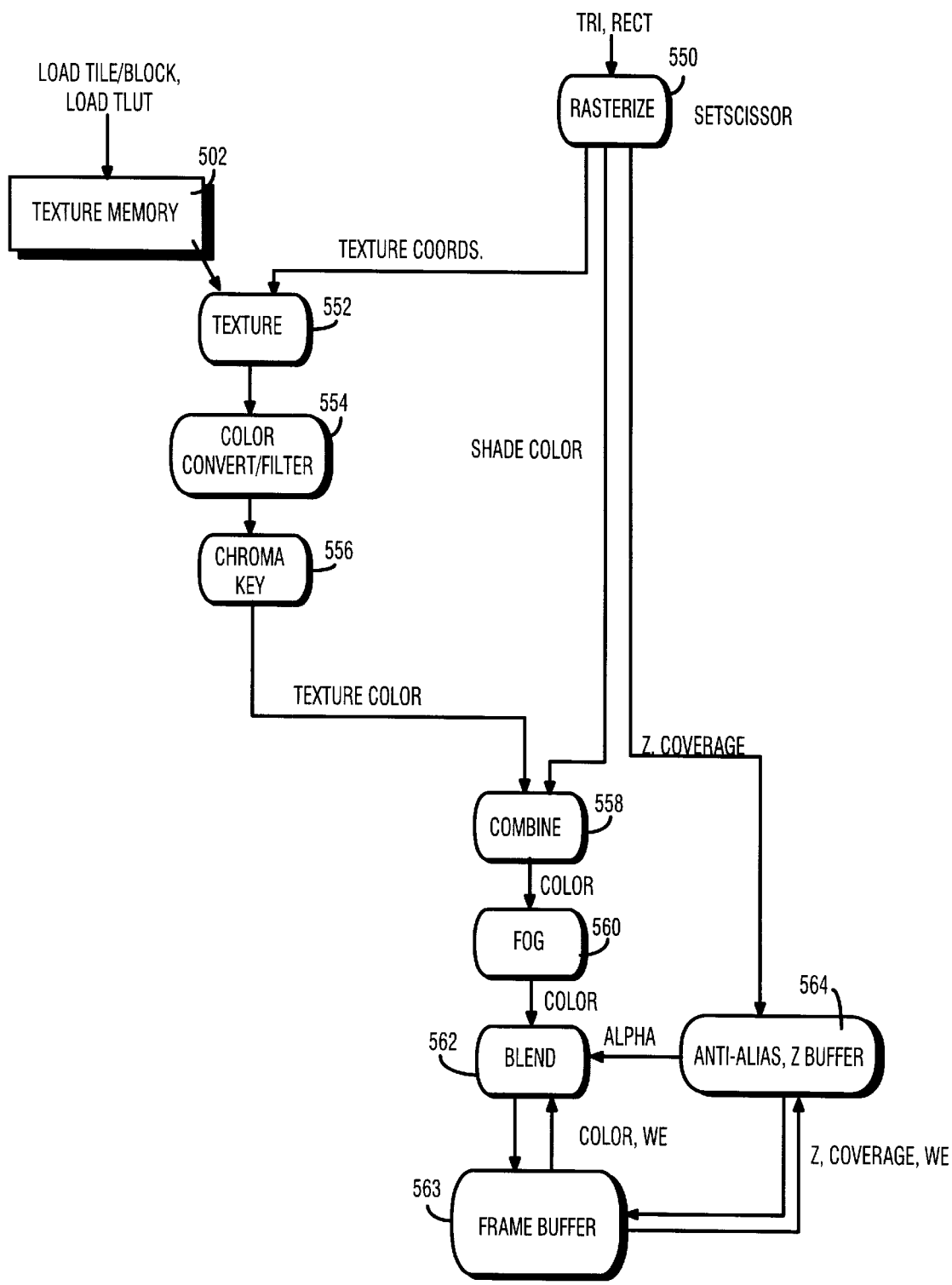
FIG. 18 shows example overall display processor processing steps.

Display processor 500 in this example rasterizes triangles and rectangles and produces high quality pixels that are textured, anti-aliased and z-buffered. FIG. 18 shows the overall processes performed by display processor 500. Display processor 500 receives graphics display commands that, for example, specify the vertices, color, texture, surface normal and other characteristics of graphics primitives to be rendered. In this example, display processor 500 can render lines, triangles, and rectangles. Typically, display processor 500 will receive the specifications for the primitives it is to render from signal processor 400, although it is also possible for main processor 100 to specify these commands directly to the display processor.

The first operation display processor 500 performs on an incoming primitive is to rasterize the primitive, i.e., to generate pixels that cover the interior of the primitive (FIG. 18, block 550). Rasterize block 550 generates various attributes (e.g., screen location, depth, RGBA color information, texture coordinates and other parameters, and a coverage value) for each pixel within the primitive. Rasterize block 550 outputs the texture coordinates and parameters to a texture block 552. Texture block 552 accesses texture information stored within texture memory 502, and applies ("maps") a texel (texture element) of a specified texture within the texture memory onto each pixel outputted by rasterized block 550. A color convert block 554 and a chroma keying block 556 further process the pixel value to provide a texture color to a color combine block 558.

Meanwhile, rasterize block 550 provides a primitive color (e.g., as a result of shading) for the same pixel to color combine block 558. Color combine block 558 combines these two colors to result in a single pixel color. This single pixel color output may have fog applied to it by block 560 (e.g., to create the effect of a smoke filled room, or the less extreme, natural effect of reducing color brilliance as an object moves further away from the viewer). The resulting pixel color value is then blended by a block 562 with a pixel value framebuffer 118 stores for the same screen coordinate location. An additional anti-alias/z-buffer operation 564 performs hidden surface removal (i.e., so closer opaque objects obscure objects further away), anti-aliasing (to remove jaggedness of primitive edges being approximated by a series of pixels), and cause the new pixel value to be written back into framebuffer 118.

The operations shown in FIG. 18 are performed for each pixel within each primitive to be rendered. Many primitives may define a single complex scene, and each primitive may contain hundreds or thousands of pixels. Thus, display processor 500 must process millions of pixels for each image to be displayed on color television set 58.

Typically, framebuffer 118 is "double buffered"—meaning that it is sized to contain two complete television screen images. Display processor 500 fills one screen worth of framebuffer information while video interface 210 reads from the other half of the framebuffer 118. At the end of the video frame, the video interface 210 and display processor 500 trade places, with the video interface reading from the new image representation just completed by display processor 500 and the display processor rewriting the other half of the framebuffer. This double buffering does not give display processor 500 any more time to complete an image; it must still finish the image in nominally one video frame time (i.e., during the video frame time just prior to the frame time during which the new image is to be displayed).

Pipelining:

Because high speed operation is very important in rendering pixels, display processor 500 has been designed to operate as a "pipeline." Referring again to FIG. 18 "pipelining" means that the various steps shown in FIG. 18 can be performed in parallel for different pixels. For example, rasterize block 550 can provide a first pixel value to texture block 552, and then begin working on a next pixel value while the texture block is still working on the first pixel value. Similarly, rasterize block 550 may be many pixels ahead of the pixel that blend block 562 is working on.

In this example, display processor 500 has two different pipeline modes: one-cycle mode, and two-cycle mode. In one-cycle mode, one pixel is processed for each cycle time period of display processor 500. A one-cycle mode operation is shown in FIG. 19A. Note that the operations shown in FIG. 19A are themselves pipelined (i.e., the blend operation 562 operates on a different pixel than the rasterize operation 550 is currently rasterizing), but the overall operation sequence processes one pixel per cycle.

FIG. 19B shows the two-cycle pipeline mode operation of display processor 500 in this example. In the FIG. 19B example, some of the operations shown in FIG. 18 are performed twice for each pixel. For example, the texture and color convert/filtering operations 552, 554 shown in FIG. 18 are repeated for each pixel; the color combine operation 558 is performed twice (once for the texture color output of one texture operation, and once for the texture color output of the other texture operation). Similarly, blend operation 562 shown in FIG. 18 is performed twice for each pixel.

Even though these various operations are performed twice, display processor 500 in this example does not contain duplicate hardware to perform the duplicated operations concurrently (duplicating such hardware would have increased cost and complexity). Therefore, in this example, display processor 500 duplicates an operation on a pixel by processing it with a particular circuit (e.g., a texture unit, a color combiner or a blender), and then using, the same circuit again to perform the same type of operation again for the same pixel. This repetition slows down the pipeline by a factor of two (each pixel must "remain" at each stop in the pipeline for two cycles instead of one), but allows more complicated processing. For example, because the two-cycle-per-pixel mode can map two textures onto the same pixel, it is possible to do "trilinear" ("mipmapping") texture mapping. In addition, since in this example, display processor 500 uses the same blender hardware to perform both the fog operation 560 and the blend operation 562 (but cannot both blend and fog simultaneously), it is generally necessary to operate in the two-cycle-per-pixel mode to provide useful fog effects.

The following tables summarize the operations performed by the various blocks shown in FIGS. 19A and 19B during the one-cycle and two-cycle modes:

| Display Processor Pipeline Block Functionality in One-Cycle Mode | |
|---|---|
| Block | Functionality |
| Rasterize 550 | Generates pixel and its attribute covered by the interior of the primitive. |
| Texture 552 | Generates 4 texels nearest to this pixel in a texture map. |
| Filter Texture 554 | Bilinear filters 4 texels into 1 texel, OR performs step 1 of YUV-to-RGB conversion. |
| Combine 558 | Combines various colors into a single color, OR performs step2 of YUV-to-RGB conversion. |
| Blend 562 | Blends the pixel with framebuffer memory pixel, OR fogs the pixel for writing to framebuffer. |
| Framebuffer 563 | Fetches and writes pixels (color and z) from and to the framebuffer memory. |

| Display Processor Pipeline Block Functionality in Two-Cycle Mode | |
|---|---|
| Block | Functionality |
| Rasterize 550 | Generates pixel and its attribute covered by the interior of the primitive. |
| Texture 552a | Generates 4 texels nearest to this pixel in a texture map. This can be level X of a mipmap. |
| Texture 552b | Generates 4 texels nearest to this pixel in a texture map. This can be level X + 1 of a mipmap. |
| Filter Texture 554a | Bilinear; filters 4 texels into 1 texel. |
| Filter Texture 554b | Bilinear; filters 4 texels into 1 texel. |
| Combine 558a | Combines various colors into a single color, OR linear interpolates the 2 bilinear filtered texels from 2 adjacent levels of a mipmap, OR performs step 2 of YUV-to-RGB conversion. |
| Combine 558b | Combines various colors into a single color, OR chroma keying. |
| Blend 562a | Combines fog color with resultant CC1 color. |
| Blend 562b | Blends the pipeline pixels with framebuffer memory pixels. |
| Framebuffer 563a | Read/modify/write color memory; and |
| Framebuffer 563b | Read/modify/write Z memory. |

Fill and Copy Operations:

Display processor 500 also has a "fill" mode and a "copy" mode, each of which process four pixels per cycle. The fill mode is used to fill an area of framebuffer 118 with identical pixel values (e.g., for high performance clearing of the framebuffer or an area of it). The copy mode is used for high-performance image-to-image copying (e.g., from display processor texture memory 502 into a specified area of framebuffer 118). The copy mode provides a bit "blit" operation in addition to providing high performance copying in the other direction (i.e., from the framebuffer into the texture memory).

The pipeline operations shown in FIGS. 19A and 19B are largely unused during the fill and copy modes, because in this example, the operations cannot keep up with the pixel fill or copy rate. However, in this example, an "alpha compare" operation (part of blend operation 562) is active in the copy mode to allow display processor 500 to "blit" an image into framebuffer 118 and conditionally remove image pixels with the word alpha=0 (e.g., transparent pixels).

The display processor's mode of operation is selected by sending the display processor 500 a "set other mode" command specifying a "cycle type" parameter. See FIGS. 46–118. In the one-cycle-per-pixel or two-cycle-per-pixel pipeline modes, additional display processor 500 commands are available to insure that pipeline synchronization is maintained (e.g., so that the pipeline is emptied of one primitive before the parameters of another primitive take effect). See "Sync Pipe" command set forth in FIGS. 46–118.

EXAMPLE DISPLAY PROCESSOR 500 ARCHITECTURE

Figure 20:
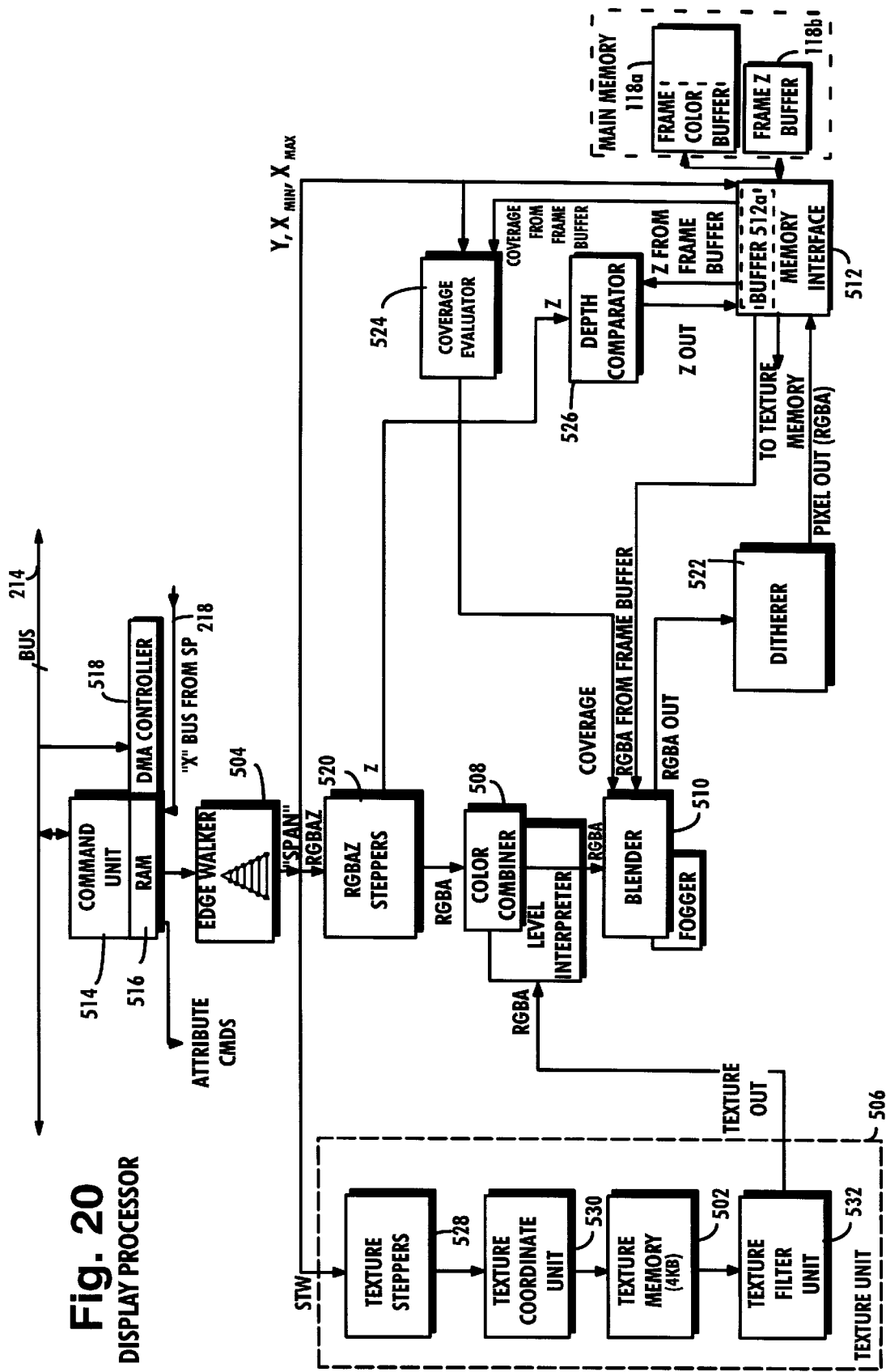
FIG. 20 shows an example display processor architecture.

FIG. 20 shows an example architecture of display processor 500. In this example, display processor 500 includes a command unit 514 with associated RAM 516 and DMA controller 518; an "edge walker"/rasterizer 504; a RGBAZ pixel stepper 520; a color combiner/level interpreter 508, a blender/fogger 510, a ditherer 522, a coverage evaluator 524, a depth (z) comparator 526, a memory interface 512 and a texture unit 506. In this case, texture unit 506 includes, in addition to texture memory 502, texture steppers 528, a texture coordinate unit 530 and a texture filter unit 532.

Command unit 514 and DMA controller 518 connect to coprocessor main internal bus 214, and also connect to the signal processor 400 via a private "x" bus 218. Memory interface 512 is a special memory interface for use by display processor 500 primarily to access to the color framebuffer 118a and the z buffer 118b stored within main memory 300 (thus, display processor 500 has access to main memory 300 via memory interface 512 and also via coprocessor internal bus 214).

DMA Controller:

DMA controller 518 receives DMA commands from signal processor 400 or main processor 100 over bus 214. DMA controller 518 has a number of read/write registers shown in FIGS. 21A–21C that allow signal processor 400 and/or main processor 100 to specify a start and end address in SP data memory 404 or main memory 300 from which to read a string of graphics display commands (FIG. 21A shows a start address register 518A, and FIG. 21B shows an end address register 518B). DMA controller 518 reads data over main coprocessor bus 214 if registers 518a, 518b specify a main memory 300 address, and it reads data from the signal processor's data memory 404 over private "x bus" 214 if the registers 518a, 518b specify a data memory 404 address. DMA controller 518 also includes a further register (register 518C shown in FIG. 21C) that contains the current address DNA controller 518 is reading from. In this example, DMA controller 518 is uni-directional—that is, it can only write from bus 214 into RAM 516. Thus, DMA controller 518 is used in this example for reading from signal processor 400 or main memory 300. In this example, display processor 500 obtains data for its texture memory 502 by passing texture load commands to command unit 514 and using memory interface 512 to perform those commands.

Command Unit:

Command unit 514 retains much of the current state information pertaining to display processor 500 (e.g., mode and other selections specified by "set commands"), and outputs attributes and command control signals to specify and determine the operation of the rest of display processor 500. Command unit 514 includes some additional registers that may be accessed by main processor 100 (or signal processor 400) via coprocessor bus 214. These additional registers, which are mapped into the address space of main processor 100, permit the main processor to control and monitor display processor 500.

For example, command unit 514 includes a status/command register 534 shown in FIG. 21D that acts as a status register when read by main processor 100 and acts as a command register when the main processor writes to it. When reading this register 534, main processor 100 can determine whether display processor 500 is occupied performing a DMA operation reading from signal processor data memory 404 (field 536(1); whether the display processor is stalled waiting for access to main memory 300 (field 536(2); whether the display processor pipeline is being flushed (field 536(3); whether the display processor graphics clock is started (field 536(4); whether texture memory 502 is busy (field 536(5); whether the display processor pipeline is busy (field 536(6); whether command unit 514 is busy (field 536(7); whether the command buffer RAM 516 is ready to accept new inputs (field 536(8); whether DMA controller 518 is busy (field 536(9); and whether the start and end addresses and registers 518a and 518b respectively valid (fields 536 (10), 536(11). When writing to this same register 534, main processor 100 (or signal processor 400) can clear an X-bus DMA operation from the signal processor 400 (field 538 (1); begin an X-bus DMA operation from signal processor data memory 404 (field 538(2); start or stop the display process (fields 538 (3), 538(4); start or stop a pipeline flushing operation (fields 538 (5), 538(6); clear a texture memory address counter 540 shown in FIG. 21H (field 538 (7); clear a pipeline busy counter 542 shown in FIG. 21F (field 538(8); clear a command counter 544 used to index command buffer RAM 516 (field 538(9) (the counter 544 is shown in FIG. 21G); and clear a clock counter 546 (see FIG. 21E) used to count clock cycles (field 538 (10).

As mentioned above, the clock count, buffer count, pipeline count and texture memory count can all be read directly from registers 540–546 (see FIGS. 21E–21H). In addition, main processor 100 or signal processor 400 can read and control the BIST operation pertaining to texture memory 502 (see BIST status/control register 548 shown in FIG. 21I), and can also enable and control testing of memory interface 512 by manipulating mem span test registers 549(a), 549(b) and 549(c) shown in FIG. 21J.

Referring back to FIG. 20, once one or more commands have been loaded into command unit buffer ram 518 and display processor 500 has been started, command unit 514 begins reading and processing each command sequentially. The repertoire of commands display processor 500 understands are set forth in FIGS. 46–118. Hardware (e.g., logic, gate arrays and the like) within display processor 500 directly interpret the graphics display commands within RAM 516. In this example, display processor 500 has no ability to branch or jump in traversing this list of commands. Rather, display processor 500 in this example is a sequential state machine that accepts each new command as an input in strict sequence and alters its states and outputs in response to the command.

Display processor 500 halts if its command buffer RAM 516 is empty (i.e., it has processed all of the commands in the buffer, which buffer acts as a FIFO). Main processor 100 or signal processor 400 can determine if display processor 500 has halted by reading display processor status register 534 and may, if desired, pass the display processor a command that stalls the display processor temporarily (see "Sync Full" command in FIGS. 46–118).

Edgewalker and Steppers:

Edgewalker 504 shown in FIG. 20 performs the rasterize process 550 shown in FIG. 18. In this example, edgewalker 504 receives the edge coefficients, shade coefficients, texture coefficients and z buffer coefficients specified in a "triangle command" (see FIGS. 46–118 specifying a particular primitive open line, triangle or rectangle), and outputs "span" values from which the following attributes for each pixel enclosed within the primitive can be derived:

a screen x, y location z depth for z buffer purposes

RGBA color information s/w, t, w, 1/w texture coordinates, level-of-detail for texture index, perspective correction, and mipmapping (these are commonly referred to S, t, w, 1)

coverage value (pixels on the edge of a primitive have partial coverage values, whereas pixels within the interior of a primitive are full).

Edgewalker 504 sends the parameters for a line of pixels across the primitive (a "span") to the pipeline hardware downstream for other computations. In particular, texture steppers 528 and RGBAZ steppers 520 receive the "span" information specified by edgewalker 504, and step sequentially along each pixel in the horizontal line (in the view plane coordinate system) of the "span" to derive the individual texture coordinates and RGBAZ values for each individual pixel in the span.

The RGBAZ stepper 520 may also perform a "scissoring" operation on triangle primitives (this does not work for rectangles in this example) to efficiently eliminate portions of triangle primitives extending outside of a view plane scissoring rectangle. Scissoring is commonly used to eliminate running performance-intensive clipping operations on signal processor 400. Scissoring is similar in concept to clipping, but whereas clipping is performed in the 3-D coordinate system, scissoring is performed in the 2-D coordinate system of the viewing plane. Scissoring by steppers 520, 528 is invoked by sending display processor 500 a "set scissor" command (see FIGS. 46–118).

As mentioned above, steppers 520 produces color and alpha information for each pixel within the "span" defined by edgewalker 504. Similarly, texture steppers 528 produces texture coordinate values (s, t, w) for each pixel within the span. Steppers 520, 528 operate in a synchronized fashion so that texture unit 506 outputs a mapped texture value for a pixel to color combiner 58 at the same time that the RGBAZ steppers 520 output a color value for the same pixel based on primitive color, shading, lighting, etc.

Texture Unit:

Texture unit 506 in this example takes the texture coordinates s, t, w and level-of-detail values for a pixel (as mentioned above, texture steppers 528 derive these values for each individual pixel based upon "span" information provided by edgewalker 504), and fetches appropriate texture information from onboard texture memory 502 for mapping onto the pixel. In this example, the four nearest texels to the screen pixel are fetched from texture memory 502, and these four texel values are used for mapping purposes. Video game program 108 can manipulate texture states such as texture image types and formats, how and where to load texture images, and texture sampling attributes.

Texture coordinate unit 530 computes appropriate texture coordinates for mapping texture stored within texture memory 502 onto the primitive being rendered. Since the 2-dimensional textures stored in texture memory 502 are square or rectangular images that must be mapped onto triangles of various sizes, the texture coordinate in 530 must select appropriate texels within the texture to map onto pixels in the primitive to avoid distorting the texture. See *OpenGL Programming Guide* at 278.

Texture coordinate unit 530 computes a mapping between the inputted pixel texture coordinates and four texels within the appropriate texture stored in texture memory 502. Texture coordinate unit 530 then addresses the texture memory 502 appropriately to retrieve these four texels. The four texel values are passed to the texture filter unit 532. Texture filter 532 takes the four texels retrieved from texture memory 502 and produces a simple bilinear-filtered texel. Texture filter 532 in this example can perform three types of filter operations: point sampling, box filtering, and bilinear interpolation. Point sampling selects the nearest texel to the screen pixel. In the special case where the screen pixel is always the center of four texels, the box filter can be used. In the case of the typical 3-D, arbitrarily rotated polygon, bilinear filtering is generally the best choice available. For hardware cost reduction, display processor texture filter unit 532 does not implement a true bilinear filter. Instead, it linearly interpolates the three nearest texels to produce the result pixels. This has a natural triangulation bias which is not noticeable in normal texture images but may be noticed in regular pattern images. This artifact can be eliminated by prefiltering the texture image with a wider filter. The type of filtering performed by texture filter unit 532 is set using parameters in the "set modes" display command (see FIGS. 46–118).

TEXTURE MEMORY 502

Display processor 500 treats texture memory 502 as a general-purpose texture memory. In this example, texture memory 502 is divided into four simultaneously accessible banks, giving output of four texels per clock cycle. Video game program 58 can load varying-sized textures with different formats anywhere in the texture memory 502. Texture coordinate unit 530 maintains eight texture tile descriptors that describe the location of texture images within texture memory 502, the format of each texture, and its sampling parameters. This allows display processor 500 to access as many as eight different texture tiles at a time (more than eight texture tiles can be loaded into the texture memory, but only eight tiles are accessible at any time).

FIG. 22 shows an example of the texture tile descriptors and their relationship to texture tiles stored in texture memory 502. In this particular example shown in FIG. 22, eight different texture tiles 802 are stored within texture memory 502. Each texture tile 802 has an associated texture tile descriptor block 804 (as discussed above, display processor 500 maintains up to eight descriptors 804 corresponding to eight texture tiles stored within texture memory 502). The texture descriptors contain information specified by a "set tile" command (see FIGS. 46–118). For example, these texture tile descriptors specify the image data format (RGBA, YUV, color index mode, etc.), the size of each pixel/texel color element (four, eight, sixteen, thirty-two bits), the size of the tile line in 64-bit words, the starting address of the tile in texture memory 502, a palette number for 4-bit color indexed texels, clamp and mirror enables for each of the S and T directions, masks for wrapping/mirroring in each of S and T directions, level of detail shifts for each of S and T addresses. These descriptors 804 are used by texture coordinate unit 530 to calculate addresses of texels within the texture memory 502.

Texture Coordinate Unit:

FIG. 23 shows a more detailed example of the processing performed by texture coordinate unit 530. FIG. 23 shows the various tile descriptors 804 being applied as inputs to texture coordinate unit 530. FIG. 23 also shows that texture coordinate unit 530 receives the primitive tile/level/texture coordinates for the current pixel from texture steppers 528. Texture coordinate unit 530 additionally receives mode control signals from command unit 514 based, for example, on the "set other mode" and "set texture image" commands (see FIGS. 46–118). Based on all of this input information, texture coordinate unit 530 calculates which tile descriptor 804 to use for this primitive, and converts the inputted texture image coordinates to tile-relative coordinates which the texture coordinate unit wraps, mirrors and/or clamps as specified by the tile descriptor 804. Texture coordinate unit 530 then generates an offset into texture memory 502 based on these tile coordinates. The texture coordinate unit 530 in this example can address 2×2 regions of texels in one or two cycle mode, or 4×1 regions in copy mode. Texture coordinate unit 530 also generates S/T/L fraction values that are used to bi-linearly or tri-linearly interpolate the texels.

Figure 24:
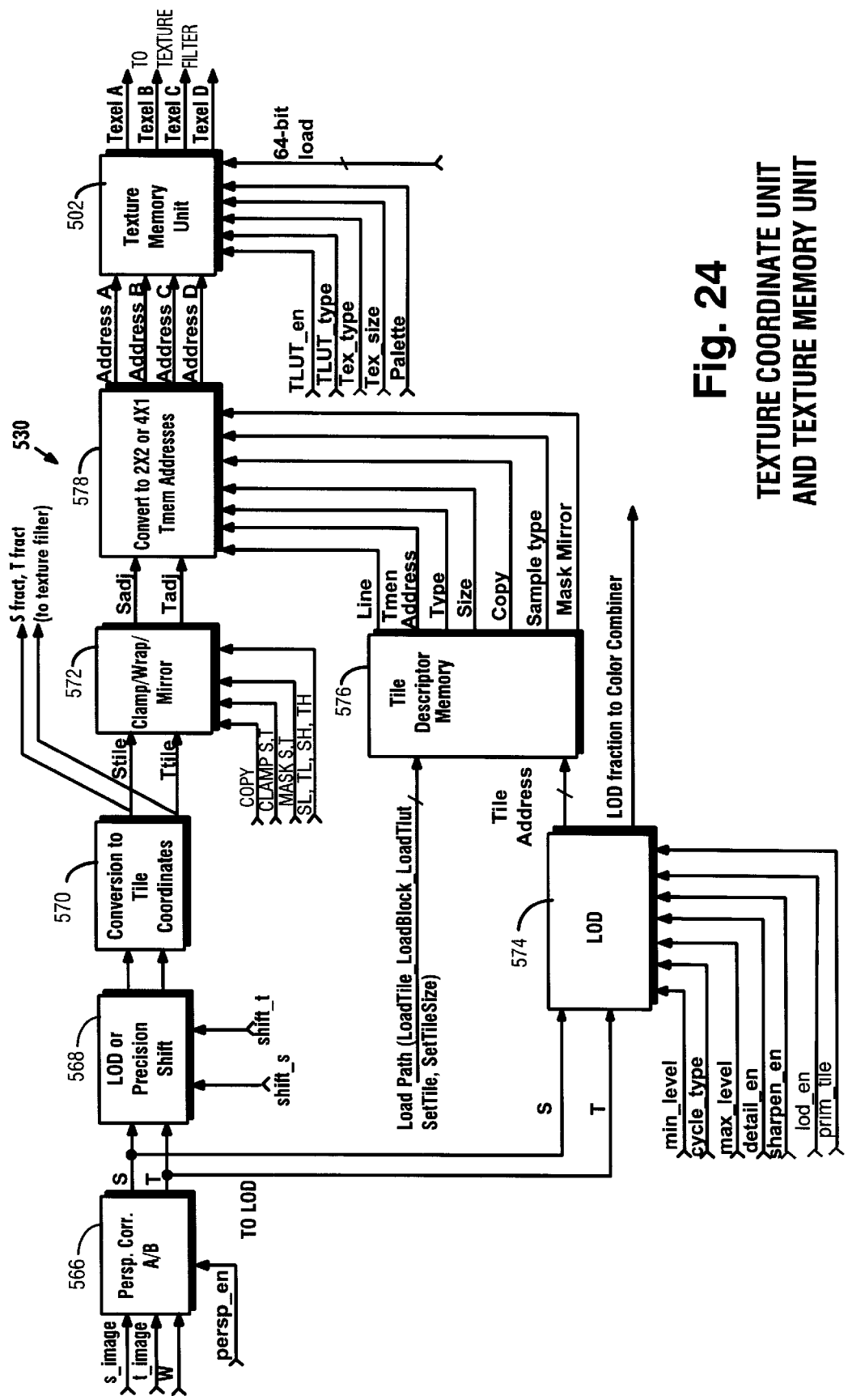
FIG. 24 shows an example texture coordinate unit and texture memory unit architecture.

FIG. 24 is a detailed diagram of texture coordinate unit 530 and texture memory unit 502. As shown in FIG. 24, the incoming s, t, w texture coordinates are inputted into a perspective correction block 566 which provides a perspective correction based on w when perspective correction is enabled. The perspective-corrected s, t values are then provided to a level-of-detail or precision shift block 568 which shifts the texture coordinates after perspective divide (e.g., for MIP mapping and possibly for precision reasons). A block 570 then converts the shifted texture coordinates to tile coordinates, providing fractional values to the texture filter unit 532. These tile coordinate values are then clamped, wrapped and/or mirrored by block 572 based on the current texture mode parameters of display processor 500. Meanwhile, the perspective-corrected texture coordinates provided by perspective correction block 566 are also provided to a level of detail block 574 which, when level of detail calculations are enabled, calculates a tile descriptor index into a tile descriptor memory 576 and also calculates a level of detail fractional value for interpolation by the color combiner 508. The tile descriptors 804 are stored in tile descriptor memory 576, and are retrieved and outputted to a memory conversion block 578 which conversion block also receives the adjusted texture coordinate values of block 572. Address conversion block 578 converts the adjusted texture coordinate values into texture memory unit addresses based on current tile size, format and other parameters as specified by the tile descriptor 804. Address conversion block 578 outputs the texel address to texture memory unit 502. The texture memory unit 502 also receives additional parameters which are used, for example, if the texture is color indexed. Texture memory unit 502 outputs four texel values to texture filter unit 532 for filtering as discussed above.

Texture Memory Loading

Texture memory unit 502 includes a four kilobyte random access memory onboard coprocessor 200. Because texturing requires a large amount of random accesses with consistent access time, it is impractical to texture directly from main memory 300 in this example. The approach taken is to cache up to four kilobytes of an image in on-chip, high-speed texture memory 502. All primitives can be textured using the contents of texture memory 502.

In order to use texture memory 502, video game program 108 must load a texture tile into the texture memory and then load the associated descriptor 804 into tile descriptor 576. The "load tile" command (see FIGS. 46–118) is used to load a tile into texture memory 502, and a "set tile" and "set tile size" command are used to load corresponding tile descriptor blocks 804 into tile descriptor memory 576. In addition, a "Load Tlut" command (see FIGS. 46–118) can be used to load a color lookup table into texture memory 502 for use by color indexed textures.

Physically, texture memory 502 is organized in four banks, each comprising 256 16-bit wide words, each bank having a low half and a high half. This organization can be used to store 4-bit textures (twenty texels per row), 8-bit textures (ten texels per row), 16-bit textures (six texels per row), 16-bit YUV textures (twelve texels per row), and 32-bit textures (six texels per row). In addition, texture unit 506 in this example supports a color-indexed texture mode in which the high half of texture memory 502 is used to store a color lookup table and the low half of the texture memory is used to store 4-bit or 8-bit color indexed textures. This organization is shown in FIG. 25. In this FIG. 25 example, a color indexed texture tile 580 is stored in a low half 502(L) of texture memory 502, and a corresponding color lookup table 582 is stored in the upper half 502(H) of the texture memory.

FIG. 26 shows a more detailed depiction of a particular texture memory color indexed mode, in which the color lookup table 582 is divided into four palette banks 584 or tables, each having, for example, sixteen entries, each entry being 16-bits wide. The color lookup table may represent color in 16-bit RGBA format, or in 16-bit IA format. Since four texels are addressed simultaneously, there are four (usually identical) lookup tables 484 stored in the upper half of texture memory 502. As mentioned above, these lookup tables are loaded using the "load Tlut" command shown in FIGS. 46–118.

Display processor 500 supports another color-indexed texture mode in which each texel in the lower half of texture memory 502 comprises eight bits-and therefore can directly access any one of the 256 locations in the upper half 502(H) of texture memory 502. Thus, 8-bit color-indexed textures do not use the palette number of the tile, since they address the whole 256-element lookup table directly. It is not necessary to use the entire upper half of texture memory 502 for a lookup table when using 8-bit color-indexed textures. For example, if less than eight of the bits of the 8-bit color-indexed texture tile is being used for color lookup, only a portion of color memory upper half 502(H) is required to store the lookup table—and the remainder of the upper half of the texture memory 502 might thus be used for storing a non-color-indexed texture such as a 4-bit I texture (see FIG. 25). Similarly, even when color-indexed texture 580 is stored in the lower half 502(L) of texture memory 502, it is possible to also store non-color-indexed textures in the lower half as well. Thus, color-indexed textures and non-color-indexed textures can be co-resident in texture memory 502.

The following texture formats and sizes are supported by texture memory 502 and texture coordinate unit 530:

| Texture Format and Sizes | | | | |
|---|---|---|---|---|
| Type | 4-bit | 8-bit | 16-bit | 32-bit |
| RGBA | | | X | X |
| YUV | | | X | |
| Color Index | X | X | | |
| Intensity Alpha (IA) | X | X | X | |
| Intensity (I) | X | X | | |

In this example, texture unit 506 will, unless explicitly told otherwise, change a tile descriptor 804 or a texture tile 802 immediately upon loading—even if it is still being used for texture mapping of a previous primitive. Texture loads after primitive rendering should be preceded by a "sync load" command and tile descriptor attribute changes should be preceded by a "sync tile" command to ensure that the texture tile and tile descriptor state of texture unit 506 does not change before the last primitive is completely finished processing (see FIGS. 46–118 for example formats and functions of these commands).

As mentioned above in connection with the signal processor 400, two special commands ("texture rectangle" and "texture rectangle flip") can be used to map a texture onto a rectangle primitive (see FIGS. 46–118). It is possible to use the "texture rectangle" command to copy an image from texture memory 502 into frame buffer 118, for example. See FIGS. 46–118.

COLOR COMBINER

Referring once again to FIG. 20, color combiner 508 combines texels outputted by texture unit 506 with stepped RGBA pixel values outputted by RGBAZ steppers 520. Color combiner 508 can take two color values from many sources and linearly interpolate between them. The color combiner 508 performs the equation:

$$newcolor=(A-B)*C+D$$

Here, A, B, C and D can come from many different sources (note that if D=B, then color combiner 508 performs simple linear interpolation).

FIG. 27 shows possible input selection of a general purpose linear interpolator color combiner 508 for RGB and Alpha color combination in this example. As can be seen in FIG. 27, only some of the inputs in the lefthand column come from texture unit 506 or RBGAZ steppers 520. The rest of the inputs are derived from color combiner 508 internal state that can be programmed by sending commands to display processor 500. As discussed above, the "combined color" and "combined Alpha" values provided to color combiner 508 are obtained from the RGBAZ steppers 520, and the texel color and texture Alpha are obtained from texture unit 506 (two texel colors and corresponding Alpha values are shown since in two-cycle-per-pixel mode two texels will be provided by texture unit 506 for purposes of mipmapping for example). Additionally, the level of detail fractional input is obtained from FIG. 24 block 574, and the primitive level of detail value along with the primitive color and primitive Alpha value may be obtained from a "set primitive color" command sent to display processor 500 (see FIGS. 46–118) (the primitive color value/alpha/level of detail fraction value can be used to set a constant polygon face color). Similarly, a shade color and associated Alpha value may be obtained from a "shade coefficient" command (see FIGS. 46–118), and an environment color and associated Alpha value may be obtained from a "set environment color" command (see FIGS. 46–118) (the environment color/alpha value described above can be used to represent the ambient color of the environment). Two kinds of "set key" commands (one for green/blue, the other for red) are used for green/blue color keying and red color keying respectively—these supplying the appropriate key:center and key:scale inputs to color combiner 508 (see FIGS. 46–118). Both the primitive and environment values are programmable and thus can be used as general linear interpolation sources.

Convert K4 and K5 Inputs to color combiner 508 are specified in this example by the "set convert" command (see FIGS. 46–118) that adjust red color coordinates after conversion of texel values from YUV to RGB format (the remainder of the conversion process responsive to this set convert command being performed within texture filter unit 532).

Figure 29:
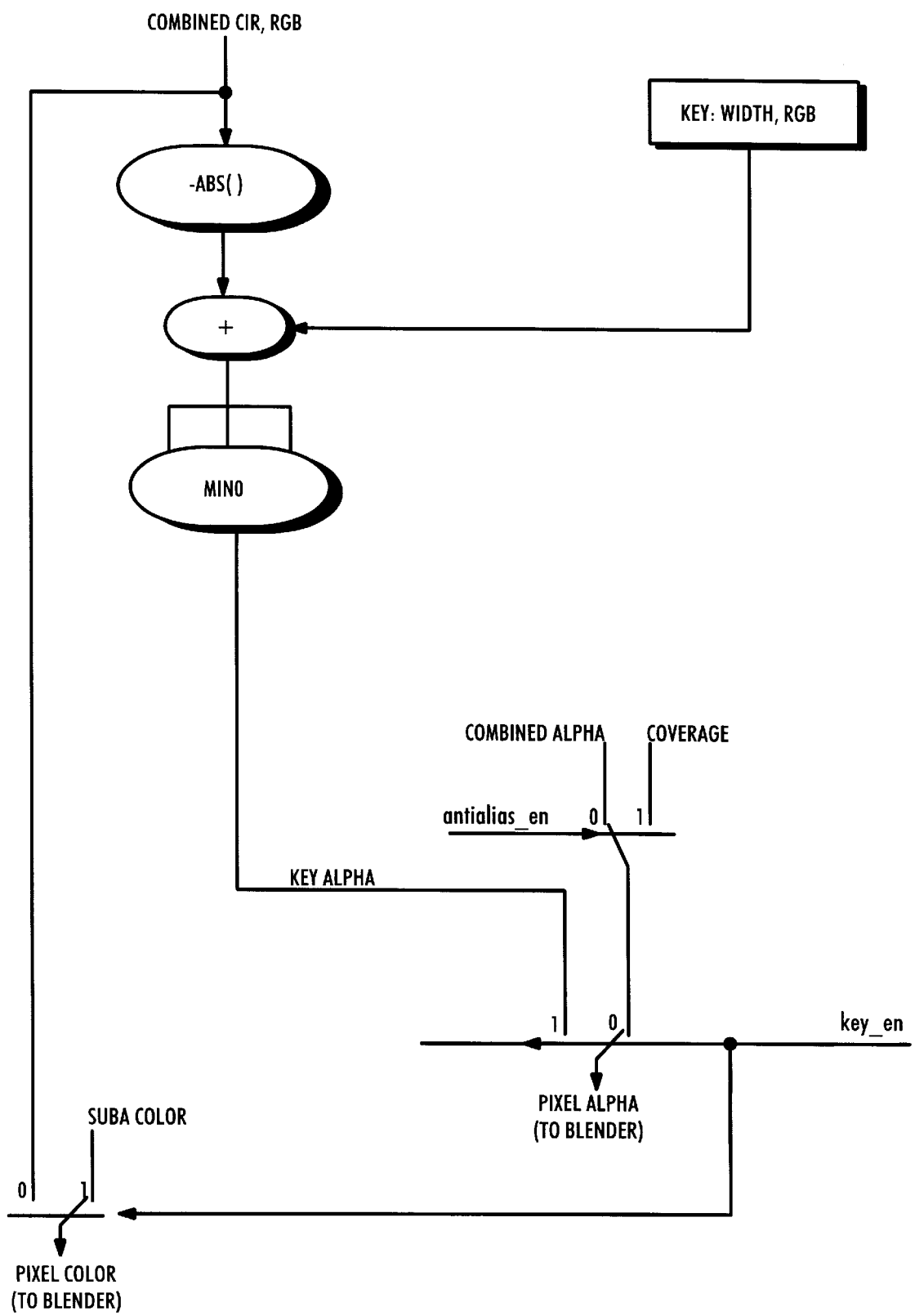
FIG. 29 shows an example alpha fix up operation.

FIG. 28 shows a portion of color combiner 508 used for combining the alpha values shown as inputs in FIG. 27. For both the RGB color combine in alpha color combine operations performed by color combiner 508, there are two modes, one for each of the two possible pipeline modes one cycle-per-pixel, and two cycles-per-pixel). In the two-cycle mode, color combiner 508 can perform two linear interpolation arithmetic computations. Typically, the second cycle is used to perform texture and shading color modulation (i.e., the operations color combiner 508 are typically used for exclusively in the one-cycle mode), and the first cycle can be used for another linear interpolation calculation (e.g., level of detail interpolation between two bi-linear filtered texels from two mipmap tiles). Color combiner 508 also performs the "alpha fix-up" operation shown in FIG. 29 in this example (see "set key GB" command in FIGS. 46–118). Blender As discussed above, blender 510 takes the combined pixel value provided by color combiner 508 can blends them against the frame buffer 118 pixels. Transparency is accomplished by blending against the frame buffer color pixels. Polygon edge antialias is performed, in part, by blender 510 using conditional color blending based on depth (z) range. The blender 510 can also perform fog operations in two-cycle mode.

Blender 510 can perform different conditional color-blending and z buffer updating, and therefore can handle all of the various types of surfaces shown in FIG. 30 (i.e., opaque surfaces, decal surfaces, transparent surfaces, and inter-penetrating surfaces).

An important feature of blender 510 is its participation in the antialias process. Blender 510 conditionally blends or writes pixels into frame buffer 118A based on depth range (see FIG. 33 which shows example z buffer formats including a "dz" depth-range field). See U.S. patent application Ser. No. 08/562,283 of Akeley et al, entitled "System and Method For Merging Pixel Fragments Based On Depth Range Values", filed concurrently herewith (Atty. Dkt. No. SKGF 1452/1740000; SGI docket no. 15-4-300.00)

In this example, video interface 210 applies a spatial filter at frame buffer read-out time to account for surrounding background colors to produce antialias silhouette edges. The antialiasing scheme requires ordered rendering sorted by surface or line types. Here is the rendering order and surface/line types for z buffer antialiasing mode:

1. All opaque surfaces are rendered.
2. All opaque decal surfaces are rendered.
3. All opaque interpenetrating surfaces are rendered.
4. All of the translucent surface and lines are rendered last. These can be rendered in any order, but proper depth order gives proper transparency.

The mode blender 510 is controlled, in part by the groups of coefficients. specified in the triangle command defining the primitive (see FIGS. 46–118). Thus, a primitive can be rendered in a z buffered mode or non-z buffered mode as specified by the triangle command. In addition, the "set other modes" command (see FIGS. 46–118) specifies blend mode words for cycle 0 and cycle 1 in addition to specifying "blend masks" and enabling/disabling antialiasing.

Blender 510 has two internal color registers: fog color and blend color. These values are programmable using the "set fog color" and "set blend color" commands, respectively (see FIGS. 46–118). These values can be used for geometry with constant fog or transparency.

Blender 510 can compare the incoming pixel alpha value with a programmable alpha source to conditionally update frame buffer 118A. This feature can allow complex, outlined, billboard type objects, for example. Besides thresholding against a value, blender 510 in this example can also compare against a dithered value to give a randomized particle effect. See "set other modes" command (FIGS. 46–118). Blender 510 can also perform fog operations, either in 1-cycle or 2-cycle mode. Blender 510 uses the stepped z value as a fog coefficient for fog and pipeline color blending.

FIG. 31 shows an example of the overall operations performed by blender 510 in this example. In this particular example, blender 510 can be operated in a mode in which a coverage value produced by coverage evaluator 524 can be used to specify the amount of blending. Coverage evaluator 524 compares the coverage value of the current pixel (provided by edge walker 504) to stored coverage value within frame buffer 118A. As shown in FIG. 32 (a depiction of the format of the color information stored for each pixel within color frame buffer 118A), the color of a pixel is represented by 5-bits each of red, green, and,blue data and by a 3-bit "coverage" value. This "coverage" value can be used as-is, or multiplied by an alpha value for use as pixel alpha and/or coverage (see "set other modes" command in FIGS. 46–118). The "coverage" value nominally specifies how much of a pixel is covered by a particular surface. Thus, the coverage value outputted by edge walker 504 will be 1 for pixels lying entirely within the interior of a primitive, and some value less than 1 for pixels on the edge of the primitive. In this example, blender 510 uses the coverage value for antialiasing. At the time blender 510 blends a primitive edge, it does not know whether the primitive edge is internal to an object formed from multiple primitives or whether the edge is at the outer edge of a represented object. To solve this problem in this example, final blending of opaque edge values is postponed until display time, when the video interface 210 reads out frame buffer 118A for display purposes. Video interface 210 uses this coverage value to interpolate between the pixel color and the colors of neighboring pixels in the frame buffer 118A. In order to accomplish this antialiasing at display time, blender 510 must maintain the coverage value for each pixel within frame buffer 118a, thereby allowing video interface 210 to later determine whether a particular pixel is a silhouette edge or an internal edge of a multi-polygon object.

Memory Interface 512 and Z Buffering

Memory interface 512 provides an interface between display processor 500 and main memory 300. Memory interface 512 is primarily used during normal display processor 500 operations to access the color frame buffer 118a and the Z buffer 118b. Color frame buffer 118a stores a color value for each pixel on color television screen 60. The pixel format is shown in FIG. 32. Z buffer 118b stores a depth value and a depth range value for each color pixel value stored in color frame buffer 118a. An example format for z buffer values is shown in FIG. 33. The Z buffer 118b is used primarily by blender 510 to determine whether a newly rendered primitive is in front of or behind a previously rendered primitive (thereby providing hidden surface removal). The "DZ" depth range value shown in FIG. 33 may be used to help ascertain whether adjacent texels are part of the same object surface.

Memory interface 512 can write to main memory 300, read from main memory, or read, modify and write (RMW) locations in the main memory. For RMW operations, memory interface 512, in this example, pre-fetches a row of pixels from frame buffer 118a as soon as edge walker 504 determines the x, y coordinates of the span. Memory interface 512 includes an internal "span buffer" 512a used to store this span or row of pixels. Memory interface 512 provides the appropriate pre-fetched pixel value from span buffer 510a to blender 510 at the appropriate time—thus minimizing the number of accesses to main memory 300. Span buffer 512a is also used to temporarily store blended (modified) pixel values so that display processor 500 need not access main memory 300 each time a new pixel value is blended. In general, memory interface 512 writes the entire span worth of pixels into main memory 300 as a block all at once.

Memory interface 512 has enough on-chip RAM to hold several span buffers. This can cause problems, however, if two spans in sequence happen to overlap the same screen area. A parameter "atomic space" in the "Set Other Modes" command (see FIGS. 46–118) forces memory interface 512 to write one primitive to frame buffer 118a before starting the next primitive—thereby avoiding this potential problem by adding no cycles after the last span of a primitive is rendered.

Depth comparator 526 operates in conjunction with z buffer 118b to remove hidden surfaces and to insure the transparent values are blended properly. Depth comparator 526 compares the z or depth value of the current pixel with the z value currently residing in z buffer 118a for that screen location. At the beginning of the rendering of a new frame, all locations in z buffer 118b are preferably initialized to maximum distance from the viewer (thus, any object will be open "in front of" this initialized value). Generally, each time display processor 500 is to blend a new pixel into frame buffer 118a, depth comparator 526 compares the depth of the current pixel with the depth residing in that location of z buffer 118b. If the old z buffer value indicates that the previously written pixel is "closer" to the viewer than is the new pixel, the new pixel is discarded (at least for opaque values) and is not written into the frame buffer—thus accomplishing hidden surface removal. If the new pixel is "closer" to the old pixel as indicated by depth comparator 526, then the new pixel value (at least for opaque pixels) may replace the old pixel value in frame buffer 118a—and the corresponding value in z buffer 118b is similarly updated with the z location of the new pixel (see FIG. 33A). Transparency blending may be accomplished by blending without updating the z buffer value—but nevertheless reading it first and not blending if the transparent pixel is "behind" an opaque pixel.

Video Interface 210

Video interface 210 reads the data out of frame buffer 118 and generates the composite, S video RGB video output signals. In this example, video interface 210 also performs anti-aliasing operations, and may also perform filtering to remove truncation caused by the introduction of dithering noise.

Video interface 210 in this example works in either NTSC or PAL mode, and can display 15-bit or a 24-bit color pixels with or without filtering at both high and low resolutions. The video interface 210 can also scale up a smaller image to fill the screen. The video interface 210 provides 28 different video modes plus additional special features.

Video interface 210 reads color frame buffer 118a in synchronization with the electron beam scanning the color television screen 60, and provides RGB values for each pixel in digital form to video DAC 144 for conversion into analog video levels in this example. Video interface 210 performs a blending function for opacity values based on coverage (thereby providing an antialiasing function), and also performs a back-filtering operation to remove some of the noise introduced by screen-based dithering.

FIG. 34 is a block diagram of the architecture of video interface 210. In this example, video interface 210 includes the DMA controller 900, a buffer 902, control logic 904, anti-aliasing filters 906a, 906b, error correction blocks 908a, 908b, vertical interpolator (filter) 910, horizontal interpolator (filter) 912, "random" function generator 914, gamma block 916, and bus driver 918.

DMA controller 900 is connected coprocessor bus 214. DMA controller 900 reads color frame buffer 118a beginning at an "origin" address in the main memory specified by main process 100 (see FIG. 35B). DMA controller 900 sequentially reads the pixel color and coverage values (see FIG. 32) from frame buffer 118a in synchronism with the line scanning operations of television 58. The pixel values read by DMA controller 900 are processed by the remainder of video interface 210 and are outputted to video DAC 144 for conversion into an analog composite video signal NTSC or PAL format in this example.

DMA controller 900 in this example provides the color/coverage values it has read from main memory frame buffer 118a, to a RAM buffer 902 for temporary storage. In this example, buffer 902 does not store the pixel color values corresponding to an entire line of television video. Instead, buffer 902 stores a plurality of blocks of pixel data, each block corresponding to a portion of a line of video. Buffer 902 provides "double buffering," i.e., it has sufficient buffers to make some line portions available to filters 906 while other buffers are being written by DMA controller 900.

In this example, DMA controller 900 accesses, and stores into buffers 902, several of the pixel data corresponding to several horizontally-aligned portions of the video lines to be displayed on television screen 60. Looking at FIG. 34A, frame buffer 118a is shown—for purposes of illustration—as being organized in a row/column order corresponding to pixels on the television screen (it will be understood that the frame buffer as stored in main memory 300 may actually be stored as a long sequential list of pixel color/coverage values). In this example, DMA controller 900 reads out a block of pixel values corresponding to a particular segment of the current line n of video to be displayed (top shaded block in FIG. 34A frame buffer 118a), and also reads out the pixel values corresponding to a horizontally-aligned (on the television screen) line segment of a "next" video line n+1 (i.e., the part of the pixel data representing the part of the "next" line just beneath the line n). In this particular example, also reads a further block of pixel values from the frame buffer corresponding to the horizontally-aligned line segment of video line n+2.

Each of these blocks of pixel values is stored in buffer 902. Filters 906a, 906b perform a filtering/anti-aliasing operation based on coverage value to interpolate the current line's pixel values with neighboring pixel values (i.e., pixel values that are adjacent with respect to the displayed position on color television screen 60). The anti-aliasing filtering operations performed by filters 906a, 906b are as described in co-pending U.S. patent application Ser. No. 08/539,956 of Van Hook et al, entitled Antialiasing of Silhouette Edges, filed on Oct 6, 1995 (Atty. Dkt. No. SKGF 15-4-224.00). Briefly, a three-scan-line high neighborhood is color weighted by coverage value in a blending process performed by filter 906. This filtering operation results in smoother, less jagged lines at surface edges by using the pixel coverage value retained in frame buffer 118a (which coverage value indicates what percentage of the pixel is covered by a polygon) to adjust the contribution of that pixel value relative to the contributions of neighboring pixel values in a blending process to produce the current pixel value. "Divot" error correction blocks 908a, 908b correct the outputs of anti-alias filters 906a, 906b for slight artifacts introduced by the anti-aliasing process. In particular, for any pixels on or adjacent to a silhouette edge, the error correction blocks 908 take the median of three adjacent pixels as the color to be displayed in place of the center pixel. This error correction can be enabled or disabled under software control (see FIG. 35A), and a video game programmer may wish to disable the error correction since it interacts poorly with decal line rendering modes.

Anti-aliasing filters 906a, 906b operate in parallel in this example to produce pixel data blocks corresponding to horizontally aligned portions of two successive lines (line n, line n+1) of the image represented by frame buffer 118a. These pixel values are provided to vertical interpolator 910, which performs a linear interpolation between the two image lines to produce an image portion of a single scan line (see FIG. 34A). Interpolator 910 interpolates between successive scan lines in order to reduce flicker in interlaced displays. For example, interpolator 910 can add in a contribution from a previous or next successive horizontally-aligned scan line portion to make transitions between successive video scan lines less noticeable—thereby reducing flicker.

Additionally, interpolator 910 in this example can perform a vertical scaling function that allows the number of lines displayed on television screen 60 to be different from the number of lines represented by the frame buffer 118a pixel information. In this example, filter 906 scales in the vertical dimension by resampling the pixel data for successive lines of image represented by frame buffer 118a—thereby allowing television screen 60 to have a different number of lines. This scaling operation (which also accommodates offsetting) is controlled by the values within the video interface Y scale register (see FIG. 35N). The ability to scale the television image relative to the digital image size of frame buffer 118a provides additional flexibility. For example, the scaling ability makes it possible for signal processor 400 and display processor 500 to generate a smaller digital image representation in frame buffer 118—and yet allow that smaller image to fill the entire television screen 60. Since a smaller frame buffer 118 requires less time to rasterize (i.e., display processor 500 needs to handle fewer spans and fewer pixels per span for a given polygon) and less memory to store, the scaling ability can provide increased performance—albeit at the cost of a lower resolution image.

Figure 34A:
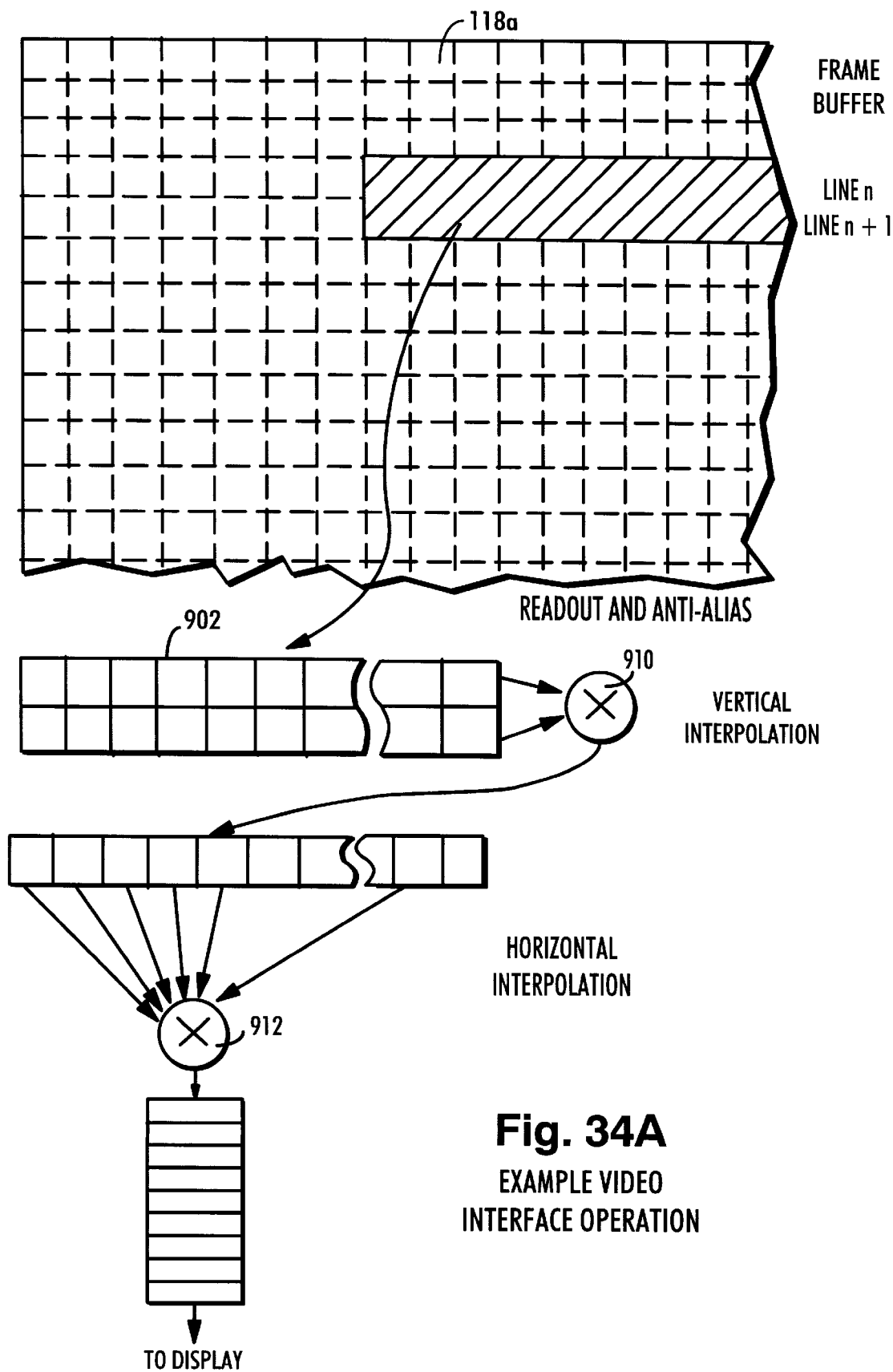
FIG. 34A shows an example video interface operating sequence.

The output of vertical filter 910 in this example is a block of pixel data representing the pixel values for a portion of the video line to be displayed. As shown in FIG. 34A, this block of pixel values is provided to horizontal interpolator 912. Horizontal interpolator 912 provides a linear interpolation between neighboring pixel values in order to resample the pixels based on a horizontal scaling factor stored in the X scale register (see FIG. 35M). Horizontal interpolator 112 thus provides a horizontal scaling ability, e.g., to convert a smaller number of frame buffer values into a larger number of screen pixels alone a horizontal line.

The output of horizontal interpolator 912 is provided to a Gamma correction circuit 916 that converts linear RGB intensity into non-linear intensity values suitable for composite video generation for the gamma non-linearity of TV monitors. This amounts to taking a square root of the linear color space. The TV monitor effectively raises these color values to a power of 2.2 or 2.4. A "random" function block 914 introduces additional bits of resolution to each of the R, G and B color values in order to "de-dither" (i.e., to compensate for the bit truncation performed by display processor dithering block 522). As shown in FIG. 32, one example frame buffer 118 color pixel format in this example provides only five bits of resolution of each R, G and B to conserve storage space within main memory 300. Display processor dithering block 522 may truncate 8-bit RGB color values provided by blender 510 to provide the compressed representation shown in FIG. 32. Block 914 can reverse this truncation process to decompress the RGB values to provide 256 different display color levels for each R, G and B. See U.S. application Ser. No. 08/561,584, filed on Nov. 21, 1995 in the name of Gossett, entitled "Restoration Filter For Truncated Truncated Pixels," (Atty Dkt. No. SKGF1452.1690000). This dither filter operation can be turned on and off under software control (see FIG. 35A).

Example Video Interface Registers

There are sixteen control registers for the video interface 210 which control all its functions including sync generation, video rescaling, and anti-aliasing. FIGS. 35A–35P show the various registers within video interface 210 the can be accessed by main processor 100.

FIG. 35a shows the video interface control register 952. Main processor 100 can write the following values into this register 952 to control the operation of video interface 210:

Type field 952a specifies pixel data size as blank (no data, no sync), the format shown in FIG. 32 (5 bits each of RGB and a 3-bit coverage value), or 8/8/8/8 (32-bit color value and 8 bits of coverage);

Gamma dither enable field 952b turns on and off the addition of some random noise to the least significant bits of the video out before the final quantization to 7 bits to eliminate Mach banding artifacts;

Gamma enable field 952c turns on and off gamma correction;

Divot enable field 952d turns on and off the divot error correction discussed above;

video bus clock enable field 952e turns an internal clock on or off;

Interlace field 952f turns interlacing on and off;

Test mode field 952g;

anti-alias mode on/off field 952h;

diagnostic field 952i;

pixel advance field 952j; and dither filter enable field 952k.

FIG. 35B shows the video interface origin register 954 used to specify the beginning main memory 300 address of frame buffer 118a for read out. In this example, main processor 100 needs to explicitly set this register 954 each time video interface 210 is to read from a new area in main memory 300 (e.g., to read the other half of double buffered frame buffer 118).

FIG. 35c shows the video interface line width register 956, which can be set to specify the number of pixels in each horizontal line. FIG. 35d shows the video interface vertical interrupt register 958, which main processor 100 can set with a particular vertical line number so that coprocessor 200 will interrupt the main processor once per frame at the specified vertical line or half line. FIG. 35e shows the video interface current line register 960, which specifies the current vertical line when read from by the main processor 100 and clears the vertical line interrupt when written to by the main processor.

The registers 962–972 shown in FIGS. 35G–35L are used by main processor to specify detailed composite video timing parameters. For example:

FIG. 35F shows the vertical interface timing register 962 which main processor 100 can write to to specify horizontal sync pulse width, color burst width, vertical sync pulse width, and color burst start timing.

FIG. 35G shows the video interface vertical sync register 964 that main processor 100 may write to specify the number of vertical half-lines per field.

FIG. 35H shows the video interface horizontal sync register 965 which main processor 100 can write to specify the total duration of a line and a horizontal "leap pattern" for PAL.

FIG. 35I shows the video interface h sync leap register 966 specifying two alternate h sync leap parameters for PAL.

The video interface horizontal video register and vertical video register 968, 970 shown in FIGS. 35j, 35k, respectively, are used to specify horizontal and vertical video start and end times relative to hsync and vsync.

The vertical interfaced vertical burst register 972 shown in FIG. 35L specifies color burst start and end timing.

The timing parameters programmable into registers 962–972 can be used to provide compatibility with different kinds of television sets 58. For example, most television sets 58 in the United States use a composite video format known as NTSC, whereas most European television sets use a composite video format known as PAL. These formats differ in terms of their detailed timing parameters (e.g., vertical blanking integral width and location within the signal pattern, horizontal synchronization pulse width, color burst signal pulse width, etc.). Because registers 962–972 control these composite video timing parameters and are programmable by software executing on main processor 100, a programmer of video game 108 can make her program NTSC compatible, PAL compatible, or both (as selected by a user) by including appropriate instructions within the video game program that write appropriate values to registers 962–972. Thus, in this example, coprocessor 200 is compatible with NTSC-standard television sets 58, with PAL standard compatible television sets—and even with video formats other than these within a range as specified by the contents of registers 962–972.

Vertical interface x and y scale registers 974, 976 (see FIG. 35m, 35n, respectively) specify x and y scale up and subpixel offset parameters for horizontal and vertical scaling, as discussed above. FIGS. 35o and 35p show video interface test data and address registers 978, 980 for diagnostic purposes.

Memory Controller/Interface 212

As explained above, coprocessor memory interface 212 interfaces main memory 300 with coprocessor internal bus 214. In this example, main memory 300 is accessed over a 9-bit wide bus, and one of the tasks memory interface 212 is responsible for is to buffer successive 9-bit words so they can be more conveniently handled by coprocessor 200. FIG. 36 is an example diagram showing the overall architecture of memory controller/interface 212

In this example, memory interface/controller 212 includes a pair of registers/buffers 1000, 1002, a control block 1004, and a RAM controller block 212b. RAM controller block 212b comprise RAM control circuits designed and specified by Rambus Inc. for controlling main memory 300. Registers 1000, 1002 are used to latch outgoing and incoming data, respectively. Control block 1004 controls the operation of memory interface 212.

Example Memory Controller/Interface Registers

FIGS. 37A–37H show example control registers used by main processor 100 to control memory interface 212. FIG. 37A shows a read/write mode register specifying operating mode and whether transmit or receive is active (1052). FIG. 37B shows a configuration register 1054 that specifies current control input and current control enable. FIG. 37C represents a current mode register 1056 that is write only, with any writes to this register updating the current control register. FIG. 37D shows a select register 1058 used to select receive or transmit. FIG. 37E shows a latency register 1060 used to specify DMA latency/overlap. FIG. 37F shows a refresh register 1062 that specifies clean and dirty refresh delay, indicates the current refresh bank, indicates whether refresh is enabled, indicates whether refresh is optimized, and includes a field specifying refresh multi-bank device. FIG. 37G shows an error register which in a read mode indicates NACK, ACK and over-range errors, and when written to by main processor 100 clears all error bits. FIG. 37H shows a bank status register 1066 which, when read from indicates valid and dirty bits of the current bank, and when written to clears valid and sets dirty bits of the current bank.

CPU INTERFACE

FIG. 38 shows a block diagram of coprocessor CPU interface 202 in this example. CPU interface 202 comprises a FIFO buffer 1102 and a control block 1104. FIFO buffer 1102 provides bidirectional buffering between the CPU SysAD multiplexed address/data bus 102a and the coprocessor multiplexed address/data bus 214D. Control block 1104 receives addresses asserted by the main processor 100 and places them onto the coprocessor address bus 214C. Control block 1104 also receives interrupt signals from the other parts of coprocessor 200, and receives command control signals from the main processor 100 SysCMD bus 102b.

Example CPU Interface Registers

FIGS. 39A–39D show the registers contained within CPU interface 303 in this example. FIG. 39 shows a CPU interface status/control register 1152 that controls coprocessor 200 when main processor 100 writes to the register and indicates overall coprocessor status when the main processor reads from the register. Main processor 100 can write to register 1152 to specify initialization code length, set or clear initialization mode, set or clear internal coprocessor bus test mode, clear display processor 400 interrupt, and set or clear main memory register mode. When main processor 100 reads from this register 1152, it can determine initialization code length, initialization mode, internal coprocessor bus test mode, and whether the coprocessor is operating in the main memory register mode.

FIG. 39b shows a version register 1154 that main processor 100 can read from to determine version information pertaining to various components within coprocessor 200.

FIG. 39c shows an interrupt register 1156 that main processor 100 can read from to determine the source of an interrupt it has received from coprocessor 200. In this example, a single line connects between coprocessor 200 and main processor 100 is used for interrupt purposes. Upon receiving a coprocessor interrupt, main processor 100 can read interrupt register (which contains an interrupt vector) to ascertain what component within coprocessor 200 (i.e., signal processor 400, serial interface 204, audio interface 208, video interface 210, parallel interface 206, or display processor 500) cause the interrupt. FIGS. 39d shows an interrupt mask register 1158 which main processor 100 can write to to set or clear an interrupt mask for any of the interrupts specified in interrupt register 1156, and may read to determine interrupts are masked and which are not.

AUDIO INTERFACE

FIG. 40 shows an overall block diagram architecture of audio interface 208 in this example. Audio interface 208 includes DMA logic 1200, a state machine/controller 1202, an audio clock generator 1204, audio data buffers 1206 and a serializer 1208. In this example, DMA logic 1200 fetches digital audio sample data from audio buffer 114 within main memory 300. DMA logic 1200 writes this audio sample data, 8 bytes at a time, into audio data buffers 1206. There are multiple audio data buffers 1206 arranged in a FIFO so that DMA logic 1200 can be prefetching some audio sample data while serializer 1208 serializes other, previously fetched-and-buffered audio sample data. Thus, buffers 1206 store enough data to supply serializer 1208 between block reads by DMA logic 1200. Since the output rate of serializer 1208 is relatively slow (e.g., on the order of 4 bytes at 50 kHz, a single 64-bit buffer 1206*b* can store enough digitized audio samples to last a relatively long time in terms of real time audio output.

As discussed above, serializer converts the parallel contents of audio buffers 1206 into serial format, and places the resulting serial digital audio data stream onto bus 209 for communication to audio DAC 140. Digital audio bus 209 in this example includes a single serial data line 209*a* multiplexed between left channel data and right channel data. In this example, serializer 1208 outputs a 16-bit long word for each stereo channel, alternating between the channels. The output bit rate of serializer 1208 is specified by audio clock generator 1204. Audio clock generator 1204 produces an audio clock output on 209*b* to synchronize audio DAC 140 to the serializer 1208 output bit rate, and produces an audio L/R clock on line 209*c* specifying whether the current serializer output 1208 is for the left or right stereo channel.

Figure 41D:
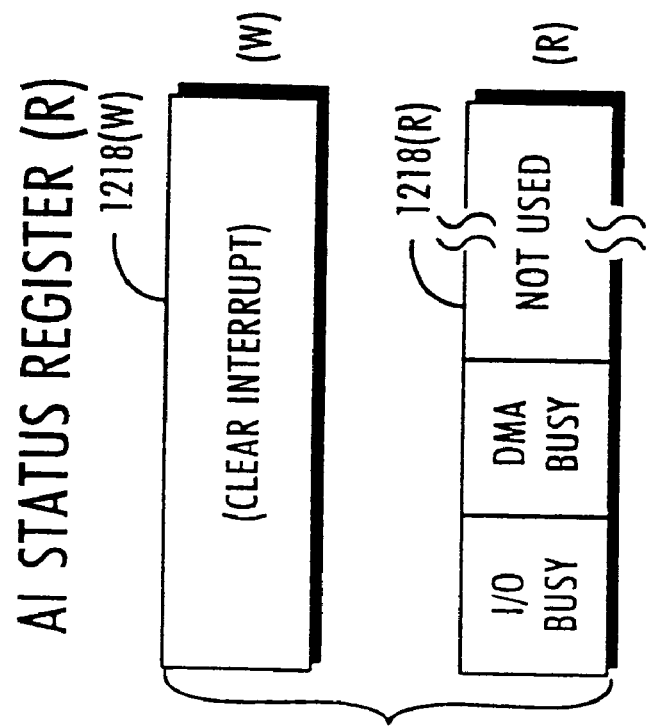
Figure 41C:
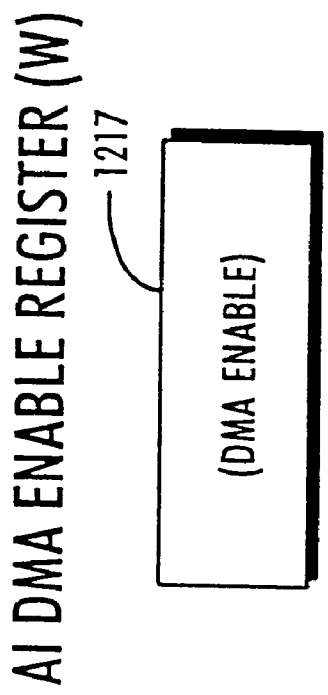

FIG. 40 shows a number of registers and counters used to control audio interface 208. DMA controllers 1200 receives a starting main memory address from an address register 1210. Main processor 100 writes to this address register 1210 (see FIG. 41A) to point audio interface 208 to the locations in main memory 300 providing the audio buffer 114 for the current audio to be played. A counter 1212 increments this address for each fetch by DMA controller 1200—thereby sequencing the DMA controller through the entire audio buffer 114. Main process 100 writes the length of audio buffer 114 into a transfer length register 1214 (see FIG. 41B). An additional counter 1216 associated with length register 1214 sequences state machine 1202 through an appropriate number of control states corresponding to the length of audio buffer 114. State machine 1202 generates control signals that synchronize the operations of the other parts of audio interface 208 relative to one another. In this example, main processor 100 can enable audio interface 208 to begin fetching data from the main memory 300 by writing to a DMA enable register location 1217 (not shown in FIG. 40; see FIG. 41C). Main processor 100 may also determine the state of audio interface 200 by reading an audio interface status register 1218 (not shown in FIG. 40; see FIG. 41D). In this example, state machine 1202 generates a main processor interrupt when it reaches the end of audio buffer 114 as specified by length register 1214, and the main processor 100 can clear this interrupt by writing to the status register 1218 location (see FIG. 41D).

Figure 41E:
Figure 41F:
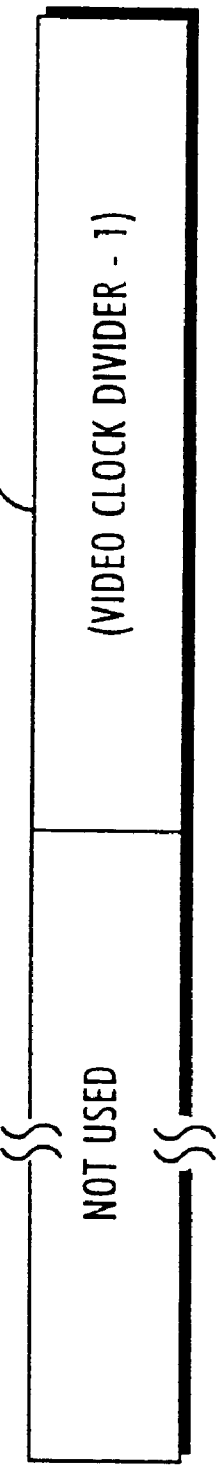

In this example, main processor 100 may also control the rate of the clocking signals generated by audio clock generator 1204. Main processor 100 can program these rates by writing to audio rate registers 1218, 1220 (see FIGS. 41E, 41F). A counter 1222 may provide a programmable dividing function based on the rate values main processor 100 as written into audio rate registers 1218, 1220.

SERIAL INTERFACE

FIG. 42 shows an overall high level block diagram of serial interface 204 in this example.

In this example, serial interface 204 moves blocks of data between coprocessor 200 and serial peripheral interface 138. Serial interface 204 can either read a 64-byte data block from serial peripheral interface 138 and transfer it to a specified location in main memory 300 or alternatively, it can read a 64-byte block of data stored in the main memory and transfer it serially to the serial peripheral interface. In this example, serial interface 204 comprises primarily direct memory access logic 1300, control logic 1302, and a parallel/serial converter 1304. Parallel/serial converter 1304 in this example comprises a shift register that converts serial data sent by serial peripheral interface 138 over a read data/acknowledge bus 205*a* into parallel data for application to latch 1308. The contents of latch 1308 is then applied to coprocessor data bus 214*d* for writing into main memory 300. Alternatively, in a parallel-to-serial conversion mode, shift register 1304 receives parallel data from the coprocessor data bus 214*d* via a latch 1310 and converts that data into serial for transmission to serial peripheral interface 138 via a command and write data bus 205*b*.

Figure 43A:
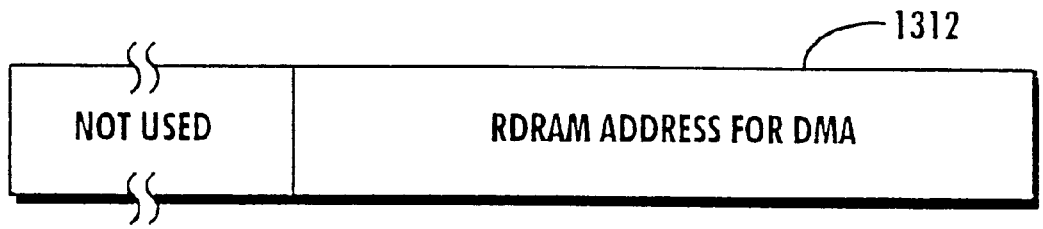
FIGS. 43A–43D show example serial interface registers.

Main processor 100 specifies the address within main memory 300 that serial interface 204 is to read from or write to, by writing this address into an address register 1312 (see FIG. 43A). Address register 1312 contents specify the main memory address to be loaded in DMA address counter 1314. Part of the contents of address register 1312 may also be used to specify "address" information within serial peripheral interface 138. Such serial peripheral interface "address" information is loaded into a latch 1316, the contents of which are provided to shift register 1304 for transmission to the serial peripheral interface. This serial peripheral interface "address" information may be used, for example, to specify a location within the serial peripheral interface 138 (i.e., a boot ROM location 158, a RAM buffer or a status register).

In this example, serial interface 204 has the ability to place the shift register 1304 parallel output onto the coprocessor address bus 214*c* via register 1308, a multiplexer 1318, and a latch 1320.

Figure 43B:
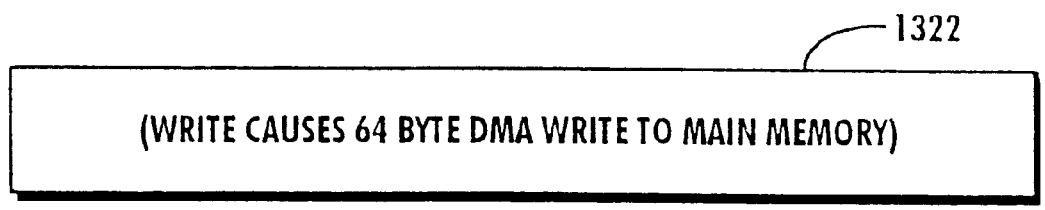
Figure 43C:
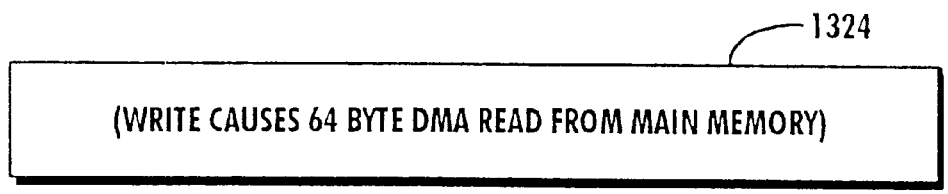

As shown in FIGS. 43B, 43C, main processor 100 in this example specifies the direction of serial transfer by writing to a location 1322 or 1324. A write to location 1322 causes serial interface 204 to read a 64-byte data block from the serial peripheral interface 138 and write it to the main memory 300 location specified by address register 1312. A write by main processor 100 to register location 1324 causes serial interface 204 to read a 64-byte block of data from the main memory 300 location specified by address register 1312, and to write the data in serial form to the serial peripheral interface 138.

Figure 43D:
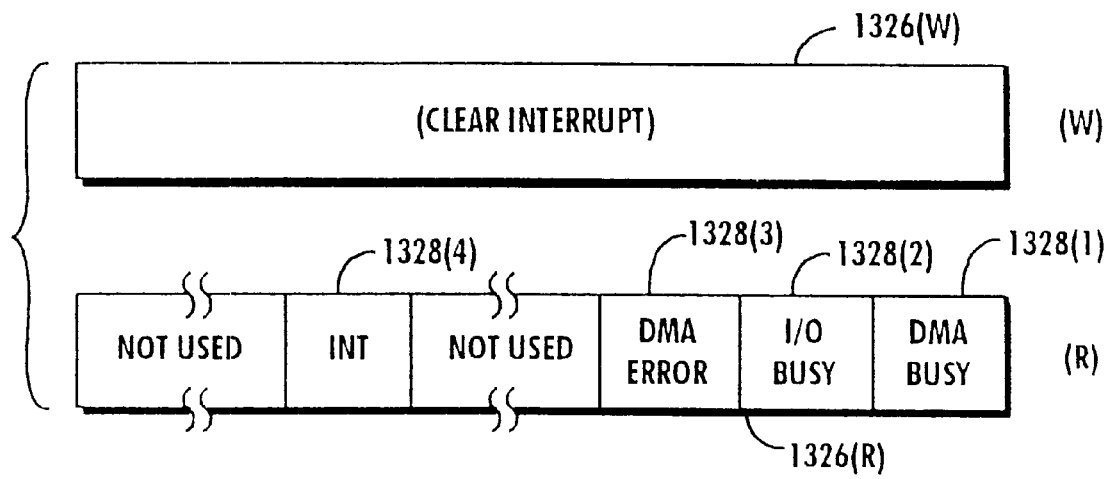

FIG. 43D shows the serial interface status register 1326. Main processor 100 can read status register 1326 to determine the status of serial interface 204 (e.g., whether the serial interface is busy with a DMA or I/O operation (fields 1328 (1) 1328 (2), respectively); whether there has been a DMA error (field 1328 (3); or whether the serial interface has caused a main processor interrupt (field 1328 (4)). Serial interface 204 may generate a main processor interrupt each time it has completed a data transfer to/from serial peripheral interface 138. Main processor 100 can clear the serial interface interrupt by writing to register 1326.

PARALLEL PERIPHERAL INTERFACE

FIG. 44 shows an example block diagram of parallel peripheral interface 206. In this example, parallel interface 206 transfers blocks of data between main memory 300 and storage device 54. Although storage device 54 described above includes only a read-only memory 76 connected to parallel bus 104, system 50 can accommodate different configurations of peripherals for connection to connector 154. For example, two different types of peripheral devices (e.g., a ROM and a RAM) may be connected to peripheral connector 154. Peripheral interface 206 is designed to support communications between two different types of peripheral devices connected to the same parallel bus 104 without requiring any time-consuming reconfiguration between writes.

Some such peripheral devices may be read-only (e.g., ROM 76), other such peripheral devices may be read/write (e.g., a random access memory or a modem), and still other such peripheral devices could be write only. Peripheral interface 206 supports bi-directional, parallel transfer over parallel bus 104 between connector 154 and main memory 300.

Parallel peripheral interface 206 in this example includes a DAM controller 1400, a control/register block 1402, and a register file 1404. Register file 1404 buffers blocks of data being transferred by peripheral interface 206 between a peripheral device connected to connector 154 and a block of storage locations within main memory 300. In this example, register file 1404 comprises a small RAM that stores 16 64-bit words. Register file 1404 operates as a FIFO, and is addressed by control/register block 1402. The output of register file 1404 is multiplexed into 16-bit portions by multiplexer 1406. These 16-bit-wide values are latched by a latch 1408 for application to the peripheral device connected to connector 154 via a multiplexed address/data bus 104ad. Data read from the peripheral device via the multiplexed address/data bus 104ad is temporarily stored in a latch 1410 before being applied (via a multiplexer 1412 that also positions the 16-bit read value within an appropriate quarter of a 64-bit word) into register file 1404. Multiplexer 1412 also receives data from coprocessor data bus 214d via latch 1414, and can route this received data into register file 1404 for storage. The register file 1404 output can also be coupled to coprocessor data bus 214d via latch 1416. In this example, the register file 1404 output may also be coupled to the coprocessor address bus 214c via a multiplexer 1418 and a latch 1420.

Main processor 100 controls the parameters of a DAM transfer performed by peripheral interface 206 by writing parameters into control/register block 1402. For example, main processor 100 can write a starting main memory address into a DRAM address register 1422 (see FIG. 45A) and can write a starting address space of a peripheral device connected to connector 154 by writing a peripheral bus address starting address into the peripheral bus register 1424 (see FIG. 45B). In this example, main processor 100 specifies the length and direction of transfer by writing to one of registers 1426, 1428 shown in FIGS. 45C, 45D, respectively. A write to read length register 1426 shown in FIG. 45C controls the peripheral interface 206 to transfer in one direction, whereas writing a length value into register 1428 shown in FIG. 45D causes the peripheral interface to transfer in the opposite direction. In this example, the main processor 100 can read the status of peripheral interface 206 by reading from a status register location 1430(R) (See FIG. 45B). This status register 1430(R) contains fields 1432 indicating DMA transfer in progress (field 1432 (1)), I/O operation in process (field 1432 (#)), an error condition (field 1432 (3)). By writing to the same register 1430(W) location, main processor 100 can clear an interrupt peripheral interface 206 generates when it has completed a requested transfer. Writing to status register location 1430(W) also allows main processor 100 to both clear and interrupt and abort a transfer in progress (see FIG. 45A field 1434 (1)).

FIGS. 45F, 45G, 45H, 45I show additional registers main processor 100 can write to in order to control timing and other parameters of the peripheral interface bus 104. These registers permit main processor 100 to configure the bus 104 for particular types of peripheral devices—all under control of software within game program 108. In this example, peripheral interface 44 supports duplicate sets of registers 1436, 1438, 1440 and 1442 shown in FIGS. 45F–45I— allowing different peripheral bus 104 protocols to be used for different peripheral devices connected simultaneously to the bus without requiring the main processor 100 to re-write the configuration registers each time it request access to a different device. In this example, one set of configuration resisters 1436, 1438, 1440 and 1442 are used to configure the bus 104 protocol whenever the peripheral interface 206 accesses a "region 1" address space within the 16-bit peripheral address space, in the other set of register parameters are used whenever the peripheral interface accesses a "region 2" address space within the peripheral bus address range (see FIG. 5D memory map). The configurations specified by these two sets of registers are invoked simply by main processor 100 writing to the appropriate region.

The various ones of control registers shown in FIGS. 45A–45I may, in this example, be located within the control/register block 1402 of FIG. 44. The configuration values stored in registers 1436, 1438, 1442 are used in this example to control the timing of the access control signals control/register block 1402 produces on bus control line 1404C. A latch 1434 is used to temporarily latch addresses on the co-processor address bus 214C for application to control/register block 1402 (e.g., to select between the various registers). Control/register block 1402 in this example includes appropriate counters and the like to automatically increment DMA addresses.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for generating at least one display mode control command for processing by a 3D graphics system, the process including the step of generating at least one set mode command having:

a command identifier field including a six-bit binary value of 101111, and the following mode control fields:

(k) an atomic primitive mode field that specifies whether to force writing a primitive to a frame buffer before reading a following primitive, (i) a cycle type mode field that selects a display pipeline cycle control mode, (h) a perspective texture enable mode field that selectively enables perspective texture correction, (g) a texture detail mode field that selectively enables texture detail processing, (f) a texture sharpen enable mode field that selectively enables texture sharpening, (e) a texture detail enable mode field that selectively enables texture level-of-detail processing, (d) an enable look up table mode field that selectively enables lookup of texture values from a color look up table, (c) a texture look up table type mode field that specifies type of texels in the color look up table, (b) a sample type mode field that specifies how texels should be sampled, (a) a mid texel mode field that specifies whether texels should be filtered using a 2×2 half texel interpolation,
(Z) a first bilerp mode field that specifies whether a texture filter should bilinearly interpolate texels in pipeline cycle 0,
(Y) a second bilerp mode field that specifies whether a texture filter should bilinearly interpolate texels in pipeline cycle 1,
(X) a texel convert mode field that specifies whether a texel outputted by the texture filter during pipeline cycle 0 should be color converted,
(W) a chroma key enable mode field that selectively enables chroma keying,
(V2) an rgb dither select mode field that selects type of rgb dithering,
(V1) an alpha dither select mode field that selects type of alpha dithering,
(V) a plurality of blend modewords that specify blender parameters,
(M) a force blend enable mode field that specifies whether the blender should be force enabled,
(L) an alpha coverage select mode field that specifies whether coverage should be used to determine pixel alpha,
(K) a coverage times alpha select mode field that specifies whether coverage multiplied by alpha should be used to determine pixel alpha and coverage,
(J) a z mode select mode field that specifies z buffering mode,
(I) a coverage destination mode field that specifies coverage destination,
(H) a color on coverage mode field that specifies whether color should be updated only on coverage overflow,
(G) an image read enable mode field that selectively enables color and/or coverage read/modify/write frame buffer memory access,
(F) a z update enable mode field that selectively enables z buffer writing conditioned on whether color write is enabled,
(E) a z compare enable mode field that specifies conditional color write enable on depth comparison,
(D) an anti-alias enable mode field that allows blend enable using coverage,
(C) a z source select mode field that chooses between primitive depth and pixel depth,
(B) a dither alpha enable mode field that specifies whether random noise should be used in alpha compare, and
(A) an alpha compare enable mode field that enables conditional color write on alpha compare.

2. A process as in claim 1 including the step of generating a cycle type mode field that selects a display pipeline cycle control mode of 1 cycle per pixel mode, 2 cycles per pixel mode, copy mode and fill mode.

3. A process as in claim 1 including the step of generating a texture look up table type mode field that between:
 (1) storing texels in a color look up table in RGBA format of 5 bits red, 5 bits green, 5 bits blue and 1 bit alpha, and
 (2) storing texels in a color look up table in intensity alpha format providing an 8 bit intensity value and an 8 bit alpha value.

4. A process as in claim 1 including the step of generating a sample type mode field that selects between:

(1) point sampling, and
 (2) 2×2 array sampling.

5. A process as in claim 1 including the step of generating an rgb dither select mode field that selects between dithering based on:
 (1) a magic square matrix,
 (2) a bayer matrix,
 (3) noise, or
 (4) no dithering.

6. A process as in claim 1 including the step of generating an alpha dithering select mode field that specifies dithering based on:
 (1) a predetermined pattern,
 (2) the negative of the predetermined pattern,
 (3) noise, or
 (4) no dithering.

7. A process as in claim 1 including the step of generating a coverage destination mode field that selects between the following coverage destination modes:
 (1) clamp,
 (2) wrap,
 (3) force to full coverage, and
 (4) save.

8. A process as in claim 1 including the step of generating a z mode select mode field that selects one of the following z buffering modes:
 (1) opaque,
 (2) interpenetrating,
 (3) transparent, and
 (4) decal.

9. A process for generating at least one display mode control command for processing by a 3D graphics system, the process including the step of generating at least one set mode command having:
 a command identifier field including a six-bit binary value of 101111, and
 at least one of the following mode control fields:
  (k) an atomic primitive mode field that specifies whether to force writing a primitive to a frame buffer before reading a following primitive,
  (i) a cycle type mode field that selects a display pipeline cycle control mode,
  (h) a perspective texture enable mode field that selectively enables perspective texture correction,
  (g) a texture detail mode field that selectively enables texture detail processing,
  (f) a texture sharpen enable mode field that selectively enables texture sharpening,
  (e) a texture detail enable mode field that selectively enables texture level-of-detail processing,
  (d) an enable look up table mode field that selectively enables lookup of texture values from a color look up table,
  (c) a texture look up table type mode field that specifies type of texels in the color look up table,
  (b) a sample type mode field that specifies how texels should be sampled,
  (a) a mid texel mode field that specifies whether texels should be filtered using a 2×2 half texel interpolation,
  (Z) a first bilerp mode field that specifies whether a texture filter should bilinearly interpolate texels in pipeline cycle 0,
  (Y) a second bilerp mode field that specifies whether a texture filter should bilinearly interpolate texels in pipeline cycle 1, (X) a texel convert mode field that specifies whether a texel outputted by the texture filter during pipeline cycle 0 should be color converted,
(W) a chroma key enable mode field that selectively enables chroma keying,
(V2) an rgb dither select mode field that selects type of rgb dithering,
(V1) an alpha dither select mode field that selects type of alpha dithering,
(V) a plurality of blend modewords that specify blender parameters,
(M) a force blend enable mode field that specifies whether the blender should be force enabled,
(L) an alpha coverage select mode field that specifies whether coverage should be used to determine pixel alpha,
(K) a coverage times alpha select mode field that specifies whether coverage multiplied by alpha should be used to determine pixel alpha and coverage,
(J) a z mode select mode field that specifies z buffering mode,
(I) a coverage destination mode field that specifies coverage destination,
(H) a color on coverage mode field that specifies whether color should be updated only on coverage overflow,
(G) an image read enable mode field that selectively enables color and/or coverage read/modify/write frame buffer memory access,
(F) a z update enable mode field that selectively enables z buffer writing conditioned on whether color write is enabled,
(E) a z compare enable mode field that specifies conditional color write enable on depth comparison,
(D) an anti-alias enable mode field that allows blend enable using coverage,
(C) a z source select mode field that chooses between primitive depth and pixel depth,
(B) a dither alpha enable mode field that specifies whether random noise should be used in alpha compare, and
(A) an alpha compare enable mode field that enables conditional color write on alpha compare,
including the step of generating a plurality of blend modeword that specify blender parameters specifying:
selectively multiplying a first blender input during pipeline cycle 0,
selectively multiplying the first blender input during pipeline cycle 1,
selectively multiplying a second blender input during pipeline cycle 0,
selectively multiplying the second blender input during pipeline cycle 1,
selectively multiplying a third blender input during pipeline cycle 0,
selectively multiplying the third blender input during pipeline cycle 1,
selectively multiplying a fourth blender input during pipeline cycle 0,
selectively multiplying the fourth blender input during pipeline cycle 1.

10. A system for generating at least one 3D display mode control command for processing by a 3D graphics system, the system including:
at least one processor,
at least one memory, and
circuitry coupled to the processor and to the memory for providing at least one set mode command having:
a command identifier field including a six-bit binary value of 101111, and the following mode control fields:
(k) an atomic primitive mode field that specifies whether to force writing a primitive to a frame buffer before reading a following primitive,
(i) a cycle type mode field that selects a display pipeline cycle control mode,
(h) a perspective texture enable mode field that selectively enables perspective texture correction,
(g) a texture detail mode field that selectively enables texture detail processing,
(f) a texture sharpen enable mode field that selectively enables texture sharpening,
(e) a texture detail enable mode field that selectively enables texture level-of-detail processing,
(d) an enable look up table mode field that selectively enables lookup of texture values from a color look up table,
(c) a texture look up table type mode field that specifies type of texels in the color look up table,
(b) a sample type mode field that specifies how texels should be sampled,
(a) a mid texel mode field that specifies whether texels should be filtered using a 2×2 half texel interpolation,
(Z) a first bilerp mode field that specifies whether a texture filter should bilinearly interpolate texels in pipeline cycle 0,
(Y) a second bilerp mode field that specifies whether a texture filter should bilinearly interpolate texels in pipeline cycle 1,
(X) a texel convert mode field that specifies whether a texel outputted by the texture filter during pipeline cycle 0 should be color converted,
(W) a chroma key enable mode field that selectively enables chroma keying,
(V2) an rgb dither select mode field that selects type of rgb dithering,
(V1) an alpha dither select mode field that selects type of alpha dithering,
(V) a plurality of blend modewords that specify blender parameters,
(M) a force blend enable mode field that specifies whether the blender should be force enabled,
(L) an alpha coverage select mode field that specifies whether coverage should be used to determine pixel alpha,
(K) a coverage times alpha select mode field that specifies whether coverage multiplied by alpha should be used to determine pixel alpha and coverage,
(J) a z mode select mode field that specifies z buffering mode,
(I) a coverage destination mode field that specifies coverage destination,
(H) a color on coverage mode field that specifies whether color should be updated only on coverage overflow,
(G) an image read enable mode field that selectively enables color and/or coverage read/modify/write frame buffer memory access,
(F) a z update enable mode field that selectively enables z buffer writing conditioned on whether color write is enabled, (E) a z compare enable mode field that specifies conditional color write enable on depth comparison, (D) an anti-alias enable mode field that allows blend enable using coverage, (C) a z source select mode field that chooses between primitive depth and pixel depth, (B) a dither alpha enable mode field that specifies whether random noise should be used in alpha compare, and (A) an alpha compare enable mode field that enables conditional color write on alpha compare.

11. A system as in claim 10 including means for generating a cycle type mode field that selects a display pipeline cycle control mode of 1 cycle per pixel mode, 2 cycles per pixel mode, copy mode and fill mode.

12. A system as in claim 10 including means for providing a texture look up table type mode field that selects between:

(1) storing texels in a color look up table in RGBA format of 5 bits red, 5 bits green, 5 bits blue and 1 bit alpha, and (2) storing texels in a color look up table in intensity alpha format providing an 8 bit intensity value and an 8 bit alpha value.

13. A system as in claim 10 including circuitry for providing a sample type mode field that selects between:

(1) point sampling, and (2) 2×2 array sampling.

14. A system as in claim 10 including circuitry for providing an rgb dither select mode field that selects between dithering based on:

(1) a magic square matrix, (2) a bayer matrix, (3) noise, or (4) no dithering.

15. A system as in claim 10 including means for generating an alpha dithering select mode field that specifies dithering based on:

(1) a predetermined pattern, (2) the negative of the predetermined pattern, (3) noise, or (4) no dithering.

16. A system as in claim 10 including circuitry for generating a coverage destination mode field that selects between the following coverage destination modes:

(1) clamp, (2) wrap, (3) force to full coverage, and (4) save.

17. A system as in claim 10 including circuitry for providing a z mode select mode field that selects one of the following z buffering modes:

(1) opaque, (2) interpenetrating, (3) transparent, and (4) decal.

18. A system for generating at least one 3D display mode control command for processing by a 3D graphics system, the system including:

at least one processor, at least one memory, and circuitry coupled to the processor and to the memory for providing at least one set mode command having:

a command identifier field including a six-bit binary value of 101111, and at least one of the following mode control fields:

(k) an atomic primitive mode field that specifies whether to force writing a primitive to a frame buffer before reading a following primitive, (i) a cycle type mode field that selects a display pipeline cycle control mode, (h) a perspective texture enable mode field that selectively enables perspective texture correction, (g) a texture detail mode field that selectively enables texture detail processing, (f) a texture sharpen enable mode field that selectively enables texture sharpening, (e) a texture detail enable mode field that selectively enables texture level-of-detail processing, (d) an enable look up table mode field that selectively enables lookup of texture values from a color look up table, (c) a texture look up table type mode field that specifies type of texels in the color look up table, (b) a sample type mode field that specifies how texels should be sampled, (a) a mid texel mode field that specifies whether texels should be filtered using a 2×2 half texel interpolation, (Z) a first bilerp mode field that specifies whether a texture filter should bilinearly interpolate texels in pipeline cycle 0, (Y) a second bilerp mode field that specifies whether a texture filter should bilinearly interpolate texels in pipeline cycle 1, (X) a texel convert mode field that specifies whether a texel outputted by the texture filter during pipeline cycle 0 should be color converted, (W) a chroma key enable mode field that selectively enables chroma keying, (V2) an rgb dither select mode field that selects type of rgb dithering, (V1) an alpha dither select mode field that selects type of alpha dithering, (V) a plurality of blend modewords that specify blender parameters, (M) a force blend enable mode field that specifies whether the blender should be force enabled, (L) an alpha coverage select mode field that specifies whether coverage should be used to determine pixel alpha, (K) a coverage times alpha select mode field that specifies whether coverage multiplied by alpha should be used to determine pixel alpha and coverage, (J) a z mode select mode field that specifies z buffering mode, (I) a coverage destination mode field that specifies coverage destination, (H) a color on coverage mode field that specifies whether color should be updated only on coverage overflow, (G) an image read enable mode field that selectively enables color and/or coverage read/modify/write frame buffer memory access, (F) a z update enable mode field that selectively enables z buffer writing conditioned on whether color write is enabled, (E) a z compare enable mode field that specifies conditional color write enable on depth comparison, (D) an anti-alias enable mode field that allows blend enable using coverage,
(C) a z source select mode field that chooses between primitive depth and pixel depth,
(B) a dither alpha enable mode field that specifies whether random noise should be used in alpha compare, and
(A) an alpha compare enable mode field that enables conditional color write on alpha compare,
including means for generating a plurality of blend modeword that specify blender parameters specifying:
selectively multiplying a first blender input during pipeline cycle 0,
selectively multiplying the first blender input during pipeline cycle 1,
selectively multiplying a second blender input during pipeline cycle 0,
selectively multiplying the second blender input during pipeline cycle 1,
selectively multiplying a third blender input during pipeline cycle 0,
selectively multiplying the third blender input during pipeline cycle 1,
selectively multiplying a fourth blender input during pipeline cycle 0,
selectively multiplying the fourth blender input during pipeline cycle 1.

19. In a 3D graphics system, a process for interpreting at least one set mode command including the steps of:
(a) interpreting a command identifier field including a six-bit binary value of 101111,
(b) interpreting the following mode control fields:
(k) an atomic primitive mode field that specifies whether to force writing a primitive to a frame buffer before reading a following primitive,
(i) a cycle type mode field that selects a display pipeline cycle control mode,
(h) a perspective texture enable mode field that selectively enables perspective texture correction,
(g) a texture detail mode field that selectively enables texture detail processing,
(f) a texture sharpen enable mode field that selectively enables texture sharpening,
(e) a texture detail enable mode field that selectively enables texture level-of-detail processing,
(d) an enable look up table mode field that selectively enables lookup of texture values from a color look up table,
(c) a texture look up table type mode field that specifies type of texels in the color look up table,
(b) a sample type mode field that specifies how texels should be sampled,
(a) a mid texel mode field that specifies whether texels should be filtered using a 2×2 half texel interpolation,
(Z) a first bilerp mode field that specifies whether a texture filter should bilinearly interpolate texels in pipeline cycle 0,
(Y) a second bilerp mode field that specifies whether a texture filter should bilinearly interpolate texels in pipeline cycle 1,
(X) a texel convert mode field that specifies whether a texel outputted by the texture filter during pipeline cycle 0 should be color converted,
(W) a chroma key enable mode field that selectively enables chroma keying,
(V2) an rgb dither select mode field that selects type of rgb dithering,
(V1) an alpha dither select mode field that selects type of alpha dithering,
(V) a plurality of blend modewords that specify blender parameters,
(M) a force blend enable mode field that specifies whether the blender should be force enabled,
(L) an alpha coverage select mode field that specifies whether coverage should be used to determine pixel alpha,
(K) a coverage times alpha select mode field that specifies whether coverage multiplied by alpha should be used to determine pixel alpha and coverage,
(J) a z mode select mode field that specifies z buffering mode,
(I) a coverage destination mode field that specifies coverage destination,
(H) a color on coverage mode field that specifies whether color should be updated only on coverage overflow,
(G) an image read enable mode field that selectively enables color and/or coverage read/modify/write frame buffer memory access,
(F) a z update enable mode field that selectively enables z buffer writing conditioned on whether color write is enabled,
(E) a z compare enable mode field that specifies conditional color write enable on depth comparison,
(D) an anti-alias enable mode field that allows blend enable using coverage,
(C) a z source select mode field that chooses between primitive depth and pixel depth,
(B) a dither alpha enable mode field that specifies whether random noise should be used in alpha compare,
(A) an alpha compare enable mode field that enables conditional color write on alpha compare, and
(c) generating an image based at least in part on step (b).

20. A process as in claim 19 including the step of interpreting a cycle type mode field that selects a display pipeline cycle control mode of 1 cycle per pixel mode, 2 cycles per pixel mode, copy mode and fill mode.

21. A process as in claim 19 including the step of interpreting a texture look up table type mode field that selects between:
(1) storing texels in a color look up table in RGBA format of 5 bits red, 5 bits green, 5 bits blue and 1 bit alpha, and
(2) storing texels in a color look up table in intensity alpha format providing an 8 bit intensity value and an 8 bit alpha value.

22. A process as in claim 19 including the step of interpreting a sample type mode field that selects between:
(1) point sampling, and
(2) 2×2 array sampling.

23. A process as in claim 19 including the step of interpreting an rgb dither select mode field that selects between dithering based on:
(1) a magic square matrix,
(2) a bayer matrix,
(3) noise, or
(4) no dithering.

24. A process as in claim 19 including the step of interpreting an alpha dithering select mode field that specifies dithering based on:

(1) a predetermined pattern,
(2) the negative of the predetermined pattern,
(3) noise, or
(4) no dithering.

25. A process as in claim 19 including the step of interpreting a coverage destination mode field that selects between the following coverage destination modes:
   (1) clamp,
   (2) wrap,
   (3) force to full coverage, and
   (4) save.

26. A process as in claim 19 including the step of interpreting a z mode select mode field that selects one of the following z buffering modes:
   (1) opaque,
   (2) interpenetrating,
   (3) transparent, and
   (4) decal.

27. In a 3D graphics system, a process for interpreting at least one set mode command including the steps of:
   (a) interpreting a command identifier field including a six-bit binary value of 101111,
   (b) interpreting at least one of the following mode control fields:
      (k) an atomic primitive mode field that specifies whether to force writing a primitive to a frame buffer before reading a following primitive,
      (i) a cycle type mode field that selects a display pipeline cycle control modes,
      (h) a perspective texture enable mode field that selectively enables perspective texture correction,
      (g) a texture detail mode field that selectively enables texture detail processing,
      (f) a texture sharpen enable mode field that selectively enables texture sharpening,
      (e) a texture detail enable mode field that selectively enables texture level-of-detail processing,
      (d) an enable look up table mode field that selectively enables lookup of texture values from a color look up table,
      (c) a texture look up table type mode field that specifies type of texels in the color look up table,
      (b) a sample type mode field that specifies how texels should be sampled,
      (a) a mid texel mode field that specifies whether texels should be filtered using a 2×2 half texel interpolation,
      (Z) a first bilerp mode field that specifies whether a texture filter should bilinearly interpolate texels in pipeline cycle 0,
      (Y) a second bilerp mode field that specifies whether a texture filter should bilinearly interpolate texels in pipeline cycle 1,
      (X) a texel convert mode field that specifies whether a texel outputted by the texture filter during pipeline cycle 0 should be color converted,
      (W) a chroma key enable mode field that selectively enables chroma keying,
      (V2) an rgb dither select mode field that selects type of rgb dithering,
      (V1) an alpha dither select mode field that selects type of alpha dithering,
      (V) a plurality of blend modewords that specify blender parameter,
      (M) a force blend enable mode field that specifies whether the blender should be force enabled,
      (L) an alpha coverage select mode field that specifies whether coverage should be used to determine pixel alpha,
      (K) a coverage times alpha select mode field that specifies whether coverage multiplied by alpha should be used to determine pixel alpha and coverage,
      (J) a z mode select mode field that specifies z buffering mode,
      (I) a coverage destination mode field that specifies coverage destination
      (H) a color on coverage mode field that specifies whether color should be updated only on coverage overflow,
      (G) an image read enable mode field that selectively enables color and/or coverage read/modify/write frame buffer memory access,
      (F) a z update enable mode field that selectively enables z buffer writing conditioned on whether color write is enabled,
      (E) a z compare enable mode field that specifies conditional color write enable on depth comparison,
      (D) an anti-alias enable mode field that allows blend enable using coverage,
      (C) a z source select mode field that chooses between primitive depth and pixel depth,
      (B) a dither alpha enable mode field that specifies whether random noise should be used in alpha compare,
      (A) an alpha compare enable mode field that enables conditional color write on alpha compare, and
   (c) generating an image based at least in part on step (b),
   including the step of interpreting a plurality of blend modeword that specify blender parameters specifying:
      selectively multiplying a first blender input during pipeline cycle 0,
      selectively multiplying the first blender input during pipeline cycle 1,
      selectively multiplying a second blender input during pipeline cycle 0,
      selectively multiplying the second blender input during pipeline cycle 1,
      selectively multiplying a third blender input during pipeline cycle 0,
      selectively multiplying the third blender input during pipeline cycle 1,
      selectively multiplying a fourth blender input during pipeline cycle 0,
      selectively multiplying the fourth blender input during pipeline cycle 1.

28. A 3D graphics system for interpreting at least one set mode command having a command identifier field including a six-bit binary value of 101111, the system including:
   a first decoder that interprets a command identifier field including a six-bit binary value of 101111,
   (k) circuitry for interpreting an atomic primitive mode field that specifies whether to force writing a primitive to a frame buffer before reading a following primitive,
   (i) circuitry for interpreting a cycle type mode field that selects a display pipeline cycle control mode,
   (h) circuitry for interpreting a perspective texture enable mode field that selectively enables perspective texture correction,
   (g) circuitry for interpreting a texture detail mode field that selectively enables texture detail processing, (f) circuitry for interpreting a texture sharpen enable mode field that selectively enables texture sharpening, (e) circuitry for interpreting a texture detail enable mode field that selectively enables texture level-of-detail processing, (d) circuitry for interpreting an enable look up table mode field that selectively enables lookup of texture values from a color look up table, (c) circuitry for interpreting a texture look up table type mode field that specifies type of texels in the color look up table, (b) circuitry for interpreting a sample type mode field that specifies how texels should be sampled, (a) circuitry for interpreting a mid texel mode field that specifies whether texels should be filtered using a 2×2 half texel interpolation, (Z) circuitry for interpreting a first bilerp mode field that specifies whether a texture filter should bilinearly interpolate texels in pipeline cycle 0, (Y) circuitry for interpreting a second bilerp mode field that specifies whether a texture filter should bilinearly interpolate texels in pipeline cycle 1, (X) circuitry for interpreting a texel convert mode field that specifies whether a texel outputted by the texture filter during pipeline cycle 0 should be color converted, (W) circuitry for interpreting a chroma key enable mode field that selectively enables chroma keying, (V2) circuitry for interpreting an rgb dither select mode field that selects type of rgb dithering, (V1) circuitry for interpreting an alpha dither select mode field that selects type of alpha dithering, (V) circuitry for interpreting a plurality of blend modewords that specify blender parameters, (M) circuitry for interpreting a force blend enable mode field that specifies whether the blender should be force enabled, (L) circuitry for interpreting an alpha coverage select mode field that specifies whether coverage should be used to determine pixel alpha, (K) circuitry for interpreting a coverage times alpha select mode field that specifies whether coverage multiplied by alpha should be used to determine pixel alpha and coverage, (J) circuitry for interpreting a z mode select mode field that specifies z buffering mode, (I) circuitry for interpreting a coverage destination mode field that specifies coverage destination, (H) circuitry for interpreting a color on coverage mode field that specifies whether color should be updated only on coverage overflow, (G) circuitry for interpreting an image read enable mode field that selectively enables color and/or coverage read/modify/write frame buffer memory access, (F) circuitry for interpreting a z update enable mode field that selectively enables z buffer writing conditioned on whether color write is enabled, (E) circuitry for interpreting a z compare enable mode field that specifies conditional color write enable on depth comparison, (D) circuitry for interpreting an anti-alias enable mode field that allows blend enable using coverage, (C) circuitry for interpreting a z source select mode field that chooses between primitive depth and pixel depth, (B) circuitry for interpreting a dither alpha enable mode field that specifies whether random noise should be used in alpha compare, (A) circuitry for interpreting an alpha compare enable mode field that enables conditional color write on alpha compare, and (c) circuitry coupled to above-mentioned circuitry (a)–(k), (A)–(M), (V1), (V2) and (W)–(Z) for generating an image.

29. An apparatus as in claim 28 including means for interpreting a cycle type mode field that selects a display pipeline cycle control mode of 1 cycle per pixel mode, 2 cycles per pixel mode, copy mode and fill mode.

30. An apparatus as in claim 28 including means for interpreting a texture look up table type mode field that selects between:
   (1) storing texels in a color look up table in RGBA format of 5 bits red, 5 bits green, 5 bits blue and 1 bit alpha, and
   (2) storing texels in a color look up table in intensity alpha format providing an 8 bit intensity value and an 8 bit alpha value.

31. An apparatus as in claim 28 including means for interpreting a sample type mode field that selects between:
   (1) point sampling, and
   (2) 2×2 array sampling.

32. An apparatus as in claim 28 including means for interpreting an rgb dither select mode field that selects between dithering based on:
   (1) a magic square matrix,
   (2) a bayer matrix,
   (3) noise, or
   (4) no dithering.

33. An apparatus as in claim 28 including means for interpreting an alpha dithering select mode field that specifies dithering based on:
   (1) a predetermined pattern,
   (2) the negative of the predetermined pattern,
   (3) noise, or
   (4) no dithering.

34. An apparatus as in claim 28 including means for interpreting a coverage destination mode field that selects between the following coverage destination modes:
   (1) clamp,
   (2) wrap,
   (3) force to full coverage, and
   (4) save.

35. An apparatus as in claim 28 including means for interpreting a z mode select mode field that selects one of the following z buffering modes:
   (1) opaque,
   (2) interpenetrating,
   (3) transparent, and
   (4) decal.

36. A 3D graphics system for interpreting at least one set mode command having a command identifier field including a six-bit binary value of 101111, the system including:
   a first decoder that interprets a command identifier field including a six-bit binary value of 101111,
      (k) circuitry for interpreting an atomic primitive mode field that specifies whether to force writing a primitive to a frame buffer before reading a following primitive, (i) circuitry for interpreting a cycle type mode field that selects a display pipeline cycle control mode,
(h) circuitry for interpreting a perspective texture enable mode field that selectively enables perspective texture correction,
(g) circuitry for interpreting a texture detail mode field that selectively enables texture detail processing,
(f) circuitry for interpreting a texture sharpen enable mode field that selectively enables texture sharpening,
(e) circuitry for interpreting a texture detail enable mode field that selectively enables texture level-of-detail processing,
(d) circuitry for interpreting an enable look up table mode field that selectively enables lookup of texture values from a color look up table,
(c) circuitry for interpreting a texture look up table type mode field that specifies type of texels in the color look up table,
(b) circuitry for interpreting a sample type mode field that specifies how texels should be sampled,
(a) circuitry for interpreting a mid texel mode field that specifies whether texels should be filtered using a 2×2 half texel interpolation,
(Z) circuitry for interpreting a first bilerp mode field that specifies whether a texture filter should bilinearly interpolate texels in pipeline cycle 0,
(Y) circuitry for interpreting a second bilerp mode field that specifies whether a texture filter should bilinearly interpolate texels in pipeline cycle 1,
(X) circuitry for interpreting a texel convert mode field that specifies whether a texel outputted by the texture filter during pipeline cycle 0 should be color converted,
(W) circuitry for interpreting a chroma key enable mode field that selectively enables chroma keying,
(V2) circuitry for interpreting an rgb dither select mode field that selects type of rgb dithering,
(V1) circuitry for interpreting an alpha dither select mode field that selects type of alpha dithering,
(V) circuitry for interpreting a plurality of blend modewords that specify blender parameters,
(M) circuitry for interpreting a force blend enable mode field that specifies whether the blender should be force enabled,
(L) circuitry for interpreting an alpha coverage select mode field that specifies whether coverage should be used to determine pixel alpha,
(K) circuitry for interpreting a coverage times alpha select mode field that specifies whether coverage multiplied by alpha should be used to determine pixel alpha and coverage,
(J) circuitry for interpreting a z mode select mode field that specifies z buffering mode,
(I) circuitry for interpreting a coverage destination mode field that specifies coverage destination,
(H) circuitry for interpreting a color on coverage mode field that specifies whether color should be updated only on coverage overflow,
(G) circuitry for interpreting an image read enable mode field that selectively enables color and/or coverage read/modify/write frame buffer memory access,
(F) circuitry for interpreting a z update enable mode field that selectively enables z buffer writing conditioned on whether color write is enabled,
(E) circuitry for interpreting a z compare enable mode field that specifies conditional color write enable on depth comparison,
(D) circuitry for interpreting an anti-alias enable mode field that allows blend enable using coverage,
(C) circuitry for interpreting a z source select mode field that chooses between primitive depth and pixel depth,
(B) circuitry for interpreting a dither alpha enable mode field that specifies whether random noise should be used in alpha compare,
(A) circuitry for interpreting an alpha compare enable mode field that enables conditional color write on alpha compare, and
(c) circuitry coupled to above-mentioned circuitry (a)–(k), (A)–(M), (V1), (V2) and (W)–(Z) for generating an image,
said system further including circuitry for interpreting a plurality of blend modeword that specify blender parameters specifying:
  selectively multiplying a first blender input during pipeline cycle 0,
  selectively multiplying the first blender input during pipeline cycle 1,
  selectively multiplying a second blender input during pipeline cycle 0,
  selectively multiplying the second blender input during pipeline cycle 1,
  selectively multiplying a third blender input during pipeline cycle 0,
  selectively multiplying the third blender input during pipeline cycle 1,
  selectively multiplying a fourth blender input during pipeline cycle 0,
  selectively multiplying the fourth blender input during pipeline cycle 1.

37. A storage medium for use with a 3D graphics system, the storage medium storing at least one 3D display mode control command including:
a command identifier field including a six-bit binary value of 101111, and
storage space reserved for at least the following mode control fields:
(k) an atomic primitive mode field that specifies whether to force writing a primitive to a frame buffer before reading a following primitive,
(i) a cycle type mode field that selects a display pipeline cycle control mode,
(h) a perspective texture enable mode field that selectively enables perspective texture correction,
(g) a texture detail mode field that selectively enables texture detail processing,
(f) a texture sharpen enable mode field that selectively enables texture sharpening,
(e) a texture detail enable mode field that selectively enables texture level-of-detail processing,
(d) an enable look up table mode field that selectively enables lookup of texture values from a color look up table,
(c) a texture look up table type mode field that specifies type of texels in the color look up table,
(b) a sample type mode field that specifies how texels should be sampled,
(a) a mid texel mode field that specifies whether texels should be filtered using a 2×2 half texel interpolation,
(Z) a first bilerp mode field that specifies whether a texture filter should bilinearly interpolate texels in pipeline cycle 0,
(Y) a second bilerp mode field that specifies whether a texture filter should bilinearly interpolate texels in pipeline cycle 1, (X) a texel convert mode field that specifies whether a texel outputted by the texture filter during pipeline cycle 0 should be color converted, (W) a chroma key enable mode field that selectively enables chroma keying, (V2) an rgb dither select mode field that selects type of rgb dithering, (V1) an alpha dither select mode field that selects type of alpha dithering, (V) a plurality of blend modewords that specify blender parameters, (M) a force blend enable mode field that specifies whether the blender should be force enabled, (L) an alpha coverage select mode field that specifies whether coverage should be used to determine pixel alpha, (K) a coverage times alpha select mode field that specifies whether coverage multiplied by alpha should be used to determine pixel alpha and coverage, (J) a z mode select mode field that specifies z buffering mode, (I) a coverage destination mode field that specifies coverage destination, (H) a color on coverage mode field that specifies whether color should be updated only on coverage overflow, (G) an image read enable mode field that selectively enables color and/or coverage read/modify/write frame buffer memory access, (F) a z update enable mode field that selectively enables z buffer writing conditioned on whether color write is enabled, (E) a z compare enable mode field that specifies conditional color write enable on depth comparison, (D) an anti-alias enable mode field that allows blend enable using coverage, (C) a z source select mode field that chooses between primitive depth and pixel depth, (B) a dither alpha enable mode field that specifies whether random noise should be used in alpha compare, and (A) an alpha compare enable mode field that enables conditional color write on alpha compare.

38. A storage medium as in claim 37 including means for storing a cycle type mode field that selects a display pipeline cycle control mode of 1 cycle per pixel mode, 2 cycles per pixel mode, copy mode and fill mode.

39. A storage medium as in claim 37 including means for storing a texture look up table type mode field that selects between:

(1) storing texels in a color look up table in RGBA format of 5 bits red, 5 bits green, 5 bits blue and 1 bit alpha, and (2) storing texels in a color look up table in intensity alpha format providing an 8 bit intensity value and an 8 bit alpha value.

40. A storage medium as in claim 37 including means for storing a sample type mode field that selects between:

(1) point sampling, and (2) 2×2 array sampling.

41. A storage medium as in claim 37 including means for storing an rgb dither select mode field that selects between dithering based on:

(1) a magic square matrix, (2) a bayer matrix, (3) noise, or (4) no dithering.

42. A storage medium as in claim 37 including means for storing an alpha dithering select mode field that specifies dithering based on:

(1) a predetermined pattern, (2) the negative of the predetermined pattern, (3) noise, or (4) no dithering.

43. A storage medium as in claim 37 including means for storing a coverage destination mode field that selects between the following coverage destination modes:

(1) clamp, (2) wrap, (3) force to full coverage, and (4) save.

44. A storage medium as in claim 37 including means for storing a z mode select mode field that selects one of the following z buffering modes:

(1) opaque, (2) interpenetrating, (3) transparent, and (4) decal.

45. A storage medium for use with a 3D graphics system, the storage medium storing at least one 3D display mode control command including:

a command identifier field including a six-bit binary value of 101111, and at least one of the following mode control fields:

(k) an atomic primitive mode field that specifies whether to force writing a primitive to a frame buffer before reading a following primitive, (i) a cycle type mode field that selects a display pipeline cycle control mode, (h) a perspective texture enable mode field that selectively enables perspective texture correction, (g) a texture detail mode field that selectively enables texture detail processing, (f) a texture sharpen enable mode field that selectively enables texture sharpening, (e) a texture detail enable mode field that selectively enables texture level-of-detail processing, (d) an enable look up table mode field that selectively enables lookup of texture values from a color look up table, (c) a texture look up table type mode field that specifies type of texels in the color look up table, (b) a sample type mode field that specifies how texels should be sampled, (a) a mid texel mode field that specifies whether texels should be filtered using a 2×2 half texel interpolation, (Z) a first bilerp mode field that specifies whether a texture filter should bilinearly interpolate texels in pipeline cycle 0, (Y) a second bilerp mode field that specifies whether a texture filter should bilinearly interpolate texels in pipeline cycle 1, (X) a texel convert mode field that specifies whether a texel outputted by the texture filter during pipeline cycle 0 should be color converted, (W) a chroma key enable mode field that selectively enables chroma keying, (V2) an rgb dither select mode field that selects type of rgb dithering, (V1) an alpha dither select mode field that selects type of alpha dithering,
(V) a plurality of blend modewords that specify blender parameters,
(M) a force blend enable mode field that specifies whether the blender should be force enabled,
(L) an alpha coverage select mode field that specifies whether coverage should be used to determine pixel alpha,
(K) a coverage times alpha select mode field that specifies whether coverage multiplied by alpha should be used to determine pixel alpha and coverage,
(J) a z mode select mode field that specifies z buffering mode,
(I) a coverage destination mode field that specifies coverage destination,
(H) a color on coverage mode field that specifies whether color should be updated only on coverage overflow,
(G) an image read enable mode field that selectively enables color and/or coverage read/modify/write frame buffer memory access,
(F) a z update enable mode field that selectively enables z buffer writing conditioned on whether color write is enabled,
(E) a z compare enable mode field that specifies conditional color write enable on depth comparison,
(D) an anti-alias enable mode field that allows blend enable using coverage,
(C) a z source select mode field that chooses between primitive depth and pixel depth,
(B) a dither alpha enable mode field that specifies whether random noise should be used in alpha compare, and
(A) an alpha compare enable mode field that enables conditional color write on alpha compare,
including memory locations for storing a plurality of blend modeword that specify blender parameters specifying:
  selectively multiplying a first blender input during pipeline cycle 0,
  selectively multiplying the first blender input during pipeline cycle 1,
  selectively multiplying a second blender input during pipeline cycle 0,
  selectively multiplying the second blender input during pipeline cycle 1,
  selectively multiplying a third blender input during pipeline cycle 0,
  selectively multiplying the third blender input during pipeline cycle 1,
  selectively multiplying a fourth blender input during pipeline cycle 0,
  selectively multiplying the fourth blender input during pipeline cycle 1.

* * * * *